(12) United States Patent
Verzun et al.

(10) Patent No.: US 11,831,624 B2
(45) Date of Patent: Nov. 28, 2023

(54) DECENTRALIZED CYBERSECURE PRIVACY NETWORK FOR CLOUD COMMUNICATION, COMPUTING AND GLOBAL E-COMMERCE

(71) Applicant: Listat Ltd., Kiev (UA)

(72) Inventors: Ievgen Verzun, Kiev (UA); Richard K. Williams, Cupertino, CA (US)

(73) Assignee: Listat Ltd., Kiev (UA)

( * ) Notice: Subject to any disclaimer, the term of this patent is extended or adjusted under 35 U.S.C. 154(b) by 0 days.

(21) Appl. No.: 17/678,652

(22) Filed: Feb. 23, 2022

(65) Prior Publication Data
US 2022/0368682 A1 Nov. 17, 2022

Related U.S. Application Data

(63) Continuation of application No. 16/508,168, filed on Jul. 10, 2019, now Pat. No. 11,277,390, which is a
(Continued)

(51) Int. Cl.
*H04L 9/40* (2022.01)
*H04L 9/06* (2006.01)
(Continued)

(52) U.S. Cl.
CPC ........ *H04L 63/0464* (2013.01); *G06F 21/606* (2013.01); *H04L 9/0662* (2013.01); *H04L 9/34* (2013.01); *H04L 63/102* (2013.01)

(58) Field of Classification Search
CPC ..... H04L 63/0464; H04L 9/0662; H04L 9/34; H04L 63/102; H04L 63/123;
(Continued)

(56) References Cited

U.S. PATENT DOCUMENTS

| | | | |
|---|---|---|---|
| 5,321,748 A | 6/1994 | Zeidler et al. | |
| 6,377,690 B1 * | 4/2002 | Witschorik | H04L 63/18 380/268 |

(Continued)

FOREIGN PATENT DOCUMENTS

| | | |
|---|---|---|
| CN | 106685825 A | 5/2017 |
| CN | 106936777 A | 7/2017 |

(Continued)

OTHER PUBLICATIONS

Virtual Routers, Apr. 3, 2017 https://web.archive.org/web/30170403014140/http://docs.voneclou.today/2.2/infrastructure_configuration/virtaul_rounters.html.
(Continued)

*Primary Examiner* — Abiy Getachew
(74) *Attorney, Agent, or Firm* — Patentability Associates

(57) ABSTRACT

Software installed in the nodes in a communication network allows them to perform a "name server" function, which entails the management of a dynamic list of the client devices that are connected to the cloud, a "task" function, which entails the receipt and transmission of the packets, and an "authority" function, which entails the determination of the routes of the packets through the cloud. Each node is capable of performing only one function at a time. After completing a job, a node reverts to an undifferentiated, state awaiting its next performance request.

21 Claims, 99 Drawing Sheets

Related U.S. Application Data continuation-in-part of application No. 15/946,863, filed on Apr. 6, 2018, now Pat. No. 10,491,575, and a continuation-in-part of application No. 15/943,418, filed on Apr. 2, 2018, now Pat. No. 11,627,639, which is a continuation-in-part of application No. 14/803,869, filed on Jul. 20, 2015, now Pat. No. 9,998,434, said application No. 15/946,863 is a continuation of application No. 14/803,869, filed on Jul. 20, 2015.

(60) Provisional application No. 62/696,160, filed on Jul. 10, 2018, provisional application No. 62/625,220, filed on Feb. 1, 2018, provisional application No. 62/480,696, filed on Apr. 3, 2017, provisional application No. 62/107,650, filed on Jan. 26, 2015.

(51) Int. Cl.
 *H04L 9/34* (2006.01)
 *G06F 21/60* (2013.01)

(58) Field of Classification Search
 CPC ............. H04L 2209/38; H04L 2209/56; H04L 9/3239; G06F 21/606; G06F 21/602; G06F 21/64
 See application file for complete search history.

(56) References Cited

U.S. PATENT DOCUMENTS

| | | | |
|---|---|---|---|
| 7,069,438 B2 | 6/2006 | Balabine et al. | |
| 8,204,217 B2 | 6/2012 | Björkengren et al. | |
| 9,177,157 B2* | 11/2015 | Binder | G06F 7/58 |
| 9,386,116 B2 | 7/2016 | Li et al. | |
| 9,444,655 B2* | 9/2016 | Sverdlov | H04L 23/00 |
| 9,628,579 B2 | 4/2017 | Li et al. | |
| 2002/0003881 A1 | 1/2002 | Reitmeier et al. | |
| 2004/0160903 A1 | 8/2004 | Gai et al. | |
| 2009/0136034 A1 | 5/2009 | Gaal et al. | |
| 2009/0153747 A1 | 6/2009 | Grimes | |
| 2009/0169001 A1 | 7/2009 | Tighe et al. | |
| 2009/0265473 A1 | 10/2009 | Hydrie et al. | |
| 2011/0194692 A1 | 8/2011 | Carpenter et al. | |
| 2011/0280143 A1 | 11/2011 | Li et al. | |
| 2011/0280153 A1 | 11/2011 | Li et al. | |
| 2012/0166582 A1 | 6/2012 | Binder | |
| 2012/0216034 A1 | 8/2012 | Chen et al. | |
| 2012/0297111 A1 | 11/2012 | Hsu et al. | |
| 2013/0041931 A1 | 2/2013 | Brand | |
| 2016/0219024 A1 | 7/2016 | Verzun et al. | |
| 2016/0292426 A1* | 10/2016 | Gibart | G09C 1/00 |
| 2016/0344628 A1 | 11/2016 | Hocker et al. | |
| 2017/0078197 A1 | 3/2017 | Cj et al. | |
| 2018/0041425 A1 | 2/2018 | Zhang | |

FOREIGN PATENT DOCUMENTS

| | | |
|---|---|---|
| EP | 1802119 A1 | 6/2007 |
| EP | 3136651 A1 | 3/2017 |
| WO | 2015139026 A2 | 9/2015 |
| WO | 2016003525 A2 | 1/2016 |

OTHER PUBLICATIONS

Matalas, Yannis et al., A Scalable Framework for Content Replication in Multicast-Based Content Distribution Networks; Walter Didimo et al.: 18th international conference on medical image computing and computer-assisted Intervention, Oct. 25, 2006.

Menezes, A.J., Handbook of Applied Cryptography, 1997, pp. 170-173, 237-230, 497-498, 506-508, CRC Press, Inc., United States.

Schneier, Bruce, Applied Cryptography, 2nd Ed., 1996, pp. 213-220, John Wiley & Sons, Inc., United States.

\* cited by examiner

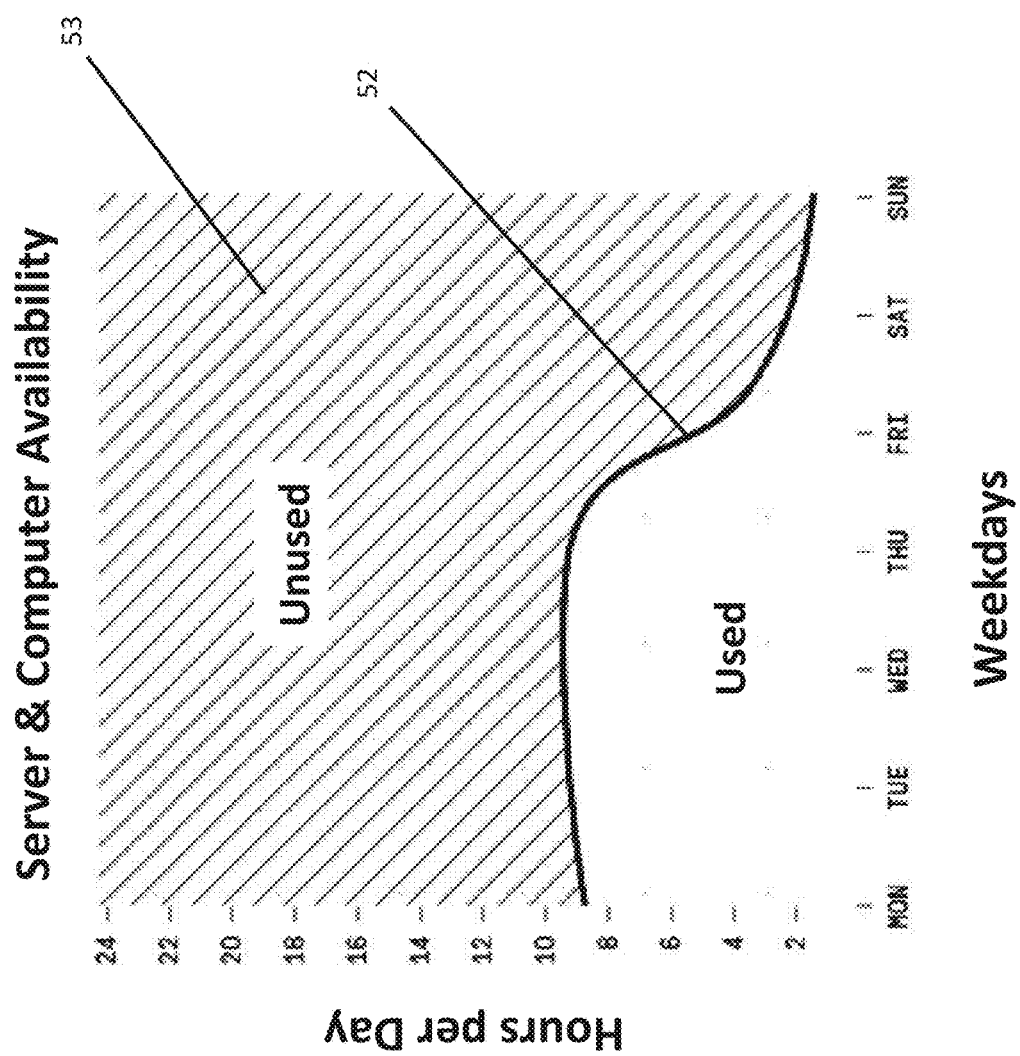

| Component | Name | Realization | Protocol |
|---|---|---|---|
| NS 108 | SDNP name server node | SDNP NS software 133 + 130 | SDNP routing |
| SS 107 | SDNP signal server node | SDNP SS software 134 + 130 | SDNP routing |
| M 106 | SDNP media node + DMZ | SDNP M software 135 + DMZ software 130a, 131, 136, 140 | SDNP routing |
| 105 | WiFi router | ISP network routing table 137 | TCP/IP routing |
| 104 | Ethernet router | ISP network routing table 138 | TCP/IP routing |
| 103 | Wireless network | Mobile network routing 139 + NAT 132 | wireless carrier routing |

Fig 9

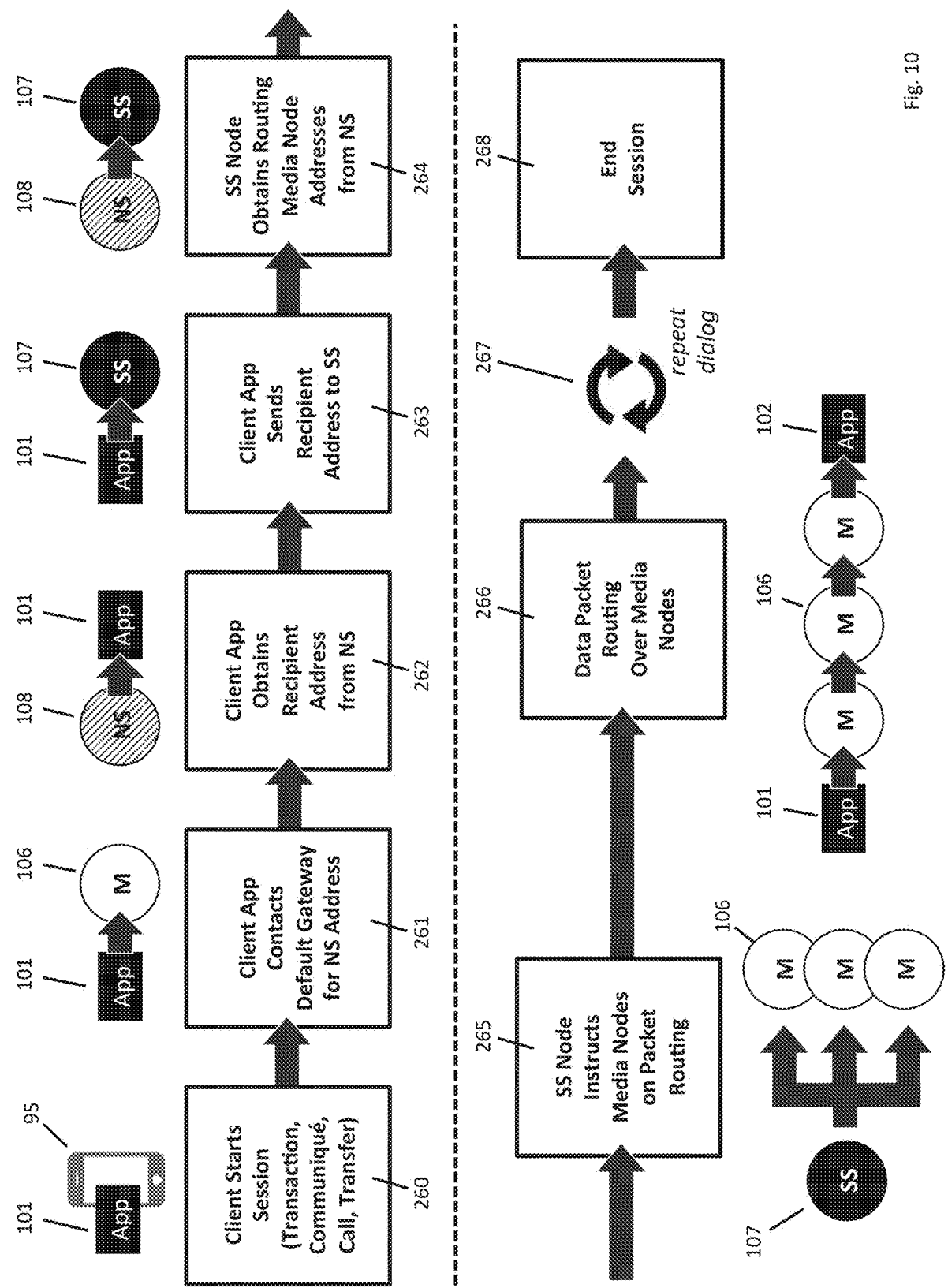

| Component | Name | Realization | Protocol |
|---|---|---|---|
| 206 HN | metamorphic HyperNode software | 231 HyperNode software + 230 | decentralized SDNP |
| 201 HG | HS client gateway software | 232 Client Gateway app software + 95 | decentralized SDNP |
| 205 HR | HyperSphere router & software | 233 HyperSphere dynamic router + 234 Ethyrnet or 235 HyFi | decentralized SDNP |
| 105 | WiFi router | 137 ISP network routing table | TCP/IP routing |
| 104 | Ethernet router | 138 ISP network routing table | TCP/IP routing |
| 103 | wireless network | 139 Mobile network routing + 132 NAT | wireless carrier routing |

Fig 12C

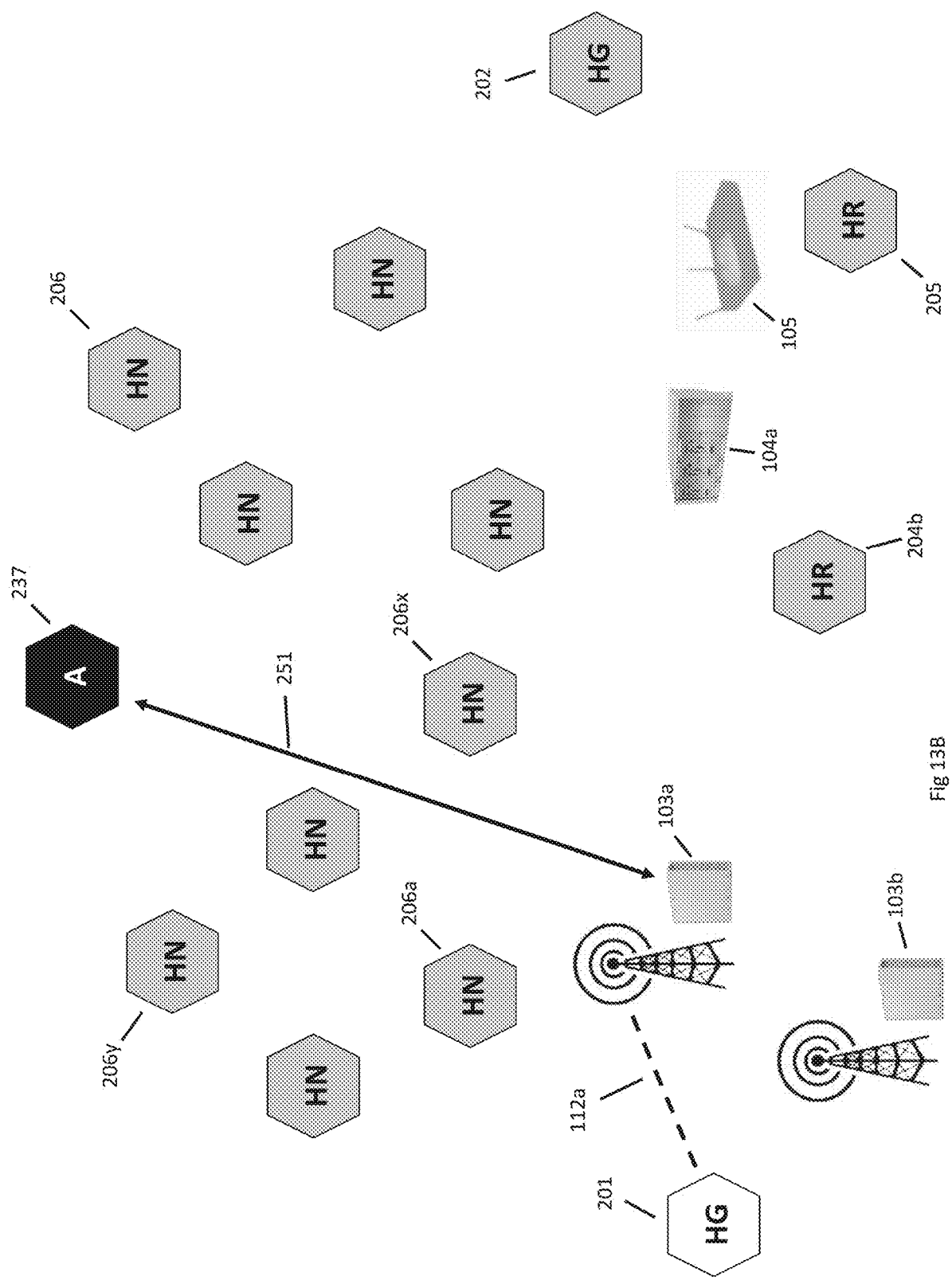

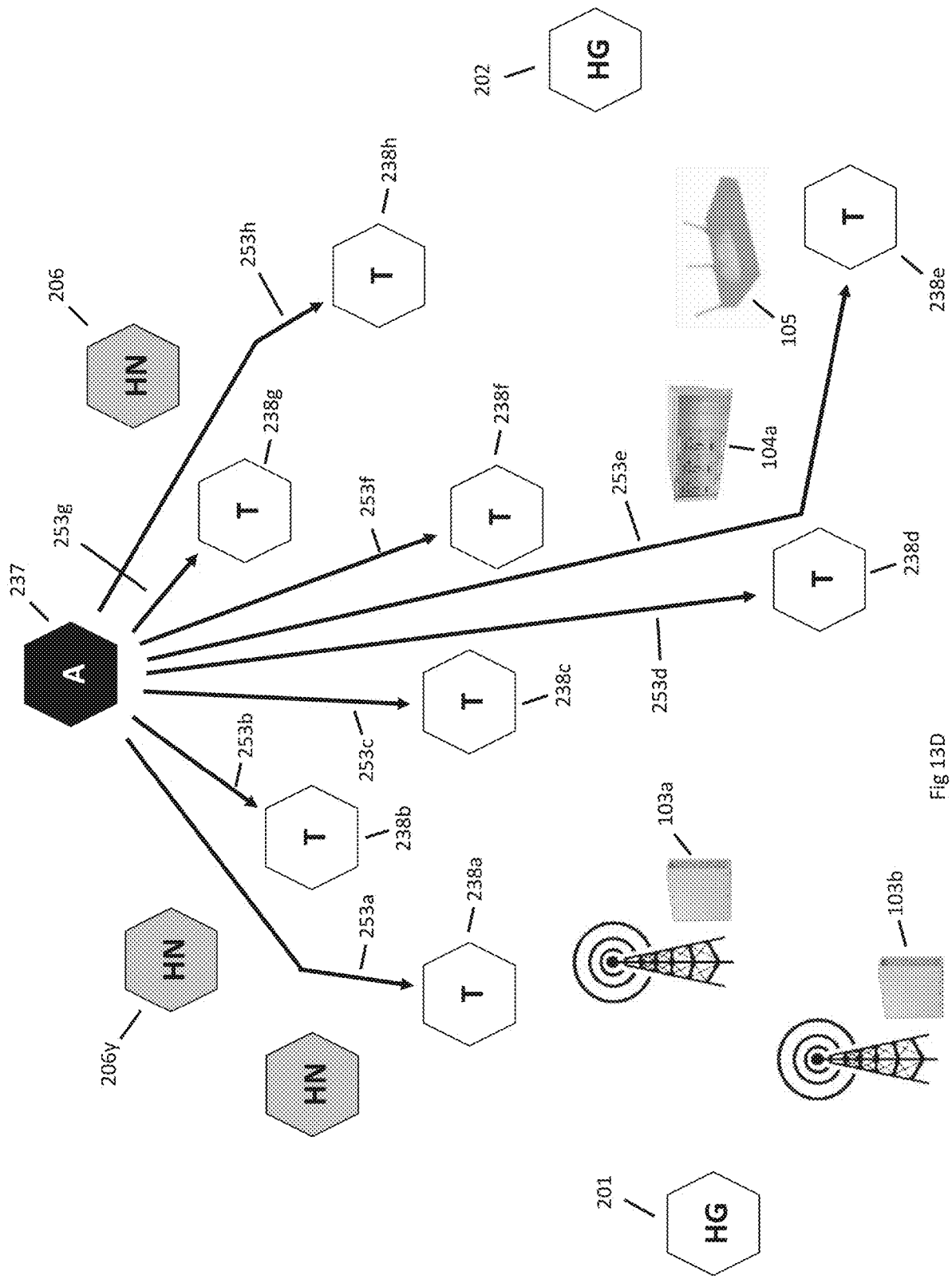

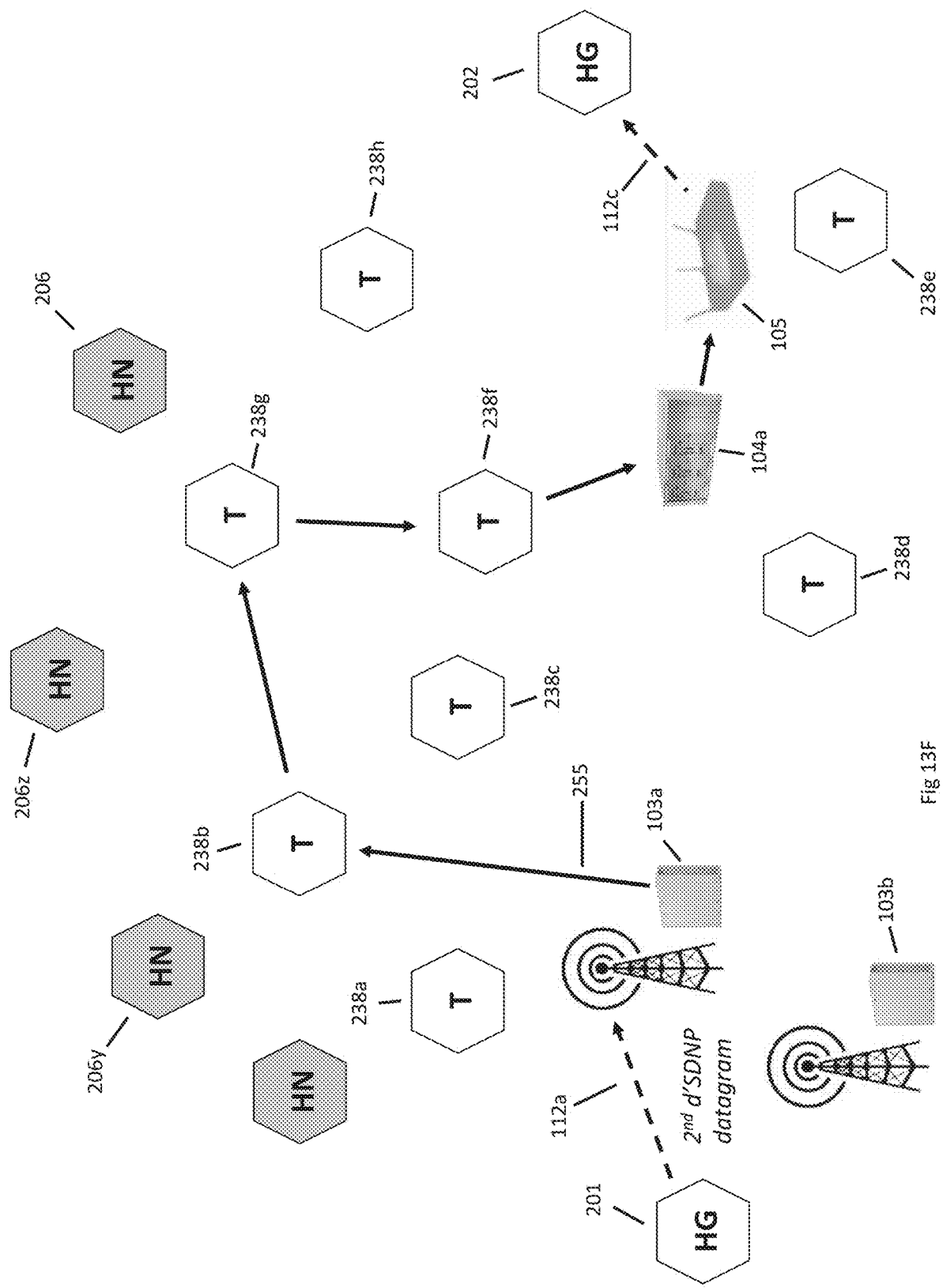

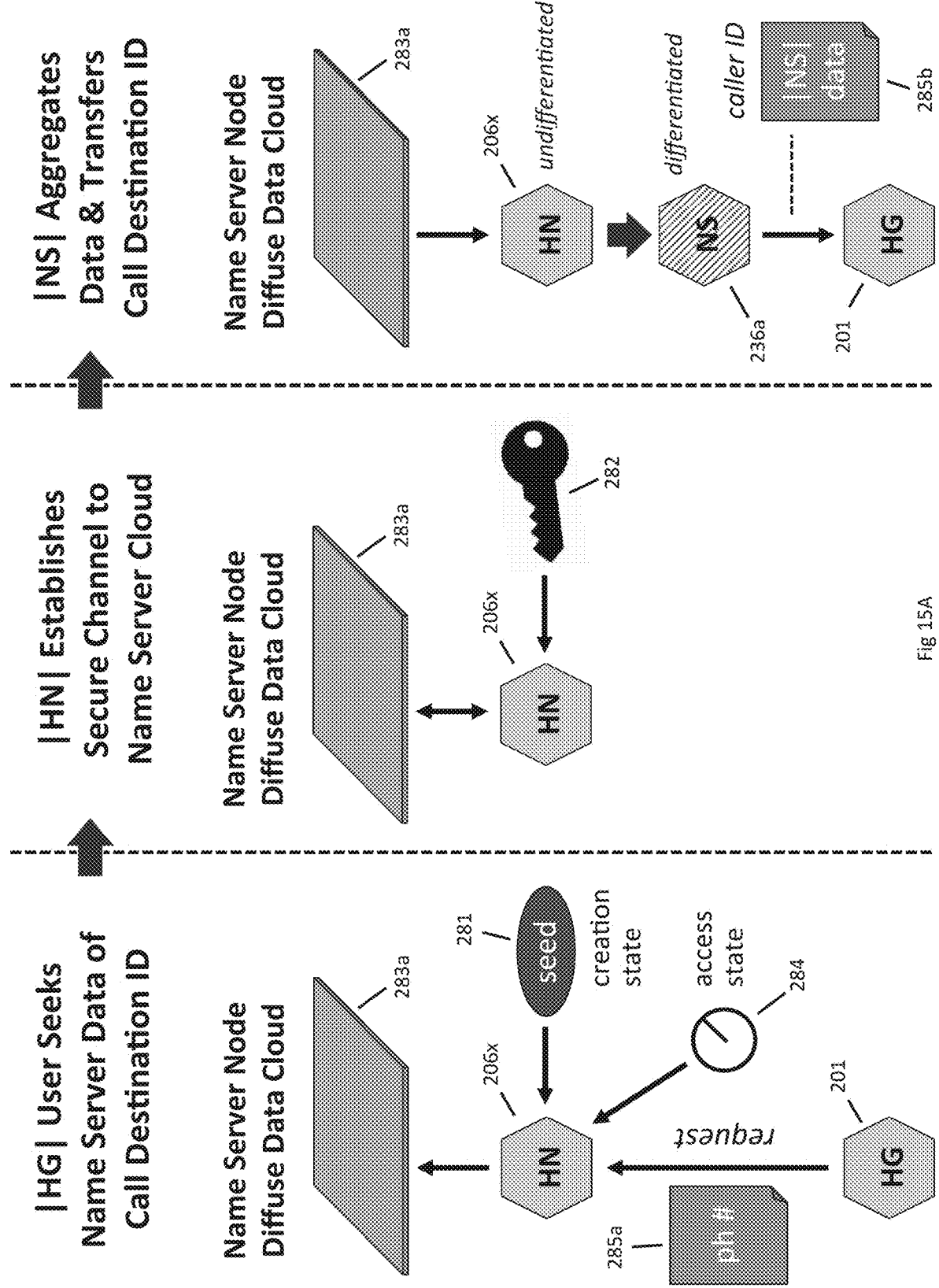

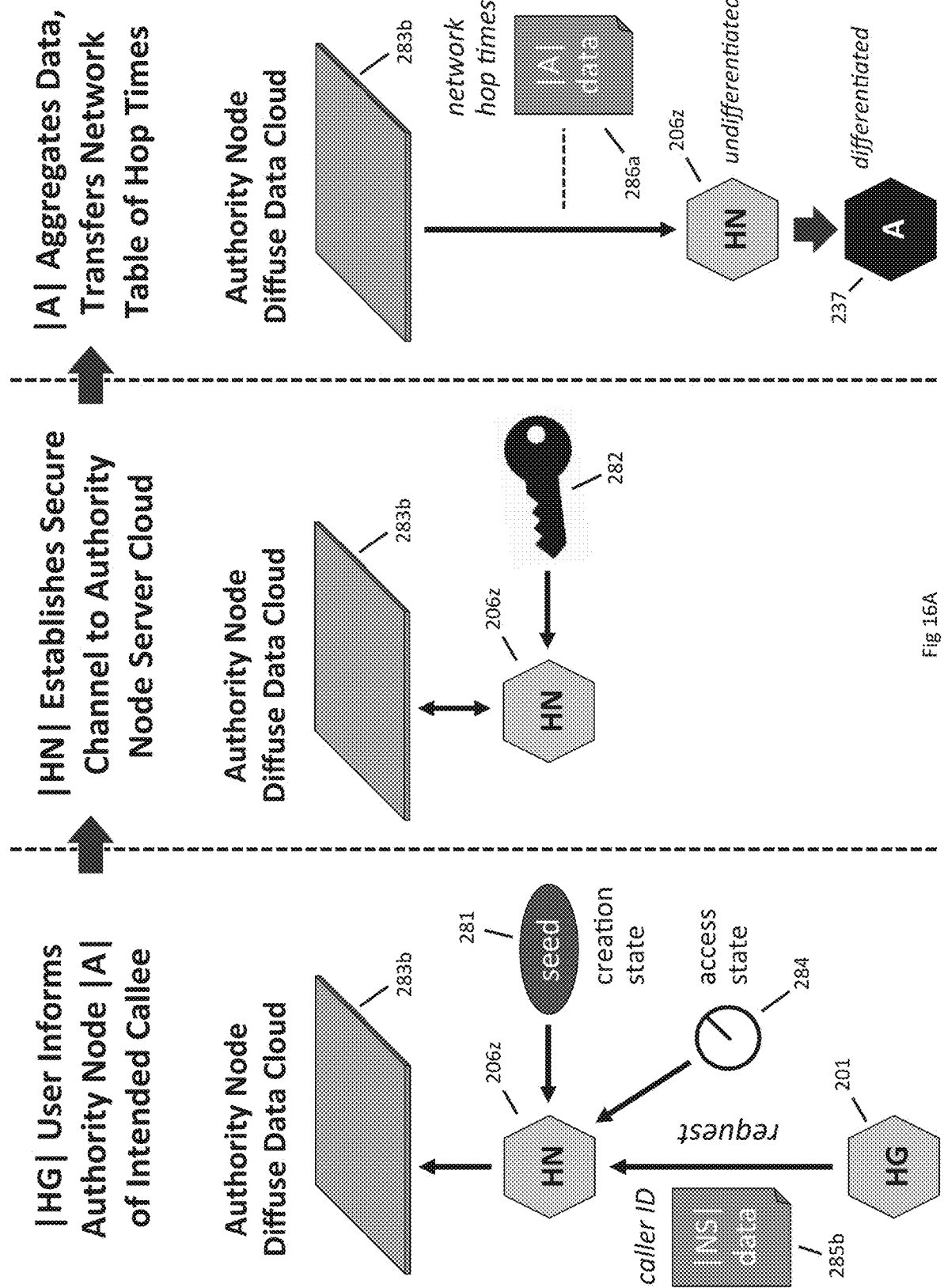

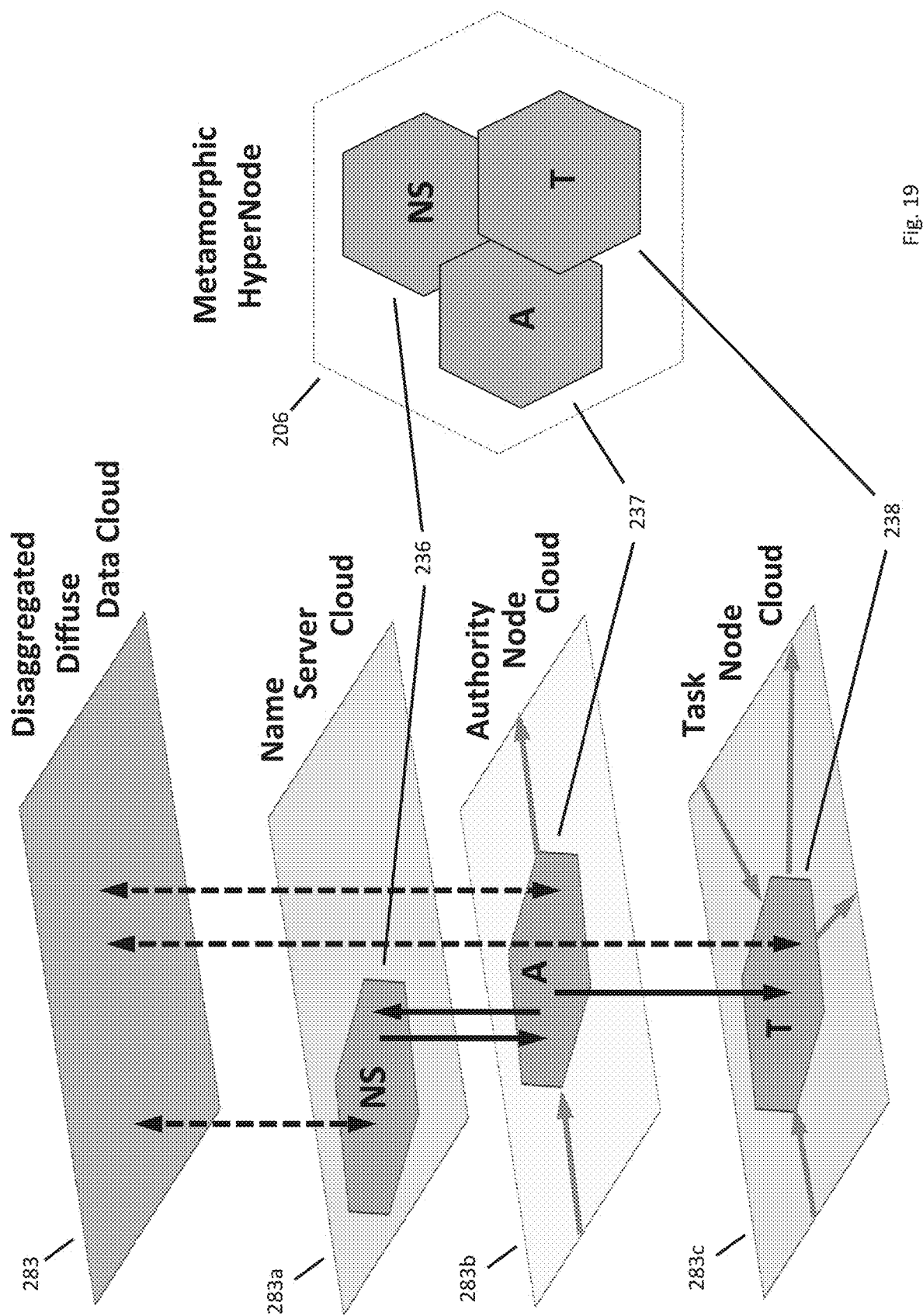

DECENTRALIZED CYBERSECURE PRIVACY NETWORK FOR CLOUD COMMUNICATION, COMPUTING AND GLOBAL E-COMMERCE

CROSS-REFERENCE TO RELATED APPLICATIONS

This application is a continuation of application Ser. No. 16/508,168, filed Jul. 10, 2019, now U.S. Pat. No. 11,277,390, issued Mar. 15, 2022, which claims the priority of Provisional Application No. 62/696,160, filed Jul. 10, 2018, and Provisional Application No. 62/625,220, filed Feb. 1, 2018.

Application Ser. No. 16/508,168 is a continuation-in-part of U.S. application Ser. No. 15/946,863, filed Apr. 6, 2018, now U.S. Pat. No. 10,491,575, issued Nov. 26, 2019, which in turn is a continuation of application Ser. No. 14/803,869, filed Jul. 20, 2015, now U.S. Pat. No. 9,998,434, issued Jun. 12, 2018. Application Ser. No. 14/803,869 claims the priority of Provisional Application No. 62/107,650, filed Jan. 26, 2015.

Application Ser. No. 16/508,168 is also a continuation-in-part of application Ser. No. 15/943,418, filed Apr. 2, 2018, which in turn is a continuation-in-part of the above-referenced application Ser. No. 14/803,869, filed Jul. 20, 2015, now U.S. Pat. No. 9,998,434, issued Jun. 12, 2018. Application Ser. No. 15/943,418 claims the benefit of Provisional Application No. 62/480,696, filed Apr. 3, 2017.

Each of the foregoing applications is hereby incorporated herein by reference in its entirety.

BACKGROUND OF THE INVENTION

The advent of global telecommunications, computer networking, and the Internet has had a profound impact on human society, touching every aspect of daily life including home, family, work, entertainment, travel, and socializing. Today's Internet also plays a crucial role in a country's infrastructure controlling energy production and power distribution, facilitating communication, transportation systems, shipping, manufacturing (including robotics), surveillance and supporting law enforcement. Electronic banking, ATMs, wire transfers, online transactions, and point-of-sale (POS) transactions illustrate the pervasive role of the Internet in fintech and e-commerce. Network connectivity of devices, the so-called 'Internet-of-Things' (IoT), and of automobiles in vehicle-to-infrastructure (V2I) and vehicle-to-vehicle (V2V) networks expand the reach of the Internet to ever corner of the globe. More recently, the advent of digital identity, distributed ledgers, blockchains, and cryptocurrency represent the rise of new forms of e-commerce having no corresponding counterpart in traditional brick-and-mortar based business.

Because the Internet was not designed with security or privacy in mind, transactions and data transfers processed over the Internet and the World Wide Web employ the extensive use of cryptography, ciphers and codes in an attempt to maintain privacy, security, and data integrity. Other efforts to improve privacy involve decentralization—a method eliminating reliance on a central control, network operator, or trusted authority. These methods include decentralized applications (dApps), applications operating over peer-to-peer (P2P) networks lacking any network operator, and in the use of smart contracts—cryptographic and blockchain based contracts employed to digitally facilitate, verify, and/or enforce the negotiation or performance of a contract without third party involvement.

Privacy advocates purport crypto-based e-commerce represents a transformative technology promising transactional integrity of credible business contracts and personal agreements without requiring a legal authority or a governmental agency to participate in an exchange. The potential application of crypto-contracts are diverse and may include electronic notary services; electronic purchase agreements and supply chain management, bank-less money transfers; blockchain recording of property deeds; and lawyer-less execution of wills, trusts, and estates.

By removing the need for a central bank or certification authority to achieve 'trusted' transactions and contracts, transaction speed and efficiency improves while contractor expense is reduced (or eliminated altogether), driving down transactional costs while improving business profitability. Specifically, decentralizing legal and financial authority and processes offers the potential benefits of fostering competition, improving service, lowering fees, and inviting innovation in risk adverse industries.

In financial services for example, cryptographic blockchain technology offers a compelling option to replace monopolistic, autocratic, arcane, and even obsolete federated practices of big banks with flexible decentralized alternatives. By eliminating reliance on a central authority, blockchain technology can improve the integrity and transparency of financial transactions involving secure payments, money transfers, e-commerce, and insurance.

Aside from its potential benefit to the financial services sector, blockchain technology is already proving useful for tech startups, facilitating both a channel for marketing and a flexible means for fundraising. Decentralized blockchain based contracts represent a potentially powerful disruptive market force, enabling small and medium sized businesses (SMBs) to effectively compete against much larger corporations by facilitating supply chain management and contracts; audit-ready records; process automation and by connecting entrepreneurs to clients and capital funding. Decentralization also addresses concerns that large corporations could control access of big data, insuring that no one company has exclusive access to or control of market data. As such, blockchains offer the potential for democratizing business.

The combined application of cryptography, decentralization, smart contracts, blockchain technology and cryptocurrency, properly deployed over the Internet should allegedly protect individuals and businesses against hacking, circumvent control of corporate oligopolies or criminal cartels, and stop cyber-criminals from perpetrating fraud and identity theft on unsuspecting consumers. The same methods have been advertised as a means to prevent unauthorized surveillance from governments and to thwart personal profiling from today's mega-network operators (Google, Amazon, Facebook, Microsoft, etc.). In their exuberance some blockchain enthusiasts even assert (since a blockchain comprises an immutable ledger) that blockchain technology should not only combat fraud and protect privacy, but it should even be able to protect the Internet. The implication of this premise is that the blockchain itself is secure and immune to hacking. But is this accolade meritorious, or is the blockchain just replacing today's vulnerabilities with newer ones?

Moreover, do facts support the premise that today's pervasive use of cryptography has successfully curtailed or reduced online fraud, hacking, identity theft, privacy invasions, banking and wire fraud, and infrastructure attacks, or is the perceived security benefits of cryptographic transactions an illusion?

I. Network Vulnerabilities & Deficiencies

Amid an incessant barrage of news reports of data breaches, cyber-attacks, and surveillance reports, the Internet's lack of security and deficient privacy provisions are notorious. It is estimated in 2017 cybercrime damages exceeded $445 billion dollars. In 2018 reported cybercrime broke the unprecedented record of $600 billion dollars. Other cyber attacks remain unreported or even undiscovered. Cybercrime in 2019 is expected to jump another 50% sequentially. Clearly then, encryption is not thwarting cyber-attacks or delivering the level of security experts claim it can or should.

Privacy attacks are even more pervasive, but difficult to quantify as they may include the theft of personal information without any record of how the stolen identity data was used. Identity theft, confounded by the cavalier treatment of client personal information by social media, merchants, credit bureaus, insurance agencies, and financial institutions, not only makes the Internet a perfect platform for cyber criminals to hone their trade but also represents a convenient environ for 'profiling' targets, i.e. collecting information in order to maximize cyber attack damage.

With a proverbial plethora of 'experts' and vendors claiming to have the secret keys to mastering security and insuring privacy, one must question why the number, frequency, and magnitude of cyber-attacks are growing, not diminishing. The answer is at least in part, network vulnerability is a multi-factor problem with varied root causes including reliance on antiquated systems, unsecured communication links (intrusion points), the willful release and promotion of personal data and private information on and by social media, naive behavior of cloud users, and in general a pervasive (if not religious) over-reliance on encryption as the sole means for securing data and transactions.

Moreover, the naive assertion that blockchain technology can protect the Internet is also a false premise. Because blockchain transactions occur over the Internet, attacks on Internet's communication protocol TCP/IP expose all blockchain transactions to attack, risking data theft and the irrevocable corruption of a blockchain's data. Blockchains cannot protect the Internet because they rely on it to execute their transactions.

Network Connectivity

To better understand the nature of cyberattacks and what makes a network connected device vulnerable, we must first consider a connected device's architecture and how it operates. The basic construction of a network-connected device comprising a hardware platform hosting operating system firmware and application software is illustrated in FIG. 1. The block diagram description applies equally to high-speed servers; cell phones; notebook computers; tablets; routers for WiFi, Ethernet, satellite, and DOCSIS3 (cable) systems; IoT devices such as home appliances, factory automation, and security systems; and to the communication and control modules in automobiles and other vehicles.

As shown, hardware of a generic device comprises a computing core 3 such as a microcontroller or microprocessor; I/O 4 comprising input-output connections to a display, keypad or touch panel, ports, peripherals, sensors, and other interfaces; and data storage 2 comprising non-volatile memory such as flash and scratch-pad memory such as DRAM and SRAM. The hardware components are controlled by hardware specific device drivers 1, which together with operating system kernel 6 form a host operating system or OS for the device. While device drivers 1 convert manufacturer-specific hardware components control into a hardware-agnostic generic instruction set, operating system kernel 6 provides scheduling and resource management of these hardware elements to facilitate all necessary communication and application operations performed by the device.

This functionality includes management of the OSI communication-stack comprising network PHY and MAC communication block 5 used to facilitate physical signal communication link 16 to nearby (local) devices in a communication network; TCP/IP block 7 used to manage TCP/IP datagram communication 15 beyond local routers and across the entire network or Internet; and OS application VM 8 used as a virtual machine (i.e. an application domain) used to host application software. The software app domain may support any number of software application types including host OS native applications 11, online apps 12, local blockchain processing BCP 9, and block applications BC apps 10. Application specific driver and app UI/UX 13 controls the user interface (UI) between the application and the user and manages the device's response to a user's actions (the user experience or UX).

Together, the integrated system as illustrated is able to receiver commands from a user, execute tasks, and communicate across a communication network with other devices compliant with transmission-control-protocol/Internet-protocol (TCP/IP) communications. By adhering to seven hierarchical layers of abstraction consistent with the 7-layer open systems interconnection (OSI) standard, devices of completely dissimilar technologies and manufacturing are able to achieve interoperability through TCP/IP. Interoperability is the key feature enabling the Internet to achieve the transformative impact on human society and commerce it enjoys today. By stipulating every aspect of network communications, the OSI open systems standard also represents the Internet's greatest weakness—its pervasive and inescapable vulnerability to cyber-attacks.

Because security and privacy attacks come in many forms, no unified taxonomy can be employed to arrange or classify the subject matter. That said, it is convenient to group attacks into several classes of attack vectors (vulnerabilities) namely (A) network attacks, (B) trust attacks, (C) data breaches, and (D) blockchain attacks. These attacks can be perpetrated by intercepting data in transit, corrupting transactions, or by infecting a network-connected device with malware.

Network Attacks

Network attacks describe cyberattacks perpetrated through network connectivity and communication. Network attacks represent the unauthorized access or surveillance of communication and computer networks to gain information; redirect packet traffic; interfere with (or impede) bona fide business, or to commit fraud, theft, and malfeasance. Denial-of-service (DOS) attacks may be considered a type of network attack. Network attacks also frequently play a role in trust attacks including wire fraud, transaction fraud, CA-certificate fraud, and malware diffusion. Network sniffing, snooping, and spying may participate in profiling, privacy attacks, and identity theft.

One aspect of network communication making cyberattacks possible is the means by which packet routing occurs in TCP/IP. As shown in FIG. 2, in packet switched data networks like the Internet data is arranged into digital data packets (data frames) for forwarding across the network. Read from left to right, the first portion of data packet 37 contains information used to establish a local connection of the device to the network followed by a datagram containing two IP addresses and a payload. Referred to as Layer-1 header, the L1 data defines timing needed to connect a user's device to the electrical, optical, or radio link (the physical signals or PHY layer) of the network's gateway device. The layer 2 data L2 describes the data protocol and address needed to interpret the media carrying the data, the media access control (MAC) address. For example tablet 30 establishes a radio link to WiFi router 31 by exchanging MAC addresses in accordance with a particular WiFi standard (such as 802.11ac) over a bi-directional microwave radio link on a defined frequency (such as 1.8 GHz) using data modulated in a specific format, namely OFDM (orthogonal frequency division multiplexing).

Following the L1/L2 header, the source IP address defines the digital address of the sending devices (so the recipient knows who to reply to) and the destination IP address, which defines the ultimate recipient of the data. As illustrated, the IP address of tablet 30 is $IP_{TB}$ constitutes the source IP address while the address $IP_{CP}$ constitutes the destination IP address of cell phone 36. During data transport, data packet 37 directed from tablet 30 to router 31 is forwarded to either server 32a in cloud 41 or to server 33 depending on the instructions of routing table 40 contained within WiFi router 31. If the routing table selects server 32a, the data packet is then routed over intra-cloud connection 39 to server 32b and then server 32c, before being directed out of cloud 41 to mobile network cell tower 35 and onto cell phone 36. Conversely if routing table 40 selects server 33, then routing ensues through wire link 38 to server 34, then to mobile network cell tower 35 and onto cell phone 36.

A routing table (similar to table 40) existing within every server 32a, 32b, 32c, 33, and 34 determines the routing after WiFi router 31 makes the initial path determination. As such, tablet 30 has no authority in choosing the path data packet 37 traverses through the Internet. If router 31, for example, were to choose a path through a server compromised by malware, then the security and payload integrity of data packet 37 may be compromised and all subsequent packet routing are at risk of being hijacked or misdirected for nefarious purpose.

Internet packet routing is therefore at risk of network attacks because (i) the two communicating parties are identified by their IP addresses, (ii) the data packet remains unaltered as it traverses the network, and (iii) the sending device has no influence on the route the data takes through the network. Moreover, because the content of the TCP/IP datagram follows the standardized format made in accordance with the 7-layer OSI model standardized in a 1984 ISO publication entitled the 'Open Systems Interconnection Reference Model,' hackers can easily analyze a packet's contents to identify vulnerabilities.

The 7-layer OSI communication stacks 50a and 50b and data packet construction are illustrated in FIG. 3. In operation, each layer in stacks 50a and 50b relies on processes performed by the layers below it, and performs services for the layers above it. As such, a particular layer doesn't care how lower layers execute their tasks so long that data is exchanged with the layer directly below it in accordance with its protocol. Similarly the same layer is not concerned with how upper layers utilize or create data so long that it supports them, delivering and receiving data in accordance with the protocol. In this manner, a predetermined division of labor and functional communication is realized for each layer without requiring detailed knowledge of any other layer.

Using abstraction layers in an open architecture promotes fair competition, giving SMBs unbridled commercial access to the burgeoning Internet and World Wide Web (WWW or Web) while thwarting any one company, technology, or government from dictating policy or usurping control. No registration or central authority approval is required to connect to the Internet. Simply by adhering to agreed abstraction layers in accordance with the OSI standard, a device can reliably negotiate and subsequently communicate with other network-connected devices with no knowledge of the other devices. In detail, the seven OSI layers collectively comprise a 'protocol stack' representing the physical interface, either electrical signals, electromagnetic waves, or light, along with data processing hardware and software used to interpret and use the signals. In operation, data is passed to and from a network-connected device, which in turn may utilize its own separate and unique abstraction layers dedicated to realizing applications in computing, databases, robotics, IoT, security, or as a general hardware abstraction layers (HAL). The Internet's protocol stack can also be linked to business services, or to other non-tech industries, financial transactions, banking, shipping, and more.

As described in the table below, the 7-Layer OSI model includes two lower layers for connecting a device to a network over a physical medium, two middle layers for controlling packet routing over the Internet, and three top layers for managing network applications.

| Layer Name | Function/Feature |
| --- | --- |
| 7 Application | APIs, BC, PKIs, login Telnet, file transfer FTP, trust CA-cert/L7, email IMAP, SMTP, computing DCOM, networking DNS, DHCP, NTP, TLS/SSL |
| 6 Presentation | Cryptographic encapsulation, compression, trust CA-cert/L6, encoding, translation, images EBCDIC/ASCII, PDF, MPEG, document security |
| 5 Session | Session initiating, authentication, trust CA-cert/L5, authorization, full/half duplex, session restoration, SOCKS, tunneling PPTP |
| 4 Transport | Transport reliability and handshaking (TCP/UDP), port addressing, transport security selector (SSL/TLS) |
| 3 Network | IPv4/IPv6, IP routing, IP addressing, traffic control, time to live, ICMP, PIM multicast |
| 2 Data Link | Media Access Control (MAC) connectivity in accordance with Ethernet, WiFi, 3G/LTE, 4G, 5G, DOCSIS3 protocols, security WEP, WPA2 |
| 1 Physical (PHY) | Signal transmission as symbols (or bits) including timing control, synchronization, digital (electronic), radio, microwaves, light |

During communication between two devices, data from the application layer is optionally encrypted then passed down the stack, encapsulated into a IP datagram with transport instructions and IP address routing, then transmitted over the PHY layer to the second device using the Data Link Layer-2 specific protocol. Once delivered to the packet's destination IP address and port, the packet is validated, decrypted then passed up the stack to the application layer for execution. Although the 7-layer abstraction model is generic, the Internet was adopted using the TCP/IP protocol and network stack. TCP/IP is an acronym for transmission control protocol/Internet protocol.

As shown in FIG. 3, even though the only physical connection occurs on the PHY Layer-1 (shown as a solid line), each communicating device pair operates virtually on a layer-by-layer basis (depicted by dashed lines), where transport Layer-4 communicates to the other device's transport Layer-4, session Layer-5 communicates to it corresponding Layer-5, and so on. As such each data layer exhibits its own security vulnerabilities, especially Layer-7 data comprising a packet's payload, the contents of which may include user ID information, passwords, login files, executable code, and blockchain data, or cryptocurrency. Examples of vulnerabilities of the TCP/IP data packet of FIG. 3 include

- PHY data 51 Layer-1 data frame vulnerabilities such as signal intercepts and jamming
- MAC data 52 Layer-2 data frame vulnerabilities including ID sniffing, packet sniffing, profiling, denial-of-service (DoS) attacks, WPA/WPA2 (i.e. WiFi Protected Access) hacking
- Network data 53 Layer-3 datagram vulnerabilities in IP routing, DNS name server, and static addressing including man-in-the-middle (MiM) attacks, packet hijacking and rerouting, sniffing and packet recording, spoofing (imposter attack), and denial-of-service (DoS) attacks
- Transport data 54 Layer-4 datagram vulnerabilities including port banging of static and pre-assigned (fixed) port numbers, TCP protocol exploits, SSL/TLS exploits and brute force code breaking, metadata collection and user profiling, traffic monitoring, and denial-of-service (DoS) attacks
- Session data 55 Layer-5 session vulnerabilities in identity, trust and the establishment of ad hoc networks including certificate authority (CA) fraud, cryptographic key theft, malware installations, privacy attacks, man-in-the-middle (MiM) attacks and denial-of-service (DoS) attacks
- Presentation data 56 Layer-6 payload vulnerabilities involving encryption and trust including unencrypted content, weak encryption, cryptographic key theft, key analysis by profiling, man-in-the-middle attacks, triggered key theft, imposter exploits, malware attacks including backdoors, keyloggers, and Trojans, privacy attacks, and denial-of-service (DoS) attacks
- Application data 57 Layer-7 payload vulnerabilities of data and content including malware installation, man-in-the-middle attacks, asset theft, cryptocurrency theft, wallet theft, login exploits and redirects, OS coup, privacy and trust attacks, blockchain attacks, blockchain corruption, database corruption, identity theft, account blocking, account theft, blockchain surround and DoS attacks, application denial-of-service (DoS) attacks. Layer 7 vulnerable payload data 57a includes software code, blockchains, and cryptocurrency including smart contracts 57b.

Metadata & Routing Vulnerabilities:

An inescapable vulnerability of TCP/IP communication is the data packet necessarily carries meaningful unencrypted data that can be observed during transport because the data is needed to route the datagram. This data necessarily includes the content of Layer 1 through Layer 6 carrying blocks (sub-packets) of unencrypted data 51 to data 56 because the Internet's packet routing relies on this information.

The observable data contained in intercepted IP packet includes the Layer-2 MAC addresses of the sender's device (with the sender's subnet); the Layer-3 source and destination IP addresses of both communicating parties (essentially the identities or the persons communicating); the data transport protocol (UDP, TCP) employed; the Layer-4 port number of the sending and receiving devices describing the type of service being requested (e.g. email, VoIP, etc.); and Layer-5 data involved in authenticating a party to open a repeating dialog referred to as a 'session'.

Collectively, this data is referred to as 'metadata'. Governments and state actors routinely monitor, collect, and store metadata to profile or analyze the behavior of a person of interest. If a state can monitor network traffic then Mafioso, gangs, and criminal cartels can do the same thing to profile an enemy. The real danger in packet metadata is the IP source address contains information traceable to a specific device and ultimately to the identity of the person using the device. Once an individual's identity is known their data traffic can be monitored, their behavior patterns analyzed, their social media trolled for additional useful information, and ultimately their passwords, identity, and their accounts stolen.

If an attacker illicitly gains access to the cellular network, the location of the caller's cell phone can also be triangulated through the relative signal strength of the cell phone towers communicating with the device, meaning a person's device can be located and their movements tracked, even with GPS turned off. This feature gives criminals, gangs, kidnappers, human traffickers, and sexual predators enormous advantages over the police in selecting the place and time to attack their next victim. By hacking IoT clouds, criminals can concurrently use surveillance cameras to know where police are and to help choose when and where to best perpetrate a crime.

Even without profiling a user, a hacker can inspect unencrypted Layer-6 data related to the coding of the payload's encryption, using the information to either to launch a brute force attack to break the encryption key, to use password guessing (like a person's birthdate or common names for dogs and cats), or to devise a means to infect the target's device with spyware. Although pure brute force attacks have a lower chance of success than profiled attacks (where the attacker knows something personal about their target), recent brute force hacker strategies employ cloud computing, harnessing the power of millions of computers to guess passwords or to break a code's encryption key. Using cloud computing with the collective computing power of today's fastest supercomputers 'unbreakable' cyphers have been broken in surprisingly short times. The advent of quantum computing will only make matters worse, likely favoring hackers to expedite their attacks.

Session Layer-5 Vulnerabilities

One especially intrinsic weakness in Internet communication is its necessary use of a Layer-5 session to establish a dialog between two parties. Without TCP/IP's 'session' feature, every packet sent over a network would have to be checked for its authenticity one-by-one, a time consuming process that would prohibitively slow down Internet communication, create unmanageably data traffic congestion, and prevent real time communication or video. Instead, when two devices begin communicating, the establish 'trust' to open a channel by exchanging information either using an encryption key, or by exchanging a signed digital certificate issued by a trust certificate authority (CA).

Once the trust is established, the two devices are connected by a virtual channel, meaning any data exchanged from that point forward having the proper digital credential is taken "on faith" as being authentic and accepted without question. One example of the use of a session is when a client opens an online session with a bank to access their bank account. During the login process, the account holder's identity is verified and the TCP/IP session is established. Transactions performed while the session remains open do not require further verification and no additional identity authorization is required.

In essence, a session is a device-to-device communication channel that is easily identifiable by the IP addresses of the two communicating parties and by the session security credentials exchanged at the beginning of the session. Should a hacker find a means to insert their device into the session when it first commences, they will have access to all information exchanged between the two parties. Session payloads may include bank account numbers, passwords, private assets, contacts, photographs, videos, chat histories, company confidential data, credit histories, medical data, tax information, social security payments, insurance files, and more. Such attacks, referred to as man-in-the-middle (MiM) attacks or packet hijacking are especially nefarious because the unsuspecting parties are wholly unaware that their communiqués are being hacked. In some MiM attacks, a fake CA-certificate is used to authenticate the attacker's identity and to open a valid session using a fraudulent session token thereby bypassing the Layer-5 security provisions altogether. Such a method was employed to disseminate the notorious virus Stuxnet, malware that ultimately infected the entire worlds' computers, even those of its perpetrators.

Another certificate theft method employs a Trojan horse to manipulate calls between the main application's executable (ex: the browser) and its security mechanisms or libraries. In a SSH downgrade exploit, the attacker tricks the client and server to use a less secure protocol before continuing with their attack. The malicious session can then be used to gather information or to commit fraudulent transactions. Opening a fake session may also be employed to execute a Session layer malware attack, delivering system malware including zero day exploits, time bombs, viruses, or worms.

Presentation Layer-6 Attacks:

Layer-6 attacks generally involve stolen security credentials and encryption keys often using the same mechanisms of fake CA-certificate in order to fool Layer-5 authentication. Because virtually every Internet data packet relies on encryption to ensure security and privacy, an attack on Layer-6 and Layer-7 delivered cryptographic keys renders most communiqués exposed to spying and criminality. Aside from defeating security and disabling all privacy protections, the exploit may also involve Presentation Layer-6 malware attacks, installing malicious code in the form of innocuous looking utilities including PDF readers, media players, ad-blockers, disk defrag utilities, etc.

One particular strategy for crypto key theft involves apprehending the distribution of one or more crypto keys from a third party crypto key server when a connection is first made. For example some allegedly 'secure' personal messengers distribute keys openly over the Internet. If the keys are intercepted, the security of "end-to-end" (E2E) encryption is compromised. For example, despite claiming unbreakable E2E encryption, all VoIP personal messengers Line, KakaoTalk, WhatsApp, WeChat and even Telegram have been reportedly been hacked and in some cases the contents of private communications unmasked.

Application Layer-7 Attacks:

Application layer attacks employ a diverse range of stratagems involving fake identities (CA-certificate fraud and trust attacks), malicious code (malware and spyware), and a variety of denial-of-sever attacks. Most Layer-7 attacks start with deception—using a digital signature, fake SSH keys or fake CA-certificate to gain access and system privileges. Once a cyber attacker uses fraudulent security credentials to pass authentication and gain access to the system or cryptographic keys, the only protection remaining for Layer-7 applications are the security provisions built-in to these apps. Many apps however, offer limited or no security provisions, instead relying wholly on the TCP/IP protocol stack to protect their content and integrity.

Layer-7 malware attacks can be used to subvert, cripple, or destroy a system with viruses or worms; to gather information using spyware, phishing, key loggers, and Trojans; to bypass security by installing backdoors; to overtly take control of a system such as ransomware; or to surreptitiously gain control of files and processes. Other attacks involve zero day exploits (such as Stuxnet) or to use fileless malware infections. Storage drive and database attacks can also be used to steal personal information, steal credit card and banking data, steal login files, or perform theft of cryptocurrency from accounts or crypto-wallets.

Downloading of personal photographs and private documents may also be used to perform extortion or blackmail. The attack can also involve installing content or software of unknown content or purpose, generally activated through some active process or application. In some cases, cyber criminals may utilize special software called 'crypters' to protect their malware from antivirus utilities. Similar cyber attack methodologies are adaptable to cell phones including back doors, ransomware, botnets, and spyware. Attack vectors include downloads from malicious websites; encrypted malicious payload downloads; and stealth malware designed to circumvent detection including anti-security, anti-sandbox, and anti-analyst techniques.

Another means by which cyber criminals are able launch an effective application layer attack is through 'root access', to gain access to system administration rights of a device, server, or network. Root access can be gained through covert means such as Trojans or by injecting malicious adware to infect a large population, to steal information, and to earn money as credit for fraudulently installing apps. So rather than gaining unauthorized access to one user's account, by hacking the system administrator's login, significant access and privileges become available to the cyber pirate without the knowledge of those using the system. Since the system administrator acts as a system's police, there is no one to catch their criminal activity—in essence for systems or networks with corrupted administration there is no one able to police the police.

Such attacks on personal computers, servers, and on mobile phones are referred to as pirate administration or infiltration attacks. The task for cyber criminals is made easier by the practice of jail breaking or 'rooting', where a user modifies the operating system of a mobile phone to give themselves administrative privileges. The phone, once rooted, loses its defensive abilities against malware. In extreme cases, the attacker can usurp complete control of the device. This scenario is especially worrisome in IoT and V2X transportation applications, where an effective cyber-attack could take control of an autonomous vehicle, intentionally or inadvertently causing life threatening conditions or accidents.

Denial-of-Service (DoS) attacks, while possible to execute on any layer, are most commonly executed on Application Layer-7 because of the myriad of diverse applications on which the attack can be executed including HTTP, FTP, IMAP, Telnet, SMPT/POP, IRC, XMPP, SSH, etc. Especially popular vectors include HTTP attacks on web server processes and web application attacks on CPU processes.

II. Identity Fraud & Trust Attacks

Trust attacks can be considered an attack of imposters, where perpetrators (or their devices) pretend to be someone they are not, usurping the identity, authority, and access privileges of their target to engage in illicit transactions or to install malware into devices disguised as valid applications or utilities. Oftentimes trust attacks are performed immediately following network and communication attacks in order to capitalize on stolen information before anyone notices. Spying and personal profiling are also often used to gather information as a prelude to imposter exploits including the use of network attacks and packet sniffing, or through physical device interventions using malware including spyware, key loggers, login exploits, etc. The monetization of identity theft also represents another type of trust attack, using fake credentials to divert funds (wire fraud) or fraudulently pay for purchases (transactional fraud).

Trust attacks are frequently executed as man-in-the middle (MiM) attacks where neither party is aware of the intrusion. For example, in FIG. 4, an imposter 41c inserts a node 44 into the communication network between communicating parties, namely browser 41b and secure HTTPS server 41a and attempts to subvert the certificate authentication procedure by introducing false credentials into the exchange. The session opens normally with browser 41b making an introduction (client hello 42) to HTTPS server 41a. When the server 41b replies by sending a valid SSL certificate 43a as a response imposter 41c intercepts the message en route by pirate node 44 which instead forwards a stolen or falsified SSL CA certificate 43b to client browser 41b. The CA certificate describes how information is to be encoded by client browser when communicating with the HTTPS server.

The client then replies with a cryptographic key 45 used to codify a cypher unique to the particular session. The changed cipher 46a granting access to HTTPS server 41a communication is then intercepted by pirate node 44 establishing an authorized secure communication link 47a between pirate node 44 and HTTPS server 41a. Concurrently pirate node 44 sends a corrupted cipher 46b to client browser 41b establishing an authorized secure communication link 47a between pirate node 44 and browser 41b. Once completing the ruse, client browser 41b communicates with HTTPS server 41a through a secure but corrupted channel comprising links 47a and 47b without knowing pirate node 44 has inserted itself into all communication in the channel. In essence, TCP/IP's session protocol helps enable a pirate to safely and securely commit a crime.

Trusting an untrustworthy certificate authority or accepting a corrupted or fraudulent CA certificate is a common means by which the integrity and security of Internet communication is compromised and the means by which network connected devices trust and accept files containing malware and spyware. The administration of CA certificates in Internet based online transaction processing is illustrated in FIG. 5. In the example shown client 80 intends to securely execute a commercial transaction with online merchant 89. In order to validate purchase order PO 88 for merchant 89, client 80 first sends private information 82 to a registration authority RA 83 who confirms the client's identity 84 and inform certificate authority 85. Certificate authority 85 then issues a copy of the CA certificate 86a to client 80 and CA certificates 87 (including a digitally signed copy of CA certificates 86a) to verification authority VA 92. To execute a transaction client 81 presents PO 88 to merchant 89 along with CA certificate 86a. Merchant 89 then verifies the authenticity of CA certificate 86a in a dialog 91a and 91b with verification authority VA 92 to complete the transaction.

Should the certificate authority CA 85 or the validation authority VA 92 be corrupted or a stolen CA certificate employed, however, a fraudulent process may be wrongfully approved thereby wrongfully endorsing illicit financial transactions and enabling malware infections. The client and merchant must therefore 'trust' the certificate and validation authorities are earnest and honest. Worse yet, many CA certificates are derived from previously generated certificates to create a family tree of 'root', intermediate, and 'leaf' certificates whereby many leaf certificate originate from a common ancestral root CA certificate. This ancestral heritage forms a 'trust chain' where a leaf certificate accepted in a transaction is assumed valid because its heritage traces back to a trusted root certificate issued by a reputable certificate authority. But how can the validity of the leaf certificate be truly trusted if the intermediate certificates are issued by unknown parties?

Once a fake or corrupted CA certificate is used to open a session or validate a transaction, transactional and data fraud can occur virtually undetected and untraceable. Fraudulent processes improperly verified by corrupt CA certificates may include money wire fraud, illicit online and point-of-sale (PoS) transactions, account theft, login exploits, login usurpations, and malware distribution. It can also be used to allow an unauthorized device, drive or USB key to access a server or personal computer thereby bypassing network security protective provisions.

CA-certificate theft can occur is numerous ways—through spying, network attacks, or by malware. If a backdoor Trojan infects a computer, the attacker may gain full access to the compromised computer and will be able to control it. The attacker will therefore be able to steal any information found on the computer.

As an alternative to theft, fake code-signing CA-certificates can be created through counterfeiting and purchased online over the dark web, obviously for nefarious campaigns. To create a counterfeit certificate at the behest of a client, unscrupulous shop owners use digital identities stolen from a legitimate company (or its employees) to order a valid CA certificate from a respected CA-certificate issuer. In most cases, duped business owners and CAs are completely unaware that their data was or is being used in these illicit activities. Regardless of how fraudulent CA-certificates are obtained, cyber criminals use them to diffuse malware to commit illicit transactions over the Internet, sometimes even disguised and openly advertised as beneficial antivirus and disk cleaning software.

Some of the most insidious uses of fraudulent CA certificates involve the distribution of malware. Malware infections deliver and install malicious code into target devices in order to commit crime, gather information, or deny services. In the early days of computing, memory devices such as floppy disks, CDs, and USB-drives carried viruses. Ever since the 1988 Morris worm attack, the first recorded malware exploit delivered over the Internet, the cloud has become the medium of choice to infect computing and mobile devices. Not only did it result in the first felony conviction for cybercrime, it exposed the intrinsic vulnerability of the Internet and email to attack-alarming users while inspiring hackers.

While fairly easy to detect and expunge, the Morris worm revealed the potential chaos an effective denial-of-service attack could render. Thirty years later, network infectious agents have evolved significantly in capability and in stealth, employing a wide variety of attack vectors including email; web browsers (HTTP-exploits); file (FTP) downloads; ad-blockers; system cleanup software; software updates and installers; java scripts; Acrobat and PDF readers; media files and Flash players; and personal messengers. Most network delivered malware exploits also employ fraudulent CA-certificates (described previously) in order to establish trust, avoid detection, and gain access. Other attack vectors gain system access through adware, when a user connects to a malicious URL, or in 'typosquatting' when a user mistypes the name of a valid URL and is unknowingly diverted to a hostile site.

Installed malware operates in various ways. In denial-of-service attacks, fork bombs, ransomware, lethal viruses, and many zero-day exploits, the target knows immediately of the infection because of overt system failures or messages. In interactive exploits like phishing, login exploits, keyloggers, and scareware, a user is tricked to willingly enter personal private information, unknowingly revealing it to a nefarious party. In spyware, rootkit, eavesdropping, data scrapers, and backdoor attacks, the malware surreptitiously invades the target using evasion methods to 'cover its tracks', avoiding detection and erasing all evidence as to its presence and its origin. Still another class of time-delayed malware including time bombs and logic bombs waits unnoticed till the conditions arise to release its payload, either to damage the target device or to launch a pandemic against other devices. More advanced attack vectors called Frankenstein malware exploits deliver hostile components in a series of innocuous-looking 'benign binaries' disguising their true malicious intent. After delivery, the component pieces are collected and stitched together to activate the attack.

With the rapid growth of mobile devices and apps, cyber criminals are turning their attention to attacking smartphones and tablets, in part because they offer less-sophisticated means to detect or prevent intrusion, and because they tend to contain significantly more personal information than the data commonly stored in PCs. For example, researchers recently identified an Android Trojan in the wild (dubbed KevDroid) disguised as anti-virus application. The most recent instantiation of the malware features severally disturbingly sophisticated capabilities, including the ability to:

Record phone calls & audio
Steal web history and files
Gain root access (take control)
Steal call logs, SMS, emails
Collect device' location (every 10 seconds)
Collect a list of installed applications These capabilities allow a criminal, gang, or crime syndicate to track a person's whereabouts; monitor their voice, text and email communications, engage in fraudulent bank transactions, and commit extortion or blackmail. As such the loss of privacy through a security breach could seriously endanger a target, reaching far beyond the realms of cybercrime. As an open source platform, Android suffers the lion's share of malware attacks for any mobile operating system. While the vast majority of these attacks are delivered through network connectivity, either WiFi or wireless communication networks, as a multisource market, mobile phone makers can also introduce OEM manufacturer unique vulnerabilities such as back doors, and pre-loaded malware. Although iOS and iPhones are less susceptible to unwanted incursion, a variety of attack vectors and iPhone attack stratagems have been reported.

Assuming that Internet-based attacks cannot be prevented, virus checkers and firewalls are sometimes used to combat cyber insurgencies. For global businesses today, however, there is no realistic means to facilitate a firewall to cover an international footprint without employing cumbersome high-latency virtual private networks (VPNs). Even worse, virus checkers are often only able to detect an attack after the infection has occurred. Advanced attacks like Frankenstein binary-fragmented malware avoid detection altogether. As such, preventing cyber attacks over an open public network such as the Internet remains the focus of numerous research efforts. Network carried malware constitutes a serious impediment to trusted commerce and growing risk to personal privacy and safety.

III. Data Breaches

According to the United States Department of Health and Human Services, a data breach is "a security incident in which sensitive, protected or confidential data is copied, transmitted, viewed, stolen or used by an individual unauthorized to do so." While a data beach can occur by hacking network communication (described previously), most breaches occur using methods designed to steal or corrupt stored data files. Stored in corporate or government databases, online in cloud storage, or in massive storage farms or server farms, such data may involve active records, regular backup files, archival data, or catastrophic recovery files.

Data breaches impact every aspect of modern life, both personal and public. Attacks may be made on financial records, business transactions, trade secrets and intellectual property, client lists, personal information, social security and tax records, government employee records, active military personnel records, veteran associates records, insurance records, credit reports, personal health information, files for social media platforms, and personal cloud storage or containing, pictures, and other private information. Cloud-based backup storage files containing virtually all of the foregoing private data are especially valuable targets for hackers. The motive of data breeches can be for financial gain, for espionage, or for "FIG" (fun, ideology, grudge). In identity theft, for example, social security information, drivers licenses, passports, addresses, email addresses, phone numbers, etc. are stolen and then used to create fake IDs to commit fraud or theft, to circumvent homeland security authorities, or are sold to spammers for marketing campaigns. Incalculable personal and commercial harm has resulted from security breaches involving access to or theft of commercial and personal private data.

While many of the data breach and data-storage attacks involved theft of large blocks of memory en masse, others attacks were more targeted, suggesting spying and profiling were employed to maximize the attack's value or impact. A particularly nefarious database attack is identity usurpation where perpetrators corrupt or erase a target's identity in a database altogether as though they never existed and usurp their personal identifiable information (PII). Although hardcopy, backup storage, and unrelated data bases can be used to reestablish a person's identity, the recovery process could be arduous and the financial impact to a person or business devastating.

In another class of data breach, transactional record attacks are also possible. For example, an effective transactional attack on a bank's database could transfer or misdirect funds from one bank account to an offshore account then erase all records of the illicit transfer. Without hardcopy backup, a victim would have no means by which to prove the theft occurred or that they ever even owned the money. The same class of database attack could, at least theoretically, be launched against insurance databases, against corporations, or against government agencies such as veteran's administration, the social security agency, or federal banks. Blockchains, may reduce transactional record fraud by producing indelible ledger chronicling a sequence of transactions, but only if the blockchain's integrity can be guaranteed as secure.

Since numerous commercial databases involve proprietary interfaces and allegedly 'secure' protocols, many database companies promote a false narrative that their database is incorruptible despite overwhelming evidence to the contrary. Like trust attacks and network attacks, data breaches are made possible because of an overreliance on cryptography. To break into a database, there is no need for a perpetrator to crack the encryption; just steal the account password or circumnavigate the security gates. For example, in one database exploit called SQL injection, an attacker adds Structured Query Language (SQL) code to a web form input box to gain access to resources or make changes to data. Through automation, it is believed professional hackers, so called 'black hats', are developing freeware hacker tools for SQL injection to steal passwords, inject worms, and access data, potentially exposing 60% of all web applications using dynamic content. This vulnerability cannot be avoided because user access to virtually all databases and storage files today occurs over the Internet, an intrinsically unsecure communication medium.

IV. Blockchain Attacks

Blockchain and cryptocurrency-based e-commerce comprise a decentralized transactional process using cryptographic digital-ledger technology (DLT) recordkeeping and distributed consensus validation. Using cryptography to protect blockchain content, transactions are broadly purported to constitute reliable, secure, un-hackable processes applicable for commercial, legal, and personal transactions. Moreover, because they employ immutable digital ledgers not controlled by a central authority, blockchain records are not subject to backdating, record tampering, or post revision.

As shown in FIG. 6, blockchain transactional processing involves a blockchain application 65 executing a validated transaction 70 using blockchain ancestry 60 to validate and indelibly record and chronicle the transactional process. A blockchain is a digital ledger arranged sequentially in time from the past to the present and stored in multiple instances in a cloud, network, or system. Topologically, a blockchain represents a one-dimensional directed acyclic graph (or 1D DAG) having a single unitary chain of main blocks 61. The main chain may include forks 62 leading to orphan blocks 63 and extinct side chains, all arranged sequentially and time stamped. The term acyclic means the chain does not form loops whereby a side chain rejoins the main spine of the chain forming a cyclic loop. The formation of a loop or cycle is prohibited as it can create a temporal sequencing paradox where a new block appended to the end of the chain has a time earlier than the prior block.

In unitary blockchains, only one chain remains active and extant. Sidechains are simply dead ends generally used to record supplemental information not endemic to the main chain's function and purpose. The blockchain and its blockchain ancestry 61 may be published, i.e. made public, or kept private. Blockchain transactions can be validated by a central authority 71 (like a bank or government) or confirmed using decentralized methods involving a jury of peers 72.

Since the blockchain contains both cryptographic and unencrypted data, publication over public clouds does not necessarily constitute a privacy breach or public disclosure. It depends how the data is represented in the appended blocks. If a block in unencrypted, all parties with access to the blockchain ancestry can retrieve the data. If the block is encrypted, only parties with the corresponding decryption key are able to view its contents. The most common method is to synthesize new blocks using a cryptographic hash, a unidirectional cipher producing a fixed length ciphertext output unique to its input. Even though a cryptographic hash has no decryption key, it has unique value in confirming authenticity in a public venue without actually disclosing the actual content of the hash. Without ever revealing the content of file X, the authenticity of file Y can be validated by comparing the hash value of the two files, namely is $H(X)=H(Y)$ or not? If the two hashes are equal then the contents file Y is confirmed to be the same as the contents of file X and the transaction can proceed. If the hash values do not equal, i.e. if $H(X) \neq H(Y)$ then file X is not the same as file Y, but the holder of file X never had to reveal its content or trust another party not to leak confidential information.

Referring again to the blockchain transaction process of FIG. 6, application 65 produces confidential data file DF 56 it wishes to append onto blockchain BA 60. Blockchain processor 67 then combines file DF 56 with BA 60 and creates hash 68 comprising ciphertext file H(DF+BA). It also produces an unencrypted plaintext header file 69. In transaction validation 70 the value of H(BA) and H(DF+BA) are compared to confirm that application 65 is truly the source and owner of file DF 66. The validation may be performed by authorization by a central authority 71 or in a decentralized system through consensus of a jury of peers 72. Once validated, pending transaction block 64 is appended onto the end of the blockchain BA 60.

All the blockchain processing is performed as an application in the OS application VM 8 of FIG. 1. Communication 15 among parties engaging in the blockchain transaction also is executed using the Application Layer-7, the top layer of TCP/IP 7. The populist tech articles describing the blockchain processing and its execution as a 'blockchain network' is misleading since the entire process is hosted by the device application VM and executed across the Internet using TCP/IP. All vulnerabilities of TCP/IP apply equally to blockchain processing. Blockchains are therefore not immune to network security risks as is often purported.

One use of blockchain technology is in the generation and use of cryptocurrency. In cryptocurrency generation using proof-of-work (PoW), a process known as 'mining', digital processors execute computationally intensive brute force methods to solve a mathematical challenge, e.g. discovering the next prime number or guessing the solution to a hash-nonce puzzle. A solution once discovered, is validated as authenticate and correct by a jury of peers, and only then is the result appended onto the end of the blockchain and the miner paid for their result with a newly generated coin. Such a process represents an energy intensive and arduous process with no guarantee of any financial return whatsoever. Another problem with unitary blockchains is the longer they become the more memory they consume and the slower they are to use in transactional commerce.

Moreover, the entire process of remunerating miners and storing digital coins in wallets or in currency exchanges is fraught with risks of theft and transactional fraud, enabled by the security vulnerabilities intrinsic to the Internet and its absolute reliance of the TCP/IP communication protocol. Even so, many decentralized cryptocurrency advocates believe that the risk of criminality is still preferable over the potential abuses of world governments' invasive control of international fiat currency and monetary policy.

Decentralized blockchain and cryptocurrency transactions are often characterized as operating in "trustless"

systems—a somewhat confusing reference to the lack of a central authority needed to validate transactions. More accurately, decentralized blockchains don't eliminate trust—they shift reliance from a single party to a group of interconnected computer nodes acting as a jury-of-peers distributing control and eliminating single point system failure risks. Despite these beneficial features, in practice numerous attack strategies have been devised to corrupt blockchain transactions and steal cryptocurrency, to launch security and privacy attacks, or to engage in criminality or other malicious online activities.

Other attacks seek to exploit blockchain's decentralized trustless consensus as a weakness. Cyber assaults on blockchains and cryptocurrency primarily involve financial fraud, security breaches, and privacy attacks. The attacks can be perpetrated on the network Layer-3 using sniffing and other means to capture cryptographic keys, using a DoS attack, or directly corrupting the blockchain transaction itself. Blockchain attacks can be grouped into several broad classes including blockchain fraud, cryptocurrency theft, malware attacks, privacy leakage, blockchain illegality, and smart contract fraud.

Blockchain Fraud

Generally for economic gain, blockchain fraud comprises any method obfuscating illicit cryptocurrency activity while intentionally subverting timely validation of bonafide transactions. These blockchain attacks typically utilize two specific types of online malicious activities: double-spending and record hacking. In double-spending fraud, cryptocurrency is intentionally spent twice where only one transaction is valid. To complete the illicit transaction, the perpetrator must avoid detection using various means such as system disruption, misdirection, or disguise.

In a 51% attack, for example, a group of miners controlling a majority of the network's mining hashrate or computing power intentionally impede the peer consensus process preventing confirmations of bonafide transactions in lieu of preferentially enabling illicit ones. The 51% majority attack vulnerability highlights a significant weakness of proof-of-work (PoW) consensus protocols used to validate transactions in decentralized processes. Specifically because parties with the most computing power can unapologetically usurp control with no vested interest in protecting the integrity of the cryptocurrency against fraudulent transactions or out-of-sequence spending, perpetrators controlling peer consensus are able to commit fraud with impunity.

Blockchain fraud enables double spending through a variety of mechanisms including race attacks, Finney attacks, Sybil attacks, timejacking, and variants thereof. Even without majority control, mining monopolies can constrain rapid resolution of transactions improving their odds of launching undetected frauds, especially when the number of newly generated coins rewarded to miners declines as a particular currency such as Bitcoin matures and traders become more desperate (the so-called Tragedy of Commons). Considering the benefits of mining monopolies, it is not surprising that PoW based cryptocurrencies are less decentralized than previously believed.

In blockchain record hacking, a perpetrator corrupts a blockchain by either inserting unverified fraudulent blocks into the blockchain, or by creating a hardfork in a blockchain for nefarious purposes. Once the blockchain is corrupted, unless it is rejected before the next transaction, the damage is nearly irreversible. The design-around of a corrupted block is to launch a hardfork prior to the offending event while rolling back (cancelling) the main blockchain branch and revoking all subsequent transactions. Such a remedy is unpopular, extremely problematic, and possibly illegal in specific jurisdictions because the cryptocurrency, once spent, is unrecoverable.

Advocates of the hardfork sanction hold the position that a perpetrator's benefit should be expunged, i.e. to unwind the theft, but in so doing it penalizes coin holders having executed legally valid transactions subsequent to the fraud. Opponents of the fork include those penalized by the action and philosophical blockchain purists adhering to the principle of caveat emptor, that blockchains should remain irrevocable even when fraud occurs.

Cryptocurrency Theft

One of the present-day risks of e-commence based on decentralized currency is the possibility of theft without any recourse to recover stolen assets. The thefts, totaling hundreds of millions of dollars, have occurred by attacks on robbing cryptocurrency mining companies, mobile wallets, end-points (devices), and even over WiFi. Other attacks focus on digital currency exchanges and web hosts. Many cryptocurrency thefts involve simple password hacking through malware and spyware (see next section), misplaced trust through fake CA-certificates, cryptographic key theft, packet sniffing, reliance on unsecure third parties, use of fake currency exchanges, or engaging in unsecured online transactions.

In short, an unsecure Internet is not able to protect cryptocurrency from online theft. One method to execute online theft employs phishing for cryptocurrency wallets using a login exploit. In this attack, a cybercriminal redirects the login window to a fake website where the victim willingly enters their password and login information, unknowingly passing it to the hacker who subsequently uses it to log into the real site to steal their funds. Such exploits depend on a fake SSL certificate. While preventing login exploits over the Internet is not certain, the risks can in part be mitigated by employing site-specific unique passwords, multi-factor authentication, and by carefully checking all site's SSL certificate for signature authenticity. More importantly, the majority of funds should be stored offline in 'cold storage'.

Blockchain Malware Attacks

Malware attacks on blockchains represent another risk to digital currencies. A recent paper presented at the RSA conference revealed 146 different types of malware designed to steal Bitcoins. These techniques include Trojans, viruses, and spyware designed to log personal keystrokes, steal cryptocurrency wallet passwords, capture screen shots, or even stream video-screen images live to a hacker. If a target's computer is infected, their CPU can be commandeered to mine new cryptocoins with the high electrical power consumption and utility bills paid for by the unaware victim. Malware infections can also sequester devices for use in botnets—massive networks of malware-infected computers used to execute attacks on blockchains, cryptocurrency wallets, and the devices storing them.

Other attacks involve viruses designed to search out the wallet.dat files containing the private cryptographic keys used to protect the wallet and its contents. Although the wallet can be encrypted, if the infection includes a key logger, typing the password even once gives the hacker the ability to open the wallet, steal (relocate) the cryptocurrency to their own accounts, or to change the password to remove owner access. Once transferred, coin traceability is altogether lost. Another form of malware intercepts cryptocurrency transfers. The virus surreptitiously infects a computer waiting silently until the infected device copies a Bitcoin address whereupon the malware immediately becomes active to launch its attack by changing the IP address redirecting the coin transfer to the hacker's account. A particularly aggressive attack involves ransomware, malware demanding payment in Bitcoin or other cryptocurrency in exchange for unlocking an infected computer or its files.

An endpoint attack uses malware specifically focused on interfering with devices participating in a cryptocurrency exchange such as the purchaser, the merchant, and the cryptocurrency wallet holding the coins to be exchanged. As such the attack is performed on the terminus devices, not the nodes carrying the transaction through the network. Best practice for mitigation of malware, while imperfect, involves using firewalls, antivirus software, and offline operation of a dedicated personal computer.

Blockchain Privacy Leakage

Although originally believed to deliver transactional pseudonymity protected by cryptographic hash methods, in 2013 blockchainologists confirmed their ability to extract the private information from an encrypted blockchain including names and account numbers. This process, referred to as 'deanonymisation' executes a detailed analysis of a cryptocurrency's blockchain using a combination of data-driven pattern recognition (to extract commonalties in blocks), and analysis of test transactions (to uncover addresses). Since a full blockchain contains blocks detailing every prior transaction, there are risks not only that digital assets may be stolen but also that personal privacy and private financial information may inadvertently be leaked. Private information leakage through a blockchain can be leveraged by astute cybercriminals to profile targets, steal cryptocurrency, engage in identity theft, or to launch personal attacks. Blockchain records can also be employed to identify and selectively target more successful cryptocurrency traders.

The vulnerability of a blockchain to deanonymisation depends on management policies and personal behavior, especially in address reuse and web purchases using cryptocurrency. For example, in the case of online purchases using cryptocurrency, third-party trackers providing online analytics and advertising possess sufficient information to "uniquely identify the transaction on the blockchain, link it to the user's cookie, and further to the user's real identity." Moreover, if a purchaser executes multiple online transactions on the same blockchain, the user's entire cluster of addresses can be exposed including all transactions even if the user employs blockchain anonymity techniques. The analytical risk is indelible and perpetual, meaning an attack can be mounted retroactively.

As industries migrate to blockchain records, the risk of personal privacy attacks through blockchain exploits becomes increasingly a matter of concern, especially as it might expose consumers to identity theft who are wholly unaware that their personal information is being stored in a blockchain. This conundrum has inspired intense research to address the issue of blockchain privacy leakage and how to mitigate it, including proposals to bind physical entities to virtual identities as proxies in an effort to improve accountability while preserving anonymity. Present proposals, despite their creativity, are unconvincing, lacking any credible implementation, testing, or real-world deployment. Transaction resolution speeds of these privacy-protected blockchains are expected to be unusably slow.

Blockchain Illegality

Because blockchain can embed any type of data into its blocks, a blockchain could be contaminated with illegal or objectionable material that may be illegal in specific countries or jurisdictions. In a decentralized system, arbitrary content files embedded into a blockchain are not reviewed or approved by any administrator prior to inclusion. As such, there exists no means by which to manage a blockchain's content, to decide what is appropriate, or to reject what is not. A number of risks result from blockchain's ability to indefinitely store arbitrary content, including the risk of copyright violations, stolen intellectual property, malware, privacy violations, politically sensitive content, religiously offensive material, as well as illegal and condemned content.

Copyright violations involve the distribution, illegal downloading and unauthorized use of copyrighted material involving original works of authorship, including musical, dramatic, literary, artistic, and other intellectual works. Similarly, stolen intellectual property involves the unauthorized disclosure, distribution, or use of intangible creations of the human intellect not already public, including unpublished pending patents, trade secrets, confidential work product, business plans, private contracts, and other private works of creativity. In both cases, since it is impossible to recall publically distributed blockchains it is difficult to ascertain the economic damage caused by the unauthorized release of IP and creative works on the blockchain. Since most users are unaware of illegal material contained within a blockchain, some countries have begun to prosecute infractions based on the download and use of the unauthorized material rather than seeking remedy from the perpetrator who uploaded the stolen material.

Another risk of the arbitrary content field in a blockchain is the introduction of malware. According to INTERPOL, "the design of the blockchain means there is the possibility of malware being injected and permanently hosted with no methods currently available to wipe this data," permanently impacting global cyber-hygiene. Malware infected blockchains may involve zero-day exploits, time bombs, Trojans, or difficult-to-detect molecular viruses. Once infected, blockchain malware is impossible to expunge, representing an ever-present transactional risk and a continuing annoyance of triggering anti-viral software alerts. The injection of politically sensitive or religiously objectionable material into a blockchain strongly depends on the country or community affected by the material. Political or religious views held sacrosanct in one country may be considered sacrilege in another. Illegal content relating to religiously offensive content or pornography also vary country-to-country. Since there is no arbitrator to ensure the cyber-hygiene of a blockchain, the unknowing import of cryptocurrency containing illegal or banned material into a country may result in unexpected or severe legal consequences. The illegal use of blockchains may also include blackmail, extortion, trafficking, or comprise threats to a sovereign nation's national security and stability.

Smart-Contract Fraud

Smart contracts represent a significant potential for both beneficial and malicious use of blockchain technology. Smart contracts comprise digital code comprising an executable computer program indelibly stored in a blockchain. Operating as a sequential state machine, the smart contract executes a sequence of verifiable tasks and distributes cryptocurrency rewards to a pool of miners based on a negotiated value for each job. Although the concept of smart contracts dates back to 1996, it was nearly twenty years before Ethereum offered the first smart-contract based blockchain-as-a-service (BaaS).

By enabling other companies to utilize its platform and blockchain, Ethereum has differentiated itself from conventional cryptocurrencies focused on trading. Although BaaS adoption is slow and market penetration limited, in part due to distrust in new technology and bad press from reported cases of fraud, a number of exciting potential use cases have emerged, mostly in financial technology (fintech) including securities, trade financing, derivatives trading, financial data recording, insurance, and mortgages. Other possible non-financial applications include digital identity, record keeping, supply chain management, land title recording, clinical trial management, and medical research.

Proponents of BaaS suggest that smart contracts can be used to prevent fraud in business while opponents are quick point out that smart contracts have been shown to be susceptible to Ponzi schemes and other fraudulent exploits. In practice, smart contracts today remain illusively problematic, facing a myriad of issues including their intrinsic lack of privacy, the inability to expeditiously repel attacks, and a propensity to duplicate errors using flawed drafting techniques and error-filled code propagating vulnerabilities, reportedly in 44% of 19,000 Ethereum smart contracts studied. Ironically, blockchains promoted as a solution to preventing distributed-denial-of-service attacks are unable to combat DDoS attacks on Bitcoin exchanges relying on blockchain technology.

V. Privacy Concerns

Aside from the described security vulnerabilities of the Internet and TCP/IP, another major topic of concern today is the topic of privacy, i.e. who owns personal and business data and can the data's owner limit its availability, control its dissemination, and restrict its use. The rapid rise of social media such as Facebook, Instagram, and Twitter has created new avenues for people to share experiences or to promote their business. More recently, however, it has been revealed that the platforms hosting social media gather information about their clients and sell that information to advertisers and data analytics companies. In the world of big data, an individual may not own their own personal data nor have the right to limit other's access to it.

In a similar manner large computer networks such as AWS, GWS and Azure carry a disproportionate fraction of the world's data traffic, having annual business expected to approach $100B USD in network revenues in 2020. The networks collect significant information about their clients including what searches a user makes, what products they buy, where they shop, and with whom they socialize. This en masse collection of personal data is being executed without the approval of their clients and without any disclosure as to how the information is being used or to whom it is sold. It has been alleged that the unauthorized sale of contact information such as email and phone numbers to unscrupulous telemarketers and email spanners in contributing to the junk mail and robocall epidemic now plaguing virtually everyone.

During the events surrounding Edward Snowden and his revelation that the NSA was spying on Americans and monitoring (in old school parlance "wire tapping") people's calls without a warrant or probable cause, the role of the state in practicing privacy invasion became well documented. Still other countries such as the UK and China outwardly proclaim any call may be monitored and data analyzed without warning. In recent weeks, this fact became politicized when it was revealed that Huawei routers and cell phones are capable of sending messages and call data back to China.

Corporate privacy is equally a topic of heated debate today. Merchants and corporations are reticent to share client information with data analytics companies in fear that their client contact and sales information will end up in the hands of their competitors. Luxury brands although motivated to more thoroughly engage with existing clients while attracting new ones, are concerned that big data companies once obtaining client contact information will either inundate the VIP clients with spam and promotions or share the information with competing brands.

Despite laws demanding privacy protection, e.g. securing personal medical records in accordance with HIPAA (the Health Insurance Portability and Accountability Act of 1996) in the USA, and prohibiting data mining of a individuals actions as specified in the General Data Protection Regulation (GDPR) in Europe, there is no clear way to ensure these laws can be implemented. In reality, in order to sort and use most data, the data is stored in unencrypted form, rendering the information readily available to anyone with system access.

Because there is no such thing as "identity" in the Internet then it is nearly impossible to protect privacy. Unable to ascertain who legally owns personal or corporate data and communication metadata, it is impossible to regulate who should have access to it. It is paradoxical that privacy protection demands the need for identity. In the Internet anyone can pretend to be anyone, so identity means nothing. In short, personal and private information is misused because the Internet allows it to happen, with no provisions to stop it.

V. Decentralization

Wikipedia defines technological decentralization as a shift from concentrated to distributed-modes of production and consumption of goods and services. In the Internet the term applies to the network's operation including cloud computing, to communication networks, and to e-commerce. Economic motivation for decentralization includes optimizing economies of scale, matching supply and demand, fostering competition, and recruiting underutilized resources.

One means to economically enlist unused assets is through a concept referred to as 'the sharing economy'. First popularized by carpooling then later expanded by Uber and Lyft rideshare services, sharing economics seeks to employ underutilized resources by making them available to those who need them, i.e. dynamically matching supply and demand. Investopedia defines a sharing economy as "an economic model defined as a peer-to-peer (P2P) based activity of acquiring, providing, or sharing access to goods and services that is often facilitated by a community-based on-line platform." The sharing economy is environmentally beneficial in that it reduces waste of natural resources while bringing underutilized resources to bear on solving a challenge or delivering a service. Sharing economies apply equally to distributed computing, cloud communication, disaggregated storage, blockchain services, and decentralized currencies.

Distributed Computing

Distributed computing involves dividing and spreading a task across a group of networked computers. Although it is possible to employ a private cloud of servers, one benefit of distributed computing is that a user can access and utilize computers without owning them, employing unlimited computing capacities. For example, FIGS. 7A and 7B illustrates the world's utilized and unused capacity in computer and servers throughout the week and within any given day. In FIG. 7A, the daily use curve 50 shows heavy usage from 8:00 AM to 5:00 PM but enormous unused computing capacity 51 for the other fifteen hours of the day. If we divide the world into three large time zones, it means two thirds of the world's computing resources remains unused at any time of the day. As illustrated in FIG. 7B, average daily use 52 of computing resources consumes nine hours every day but drops below three hours per day on the weekend, meaning the weekly total of unused computing capacity is actually 73% of all computers in a given time zone. The above analysis ignores the enormous computing capacity of cryptocurrency miners, gamers, home computers, and IoT devices (like refrigerators, air conditioners, routers, HDTVs, and the omnipresent cable set-top boxes).

If this unused computing capacity could somehow be harnessed for addressing massive tasks like weather forecasting, storm tracking, climate modeling, cancer research, searching for near earth objects (asteroids risking collision with the earth), or studying the cosmos, or supporting the search for extraterrestrial intelligence (SETI), sustainable progress could be achieved across the spectrum of topics with a minimal cost to society. One example employing a sharing economy over the Internet today involves the Berkeley Open Infrastructure for Network Computing (BOINC), which as of June 2018 averages 20 PFLOPS (the prefix P stands for peta or $10^{15}$) using only volunteer resources. BOINC hosted projects include SETI@Home and MilkyWay@Home, each consuming 4% of BOINC's total compute cycles, and Einstein@Home a study of pulsars consuming roughly 15% of BOINC's available cloud computing capacity (https://en.wikipedia.org/wiki/FLOPS). Once key factor in effective cloud computing is uptime whereby the host devices remain always on, meaning they are AC powered and available even when they are not being used otherwise.

Enormous computing resources are also available in mobile devices including notebooks, tablets, and smartphones. By 2020, the number of smartphones worldwide is expected to exceed three billion (https://www.statista.com/statistics/330695/number-of-smartphone-users-worldwide/). Considering the most recent generation of iPhone contains a NPU neural processor with a capacity of six hundred billion floating point operations per second or 600 GFLOPs, the total worldwide distributed computing capability of smartphones will soon reach a capacity of $(600 \times 10^9$ FLOPs/device$)(3 \times 10^9$ devices$)=1.8 \times 10^{21}$ FLOPs, or roughly 2 ZFLOPs (Z is prefix zeta meaning $10^{21}$), five-orders-of-magnitude beyond BOINC's volunteer-based distributed computing network.

The problem today is the Internet offers no such means to identity what resources are available or underutilized or to make them accessible to users looking for such resources. And although philanthropy is admirable, it is highly doubtful that the masses will donate their compute cycles to a noble cause when they are looking for how to pay next month's utility bills. Even is a merchant is willing to compensate people to provide resources to them, no such system or marketplace exists to match merchants looking for resources to resource providers (people willing to offer their unused compute cycles) or to facilitate a means of fair remuneration for their efforts. As such, today's Internet is unable to support a computing sharing economy.

Moreover, many computing and IoT devices remain on at all times, constantly consuming power without providing any useful work or benefit to their owner or to society. In 2017, for example, the power wasted by set top boxes in the US alone was 21 TWh (terawatt-hours), roughly the power generated by five nuclear power plants, even though the majority of the time the device is doing nothing. For environmental sustainability, the set top box could be redesigned to use the same power management methods used in smartphones, and ideally in a sharing economy to do useful computing when it's on.

Cloud Communication

The opportunity of the sharing economy extends to cloud communication. A few decades ago, a handful of telecommunication companies dominated the world's communication traffic. With the advent of the Internet and mobile networks, the number of Internet service providers (ISPs) and cellular carriers exploded. In recent years, however, the growth of Infrastructure-as-a-Service (IaaS), Software-as-a-Service (SaaS), and Platform-as-a-Service (PaaS) service markets has seen a rapid consolidation of the market to only a few global suppliers (primarily AWS, Azure, GWS and IBM clouds).

This emerging cloud oligopoly reverses the decentralization trend spawned by the Internet, concentrating the exclusive control of network traffic, data storage, and data analytics into a group of corporations not answering to any electorate or government. Although regulators can attempt to manage these mega-corporations' growth, the real issue is as a fragmented platform the Internet is unable to offer a competitive open source alternative to privately owned clouds, let alone deal with the security issues of an open source environ. If it were possible to realize a global communication network as a sharing economy, however, the prospects of creating real and viable competition to the private cloud oligopoly is compelling, especially if cell phones could somehow comprise portions of the network.

To implement a global communication network able to compete with large server clouds, the network would have to operate using peer-to-peer communication (P2P) to reduce network traffic and minimize reliance on pay-per-byte cloud services. Although the prospect of P2P communication is impractical in rural areas, in highly populated cities a peer-to-peer network has the potential for achieving good quality-of-service (QoS) metrics. In fact, in 2019 it has been reported that China with 1.6B phones (https://www.thats-mags.com/china/post/27097/china-has-more-active-mobile-phones-than-people), has more active mobile phones than it has people.

"According to several working professionals in Guangzhou, they use one phone solely for work while the other is kept for personal use." So although no mechanism exists today to harness this dense mobile telephony population into a P2P network, the nodal density is sufficiently high to support services. Unfortunately TCP/IP is ill equipped to support ad hoc networks especially of disparate components based on different hardware platforms and operating systems.

Another opportunity for deploying a P2P communication network is in vehicle-to-vehicle (V2V) communications. Cities such as Los Angeles have 6M cars in an urban area of 12,561 km$^2$ or roughly 500 cars for every square kilometer. Shanghai has 3.3M vehicles compressed into an area 6,341 km$^2$, also roughly 500 cars for every square kilometer. Such densities are sufficient to host a viable P2P network. Unfortunately, as stated previously TCP/IP does not have the provision to manage ad hoc networks or carry P2P data without exposing packet content to the peer nodes carrying the data.

Decentralized Currency

As stated by Investopedia, fiat money "is government-issued currency that isn't backed by a commodity such as gold. Fiat money gives governments' central banks greater control over the economy because they control how much currency is printed." Rather than being set by the true market dynamics of supply and demand, governments and central banks are able to manipulate currency valuations by controlling supply, arbitrarily printing or retiring currency in circulation based on arbitrary, geopolitical, and self serving interests.

Early attempts to develop a decentralized currency led to the creation of Bitcoin, the world's first cryptocurrency. Using a mathematical challenge to create new tokens in a process called mining, new Bitcoins become increasingly difficult to produce thereby limiting the number of Bitcoins in circulation to some predefined quantity. The artificial scarcity imposed by arbitrarily limiting the supply of new Bitcoins combined with unpredictable demand resulted in a highly volatile currency valuations rendering Bitcoin useless for real commerce. Merchants and service providers cannot engage in commerce using a currency with an uncertain value fluctuating daily.

Moreover today's cryptocurrency is ecologically unsustainable. Environmentalists consider cryptocurrencies as realized today as a flagrant waste of our planet's natural resources. Electrical power consumption in 2018 for mining the two largest cryptocurrencies Bitcoin and Ethereum reached 83 TWh, greater than the annual energy consumption of all but the top-40 biggest energy consuming countries on planet Earth. This consumption has spawned a firestorm of controversy about energy waste balanced against the potential yet unproven benefits of cryptocurrency. The issue of energy waste cannot be resolved by present day cryptocurrencies since they all rely on a mining and consensus protocol referred to as Proof-of-Work (PoW). PoW is by design intentionally energy efficient as it was originally developed to economically discourage hackers from attacking a network.

Another feature of cryptocurrency is its inescapable reliance on blockchain technology to ensure a trusted pedigree required to prevent fraud and double spending in a decentralized currency system. To enable verification of the Bitcoin family tree, traceability extends to its origins including every mining event producing new coins, every coin transfer, and every hardfork and softfork stemming from the main blockchain. The resulting impact of this thorough record keeping is three-fold, namely (a) the blockchains become excessively long, (ii) the resolution speed (time needed to confirm the coin's veracity) becomes slow, and (iii) if the trade takes too long, its payee will not do a thorough job on confirming the coin's validity.

Incomplete checking invites fraud and double spending exploits. The longer a blockchain exists in the wild, the longer it becomes and the longer it takes to check. Today, the size of each new Bitcoin is 156.4 GB long and growing. The memory requirement for each Bitcoin is now becoming prohibitive, in that it is too large to carry or conveniently use. With each global transaction the length of the blockchain grows and the size of the memory needed to store a coin increase. The incremental increase in memory size for each new blockchain entry typically varies between 0.5 to 1.0 MB depending on the type of transaction executed.

The other major concern with cryptocurrency today is one of scalability. Using Proof-of-Work, the more people who use a PoW cryptocurrency the longer the unitary blockchain gets and the more difficult it becomes to use. For example, hypothetically should Bitcoin become a global currency studies reveal it would become nearly useless adding hundreds of gigabytes to the blockchain every day. For the sake of argument, assuming it requires 150 minutes to fully validate each 8-MB block, if the Bitcoin became a global dominant currency its block size would necessarily swell to 2.4 GB, taking over 51,000 minutes (over 2 years) to validate. While alternative consensus protocols such as Proof-of-Stake have been proposed, they primarily address issues regarding blockchain attacks rather than improving speed performance. Even so, such consensus methods remain exclusively the topic of whitepapers and conferences.

In essence today's realization of cryptocurrency represents a financial instrument to cumbersome and to volatile to use in real commerce.

VI. Conclusion

In conclusion, despite it ubiquitous global reach, the Internet was never designed as a platform to ensure security, protect privacy, host e-commerce, or to support a sharing economy. The Internet's greatest weaknesses are now fully evident, namely No security No privacy No trust These issues remain untenably problematic yet unresolvable. Attempts to ameliorate these deficiencies using cryptography and certificate-authority based digital signatures have failed wholly and absolutely as evidenced by the relentless growth in the severity and magnitude of cybercrime.

Clearly, the Internet is not well suited as a global platform for securely and privately facilitating real-time communication, decentralized cloud computing, cloud data storage, cloud connected devices, electronic transactions, and e-commerce. Since virtually all-modern network-communication, whether realized globally as the Internet, or implemented locally as a subnet employ TCP/IP as its foundational communication protocol, then all communication and e-commerce is exposed to vulnerabilities intrinsic to TCP/IP. The vulnerability is omnipresent regardless of the physical medium used to carry the data be it optical fiber, a wired Ethernet network, a wireless WiFi LAN; cellular networks; cable distribution networks; satellite communication networks, or other peer-to-peer networks.

Aside from TCP/IP vulnerabilities, additional security and privacy risks are manifest in device hardware, and in physical and data link communication layers, allowing the interception or manipulation of data packet communication contents and metadata, corruption of memory contents, the overwriting of system and application software, the undetected installation or malware, backdoors, spyware, and phishing software, and the possible usurpation of an operating system.

No present day communication system or network securely executes cryptocurrency transactions, provides for the safe storage of cryptocurrency, prevents for the unauthorized use of fake or stolen cryptocurrency, or ensures that decentralized transactional verification has not been commandeered by cyberbots programmed to validate fraudulent transactions while thwarting or denying the timely execution of valid transactions. No present day communication system or network is able to avoid denial-of-services attacks perpetrated at one or multiple OSI communication layers.

No present day communication system or network is able to ensure minimal propagation times and network latency needed for reliable realtime communication, to guarantee real-time QoS, or to adjust data packet transport efficiency, redundancy and urgency to match the nature of the data packets or to a user's demands. No e-commerce system is able to ensure stability in the cost of digital transactions for e-commerce using utility tokens while still supporting investor desire for market-demand based cryptocurrency volatility.

No present day communication system or network is able to effectively reallocate global communication, computing, and data storage capacity to maximize commercial, research, and philanthropic utility in accordance with market dynamics to avoid the underutilization of resources, the wasteful consumption of energy, or the egalitarian control of global network assets and compute capacity. No present day communication system or network is able to effectively to block massive data breeches risking the privacy of every person on earth.

A more thorough description and analysis of present day network and transactional vulnerabilities are specified in provisional patent application 62/696,160 entitled "The HyperSphere—a Real-time Cybersecure Privacy Network with Embedded DyDAG Dual Cryptocurrency for Global e-Commerce," filed 10 Jul. 2018 and included herein by reference.

What is needed is a completely new approach to cloud-based communication, networking, computing, data storage, and decentralized cryptocurrency that addresses the aforementioned issues of privacy, security, performance, social responsibility, and sustainability while discouraging criminality, fraud, and hacking of the network and the devices connected to it. Even the Internet's visionary founders Tim Berners Lee (creator of the World Wide Web) and Steve Wozniak (inventor of the personal computer) concur, publically professing that fixing this myriad of problems will require a complete rebuild of the Internet.

SUMMARY OF THE INVENTION

In accordance with this invention, data is transmitted between client devices such as cell phones or laptop computers over a network or "cloud." The cloud includes a plurality of nodes that are individually hosted on servers or other types of computers or digital equipment. While in transit between the media nodes in the SDNP cloud, the data is in the form of packets, discrete strings of digital bits that may be of fixed or variable length.

Software installed in the nodes allows them to perform three functions, referred to herein as "name server," "authority" and "task" functions. The "name server" function entails the management of a dynamic list of the client devices that are connected to the cloud. The "task" function entails the receipt and transmission of the packets as they proceed from node to node through the cloud. The "authority" function entails the determination of the respective routes of the packets through the cloud, e.g., from node A to node B to node C, and the transmission of "command and control" packets to each of the nodes on the route, instructing the node where to send the packet on the "next hop" through the cloud. The packets may be fragmented, i.e., broken up into subpackets that travel over different routes and are united in the destination client device. The packets and subpackets may be scrambled and/or encrypted in accordance with different, state-based algorithms as they pass through a node. An aspect of the task function is to determine by which algorithm an incoming packet should be unscrambled or decrypted and by which algorithm an outgoing packet should be encrypted or scrambled.

The nodes are "metamorphic," which refers to the fact that each node is capable of performing the name server, authority and task functions, but it does not perform more than one function simultaneously. A node that is not performing a function is referred to as "undifferentiated." The software installed in a node enables it to determine from the nature of a request for it to act whether it is being requested to perform the name server, authority or task function. After completing its designated job, a node reverts to its "undifferentiated" state awaiting its next performance request, and it forgets all information regarding its last action.

The invention also includes methods for generating and processing blockchains and a method for processing financial transactions using network-generated cryptocurrencies comprising two types of tokens, designated HyperMetal and HyperCoins.

BRIEF DESCRIPTION OF THE DRAWINGS

FIG. 7B illustrates weekly server and computer capacity.

FIG. 9 illustrates the elements of an SDNP meshed network.

FIG. 10 illustrates a flowchart of SDNP routing over meshed network.

FIG. 12C shows elements of decentralized SDNP meshed network.

FIG. 13B illustrates the operation of a decentralized SDNP routing request.

FIG. 13D illustrates the operation of a decentralized SDNP C&C routing instruction dispatcher.

FIG. 13F illustrates the operation of second decentralized SDNP datagram packet transport operation.

FIG. 15A illustrates the transformation of a metamorphic HyperNode into an |NS| node for call initiation.

FIG. 16A illustrates the transformation of a metamorphic HyperNode into an |A| node for route planning.

FIG. 19 is a schematic representation of a multi-layer diffuse data cloud.

DESCRIPTION OF THE INVENTION

To overcome the deficiencies of the Internet in securing communication, ensuring privacy, and supporting trusted business and e-commerce, we introduce a new, innovative, and highly-advanced decentralized cybersecure 'privacy' network for global e-commerce supporting real-time communication, data storage, cloud computing, cloud-connected devices, and e-services—the HyperSphere. As described in the above-referenced U.S. Provisional Application No. 62/696,160, filed Jul. 10, 2018, entitled "The HyperSphere—A Real-time Cybersecure Privacy Network with Embedded DyDAG Dual Cryptocurrency for Global e-Commerce," the HyperSphere comprises an open-source business platform and technology for enabling decentralized communication and global e-commerce employing functions comprising:

Decentralized hypersecure communications
Network native certificate authority
HyperSphere blockchain processing
Network native cryptocurrency These features are facilitated using inventive matter specific to each function being performed. To understand the operation of hypersecure communication over a decentralized network, we must first consider the functions executed by dedicated single-function nodes in a network as described in the above-referenced U.S. application Ser. No. 14/803,869, entitled "Secure Dynamic Communication Network and Protocol," hereinafter referred to as an "SDNP network" or "SDNP cloud." Communication outside the SDNP cloud is described in the above-referenced U.S. application Ser. No. 15/943,418 entitled "Methods and Apparatus for HyperSecure Last Mile Communication."

A. SDNP Routing Over Dedicated Nodes

Figure 8:
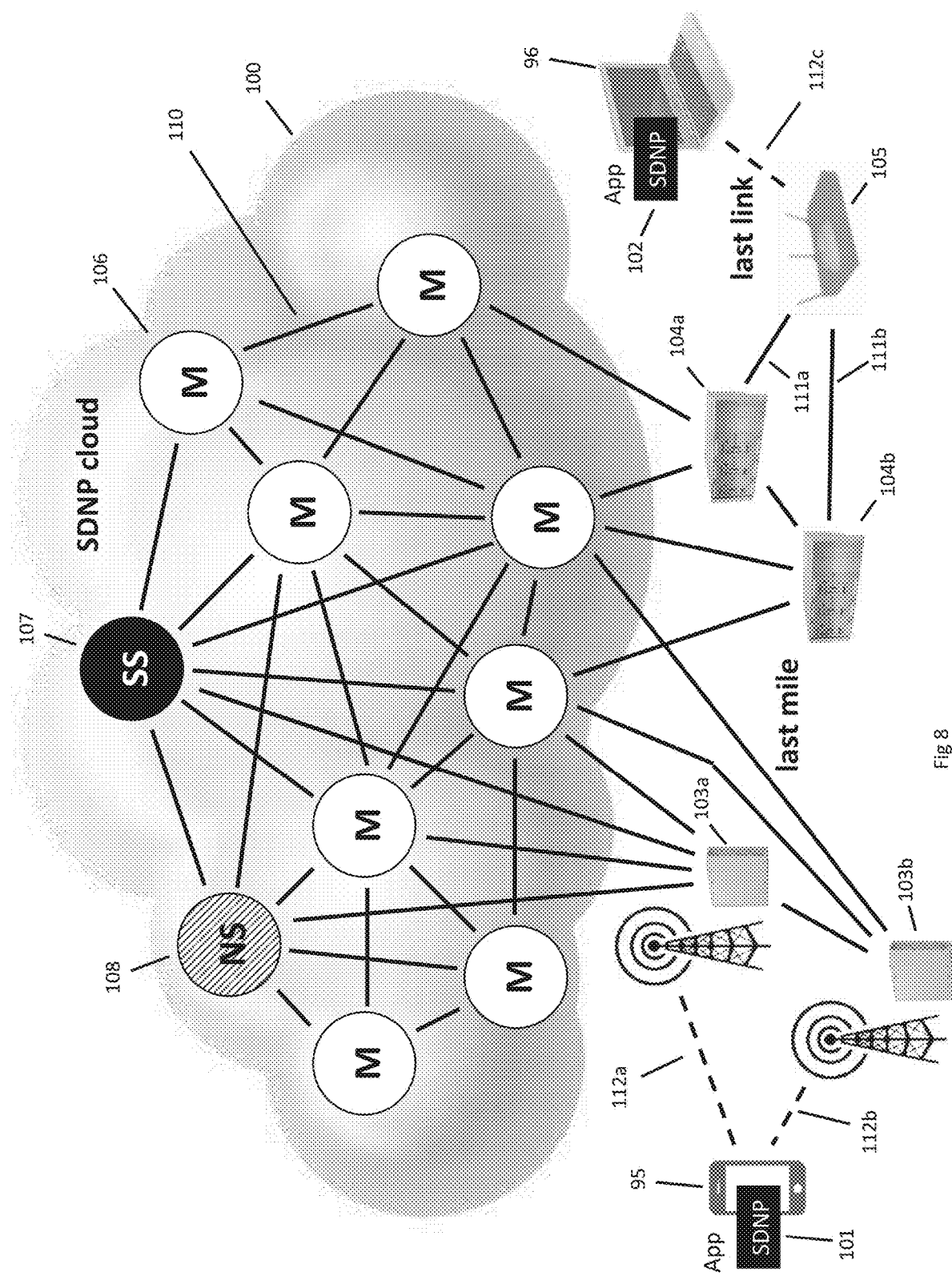
FIG. 8 shows an example of a Secure Dynamic Communication Network And Protocol (SDNP) meshed network.

FIG. 8 illustrates an SDNP network comprising edge client devices cell phone 95 and notebook computer 96 communicating over an SDNP cloud 100 comprising dedicated single-function nodes comprising SDNP media nodes 106, SDNP signal server nodes 107, and SDNP name server nodes 108 using high-speed physical links 110. Last mile communication between cell phone 95 and SDNP cloud 100 occurs over a mobile network including cell towers 103*a* and 103*b* and radio channels 112*a* and 112*b*. Cell phone 95 has access to SDNP cloud 100 via an installed SDNP application 101. Last mile communication between notebook 96 and SDNP cloud 100 occurs over a microwave last link 112*c* to a WiFi router 105, which in turn completes its access to SDNP cloud 100 over last mile wireline connections 111*a* and 111*b* via routers 104*a* and 104*b*. Notebook 96 has access to SDNP cloud 100 via installed SDNP application 102.

FIG. 9 illustrates the resources comprising the SDNP network including SDNP name server node 108, signaling server node 107, and media node 106 along with non-SDNP-enabled devices including Ethernet router 104 and WiFi router 105 and that employ TCP/IP routing tables, and cellular wireless network 103 that manages routing by the mobile network carrier.

SDNP name server nodes comprise dedicated single-function software designed to perform the network's name server role of matching phone numbers, account names, email addresses, or other identification to a device's IP address. The IP address stored in the SDNP name server can be dynamic and may comprise a NAT address, not a true Internet DNS recognized address. The SDNP name server files will be updated through a re-registration process whenever a device's dynamic IP address changes. As shown, SDNP name server node 108 is a virtual device, comprising SDNP name server software 133 installed in any lightweight server 130 and operating within the OS application VM environment of server 130.

As such, SDNP name server node 108 is not the same thing as server 130 hardware that hosts it. SDNP name server node 108 communicates with other nodes in the SDNP cloud using SDNP routing. Moreover, SDNP name server node 108 contains dynamic data not stored in the Internet's DNS servers. SDNP name server node 108 is limited in function to its lookup and address translation tasks and does not perform packet routing or carry media files (content) in SDNP cloud 100. SDNP name server node 108 has no access to the contents of any media packet traversing the SDNP network and no knowledge as to the encryption or concealment methods applied to media packets therein. SDNP name server node 108 is partially (but not purely) stateless, in that it retains no record of the inquiries it receives, the data it provides to signal server nodes, or to which signal server nodes. It is not purely stateless in the sense that it necessarily retains a translation table between SDNP network names or zip codes, phone numbers, and dynamic IP addresses. That said, the translation table is dynamic, meaning it contains constantly changing dynamic IP addresses and port numbers, updated each time they change or a device logs into or out of the SDNP cloud. The translation table is also stirred, i.e. randomly revised at regular intervals, changing the line item correspondence between SDNP addresses and/or zip codes and TCP/IP dynamic IP addresses.

SDNP signal server nodes (also referred to as signaling server nodes) comprise dedicated single-function software designed to perform the task of directing packet-routing and ensuring minimum propagation delay transport of packets. A SDNP signal server node issues routing commands to SDNP media nodes using lightweight command and control packets (C&C) either unilaterally or in conjunction with other SDNP signal server nodes working on the same communication's routing. The SDNP signal server nodes use addresses obtained from an SDNP name server node with no knowledge as to the identity or ownership of any host device. As shown, SDNP signal server node 107 is a virtual device, comprising SDNP signal server software 134 installed in any lightweight server 130 and operating within the OS application VM environment of server 130.

As such, SDNP signal server node 107 is not the same thing as server 130 hardware that hosts it. SDNP signal server node 107 communicates with other nodes in the SDNP cloud using SDNP routing. SDNP signal server node 107 has no idea as to the true owner of any device in the SDNP network and no knowledge as to the identity of a caller, callee, or any other edge device. SDNP signal server node 107 has no knowledge as to the content of any SDNP media packet or how the payload inside in concealed or encrypted. SDNP signal server node 107 is purely stateless, meaning the node is launched whenever it is needed; it collects the information it requires to perform routing (alone or in conjunction with other signal server nodes); it distributes command and control (C&C) packets to its selected media nodes, and then it forgets everything it just did. Stateless operation of the signal server is the same thing as instantaneous amnesia—it cannot remember any IP addresses it requested from the name server, it does not recall the last instructions it gave or to what media nodes it sent its C&C packets.

SDNP media nodes comprise dedicated single-function software designed to perform the task of carrying data packets of content (media) through the SDNP network. Media packet payloads may contain fragments of audio, video, software, blockchain, cryptocurrency, or software files. SDNP media nodes receive signal routing instructions directing a packet from one SDNP media node to another, on a hop-by-hop basis with no idea where a given packet originally came from or to where it is going. SDNP media nodes receive instructions in C&C packets from signaling servers, which may include numeric seeds and cryptographic keys used to dynamically change the concealment and content of any packet traversing the SDNP network on a hop-by-hop basis.

As shown, SDNP media node 106 is a two-piece virtual device, comprising SDNP media node software 135 installed in any high bandwidth server 131 operating within the OS application VM environment of high bandwidth server 131, and comprising a second component that includes DMZ software 136 installed in any non-network (air-gapped) server 130a operating within the OS application VM environment of air-gapped server 130a. Air-gapped computer server 130a cannot be addressed directly over the Internet and is separated from the media node and its host by a firewall or demilitarized zone (DMZ) barrier 140 through which media node software 135 can only request certain dynamically changing state-based information such as algorithms and concealment methods.

As such, SDNP media node 106 is not the same thing as server 131 or air-gapped DMZ server 130a or the hardware that hosts them. SDNP media node 106 communicates with other nodes in the SDNP cloud using SDNP routing. SDNP media node 106 has no idea as to the true owner of any device in the SDNP network and no knowledge as to the identity of a caller, callee, or any other edge device. Except for the next hop and its last hop, SDNP media node 106 has no knowledge as to the ultimate destination of a packet or from whence it came. Even within media node 106, knowledge is limited. DMZ software 136 and air-gapped server and 130a have no knowledge or access to the content of the media packets being processed or carried by SDNP media node software 135 and by high bandwidth server 131. Conversely, SDNP media node software 135 has no idea as to how DMZ software 136 selects algorithms or chooses the file processing instructions for concealing the payload contents of the data packets transported by media node 106.

In the aggregate, media node 106 operates in a stateless manner, as it does not retain the content of any media packet it carries, where the packet came from, where it was sent, or how its contents were revised in executing the dynamic concealment process, a complex dynamic editing of a packet's payload. DMZ software is quasi-stateless in that it must remember a table of algorithms for concealment operations including content mixing, splitting, scrambling, unscrambling, junk data insertions and deletions, encryption and decryption, but it never possesses or sees the states, numeric seeds, and cryptographic keys used in selecting and executing the algorithm. In cybersecurity, the relationship across the DMZ barrier 140 is described as "zero knowledge." So even if the algorithm stored as a shared secret in the DMZ server software 136 is somehow discovered (e.g. by a Mission Impossible type on-site invasion of a secure server room), because the DMZ server software 136 is unaware of the state variables, numeric seeds, and cryptographic keys used to process the media packet's payload, knowledge of the algorithm does not help break the code. Moreover, because the incoming packet contains only a data fragment of scrambled encrypted information, there is no way to decrypt its original contents.

Transport of media packets also may occur across non-SDNP enabled devices like WiFi router 105, or Ethernet router 104, or over wireless network 103. This case is especially likely in a "last mile communication" between a caller (edge device) and the SDNP cloud. Because the SDNP packet follows the 7-OSI format, the routers see the IP addresses as regular TCP/IP addresses for the Internet, the subnet, or the NAT address, and route the packet the same as if it were a regular TCP/IP packet. Routing through WiFi router 105 therefore employs its subnet or ISP provider's routing table 137 before each reaches an SDNP node enabled device, possibly traversing no more than one or two intermediary routers.

Similarly, routing through Ethernet router 104 employs the local ISP provider's routing table 138 until each reaches an SDNP node enabled device. In the case of transport of a SDNP packet over wireless network 103 or similarly over a cable or satellite network, routing occurs using the network's proprietary network routing table 139 and custom packet format, e.g. 3G, 5G, satellite, or DOCSIS3 protocols. Network address translator (NAT) 132 is required to convert the proprietary packet format back to Ethernet compatible TCP/IP packet formatting.

In this manner, a SDNP media packet can be transported across a network of Internet routers and SDNP nodes, with no need for custom hardware or dedicated privately owned clouds, meaning an SDNP cloud can be installed on any TCP/IP network. Transport of fragmented concealed packets over non-SDNP enable devices does not risk communication security, but may degrade call quality-of-service QoS by increasing a packet's propagation delay by routing the packet through longer delay paths in the network.

FIG. 10 illustrates an exemplary sequence for SDNP communication using dedicated function SDNP nodes. In step 260 a client initiates a session via SDNP client app 101 hosted on cell phone 95. The session may constitute any kind of communiqué, including a VoIP phone call, a video chat, a video file, audio file, a file transfer, a transactional process, group chat, conference call, etc. In step 261, the SDNP client app 101 contacts a default media node 106 to say hello to the network, i.e. to learn the dynamic IP address of its nearest name server.

Figure 11A:
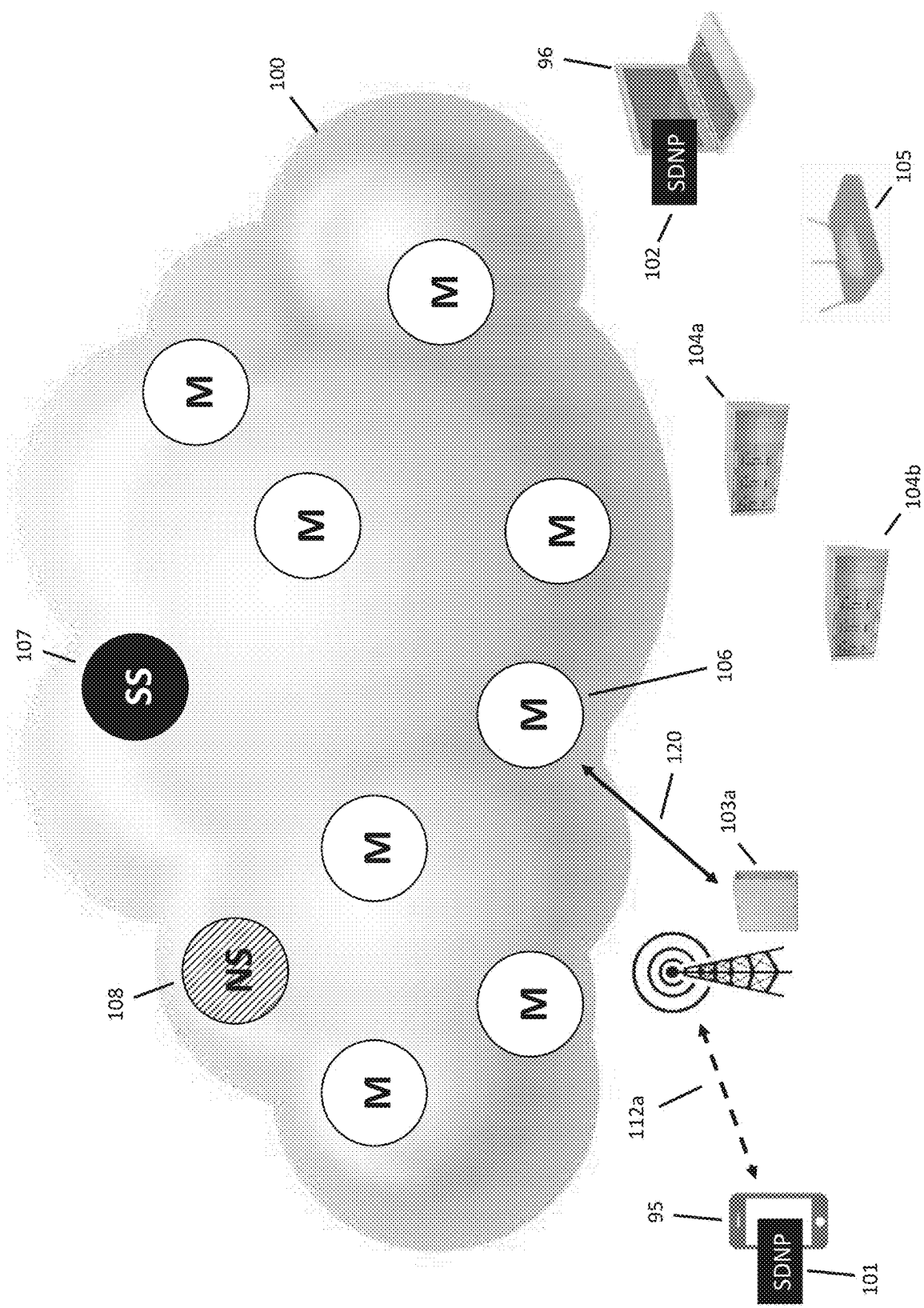
FIG. 11A illustrates SDNP registration operation.

The call initiation, shown in FIG. 11A, typically involves routing of a query packet over a last mile connection, in the example shown over radio link 112a to cell tower 103a and then over wireline connection 120 to any SDNP media node 106. All media nodes in a given region by default know the SDNP address of their nearest SDNP name server nodes. They learn one or several SDNP name servers' addresses as part of their automated registration process when they join the SDNP network. The media node passes back this name server SDNP address to SDNP client app 101.

Figure 11B:
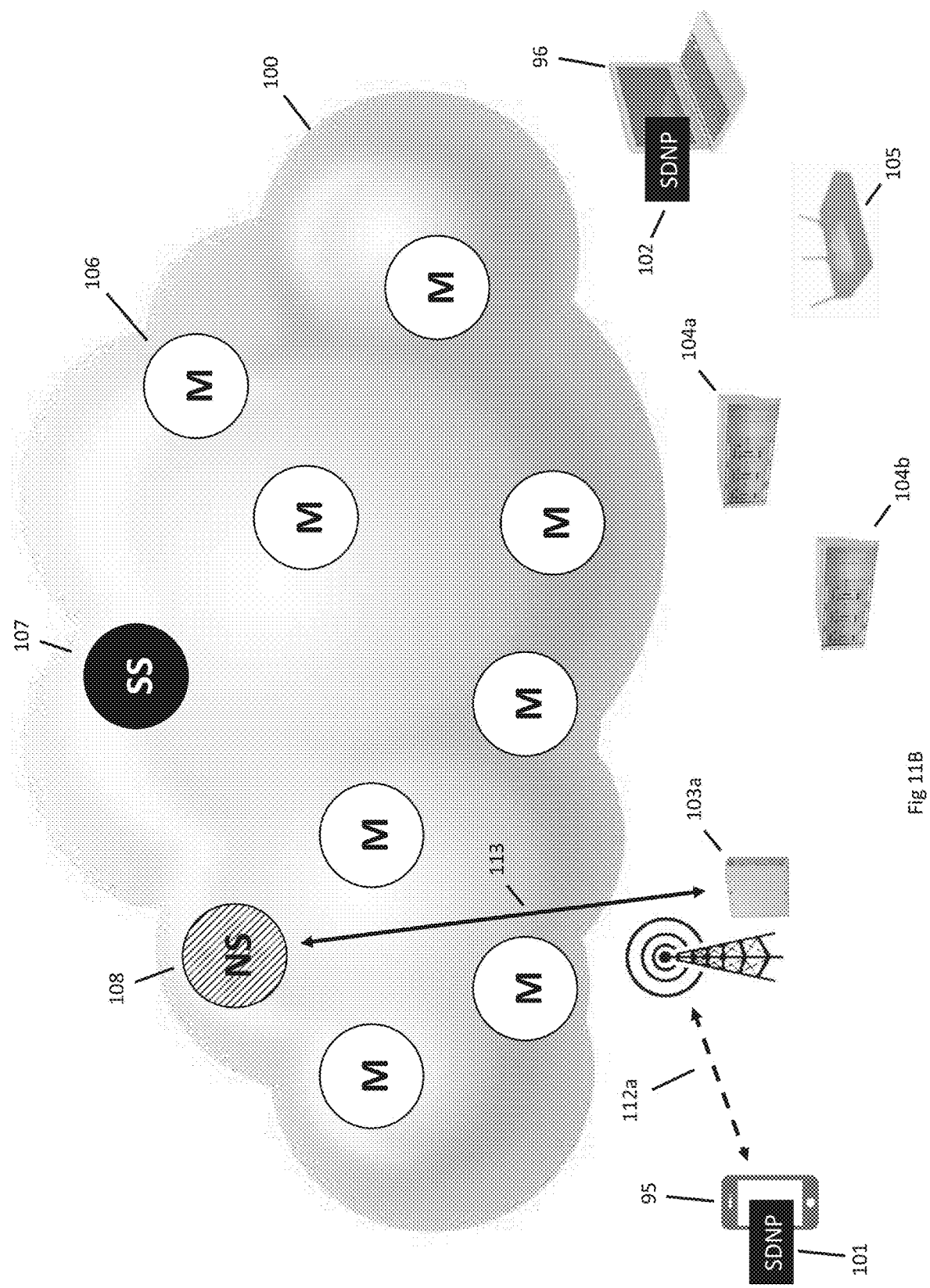
FIG. 11B illustrates SDNP name server query operation.

In step 262, shown in FIG. 11B, SDNP client app 101 then sends the query to SDNP name server node 108 over wireline connection 113. SDNP name server node 108 then returns the current dynamic SDNP address or SDNP zip code of the device or phone number the client is trying to contact, i.e. the callee. In an alternative but less secure realization, the client app can obtain the SDNP address of a signal server node and have it act as a proxy for the name server to obtain the callee's SDNP address.

Figure 11C:
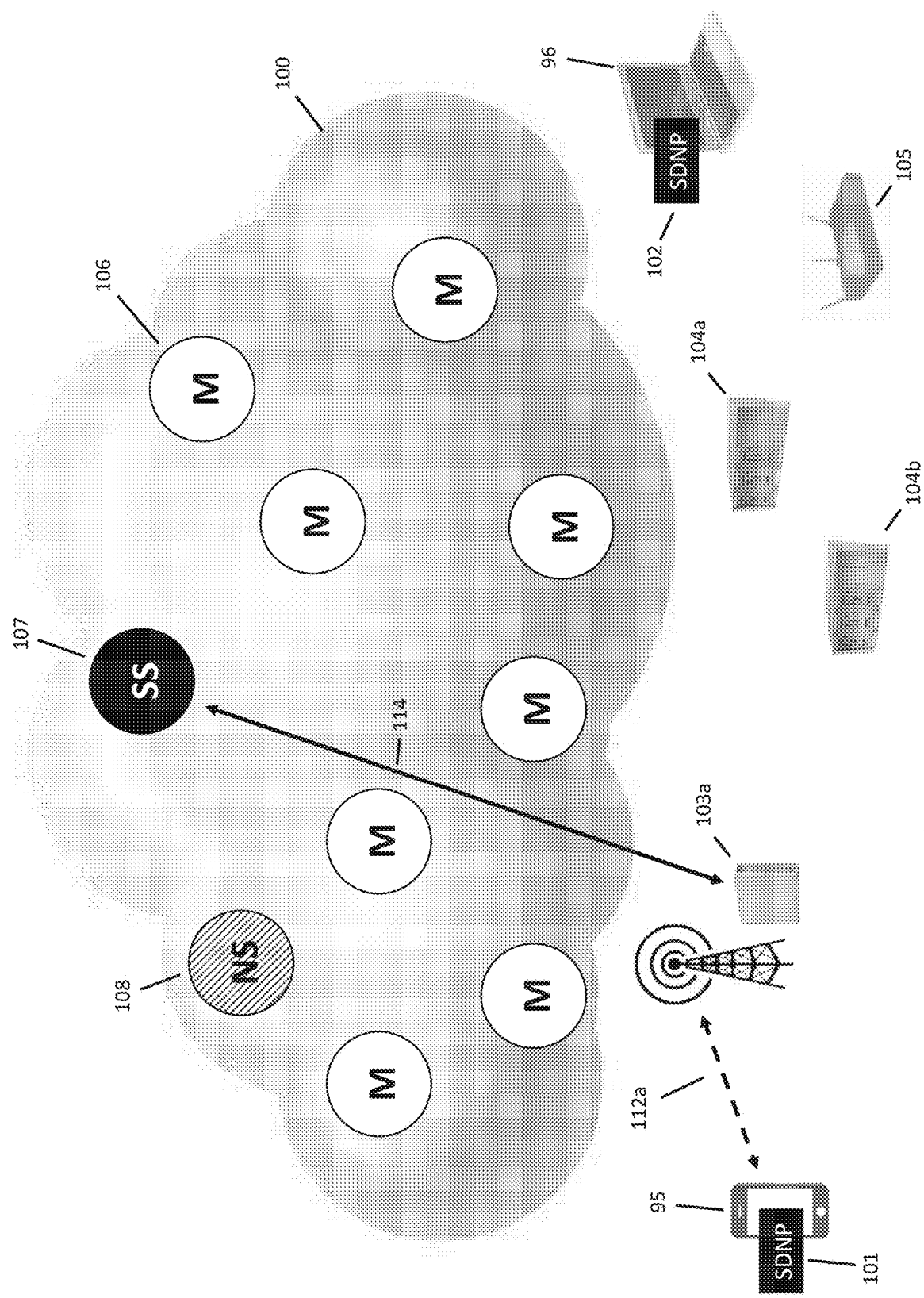
FIG. 11C illustrates SDNP routing request operation.
Figure 11D:
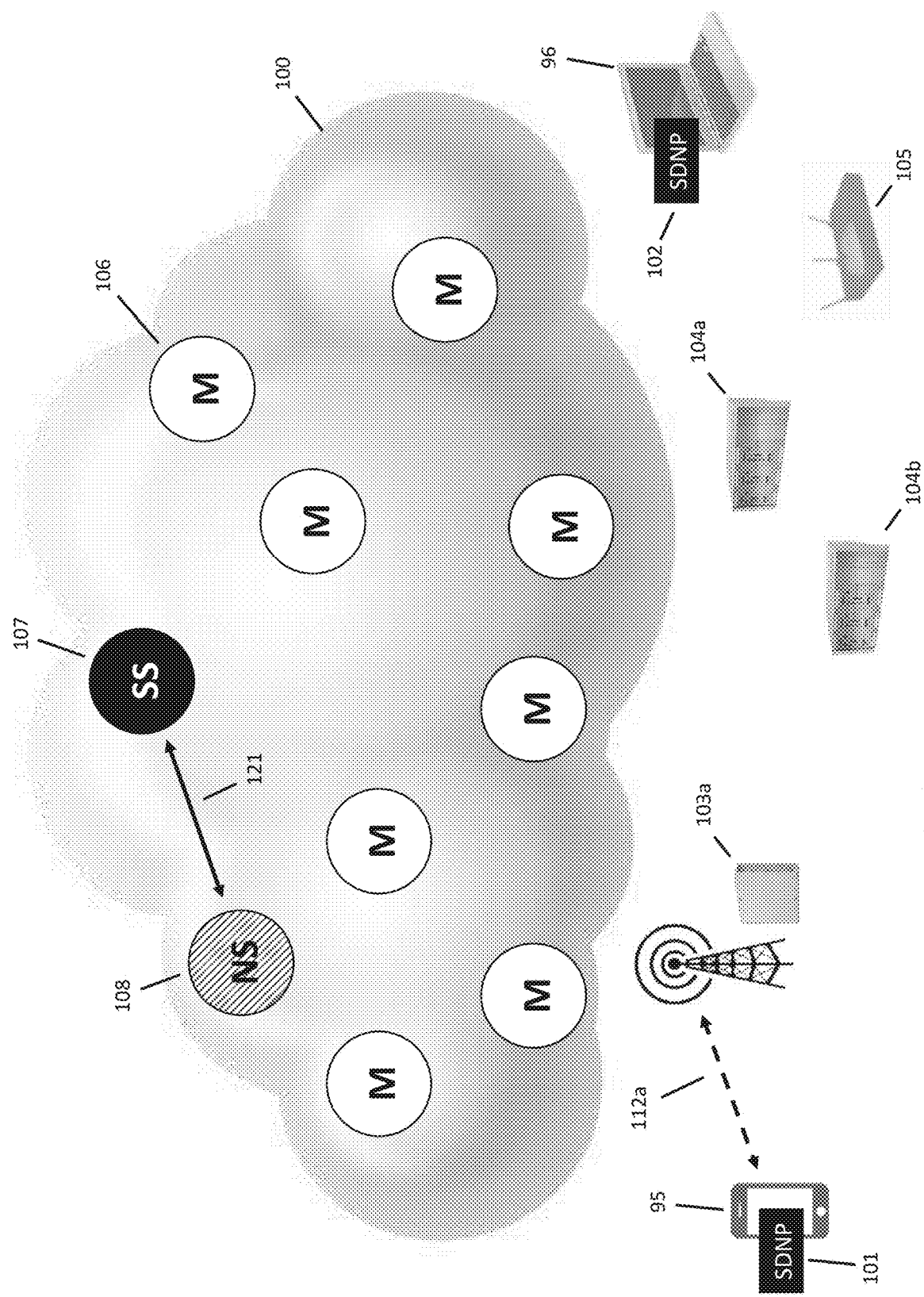
FIG. 11D illustrates SDNP network node request operation.

In FIG. 11C corresponding to step 263, SDNP client app 101 then contacts SDNP signal server node 107 sending the callee's SDNP address or SDNP zip code over wireline connection 114. In step 264 shown in FIG. 11D, SDNP signal server node 107 contacts SDNP name server node 108 over wireline connection 121 to obtain the SDNP addresses of all the media nodes it intends to execute routing over.

Figure 11E:
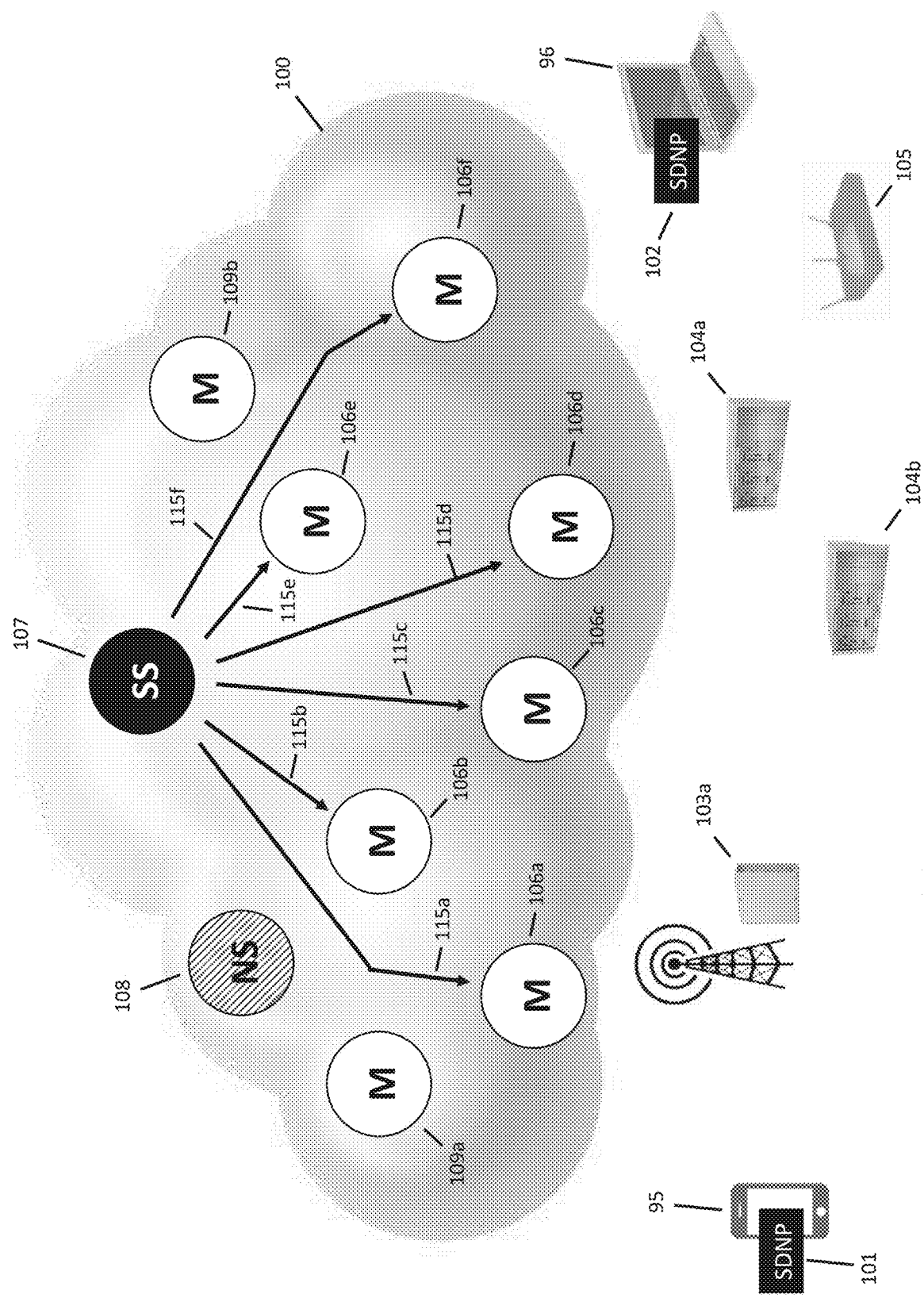
FIG. 11E illustrates the SDNP command and control (C&C) routing instruction dispatcher operation.
Figure 11F:
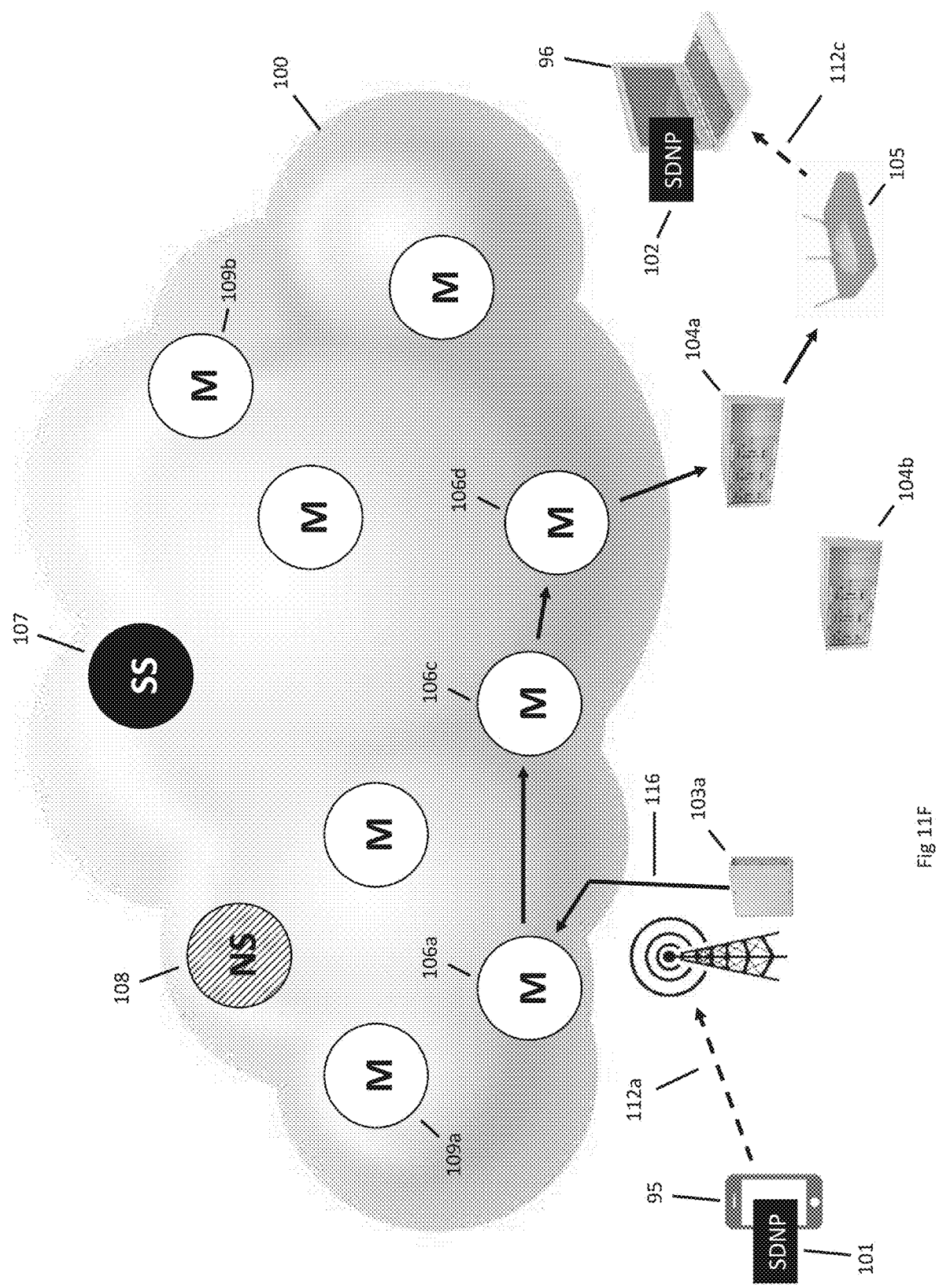
FIG. 11F illustrates the SDNP first packet transport operation.

In step 265, shown in FIG. 11E, SDNP signal server node 107 dispatches command and control (C&C) packets to the SDNP media nodes 106a-106f it selects to carry the media packets, specifically using wireline connections 115a-115f to send instructions to SDNP media nodes 106a-106f, respectively. It also passes state information, numeric seeds, and cryptographic keys. In step 266, data transport of media packets from caller SDNP app 101 to callee SDNP app 102 through the network of SDNP media nodes 106a-106f commences.

SDNP's dynamic routing is exemplified by a changing path of each successive data packet, as illustrated in FIG. 11F through FIG. 11I. Specifically, in FIG. 11F a first data packet from client app 101 in cell phone 95 is carried to cell phone tower 103a over radio link 112a, then by wireline 116 to the first media node 106a, acting as a gateway to the meshed network of SDNP cloud 100. This gateway SDNP node then performs certain state-based single-hop concealment operations on the content of the data packet and forwards the packet to SDNP media node 106c, which repeats the process, sending the packet to SDNP media node 106d, acting as a cloud gateway to last mile communication with SDNP client 102 hosted by notebook 96, carried by router 104a, WiFi router 105 and radio link 112c.

Figure 11G:
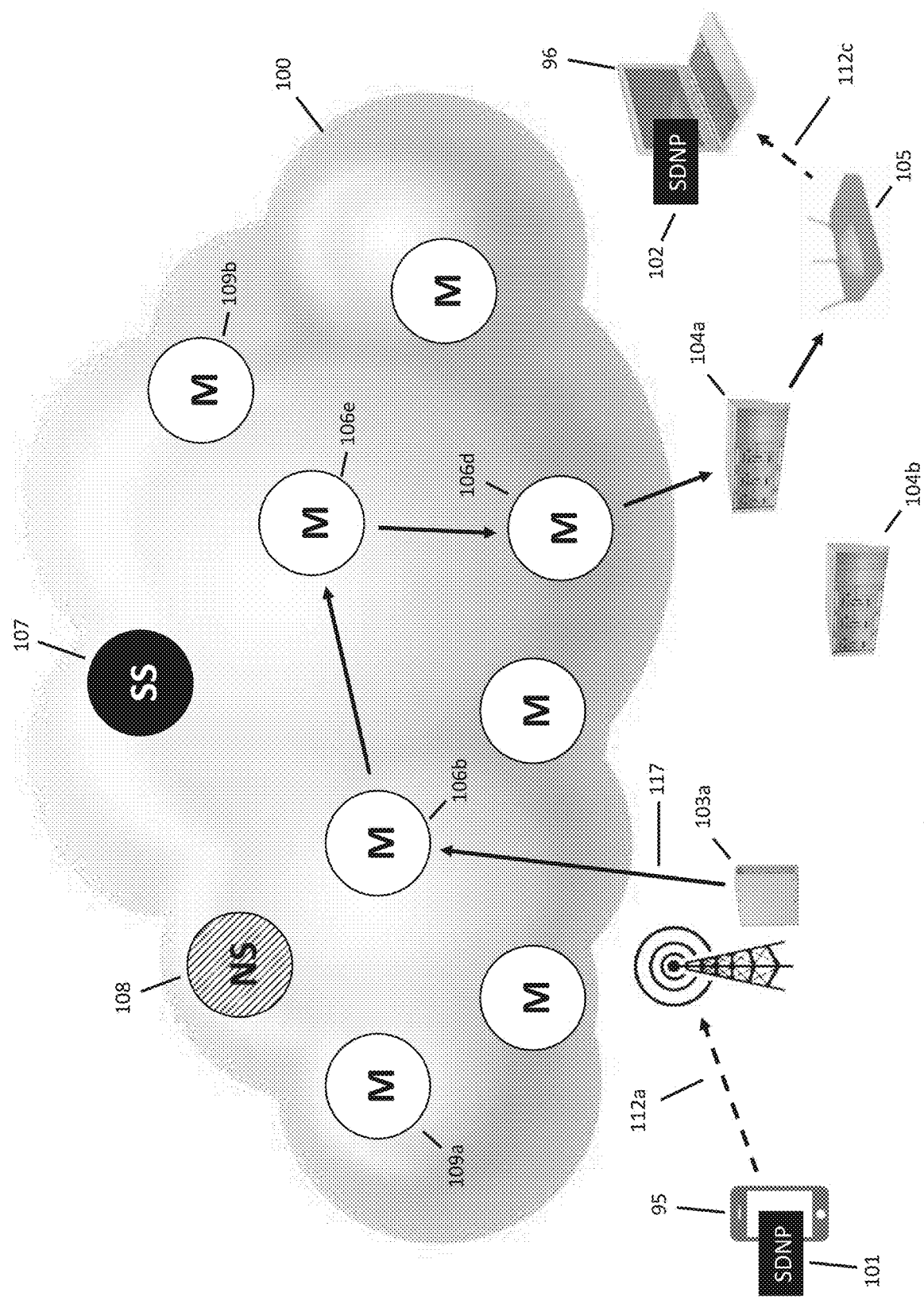
FIG. 11G illustrates the SDNP second packet transport operation.

As shown in FIG. 11G, a second data packet from client app 101 in cell phone 95 is carried to cell phone tower 103a over radio link 112a, then by wireline 117 to gateway media node 106b of SDNP cloud 100. Gateway node 106b then performs certain state-based single-hop concealment operations on the content of the data packet and forwards the packet to SDNP media node 106e, which repeats the process, sending the packet to SDNP media node 106d, acting as a cloud gateway to the same last mile communication with SDNP client 102 hosted by notebook 96, carried by router 104a, WiFi router 105 and radio link 112c.

Figure 11H:
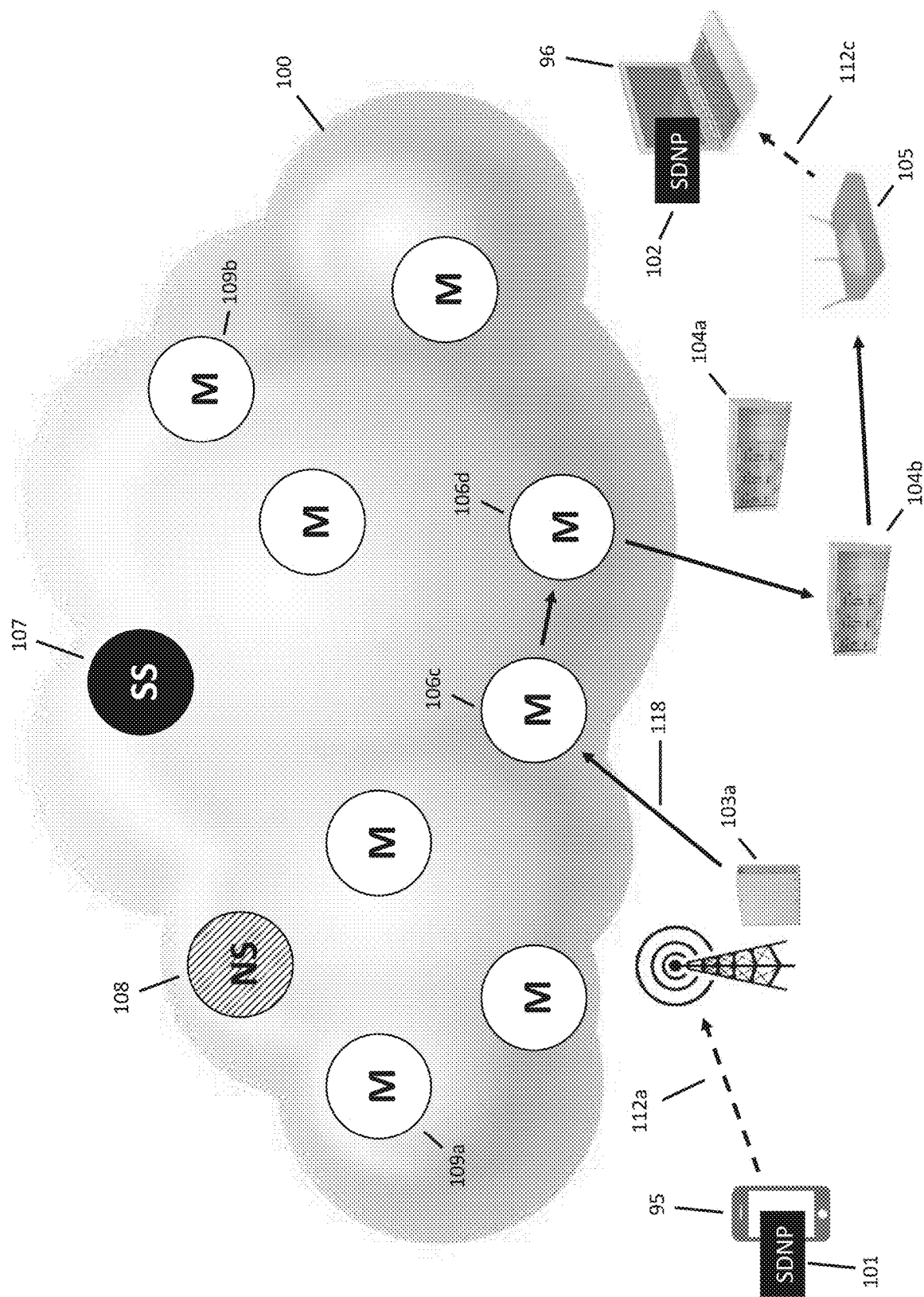
FIG. 11H illustrates the SDNP third packet transport operation.
Figure 11L:
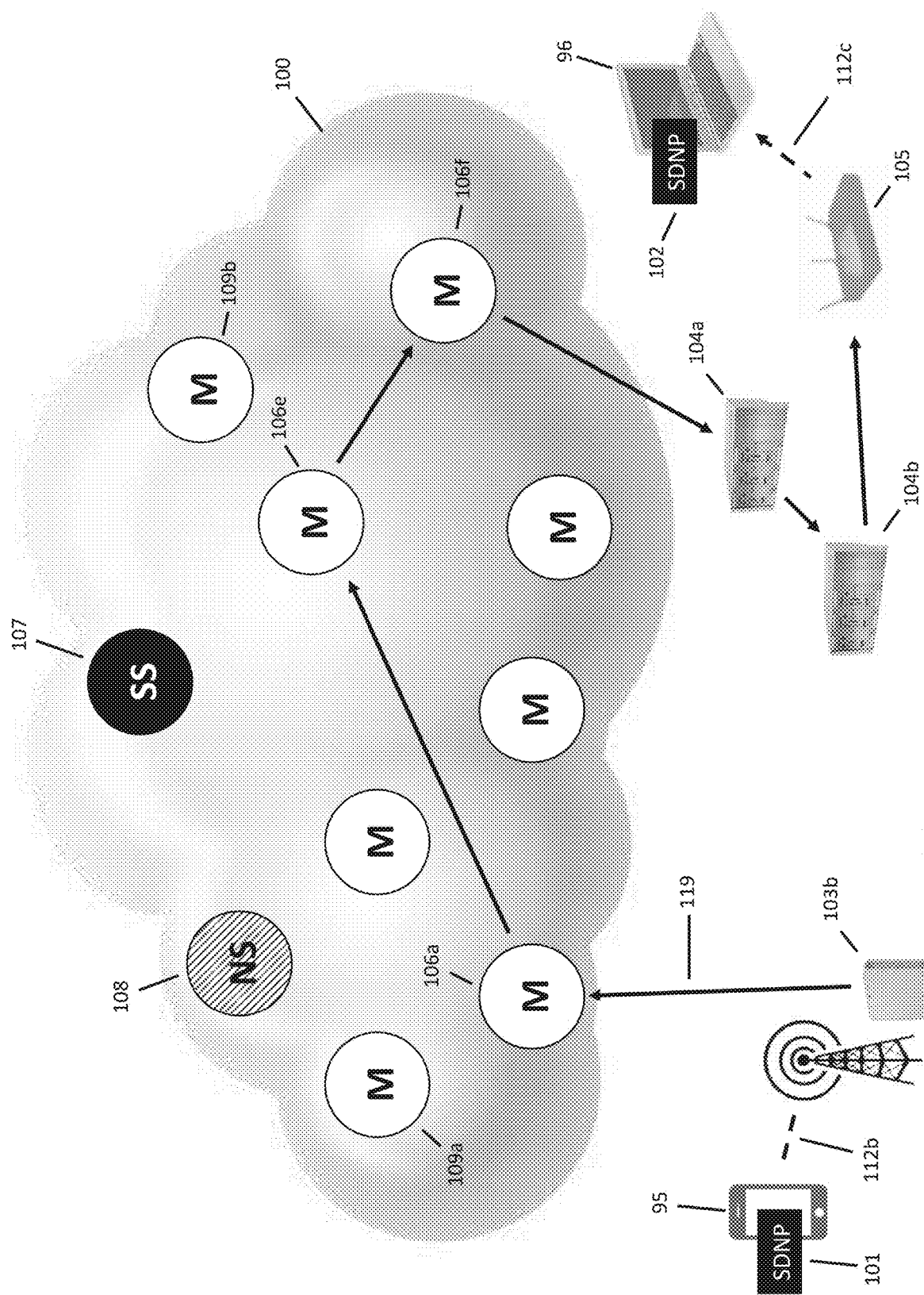
FIG. 11I illustrates the SDNP fourth packet transport operation.

As shown in FIG. 11H, a third data packet from client app 101 in cell phone 95 is carried to cell phone tower 103a over radio link 112a, then by wireline 118 to gateway media node 106c of SDNP cloud 100. Gateway node 106c then performs certain state-based single-hop concealment operations on the content of the data packet and forwards the packet to SDNP media node 106d, acting as a cloud gateway to a last mile communication with SDNP client 102 hosted by notebook 96, carried by router 104b, WiFi router 105 and radio link 112c. In this case, the last mile routing changed dynamically.

Finally, as shown in FIG. 11I a fourth data packet from client app 101 in cell phone 95 is carried to cell phone tower 103b over radio link 112b, then by wireline 119 to gateway media node 106a of SDNP cloud 100. Gateway node 106a then performs certain state-based single-hop concealment operations on the content of the data packet and forwards the packet to SDNP media node 106e, then to media node 106f, acting as a cloud gateway to the a last mile communication with SDNP client 102 hosted by notebook 96, carried by router 104a, then router 104b, WiFi router 105 and radio link 112c. In this case, both the first and last mile routing changed dynamically.

Referring again to FIG. 10, in step 267 a bidirectional dialog ensues between client apps 102 and 101 until then session ends in step 268. As described, SDNP cloud and last mile routing, packet security credentials, and packet content changed dynamically and continuously with no central control. The SDNP network as described constitutes a meshed network using dedicated resources, where certain servers are dedicated to hosting either SDNP name server node 108, SDNP signal server node 107, or one of SDNP media nodes 106a-106f, but only one of them.

SDNP communication as described employs separate nodes for the name server, signal server, and media node functions, each hosted on separate dedicated devices. Network operation therefore requires the hardware hosts for all three classes of nodes remain perpetually available, i.e. always on and reachable. Global server clouds easily support perpetual availability by launching a new instance of installed software on an active server whenever a software host goes offline or the traffic on a single server exceeds certain levels.

In networks comprising uncertain resources such as ad hoc, peer-to-peer, and mobile networks, communication reliability is impacted by the fact that the requisite managerial functionality of the signal server node or the name server node may not be available all the time (even if the media nodes are sufficiently redundant to survive outages). In such cases, a fully decentralized realization of an SDNP cloud is needed to ensure that all functions are hosted and perpetually online.

Decentralization of SDNP network operation, however, requires the use of several inventive methods to maintain both functionality and hypersecurity.

B. Decentralized SDNP Hypersecure Communications

In order to retain both the functionality and hypersecurity of SDNP communications, a decentralized implementation of an SDNP network must adhere to the same governing principles as SDNP communication using dedicated function nodes hosted on fixed infrastructure, the principle of "zero knowledge" (or more accurately "incomplete knowledge") specifically:

No node with access to device or user identity should know data packet routing through the network No node with access to device or user identity should know the content of data packet communication.

No node routing data packets should know the payload content of a data packet.

No node routing data packets should know the owner identity of a data packet's payload.

No node carrying data packets should know the owner identity of a packet's payload.

No node carrying data packets should have access to packet routing information except for single hop information needed to identify incoming packets and to direct outgoing packets to their next nodal destination.

No node carrying data should know the selection process used to determine state-based dynamic concealment of a packet.

No node carrying data should ever contain a meaningful or useful amount of payload data fragments.

A decentralized SDNP network has to perform hypersecure transport adhering to these criteria with no knowledge as to what resources are available to form the network. Such a requirement means any given HyperNode must be capable of performing any of the key roles, namely (i) the device identity management of a name server, (ii) the dispatcher function of a signal server, and (iii) hypersecure data transport of media nodes without comingling the data from one task with another.

Decentralized d'SDNP Network Topology

Figure 12A:
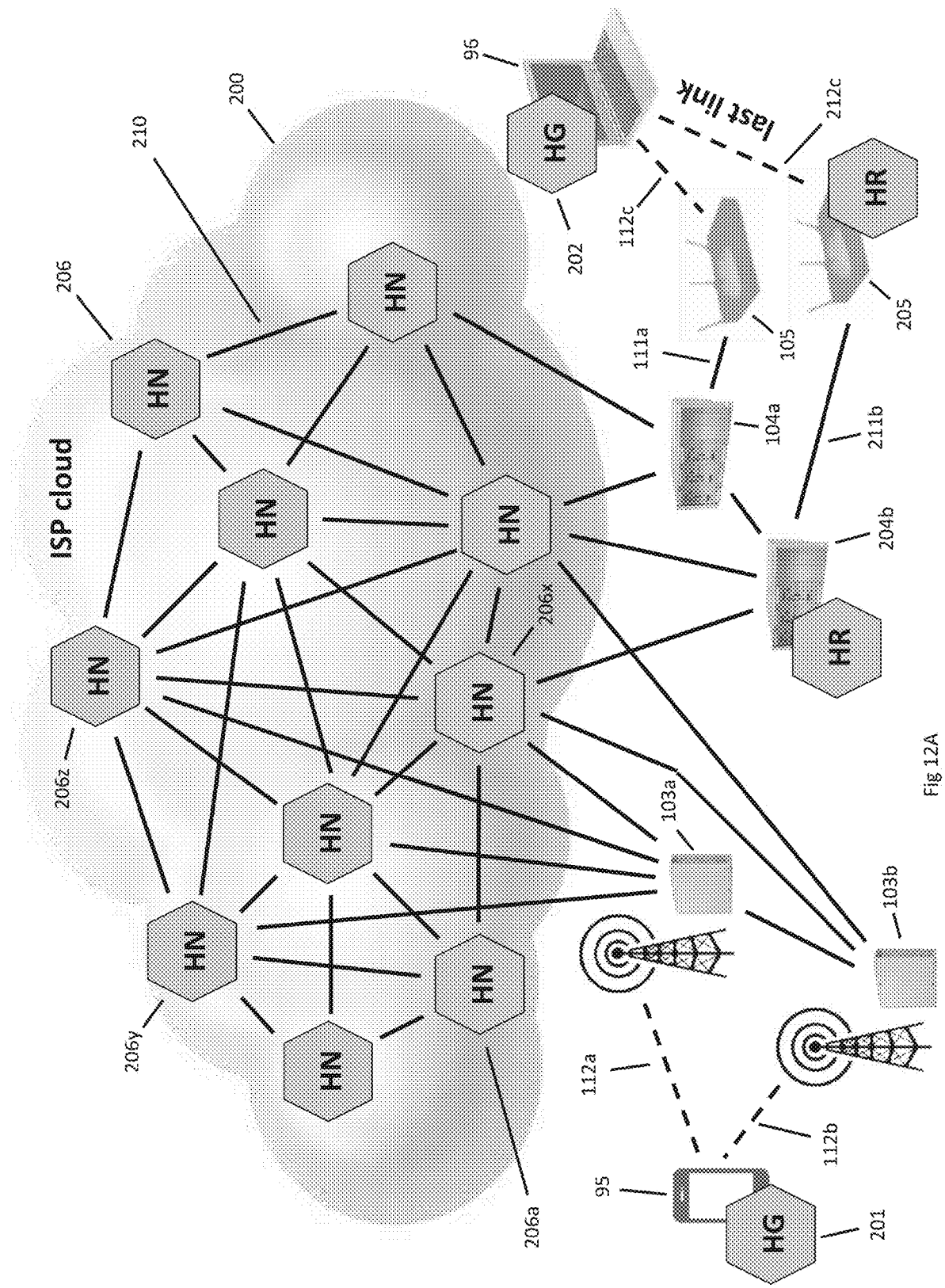
FIG. 12A illustrates an example of the decentralized SDNP meshed network.

An example of a decentralized SDNP network (or d'SDNP cloud) is illustrated in FIG. 12A, comprising an ISP hosted cloud 200 of servers hosting a single-instance type of software to realize HyperNodes 206 labeled as |HN| communicating over high-speed wireline connections 210. For clarity's sake, in written text node names contain vertical-line brackets |XX| around the node ID (in figure graphics the brackets are excluded). All HyperNodes 206 comprise servers hosting executable code identical in functionality and capability. Accordingly, prior to commencing a HyperSphere communication session, HyperNodes 206*x*, 206*y*, 206*z* and 206*a*, all instances of a generic HyperNode 206 behave identically as a cloud of homogeneous SDNP nodes.

As illustrated, cloud 200 connects to cell phone 95 via a mobile network comprising cell phone towers 103*a* and 103*b*, using cellular network radio links 112*a* and 112*b*, respectively, to realize extra-cloud (last mile) communication. Cell phone 95 is able to access the HyperSphere cloud through installed d'SDNP software client HyperSphere gateway node |HG| 201, software capable of performing the same connectivity as SDNP software 101 in dedicated function SDNP implementations. Similarly, last mile connection between cloud 200 and notebook 96 is facilitated via Ethernet router 104*a*, wireline connection 111*a*, WiFi router 105, and 802.11 microwave last link 112*c*.

In an alternative embodiment unique to decentralized SDNP communication, a hypersecure last mile connection between cloud 200 and notebook 95 can be facilitated by a SDNP-enabled HyperSphere router |HR| 204*b*, via wireline connection 211*b* to SDNP-enabled HyperSphere router |HR| 205, and 802.11 microwave last link 212*c*. Tablet 96 accesses HyperSphere cloud 210 through installed d'SDNP software, multifunction HyperSphere gateway node |HG| 202. The HyperSphere router software enables any component to operate with all the full features of a HyperNode even if the device is operating outside of all clouds performing last mile communication.

Figure 12B:
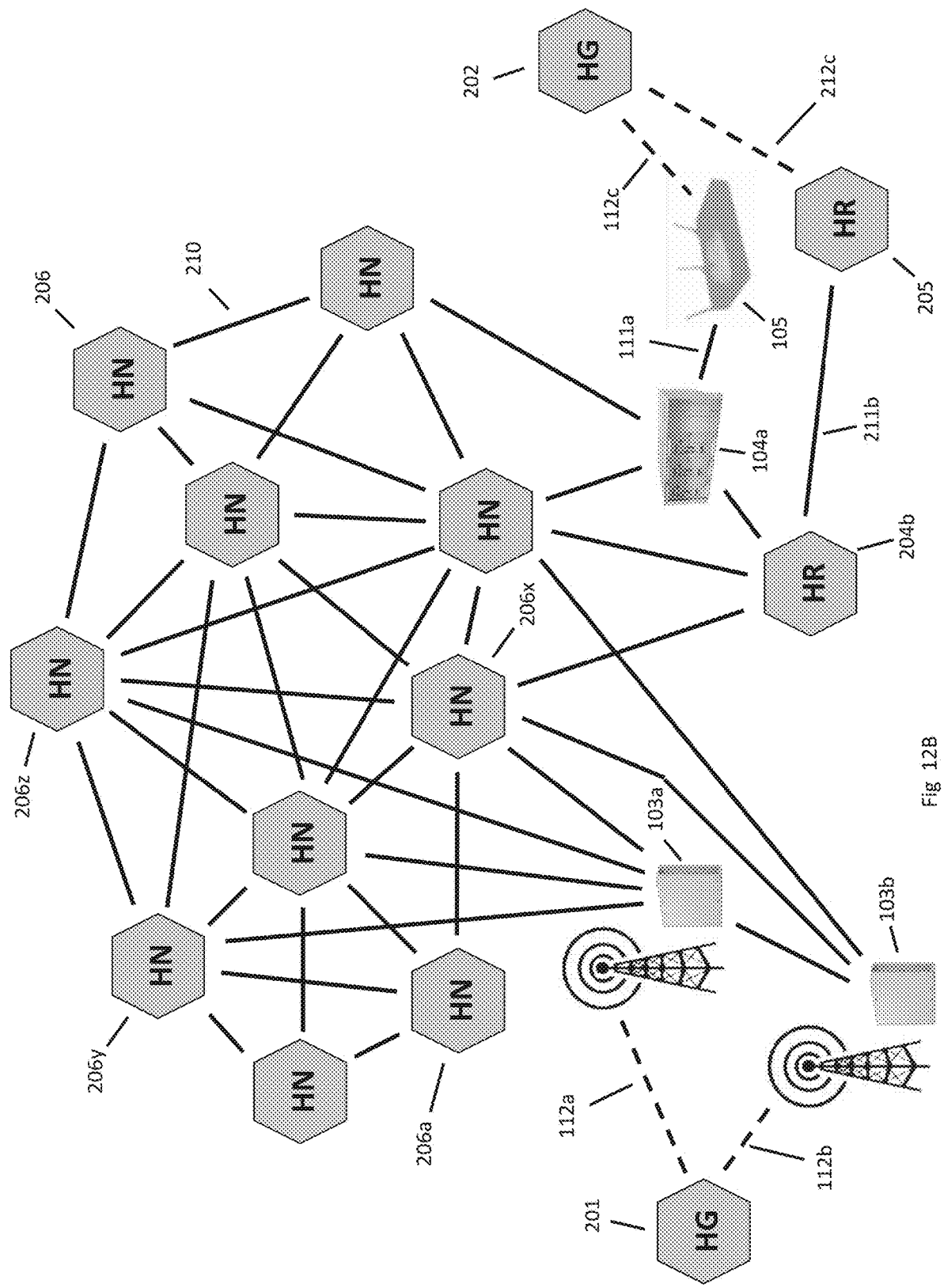
FIG. 12B is a representation of an alternative decentralized SDNP meshed network.

Given the fact that all the HyperNodes |HN| in cloud 200 are identical before communication commences; that the client's HyperSphere gateway |HG| software emulates many of the functions of HyperNodes; and that some routers are SDNP-enabled as HyperSphere routers |HR|, then there is no meaning as to whether a group of HyperNodes are provided by a common ISP or network provider, hosted over a fixed network, common infrastructure, or network backbone. In the decentralized network of the HyperSphere, all nodes are of equal value. Accordingly, FIG. 12B illustrates the same HyperSphere network, represented graphically after removing the representation of cloud 200.

In essence, all devices hosting HyperNodes, including HyperSphere routers and HyperSphere gateways, essentially operate in an identical manner, forming a homogeneous network of nodes, hosted atop heterogeneous host devices. In this manner, the HyperSphere operates a uniform cloud completely agnostic as to its host platform devices—a key criterion necessary to realize a fully autonomous decentralized communication network. In other words, in a decentralized network, there is no such thing as cloud and last mile communications—every HyperNode, HyperSphere router, and HyperSphere gateway are all equal partners, i.e. the HyperSphere's cloud is everywhere and omnipresent.

And unlike fixed infrastructure networks whose performance degrades as network traffic increases causing traffic jams and delays, the HyperSpheric cloud is dynamic and decentralized. The more HyperNodes that join the cloud, the more combinations exist and the better, not worse, the network's performance and quality-of-service (QoS) become.

HyperSphere Network Components

FIG. 12C illustrates the components of the HyperSphere network, including HyperNode HN 206, client HyperSphere gateway HG 201, and HyperSphere router HR 205 as well as non-SDNP enabled components including WiFi router 105, Ethernet router 104, and mobile wireless network 103. All three component nodes, HyperNode |HN| 206, client HyperSphere gateway |HG| 201, and HyperSphere router |HR| 205, are "metamorphic," meaning that they can change their functionality based on the current demand for a particular network function.

In particular, metamorphic HyperNode |HN| 206 comprises HyperNode software installed on a host device 231, which may comprise a server, computer, smartphone, tablet, notebook, automobile, or IoT device. Unlike the previously disclosed dedicated function SDNP network where media nodes, signal server nodes, and name server nodes comprise separate executable application software, in d'SDNP code, every HyperNode is capable of performing any one of the three aforementioned functions with one proviso—a specific HyperNode can but only perform one of the three functions—task, name server, or authority node functions—at any one time. Mathematically, this feature is defined by the equation $|HN|=|T| \oplus |NS| \oplus |A|$ where $\oplus$ is the Boolean logic symbol for "exclusive OR" a function meaning one or the other but not both.

At the time an undifferentiated HyperNode receives an instruction to initiate a communication session, it must change (morph) into one of the three differentiated HyperSphere node types, either

- A task node |T| used to carry data packets (the same operations as the media node in dedicated function SDNP media nodes) and to execute dynamic concealment of datagram payloads. In dedicated function SDNP transport, an air-gapped DMZ server provides the instructions for dynamic concealment. In the disclosed d'SDNP implementation, these instructions must be dispatched from a decentralized DMZ server or d'DMZ (described later in this disclosure).
- An authority node |A| used to direct network traffic (the same function performed by the signal server node in dedicated function SDNP networks) and to engage in transaction validations in consensus based jury of peers (a blockchain function described later). In dedicated function SDNP transport, a network propagation delay table describing the time it takes for data to transit between node SDNP nodal addresses need for real time data routing is stored in total (or in part) on signal server nodes.
- A name server node |NS| used to translate phone numbers and client IDs to dynamic IP addresses, SDNP addresses, and SDNP zip codes. Unlike dedicated function SDNP networks, the HyperSphere's name server database is decentralized and disaggregated, comprising an ethereal multi-dimensional data structure not physically located in any one server or storage device.

Because at the time a session is initiated, a HyperNode transforms, i.e. morphs into one-of-three described node types, the HyperNodes are referred to as "metamorphic," the adjective form of metamorphosis meaning to "a change of the form or nature of a thing into a completely different one." The metamorphic conversion of an undifferentiated HyperNode into single-function HyperNode is analogous to an undifferentiated stem cell transforming into a tissue-specific cell type. Unlike in biological analogs, however, in the HyperSphere, metamorphosis is a reversible process. After a differentiated HyperNode has completed its designated task, it reverts back into its undifferentiated precursor awaiting its next job. In this sense the population of eligible HyperNodes acting as network resources in inexhaustible and a given HyperNode's network participation potential is indefatigable.

In summary, even though all HyperNodes |HN| start out as undifferentiated and metamorphic, during a job the nodes morph into either a HyperSpheric name server |NS|, authority node |A| performing dispatching and signal server functions, or task node |T| performing media node functions, to complete a job then revert back into their undifferentiated |HN| form after completing the job. During metamorphosis, the undifferentiated node temporarily downloads requisite information from a diffuse, i.e. disaggregated or redundant, database layer (described later), performs its defined job and then reverts back to undifferentiated |HN| state, forgetting all the information it downloaded and everything it did. Operational amnesia, referred to a stateless operation, means a HyperNode holds knowhow only temporarily, and never possesses the information for node naming, packet routing, or payload content at the same time. Stateless operation, thereby ensures a node that can perform any of the |NS|, |A|, and |T| functions but can never do more than one of them at a time.

And although a HyperNode employs the resources of its host processor and memory, it does not share any information regarding the data it processes or tasks it performs with its host. Such a method known as sandboxing, a method that protects the host OS from the applications it runs. HyperNode software, however, is symmetrically sandboxed, meaning the HyperNode cannot interact with or obtain information from its device host. Conversely, a device hosting a HyperNode cannot interact with (or even comprehend) network traffic carried by the HyperNode. The HyperNode operates statelessly, meaning it leaves no record as to its operation in the memory of its host device. This means that any device can host a HyperNode without concern about the node and the device interfering with each other than the device deciding how much computational power (compute cycles) to allocate to the HyperNode.

Because of this symmetric sandboxing, the HyperNode cannot operate as a user interface for supporting applications or performing client specific functions. A special software interface is required for carrying data across the device application boundary, Specifically, for an application or client to access the HyperSpheric cloud, specialized application software 232 is installed into the device, for example into cell phone 95 or (any other edge device), to facilitate HyperSphere gateway HG 201. According to Wikipedia, an edge device is "a device providing an entry point into enterprise or service provider core networks. Examples include routers, routing switches, integrated access devices (IADs), multiplexers, and a variety of metropolitan area network (MAN) and wide area network (WAN) access devices." In HyperSphere parlance, an edge device is any device hosting HyperSphere gateway software. Examples include personal computers, games, tablets, smartphones, IoT devices, automobiles, and other user controlled network connected components.

Unlike a HyperNode, which is generic software designed to operate atop major operating systems such as UNIX, Linux, MacOS, Windows, iOS, and Android, HyperSphere gateway functionality necessarily interacts with the application it enables, e.g. a bank login portal, a POS terminal, a factory control system, an automobile's infotainment system, home security systems, home IoT clouds, etc. To facilitate this integrated link, a HyperSphere-specific application programming interface (API) and source development kit (SDK), along with special premade interfaces and software utilities (library) are important engineering tools. Specifically, as an element of the HyperSphere's Application Programming Interface (HAPI), the HyperSphere gateway HG 201 provides a defined link, language, and protocol for a user application to contact and communicate with the HyperSphere decentralized network and with other HyperNodes. User applications are developed using the HyperSphere Software Development Kit (HSDK).

While in most cases HyperSphere gateway HG 201 operates as a dedicated interface and API to the HyperSphere, in some circumstances the gateway is metamorphic. One metamorphic application of a HyperSphere gateway is in forming ad hoc peer-to-peer networks (described later). In other words, a HyperSphere gateway |HG| operates as a HyperNode which can in a limited manner, exchange certain types of data between the HyperSpheric cloud and the device. HyperNode gateways, however, do not operate as autonomous code but instead are integrated into a merchant's or service provider's application software.

Another version of HyperNode software is the HyperSphere router |HR|. Although SDNP communication normally operates over the Network Layer-3 to the Applications Layer-7, |HR| router software includes provisions for optionally managing security on the PHY Layer-1 and MAC Layer-2, features valuable in routers, in RAID storage, and in IoT devices. HyperSphere router 205 comprises conventional router hardware such as Ethernet router 104 combined with HyperSphere dynamic router software 233 to realize SDNP-enabled wireline router 234, defined herein as an "Ethyrnet" router. Alternatively, WiFi router 105, combined with HyperSphere dynamic router software 233 can be used to realize SDNP-enabled WiFi wireless router 235, defined herein as a "HyFi" router.

HyperSphere router software offers special advantage in Last Mile communications outside of fixed infrastructure networks or high-speed clouds, because it manages security and user validation prior to establishing or allowing Network Layer-3 communications. Such a feature is valuable in thwarting denial of service (DoS) attacks because the |HR| node completely ignores nodes it cannot recognize. HyperSphere routers offer numerous advantages:

- HyperSphere routers direct HyperSphere datagrams in accordance with SDNP routing instructions received from a HyperSphere authority node (performing the signal server function). A router's static routing table does not determine packet routing.
- By remotely controlling routing by an authority node, HyperSphere datagrams cannot be diverted or hijacked even in last mile communications.
- HyperSphere routers report hop delays to the network, allowing a HyperSphere authority node (the signal server function) to decide the lowest propagation delay path for last mile communication, a feature non-SDNP routers cannot support.
- HyperSphere routers are support SDNP dynamic concealment processing and interpret dynamic security credentials.
- HyperSphere routers support a higher refresh rate on dynamic security parameters in last link communication between the HyperSphere router and a client device's HyperSphere gateway, improving dynamic security.
- HyperSphere routers support shared secrets in last link communication between the HyperSphere router and a client device's HyperSphere gateway, improving dynamic concealment.

In FIG. 12A, for example, hypersecure communication via Ethyrnet HyperSphere router 204*b* and HyFi HyperSphere router 205 offers a higher performance last mile connection than data transport over conventional routers. In many cases, however, last mile communication between a caller (edge device) and the SDNP cloud invariably also transports media packets across non-SDNP enabled devices, such as WiFi router 105 and Ethernet router 104, or over wireless network 103.

Because the SDNP packet follows the 7-OSI format, non-SDNP routers interpret the IP addresses as regular TCP/IP addresses for the Internet, the subnet, or the NAT address, and route the packet the same as if it were a regular TCP/IP packet, never realizing the packet is HyperSpheric. Referring again to FIG. 9, traffic through WiFi router 105 therefore employs routing table 137 rather than dispatcher based routing. Similarly, Ethernet router 104 employs the local ISP provider's routing table 138 until each packet reaches an SDNP node-enabled device. In wireline communication, an SDNP packet will likely traverse no more than one or two intermediary routers before each reaches a HyperNode. In the case of transport of a SDNP packet over wireless network 103 (or similarly over a cable or satellite network), routing occurs using the carrier's proprietary network routing table 139 and custom packet format (e.g. 3G, 4G, 5G, satellite, or DOCSIS3 protocols). Network address translator (NAT) 132 is required to convert the proprietary packet format back to Ethernet compatible TCP/IP packet formatting for wireline connectivity.

In this manner a SDNP media packet can be transported across a network of Internet routers and SDNP nodes, with no need for custom hardware or dedicated privately-owned clouds, meaning that an SDNP cloud can be installed on any TCP/IP network. Transport of fragmented concealed packets over non-SDNP enable devices does not risk communication security, but may degrade call quality-of-service QoS by unpredictably increasing a packet's propagation delay by routing the packet through longer delay paths in the network.

Decentralized SDNP Network Operation

Figure 1:
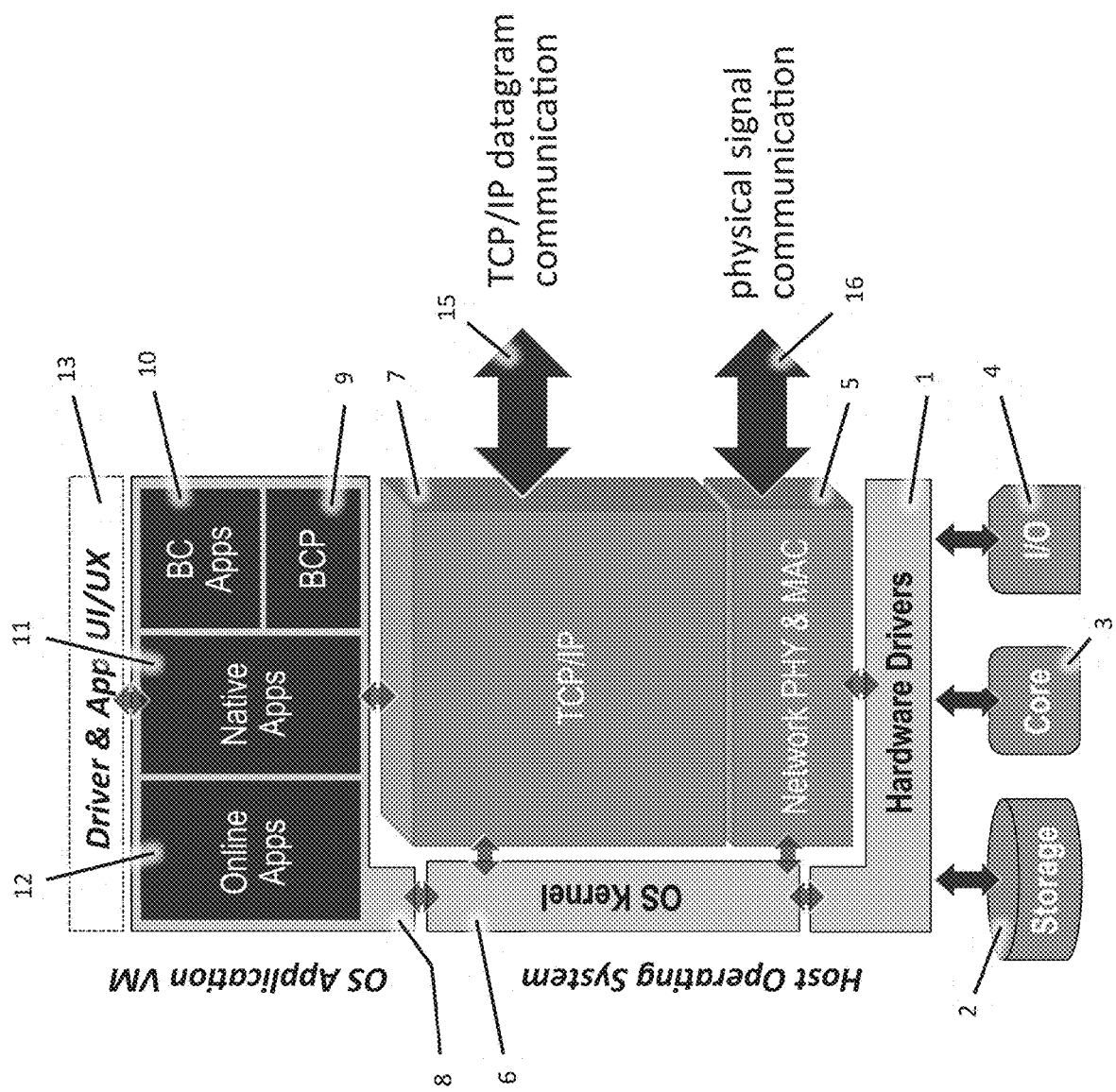
FIG. 1 is a block diagram of computing device with TCP/IP communication stack.
Figure 2:
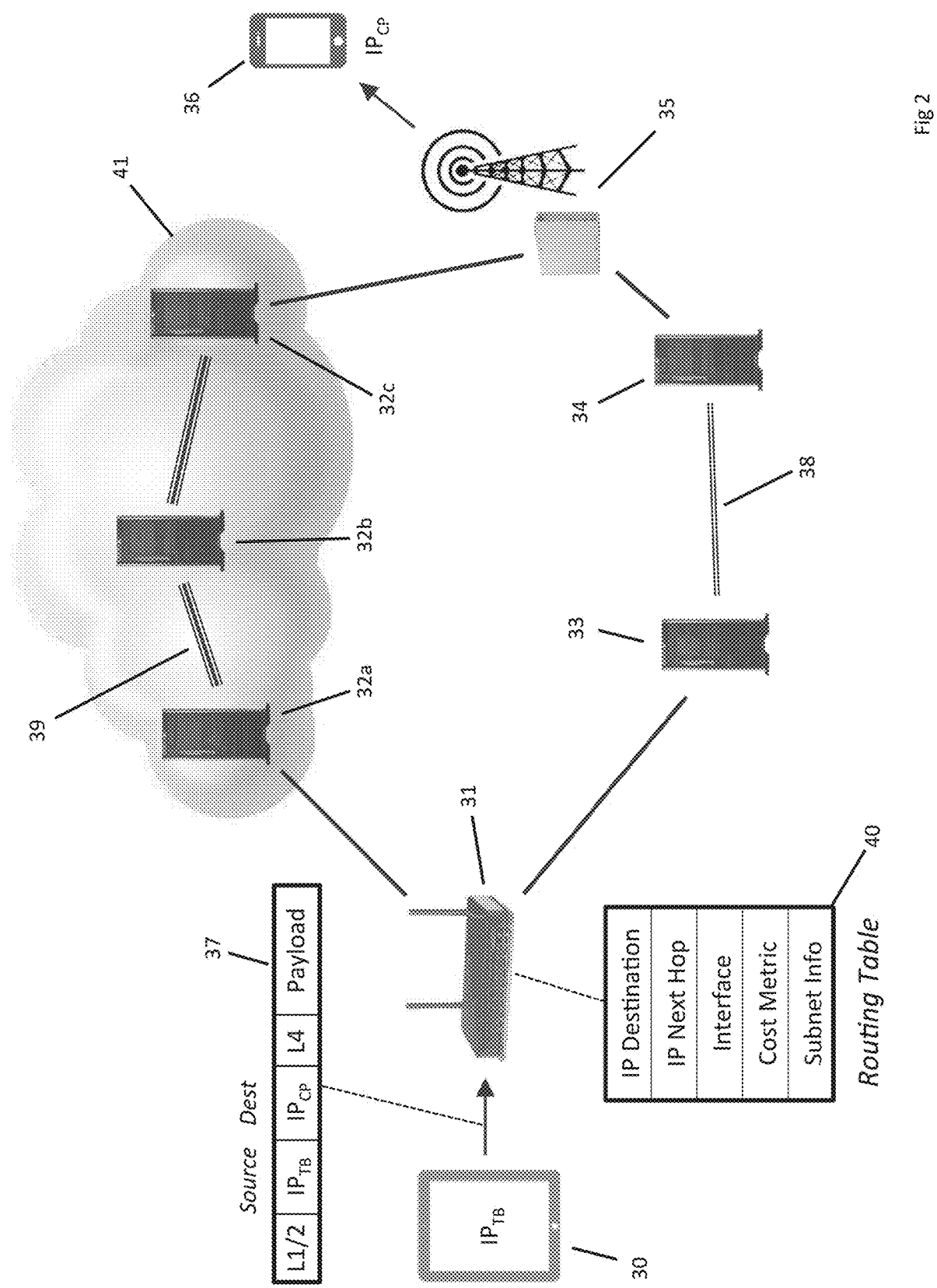
FIG. 2 is a TCP/IP datagram of packet routing.
Figure 3:
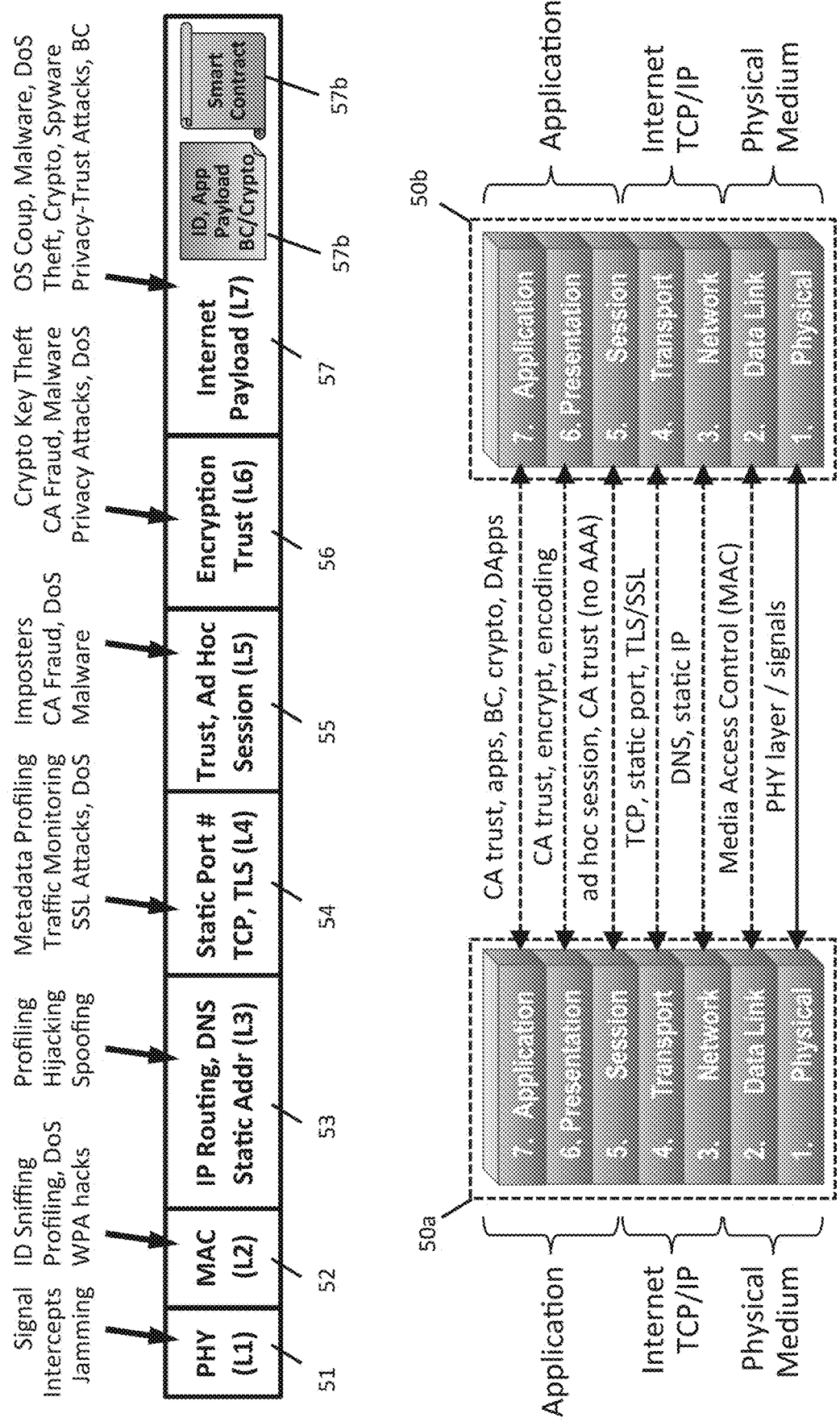
FIG. 3 is an illustration of TCP/IP communication stack and datagram construction.
Figure 4:
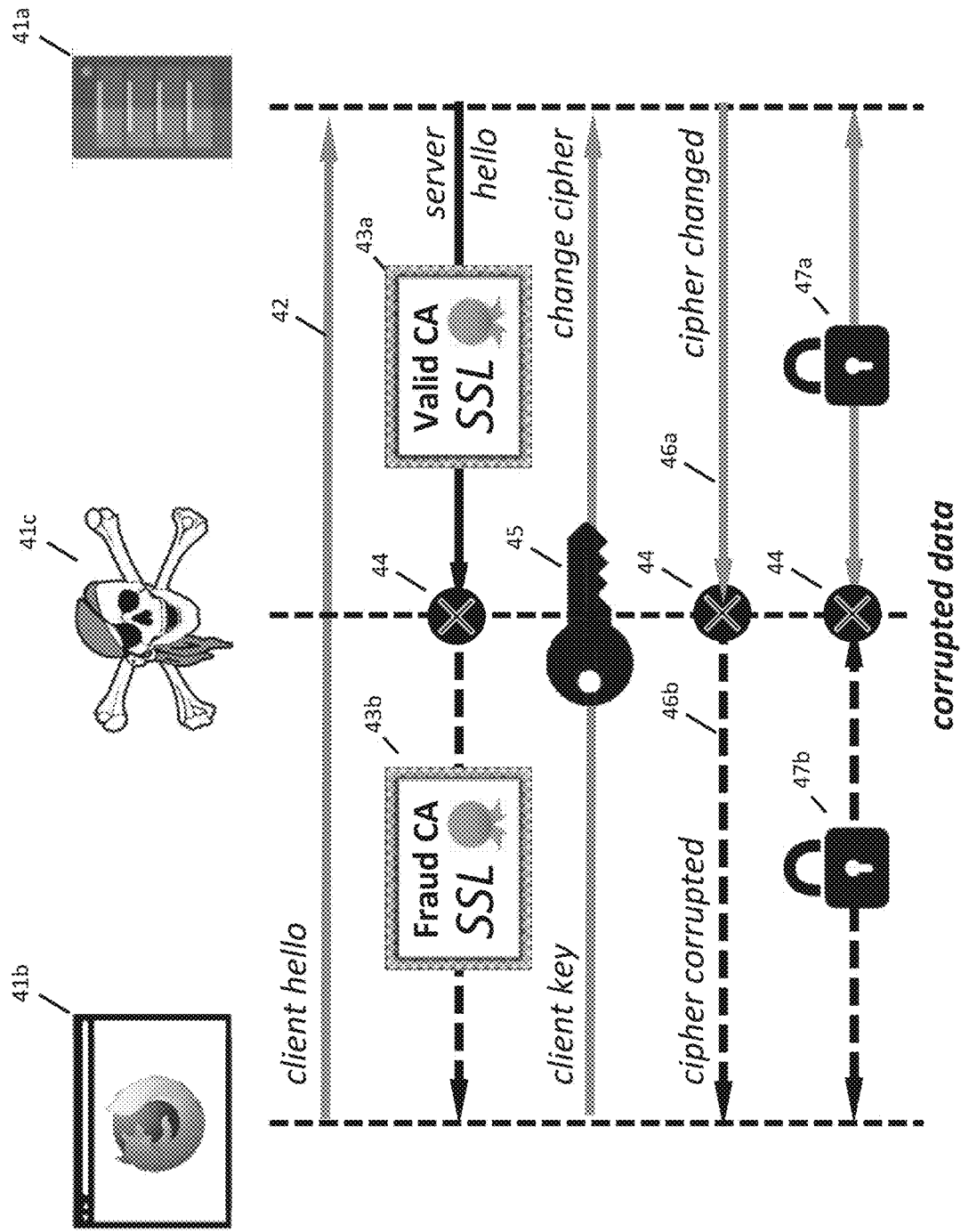
FIG. 4 illustrates Internet packet hijacking through man-in-the-middle (MiM) attack.
Figure 5:
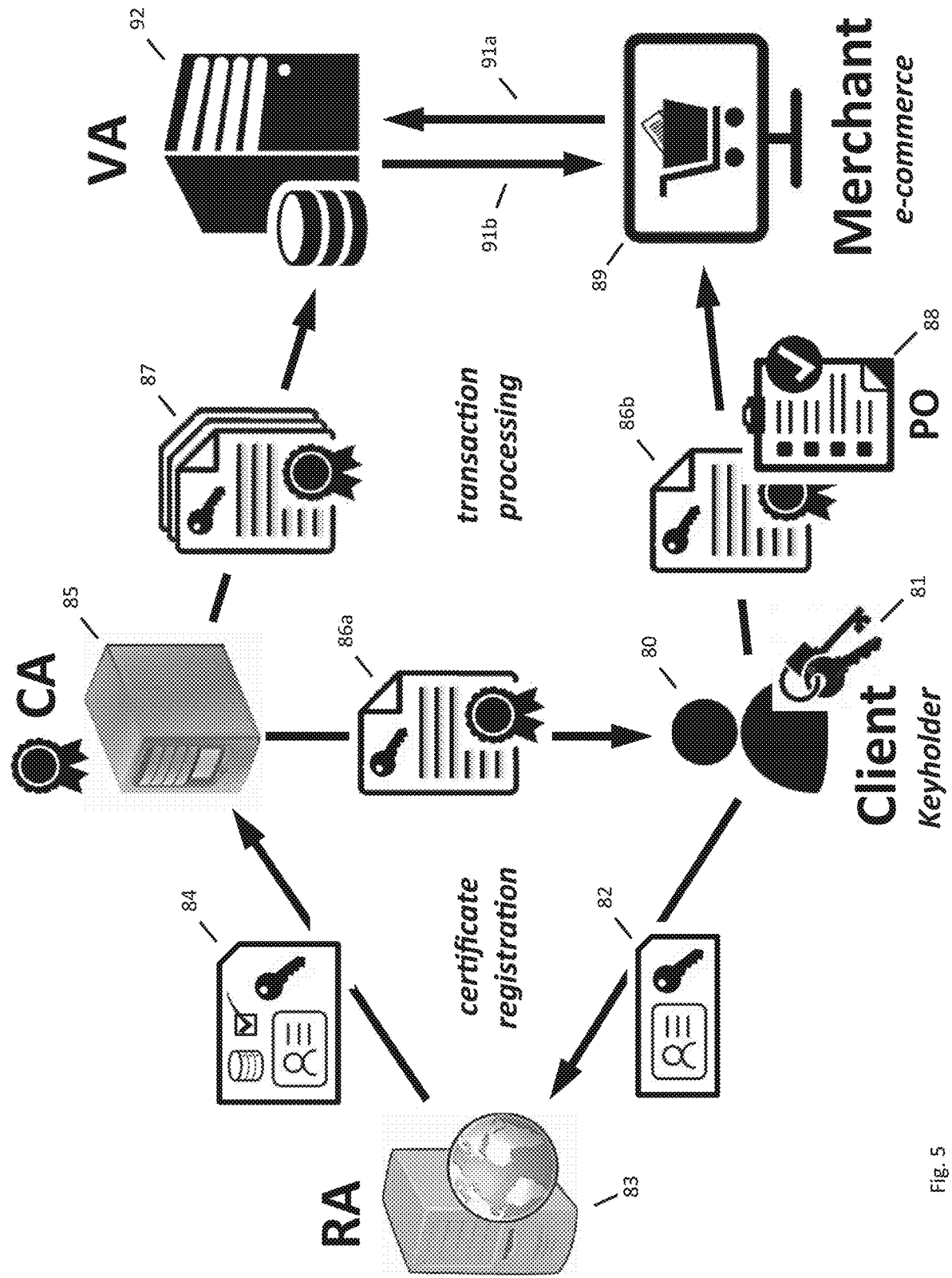
FIG. 5 shows Internet certificate authority.
Figure 6:
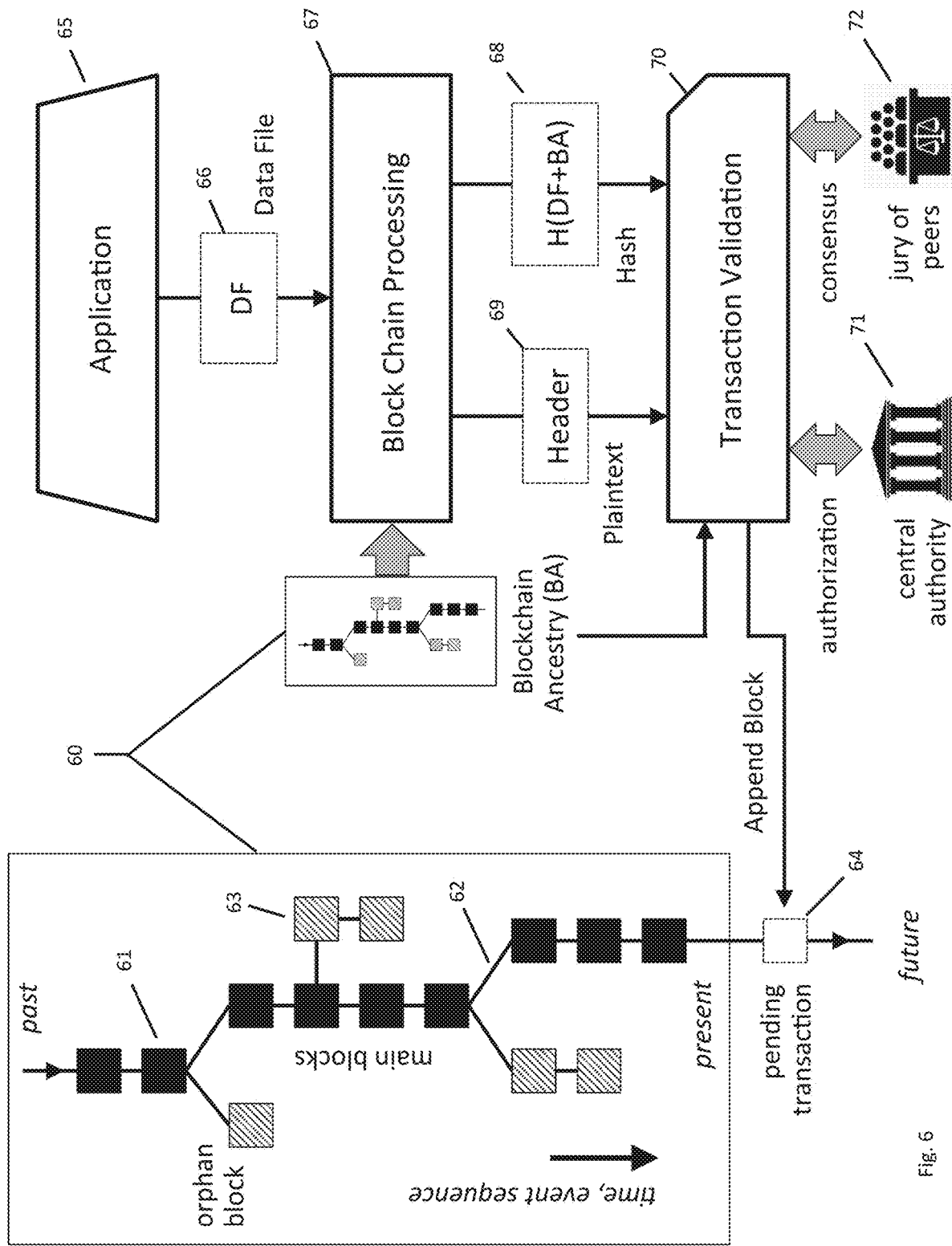
FIG. 6 shows Internet blockchain processing.
Figure 7A:
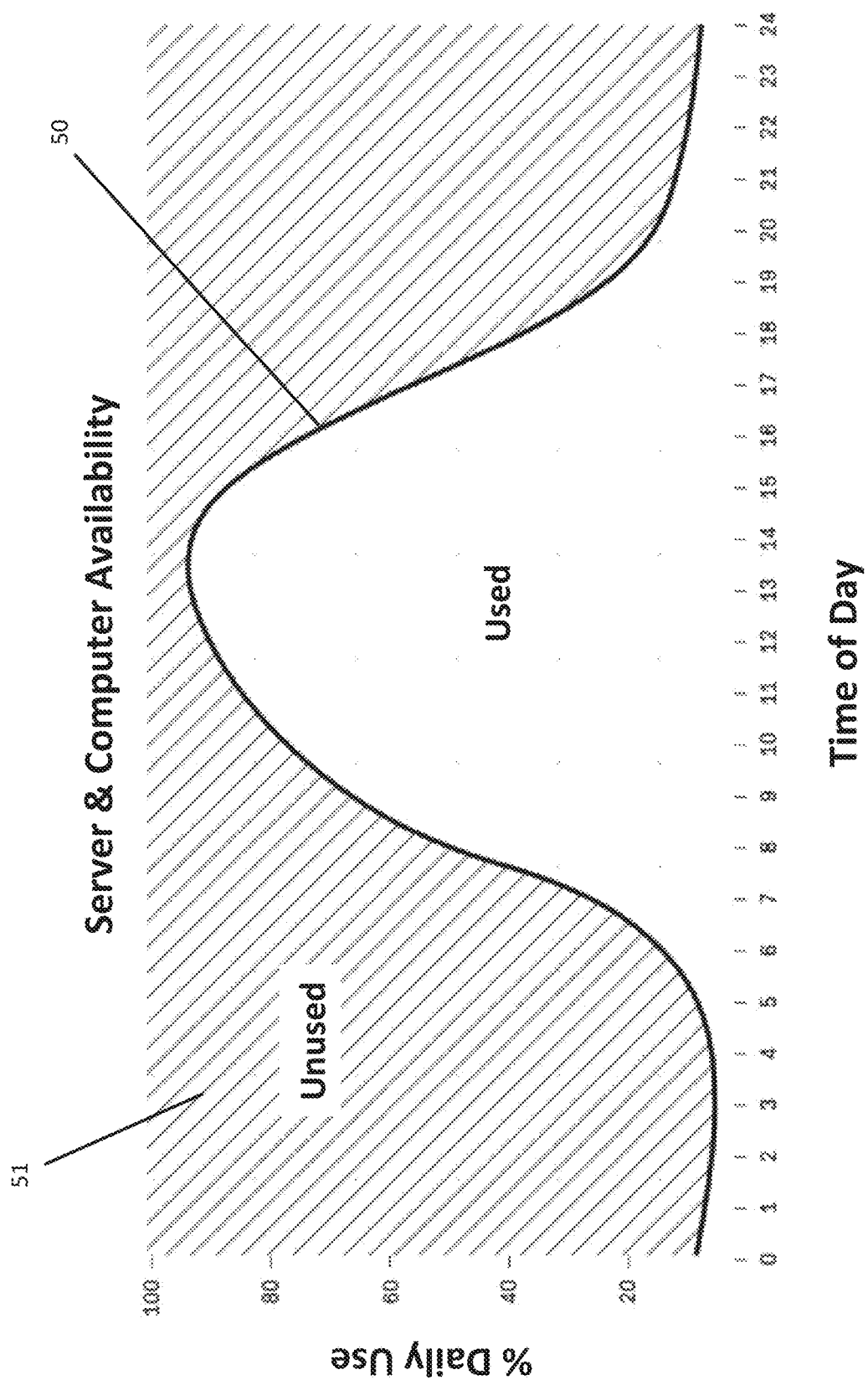
FIG. 7A illustrates daily server and computer capacity.
Figure 12D:
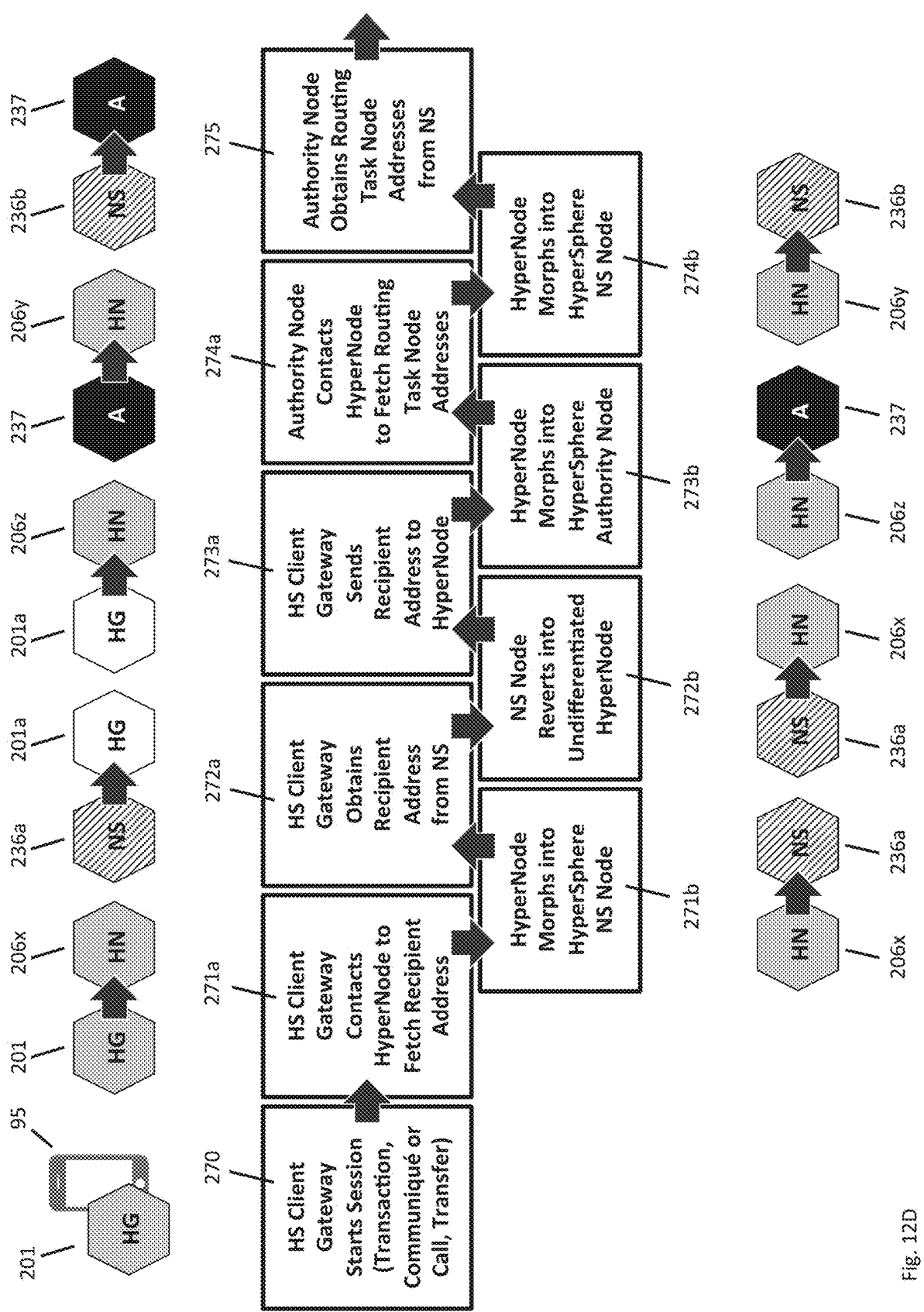
FIG. 12D is a flowchart of decentralized SDNP routing over a DyDAG meshed network (part 1).
Figure 12E:
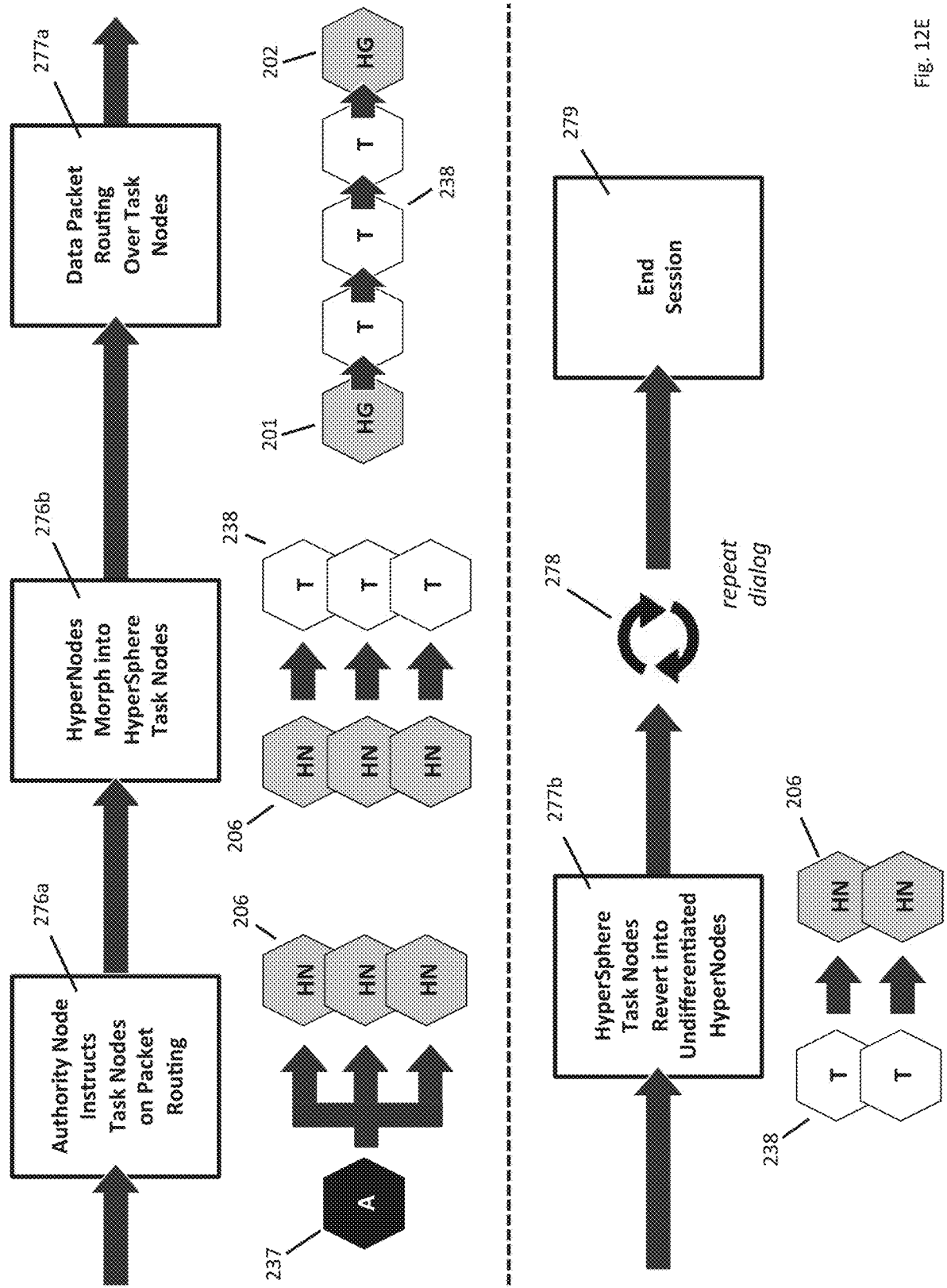
FIG. 12E is a flowchart of decentralized SDNP routing over a DyDAG meshed network (part 2).
Figure 13A:
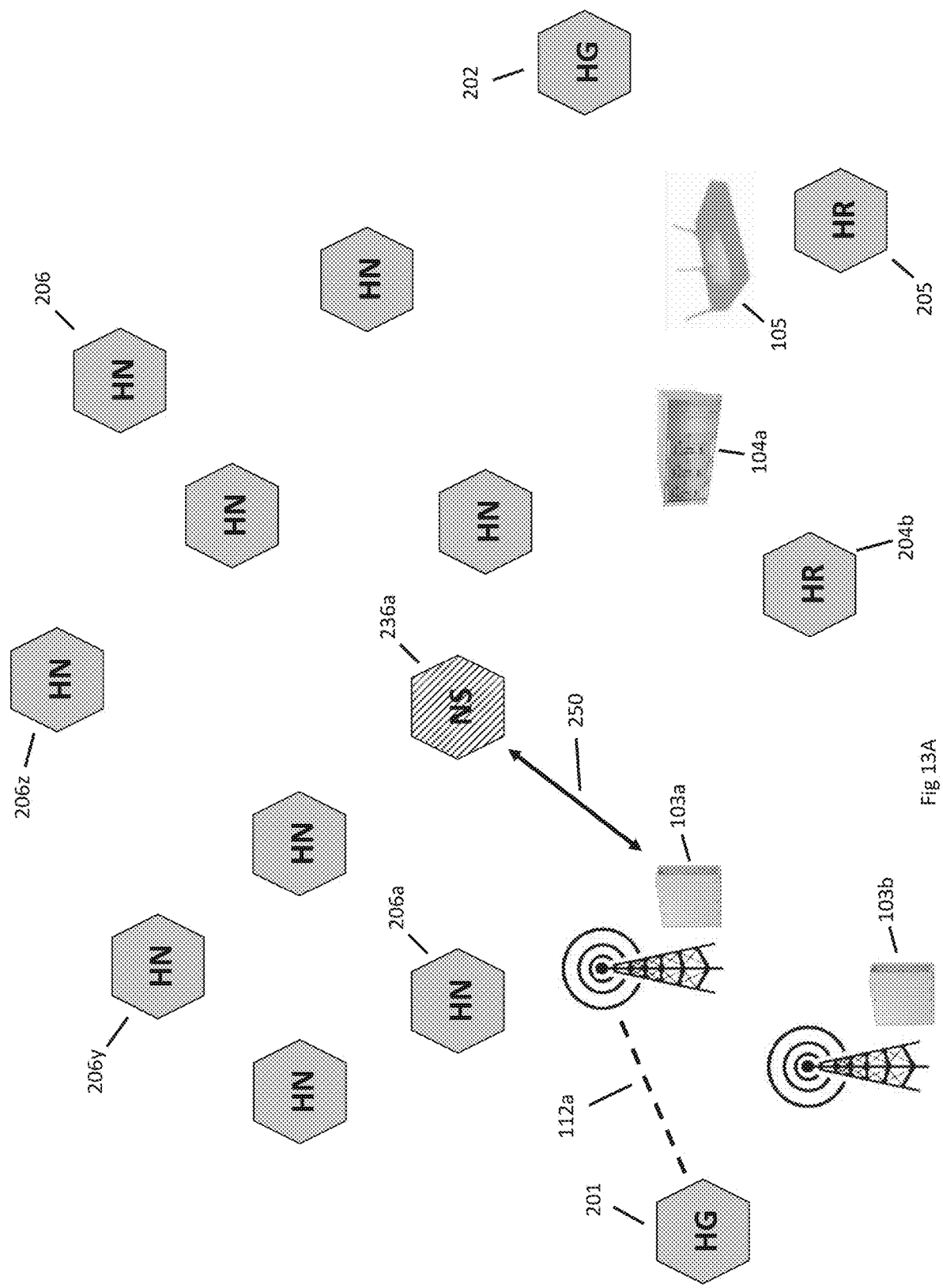
FIG. 13A illustrates the operation of a decentralized SDNP registration and name server query.

Data packet routing in a decentralized SDNP network employs the same anonymous fragmented data transport over a meshed network using dynamic security provisions as its predecessor comprising fixed infrastructure over dedicated SDNP nodes, except that in a decentralized meshed network, the nodes available to carry data constantly change in a fully autonomous manner with no network operator supervision. FIGS. 12D and 12E describe the operation of an exemplary decentralized SDNP network, also referred to as a 'd'SDNP network'. The corresponding packet routing across the decentralized meshed network is shown in FIGS. 13A through 13I1.

In step 270 of FIG. 12D, HyperSphere gateway |HG| 201*a* hosted on cell phone 95 opens a session with the d'SDNP network. In step 271*a* HyperSphere client gateway |HG| 201 contacts HyperNode |HN| 206*x* to fetch the call recipient's SDNP address. In step 271*b* HyperNode |HN| 206*x* morphs into HyperSphere name-server node |NS| 236*a*. As shown in FIG. 13A, HyperNode |HN| 206*x* then establishes a connection with HyperSphere client gateway |HG| 201*a* over radio link 112*a* to cell tower 103*a*, and over wireline connection 250 to HyperSphere name-server node |NS| 236*a*. In step 272*a*, HyperSphere name server node NS 236*a* passes the recipient's SDNP address to HyperSphere client gateway |HG| 201. In step 272*b*, HyperSphere name server node |NS| 236*a* reverts back into an undifferentiated HyperNode |HN| 206*x*.

In step 273*a* HyperSphere client gateway |HG| 201 passes the recipient SDNP address to undifferentiated HyperNode 206*z*, which in step 273*b* morphs into authority node |A| 237, a process shown in FIG. 13B, where the data is transported over radio link 112*a* to cell tower 103*a*, and over wireline connection 251 to authority node |A| 237.

Figure 13C:
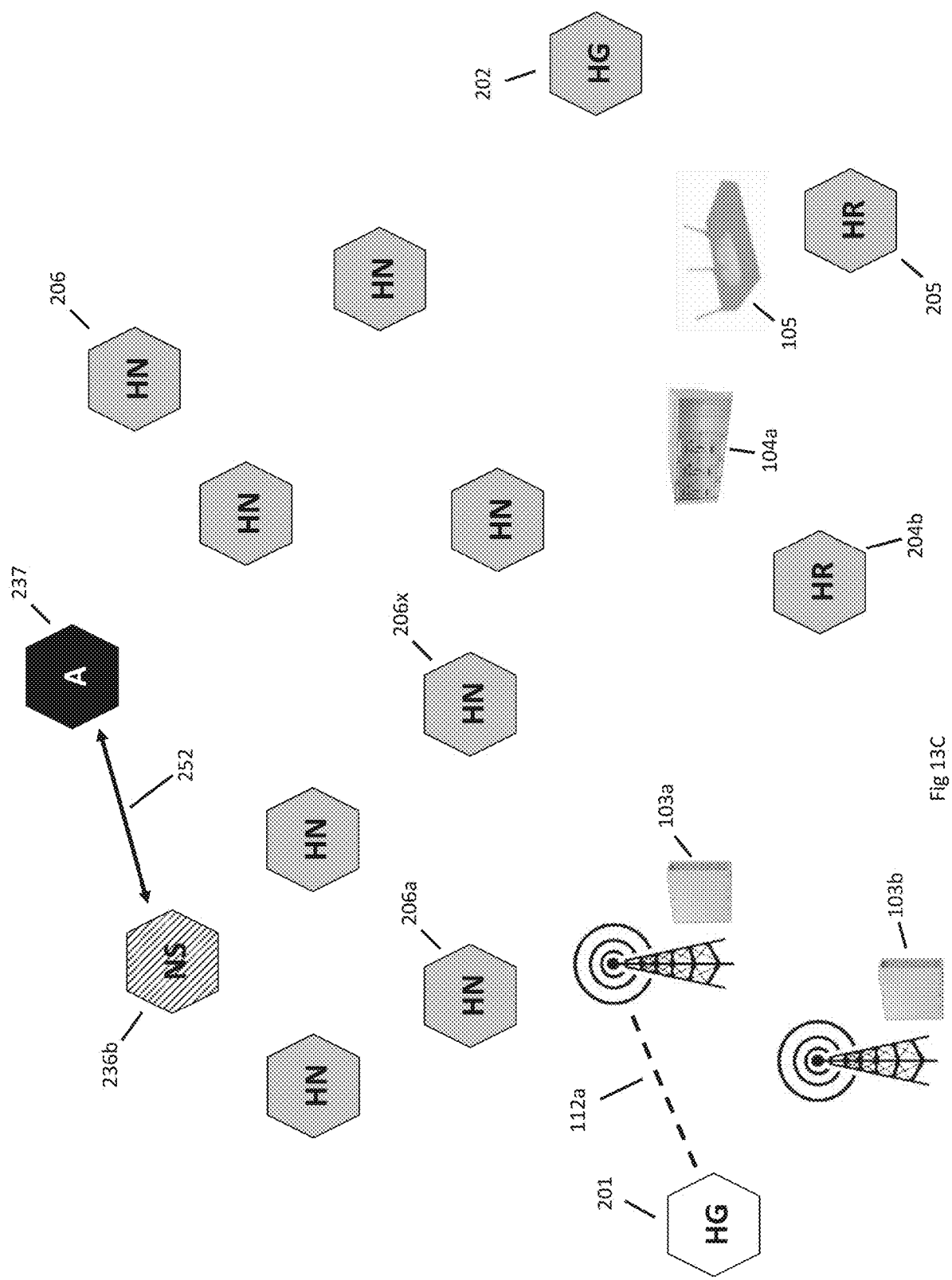
FIG. 13C illustrates the operation of a decentralized SDNP network node request.
Figure 13E:
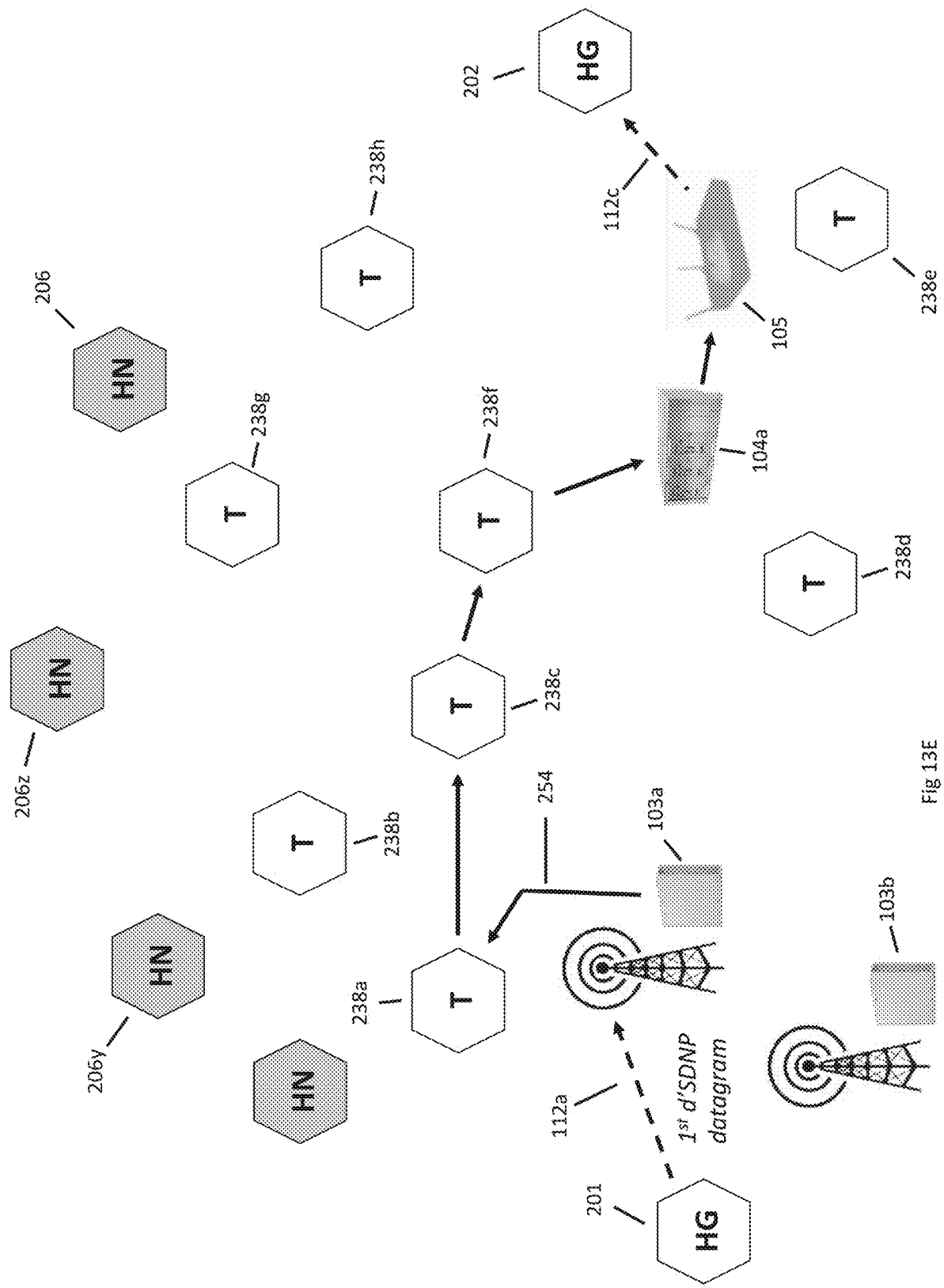
FIG. 13E illustrates the operation of first decentralized SDNP datagram packet transport.

In step 274*a*, authority node |A| 237 contacts undifferentiated HyperNode 206*y* to fetch the SDNP addresses of task node addresses, whereby in step 274*b* HyperNode 206*y* morphs into HyperSphere name server node |NS| 236*b*. In step 275 shown in FIG. 13C, HyperSphere name server node |NS| 236b delivers over wireline connection 252 the requested address table to HyperSphere authority node |A| 237.

In FIG. 13D corresponding to step 276a in FIG. 12E, HyperSphere authority node |A| 237 sends routing instruction to select undifferentiated HyperNodes 206 over wireline connections 253a to 253h, thereby in step 276b converting them into HyperSphere task nodes |T| 238a to 238h, respectively. Note that prior to differentiation, HyperSphere task nodes 238d and 238e comprised HyperSphere routers |HR| 204b and 205, not nodes hosted by ISP cloud 200.

In FIG. 12E, corresponding to step 277a, a first SDNP data packet is transported from HyperSphere client gateway |HG| 201 to cell tower 103a over radio link 112a, then over wireline 254 to task nodes |T| 238a, 238c, 238f, followed by Ethernet router 104a, WiFi router 105, and by WiFi microwave link 112c to HyperSphere gateway 202. In FIG. 13F, a second SDNP data packet is transported from HyperSphere client gateway |HG| 201 to cell tower 103a over radio link 112a, then over wireline 255 to task nodes |T| 238b, 238g, 238f, followed by Ethernet router 104a, WiFi router 105, and by WiFi microwave link 112c to HyperSphere gateway 202.

Figure 13G:
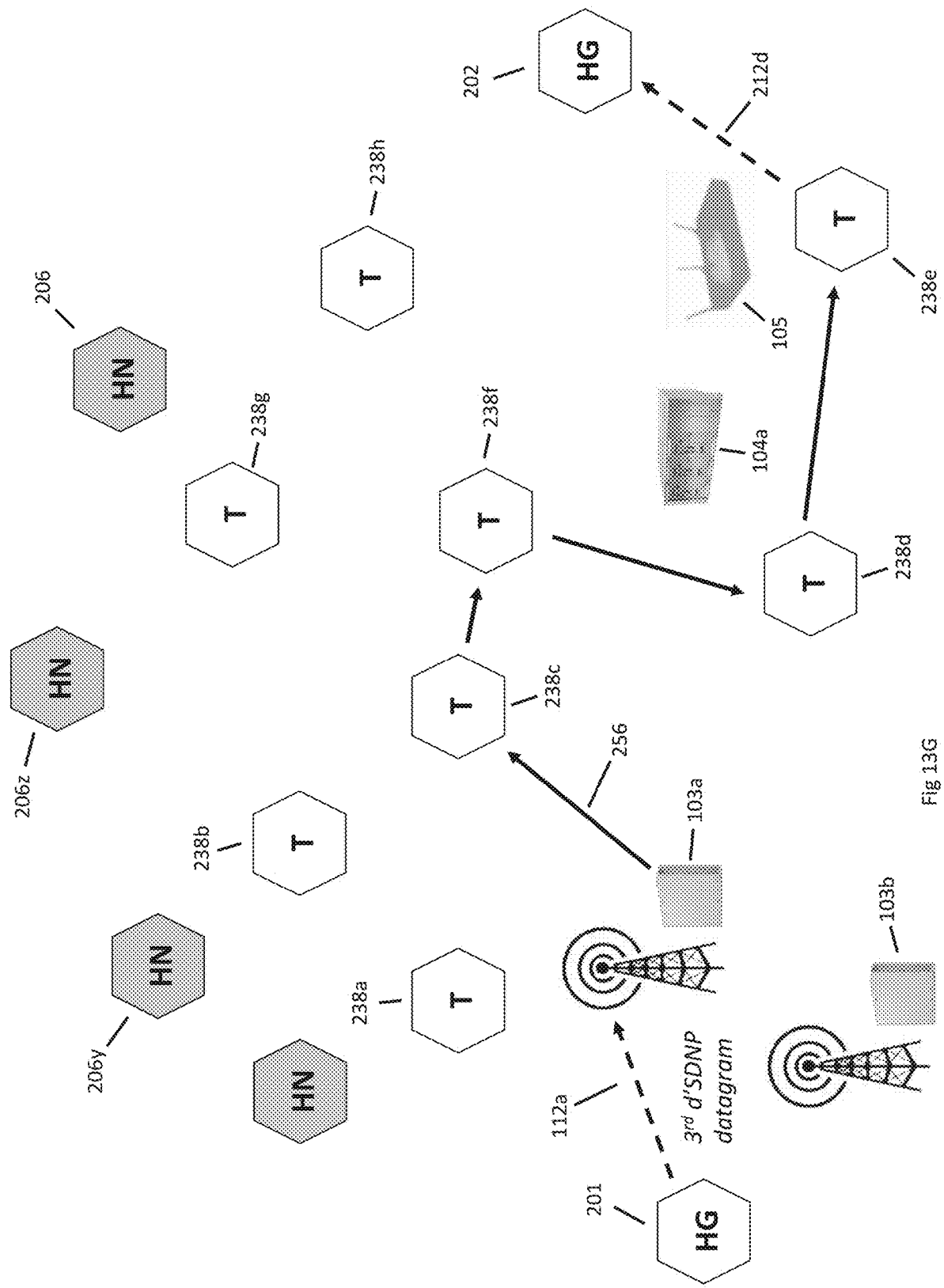
FIG. 13G illustrates the operation of third decentralized SDNP datagram packet transport operation.
Figure 13H:
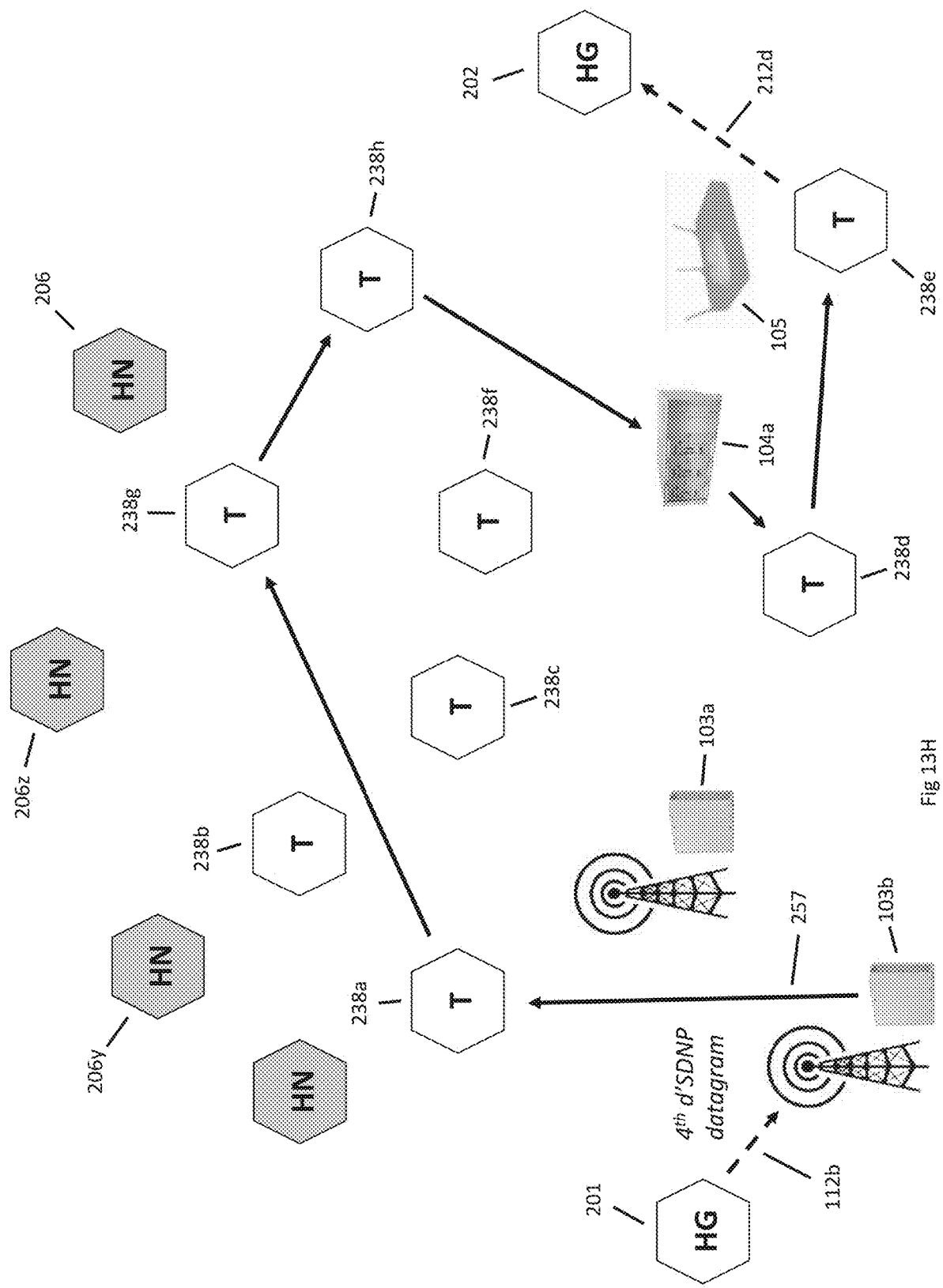
FIG. 13H illustrates the operation of fourth decentralized SDNP datagram packet transport operation.

In FIG. 13G, a third SDNP data packet is transported from HyperSphere client gateway |HG| 201 to cell tower 103a over radio link 112a, then over wireline 256 to task nodes |T| 238c, 238f, 238f, followed by HyperSphere Ethyrnet router task node 238d, then HyperSphere HyFi router 238e, and finally by hypersecure microwave link 212d to HyperSphere gateway 202. In FIG. 13H, a fourth SDNP data packet is transported from HyperSphere client gateway |HG| 201 to cell tower 103b over radio link 112b, then over wireline 257 to task nodes |T| 238a, 238g, 238h, followed by Ethernet router 104a, HyperSphere Ethyrnet router task node 238d, HyperSphere HyFi router 238e, and by hypersecure microwave link 212d to HyperSphere gateway 202.

Referring again to FIG. 12E, the sequence of transfers of fragmented data describes communication from gate HyperSphere HG 201 to 202 via collective task nodes 238. After delivery of fragmented data packets in step 277b, task nodes 238 revert to undifferentiated HyperNodes |HN|. The process 278 then repeats for a two-way dialog between gateway devices 201 and 202 until the session ends at step 279.

Metamorphic HyperNode Operation

In the HyperSphere, two means exist to implement metamorphic HyperNode operation. In one version three separate executable code files comprising |NS|, |A|, and |T| functionality are loaded onto the same server or host device. Each single function node uploads the MAC address of its host device. When a HyperNode is solicited to execute a task, it first checks with the other single-function HyperNodes having the same MAC address to see if they are running a job for the same client. If they are, the HyperNode will deny accepting the new job. For example, if task HyperNode |T| hosted on MAC address {00:A0:C9:14:C8:29} is carrying data packets for client gateway node 201, then a request for |A| node having the same MAC address to perform routing for the same client device, i.e. client gateway node 201, will be denied.

Figure 14:
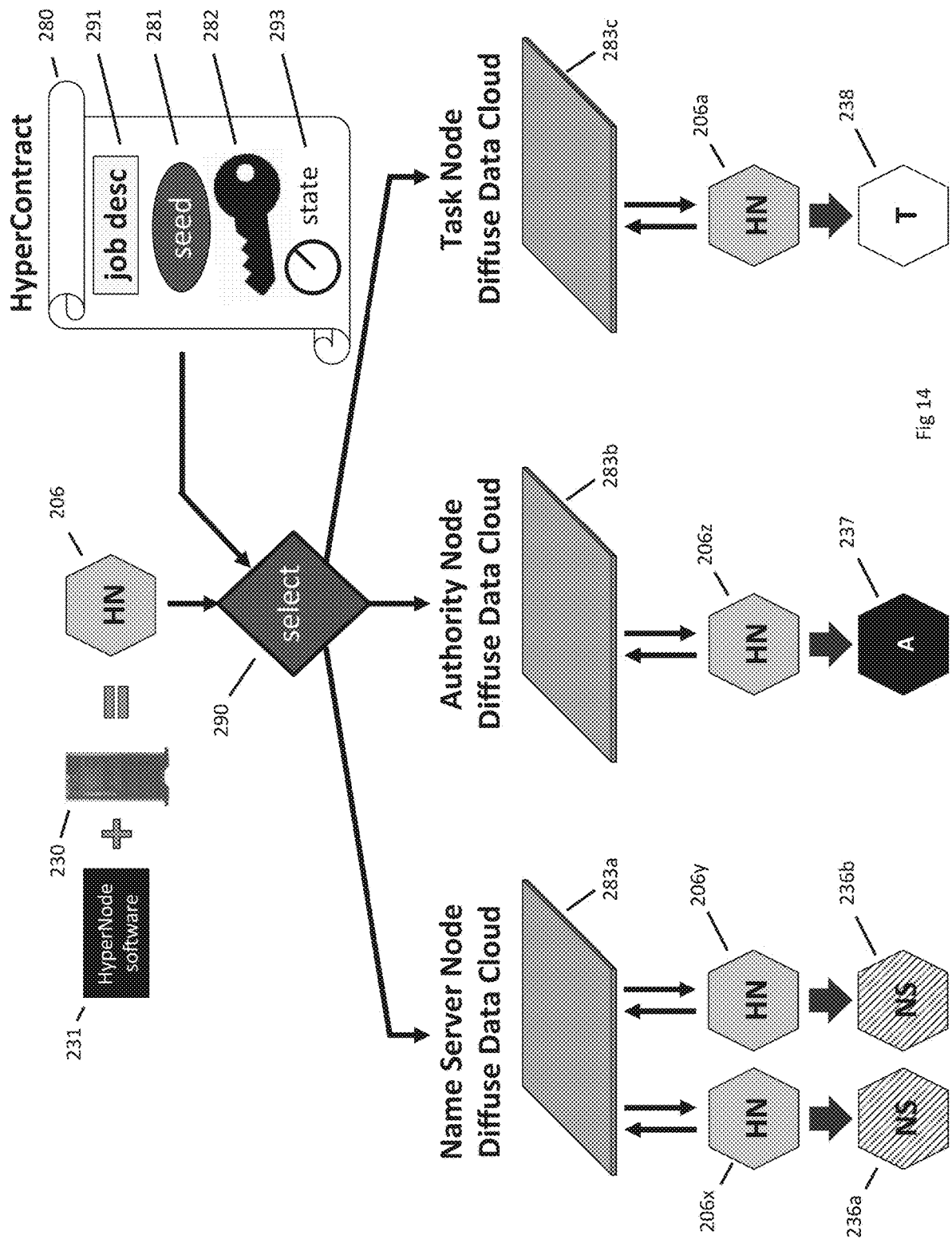
FIG. 14 illustrates the selection criteria for HyperNode access to a d'SDNP diffuse data cloud.

In a more efficient manner, the exclusivity function for a metamorphic HyperNode can be integrated into a single piece of executable code including the selector function. This inventive method is illustrated in FIG. 14, where HyperNode |HN| 206 realized by HyperNode software 231 installed on server 230 contains the executable code to operate as either a |T|, |A| or |NS| node, where selector 290 is employed to limit the HyperNode's operation to only one of the three functions at any given time, i.e. selector 290 facilitates the exclusivity function.

In one embodiment, HyperNode 206 receives a job order in the form of a digital file, referred to as a HyperContract 280, including job description 291, numeric seed 281, and cryptographic key 282. The job description provides the necessary information for selector 290 to determine whether the HyperNode 206 should be a task node, an authority node, or a name server node. In the prior routing example, when metamorphic HyperNode 206x receives instruction to perform name server functions at the request of HyperSphere client gateway |HG| 201, undifferentiated |HN| 206x downloads data from diffuse data cloud 283a and morphs into |NS| node 236a.

Similarly, when metamorphic HyperNode 206z receives instruction to perform authority node functions at the request of HyperSphere client gateway |HG| 201, undifferentiated |HN| 206z downloads data from diffuse data cloud 283b and morphs into |A| node 237. The data downloaded from diffuse data cloud 283a to create |A| node 237 is not the same as the downloaded data used to produce |NS| node 236a. Accordingly, the name server and authority nodes are differentiated, accessing different information from a diffuse cloud on a need-to-know basis.

Later, when metamorphic HyperNode 206y receives instruction to perform name server functions at the request of authority node |A| 237, |HN| 206y downloads data from diffuse data cloud 283a and morphs into |NS| node 236b. The data downloaded from diffuse data cloud 283a to create |NS| node 236b is not the same as the data used to produce |HN| 206x. Thus the two name server instances are differentiated, accessing only the information it requires on a need-to-know basis.

Finally, when metamorphic HyperNode 206a receives instruction to perform task node routing instructions at the request of authority |A| 207, undifferentiated |HN| 206a downloads data from diffuse data cloud 283c and morphs into |T| node 238. The data downloaded from diffuse data cloud 283c to create |T| node 238 is not the same as the downloaded data used to produce |A| node 237 or |NS| nodes 236a or 236b. Thus the task nodes, authority nodes, and names server nodes are all differentiated and mutually exclusive, accessing different information from a diffuse cloud purely on a need-to-know basis.

A key innovation in the HyperSphere is its ability to share information globally without dedicated storage devices using a disaggregated "diffuse" data cloud. Disaggregated data storage is data fragmented in small units (like jigsaw puzzle pieces) and stored in local storage devices diffused across the HyperSphere's decentralized cloud. Operation of the HyperSphere's disaggregated data storage, including writing, reading, searching and refreshing, is described later in this application. Suffice it to say, data stored in the disaggregated diffuse data cloud of the HyperSphere is data that can only be accessed by authorized HyperNodes on a need-to-know basis.

FIG. 15A exemplifies the role of diffuse cloud storage in metamorphic HyperNode operation. In the leftmost column, HyperSphere client gateway |HG| 201 requests name server information from metamorphic HyperNode |HN| 206x. A numeric seed 281 from HyperContract 280 authorizing access is passed to |HN| 206x. In one embodiment the numeric seed defines the creation state of the stored data, i.e. the state variable at the time the data was stored. The access request may also include state 284 used to verify the request is timely, e.g., to confirm the authorization period has not expired. The state may comprise time, location, security zone, or other dynamically changing parameters.

In the next step, shown in the center column, undifferentiated |HN| 206x establishes a secure channel with the name server node diffuse data cloud 283a, using encryption key 282 or using a digital CA certificate (described later) to authenticate the request. In the rightmost column of FIG. 15A, the requested data is located, aggregated into a compact file, and passed from diffuse data cloud 283a to |HN| 206x which immediately morphs into a differentiated name server HyperNode |NS| 236a. Name server HyperNode |NS| 236a then passes the requested NS data 285, in this case caller ID information, to the requesting HyperSphere client gateway |HG| 201.

Figure 15B:
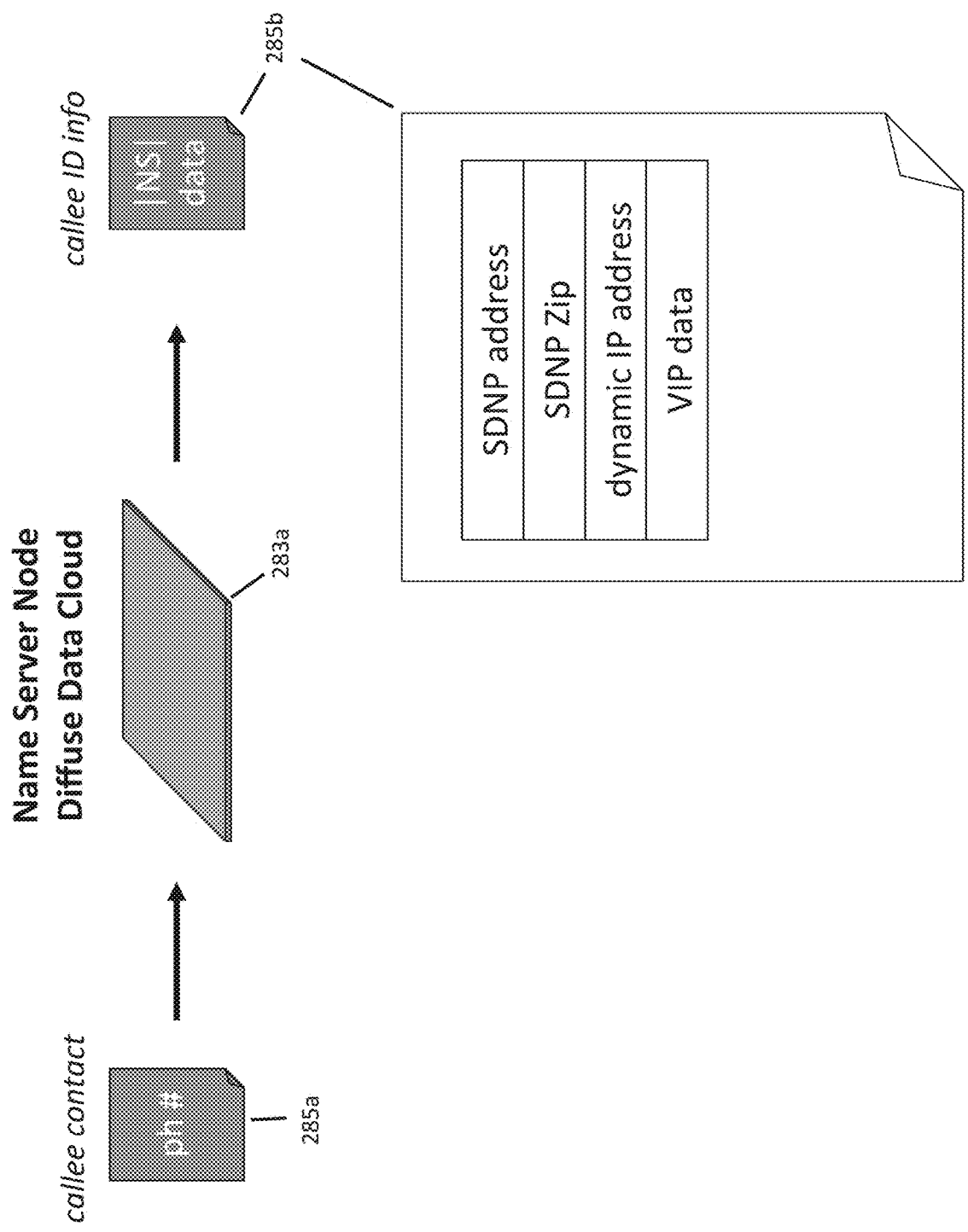
FIG. 15B illustrates the download of caller ID information from a name server's diffuse cloud data into a differentiated |NS| node.

As shown in FIG. 15B, diffuse data recall involves contact information of the edge device, e.g., the phone number 285a the caller wishes to call (callee), which is used to extract data from the name server diffuse data cloud layer 283a to extract callee ID info contained in name server |NS| file 285b including the device's SDNP address, SDNP Zip, and the dynamic IP address of the callee at that moment. The file may also include custom or application specific information labeled as "VIP data" used to determine routing priority, cost, routing redundancy, etc.

In the leftmost column of FIG. 16A, HyperSphere client gateway |HG| 201 requests informs metamorphic HyperNode |HN| 206z of its intent to place a call to called ID specified in |NS| data 285b. A numeric seed 281 from HyperContract 280 authorizing access is passed to |HN| 206z. In one embodiment the numeric seed defines the creation state of the stored data, i.e. the state variable at the time the data was stored. The access request may also include state 284 used to verify the request is timely, e.g. to confirm the authorization period has not expired. The state may comprise time, location, security zone, or other dynamically changing parameters.

In the next step, shown in the center column, undifferentiated |HN| 206z establishes a secure channel with the authority node diffuse data cloud 283b using encryption key 282 or using a digital CA certificate (described later) to authenticate the request. In the rightmost column of FIG. 16A, the requested data is located, aggregated into a compact |A| data file 286a containing network hop times, and passed from diffuse data cloud 283b to |HN| 206z which immediately morphs into a differentiated HyperNode comprising authority node |A| 237.

Figure 16B:
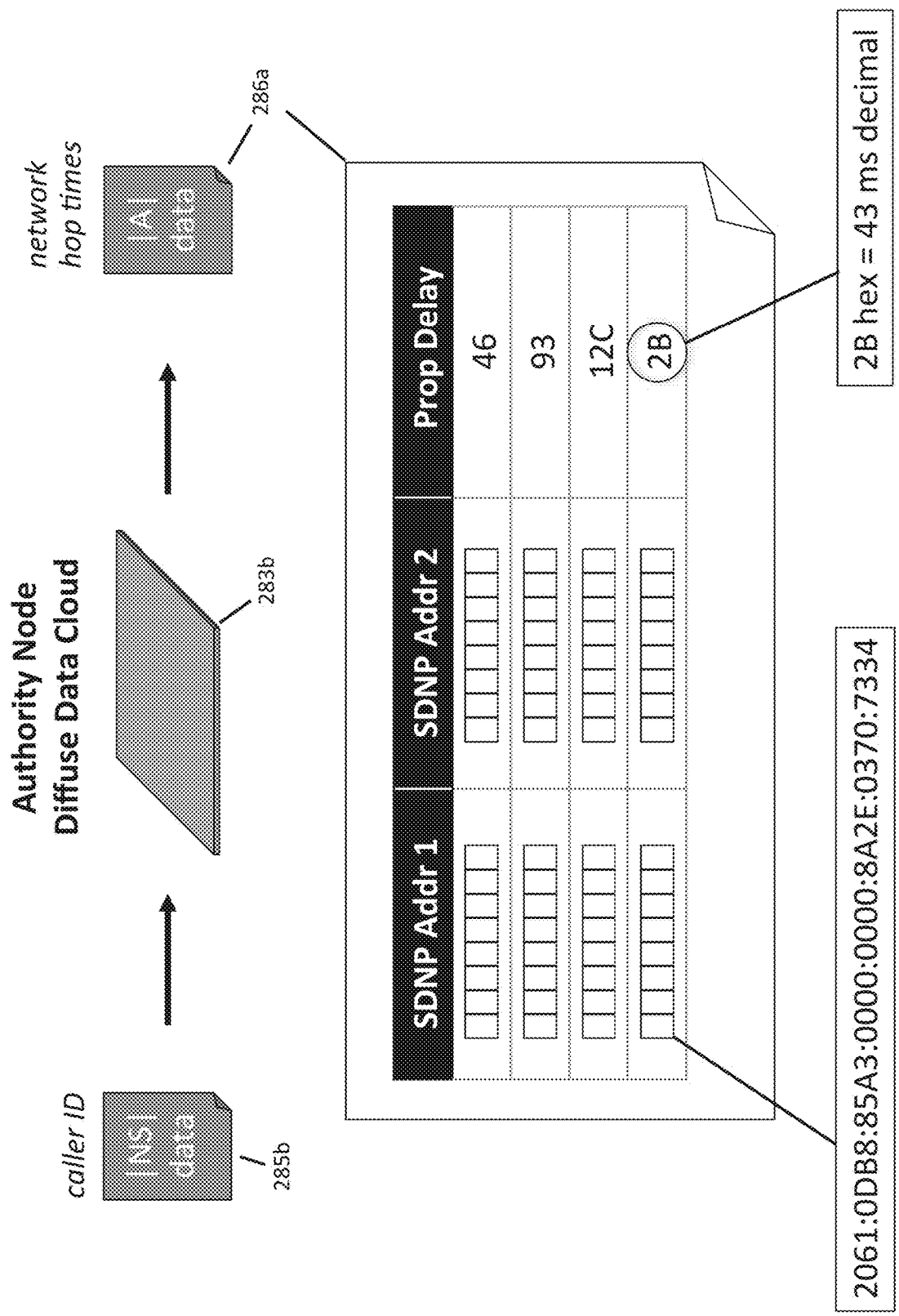
FIG. 16B illustrates the download of network hop times from an authority node's diffuse cloud data into a differentiated |A| node.

As shown in FIG. 16B, diffuse data recall involves caller ID information |NS| data 285b used to access data from the authority node diffuse data cloud layer 283b to extract network hop time info contained in name server |A| file 286a. The file contains a list of potentially relevant node-to-node propagation delays between two SDNP addresses and the last recorded transport time for the particular hop, specifically hops in the general path between the caller and the callee. The table contains an unranked list of the propagation delay between any two SDNP addresses where the propagation delay in milliseconds (ms) is represented in hexadecimal format. For example, the delay 2B hex is equivalent to 43 ms. Note the SDNP address may be represented as IPv6 as shown or alternatively using IPv4 format.

Figure 16C:
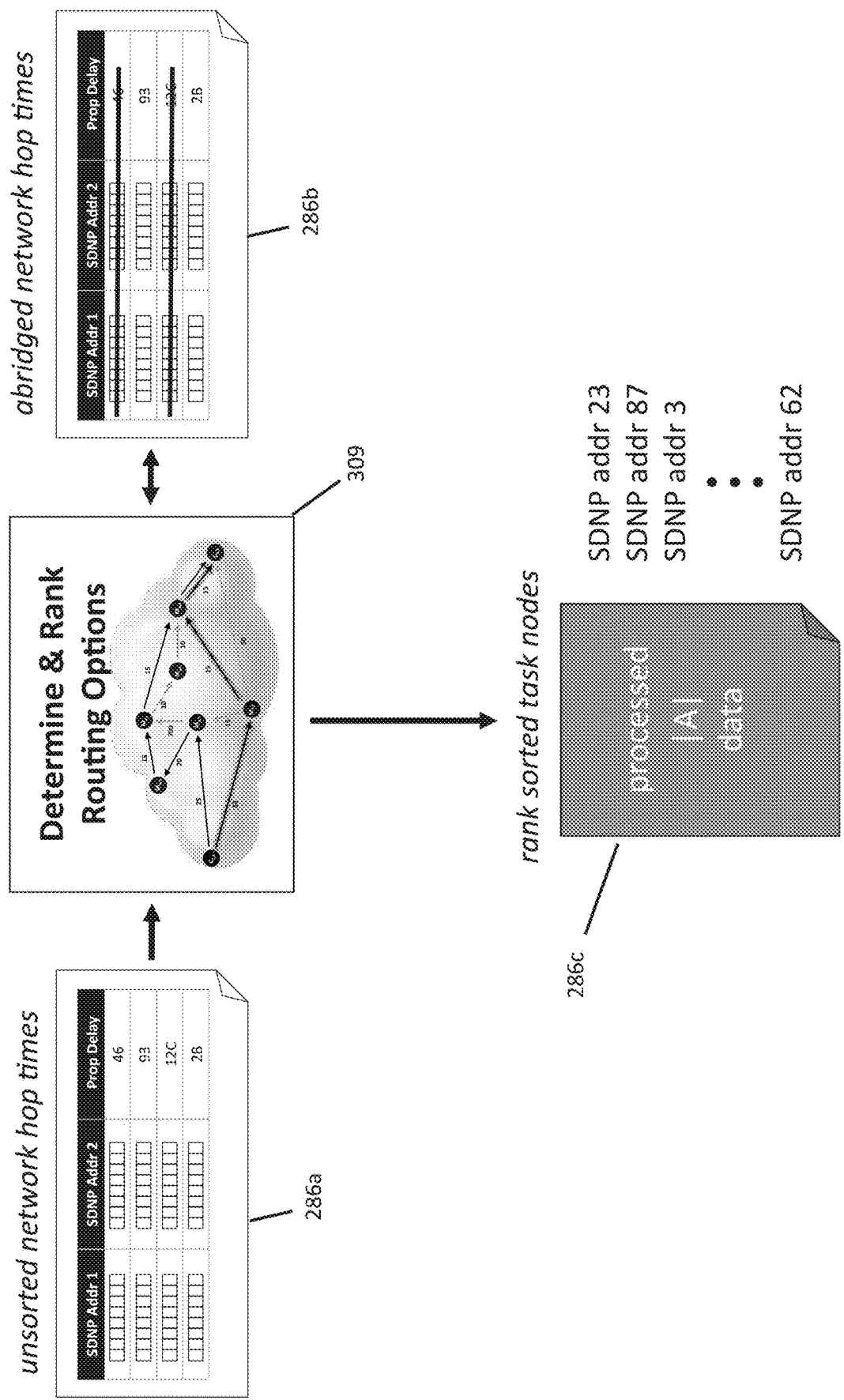
FIG. 16C illustrates a d'SDNP authority node's processing of available task node, rank sorted by network hop times.

In FIG. 16C, an algorithm used to rank and choose routing option 309 is employed to revise the edit 286a into abridged table 286b. The selection and ranking process employs an algorithm described previously in the above-referenced U.S. Pat. No. 9,998,434, entitled "Secure Dynamic Communication Network and Protocol." The algorithm will not be repeated here. The output of the routing selection process results in a list 286c of SDNP addresses of task nodes potentially useful for packet routing.

Figure 17A:
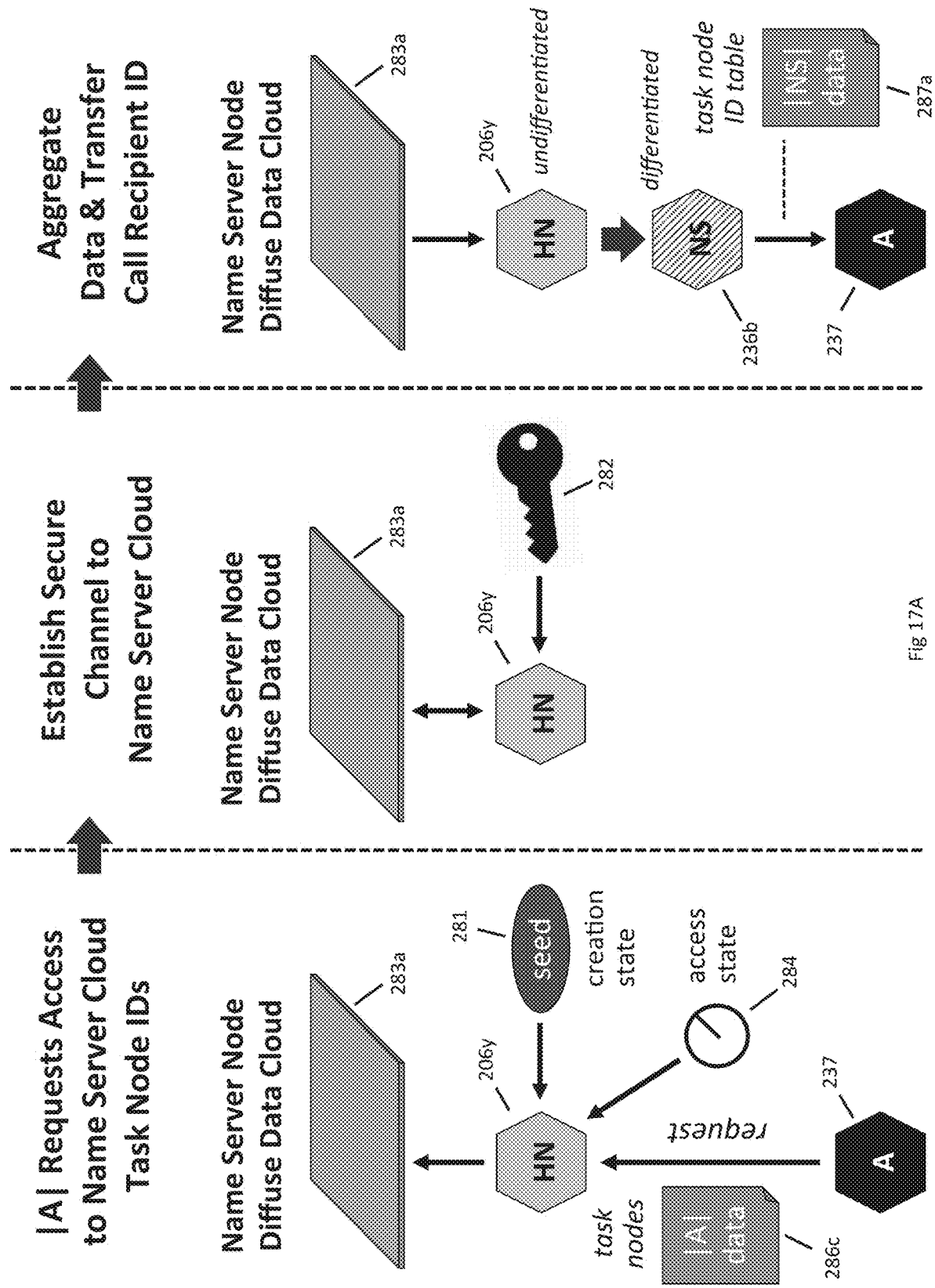
FIG. 17A illustrates the transformation of a metamorphic HyperNode into a |A| node for route dispatching.

Shown in the leftmost column of FIG. 17A, table 286c is forwarded from |A| node 237 to metamorphic HyperNode 206y, which in conjunction with numeric seed 281 and state 284 contacting (for a second time in this session) name server node diffuse data cloud 283a, which as shown in the center column establishes a secure link with HyperNode 206y using cryptographic key 282. In response, as illustrated in the rightmost column, name server node diffuse data cloud 283a downloads data to HyperNode |HN| 206y, which instantly morphs into name server node |NS| 236b passing |NS| data file 287a containing task node ID table to authority node |A| 237.

Figure 17B:
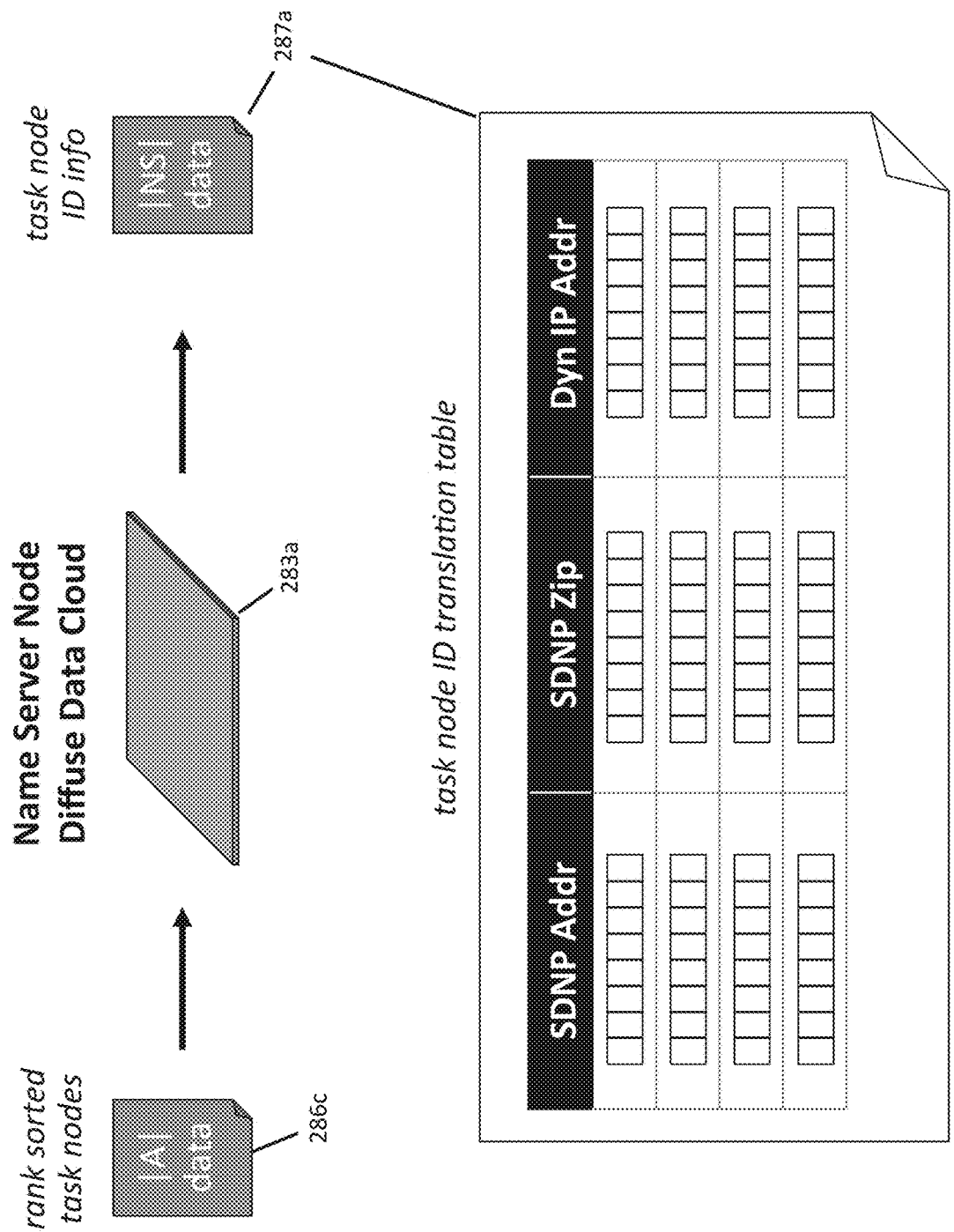
FIG. 17B illustrates the download of a task node translation table listing current dynamic IP addresses corresponding to selected SDNP addresses.

As shown in FIG. 17B, diffuse data recall involves rank sorted task node data 286c, used to access data from the name server diffuse data cloud layer 283a to extract task node ID info contained in name server |NS| file 287a. The file contains a list which includes a translation table for each requested SDNP address and its corresponding SDNP Zip code and its dynamic IP address at that moment.

Figure 18A:
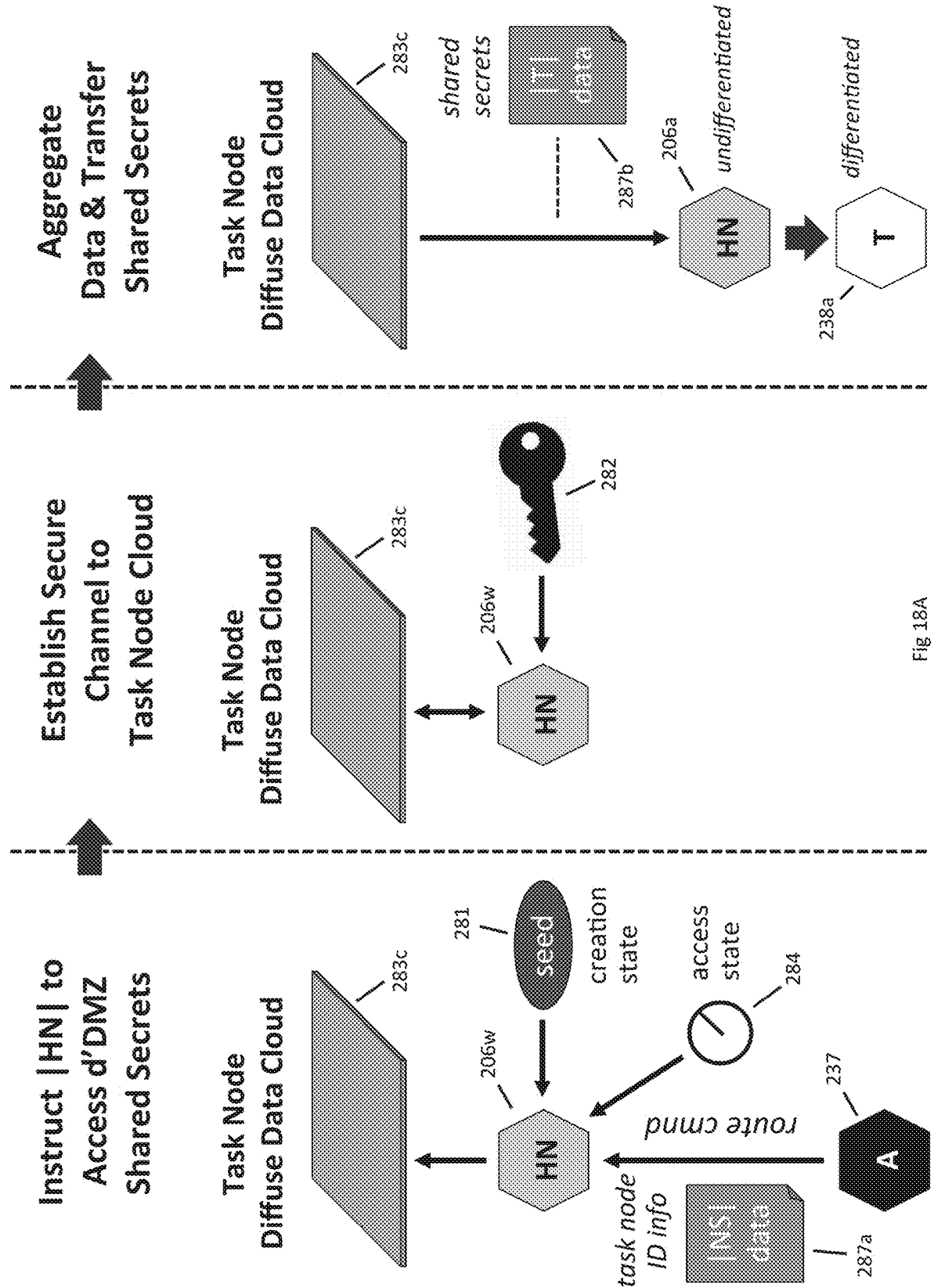
FIG. 18A illustrates the transformation of a metamorphic HyperNode into a |T| node for routing in response to |A| node's command and control (C&C) routing command.

Shown in the leftmost column of FIG. 18A, table 287a is then forwarded from |A| node 237 to metamorphic HyperNode 206w, which in conjunction with numeric seed 281 and state 284 contacts task node diffuse data cloud 283c, which as shown in the center column establishes a secure link with HyperNode 206w using cryptographic key 282. In response, as illustrated in the rightmost column, name server node diffuse data cloud 283c downloads shared secrets in |T| data file 287b to HyperNode |HN| 206w, which instantly morphs into task node 238a ready to carry data.

Figure 18B:
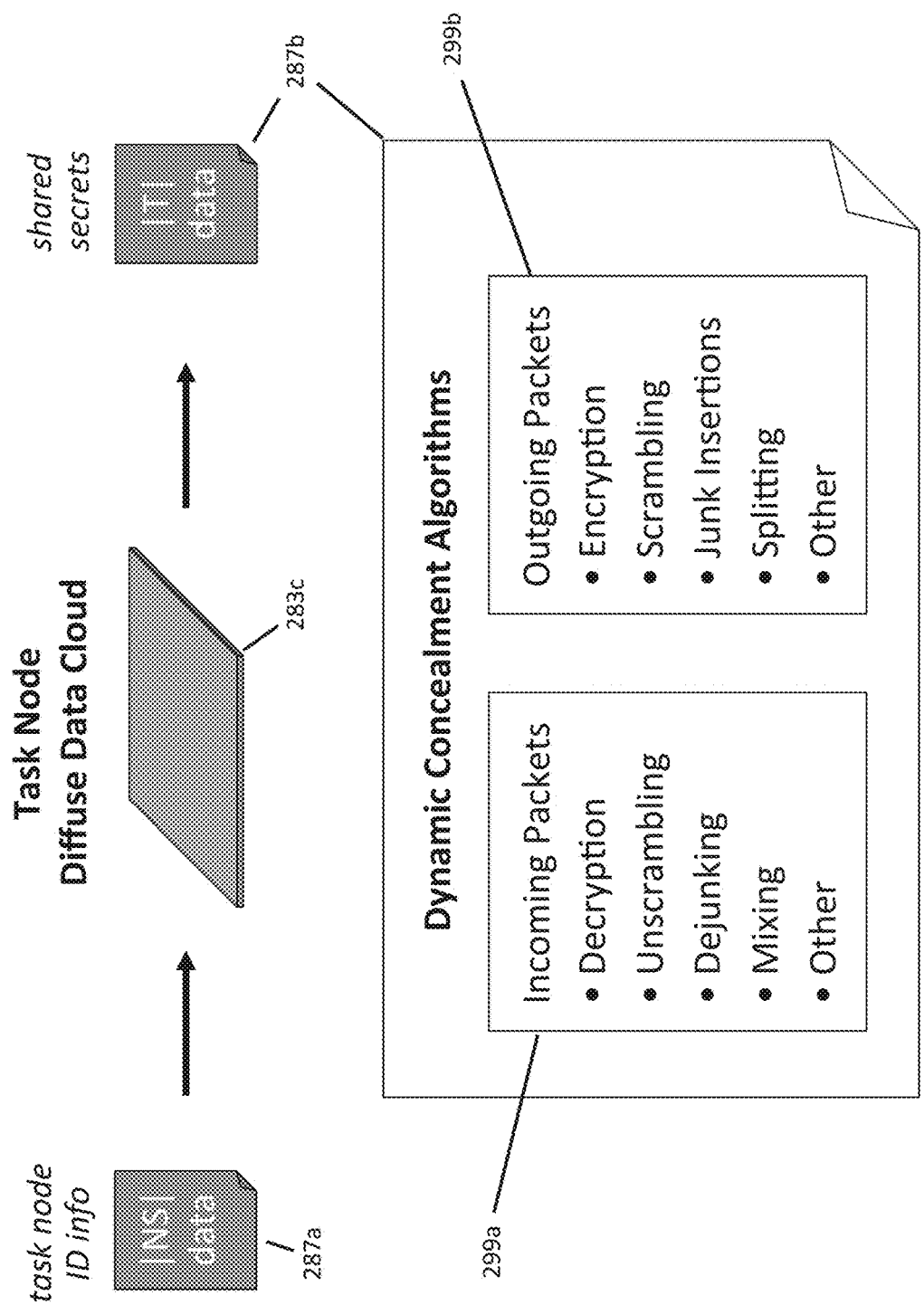
FIG. 18B illustrates the download of d'SDNP task node shared secrets comprising dynamic concealment algorithms (including a single-hop encryption cipher).
Figure 18C:
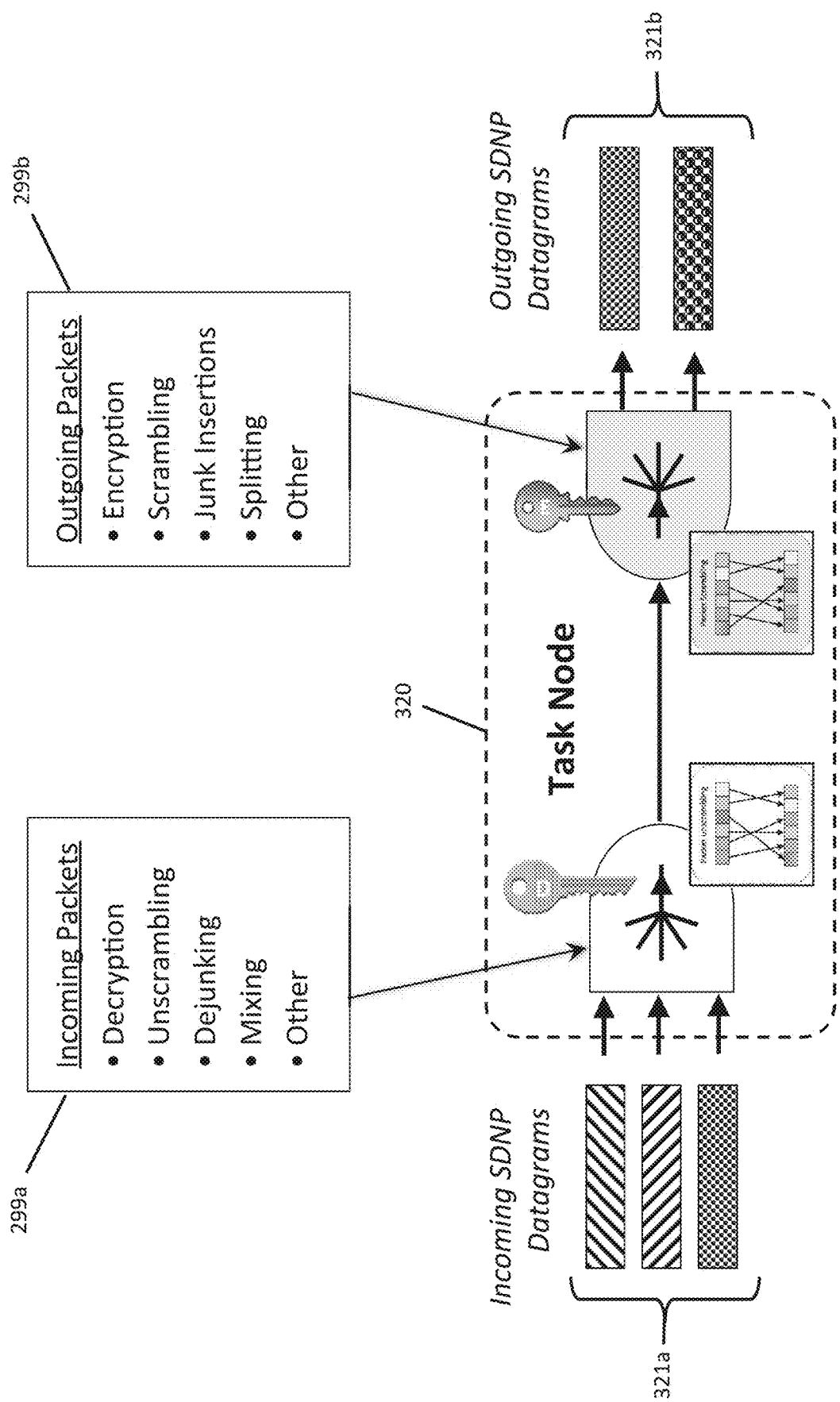
FIG. 18C illustrates a d'SDNP task node processing datagrams using dynamic concealment methods for incoming and outgoing packets.

As shown in FIG. 18B, diffuse data recall involves task node IP data 287a used to access data from the task node diffuse data cloud layer 283c to extract shared secrets contained in task node |T| file 287b. The file contains a list of decentralized DMZ algorithms, i.e. d'DMZ dynamic concealment algorithms, including those algorithms 299a required for processing incoming data packets 321a and those algorithms 299b employed to process outgoing data packets 321b as represented schematically as task node 320 in FIG. 18C. Functional operation of a task node performing "media node" operations is described previously in the above referenced U.S. Pat. No. 9,998,434.

Diffuse Data Cloud

As illustrated in FIG. 19, a diffuse data cloud 283 stored as disaggregated data is subdivided into three types of data or sub-clouds, namely name server cloud 283a, authority node cloud 283b, and task node cloud 283c. Upon differentiating into a specific node type, metamorphic HyperNode 206 is confined to interact only with its corresponding diffuse data cloud layer on a need-to-know basis. For example, differentiated into a name server node, |NS| HyperNode 236 can only access data from diffuse cloud 283 related to name server cloud 283a but not from authority node cloud 283b or task node cloud 283c. Aside from client HyperSphere gateway |HG| gateway requests, name server |NS| node can only communicate with authority node 237 but not with task node 238.

When differentiated into an authority node, |A| HyperNode 237 can only access data from diffuse cloud 283 related to authority node cloud 283b but not from name server cloud 283a or task node cloud 283c. Aside from client HyperSphere gateway |HG| gateway requests, authority |A| node 237 is able to request information from name server HyperNode 236 and communicate instructions in command and control (C&C) packages to task HyperNodes 238.

When differentiated into task node, |T| HyperNode 238 can only access data from diffuse cloud 283 related to task node cloud 283c but not from name server cloud 283a or authority node cloud 283b. Aside from client HyperSphere gateway |HG| gateway requests, task |T| node 238 is able to receive command and control (C&C) instructions from authority node HyperNodes 237 but is unable to communicate directly with name server |NS| HyperNode 236.

Figure 20:
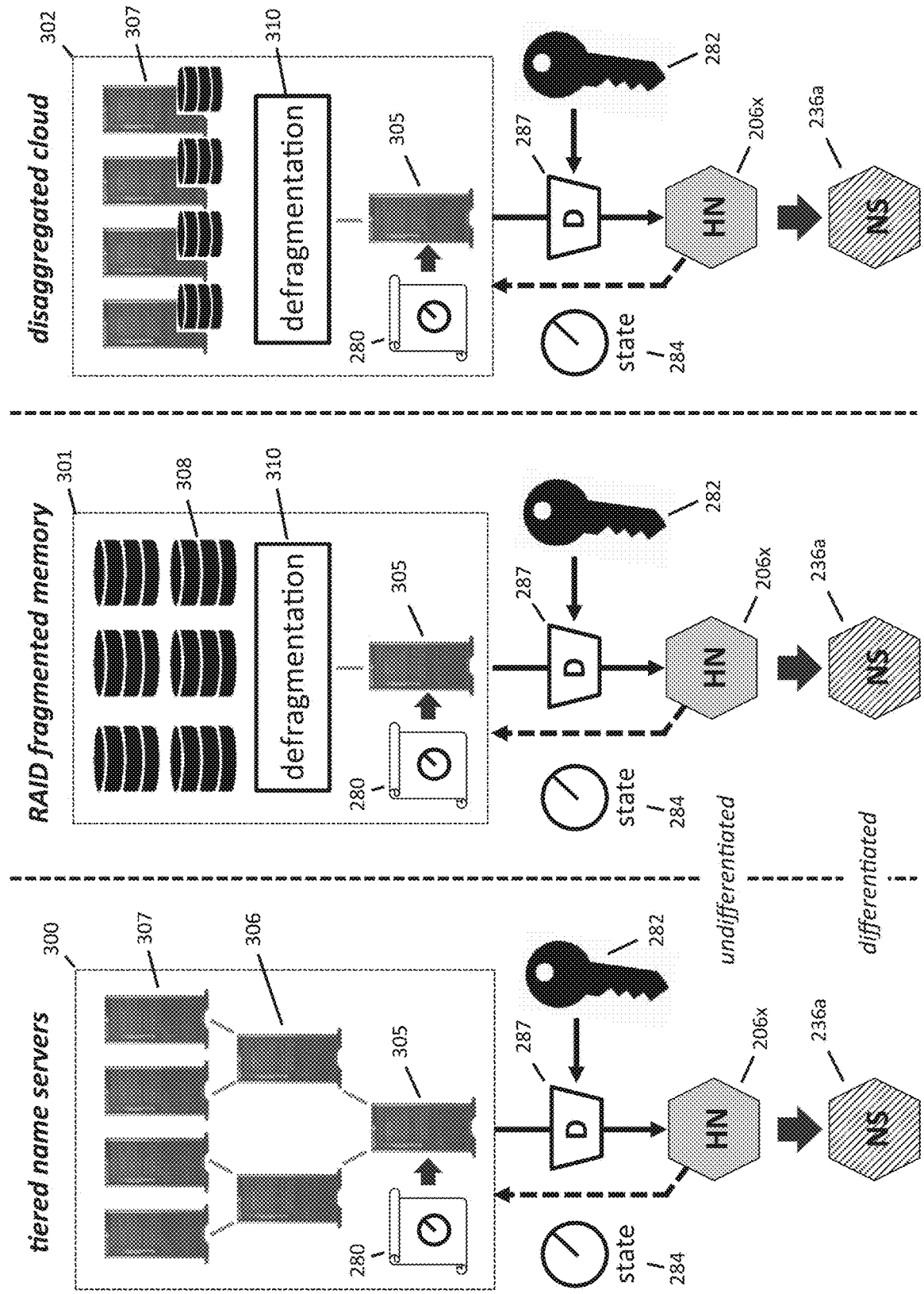
FIG. 20 is a schematic representation of various methods for realizing and accessing the HyperSphere's diffuse-data cloud.

Several possible methods to search and recall the diffuse cloud data are illustrated in FIG. 20 including tiered name servers 300 shown in the leftmost column, RAID redundant memory 301 shown in the center column and disaggregated storage 302 shown in the rightmost column. In tiered name servers, data fragments stored in servers 307 are first sorted and aggregated into larger files in servers 306, and finally merged into one file in server 306. The files comprise contain unencrypted portions used for searching and sorting, and concealed or encrypted payloads containing user ID information. In response to a request from metamorphic HyperNode |HN| 206x, name server 305 passes an encrypted or concealed file to decryption process 287 that in combination with decryption key 282 unlocks the data loading it into |HN| 206x and triggering the node to morph into a differentiated HyperNode, in this case into name server |NS| 236a.

In RAID redundant memory 301, data fragments stored in data drives 308, are defragmented 310 and loaded into server 305 which in turn passes the concealed data to decryption process 287 that in combination with decryption key 282 unlocks the data, loading it into |HN| 206x and triggering the node to morph into a differentiated HyperNode, in this case into name server |NS| 236a.

Alternatively in disaggregated cloud 302, data fragments stored in cloud servers 307 are defragmented 310 and loaded into server 305 which in turn passes the concealed data to decryption process 287 that in combination with decryption key 282 unlocks the data, loading it into |HN| 206x and triggering the node to morph into a differentiated HyperNode, in this case into name server |NS| 236a.

Figure 21:
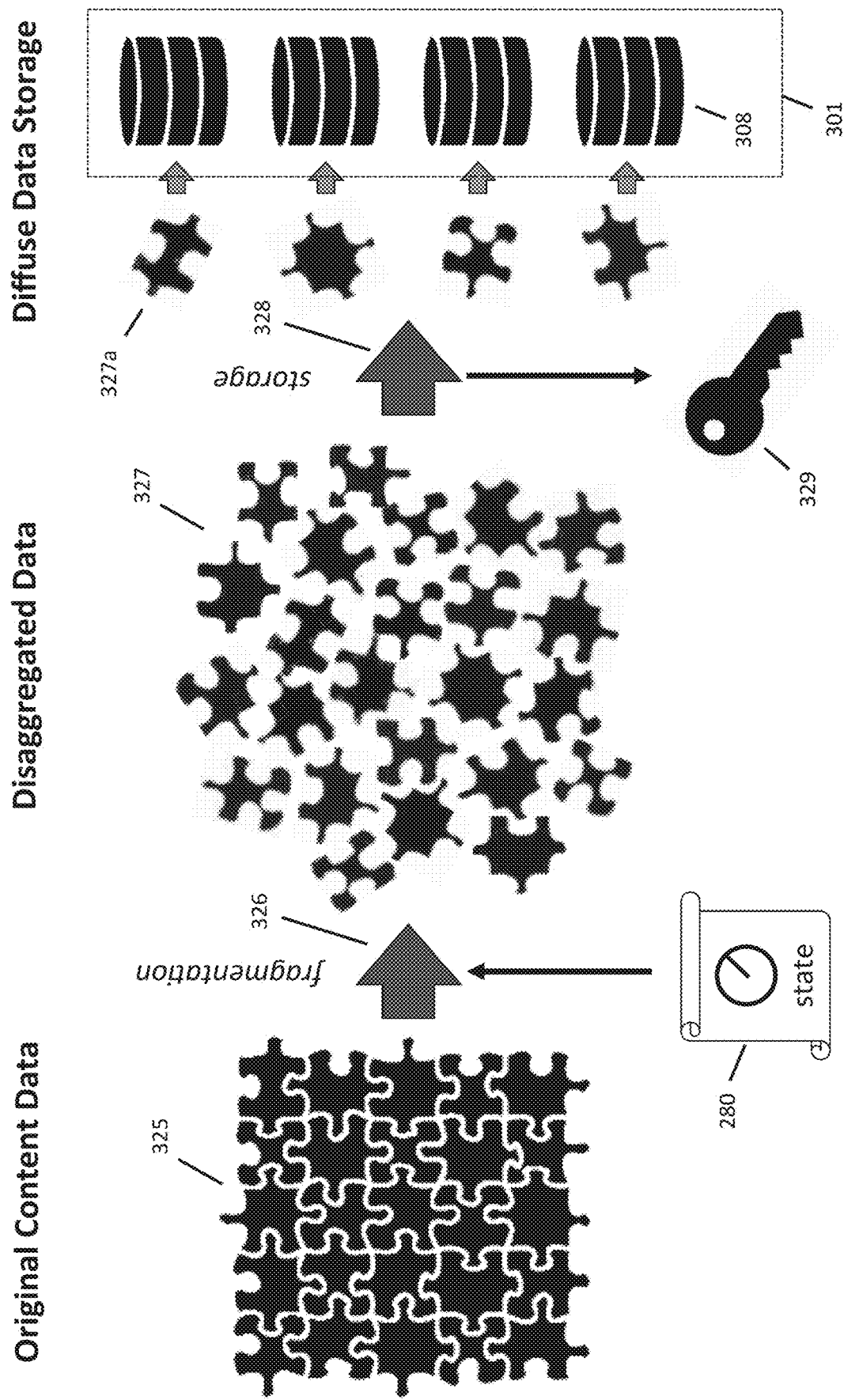
FIG. 21 is a schematic representation of realizing diffuse cloud storage using disaggregated data.

As shown in FIG. 21, diffuse data storage of fragmented payload packets is graphically represented using the aforementioned puzzle piece metaphor. In fragmented storage, original media content comprising unprocessed data (such as sound, video, pictures, files, programs, etc.) contains elements having definitive interconnections and interrelationships. Original file content 325, if disturbed even slightly, destroys the functionality and may render the file unrecoverable. In the file storage process, original file content 325 is algorithmically fragmented in step 326 into pieces in accordance with state-based digital instructions or HyperContract 260. The disaggregated date elements 327 are then divided into separated components 327a (or sub-files) and stored in separate file storage media 308, collectively representing diffuse data storage 301. In the storage process, a cryptographic key 329 is generated and sent to the data owner or HyperContract author in order to be able to recall the data.

Figure 22:
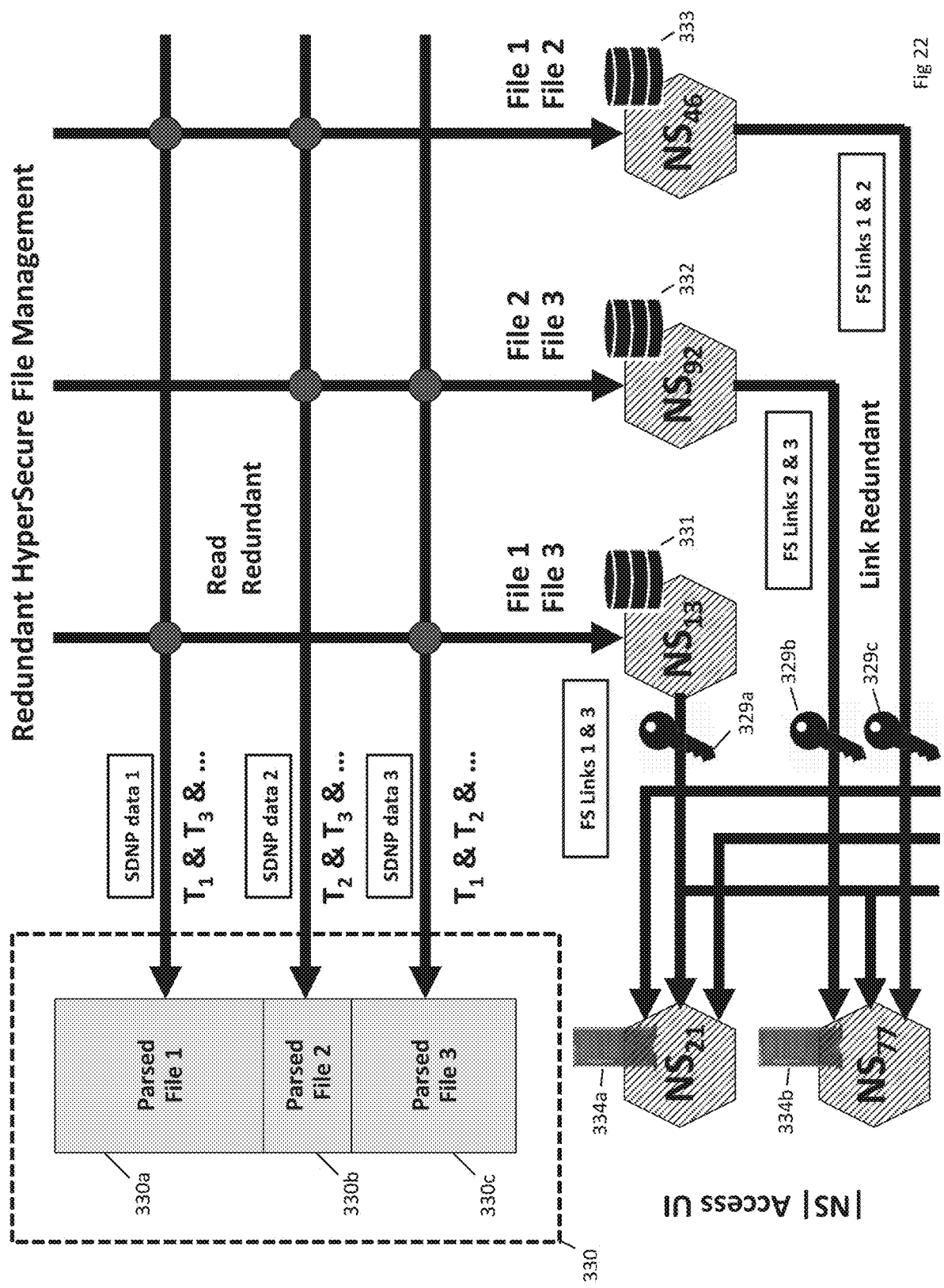
FIG. 22 is a schematic representation of the redundant file management of a d'SDNP name server's diffuse-data cloud storage and access keys.

FIG. 22 illustrates the redundant file storage of name server data. For example a parsed file of updated name server data 330a, 330b, 330c is written into a number of storage servers 331, 332, and 333 respectively comprising name server nodes |NS$_{13}$|, |NS$_{92}$|, and |NS$_{46}$|, collectively performing diffuse name server cloud storage 302. As shown, file parsed file 1 comprising data 330a is redundantly stored on both |NS$_{13}$| and |NS$_{46}$| and others (not shown); file parsed file 2 comprising data 330b is redundantly stored on both |NS$_{92}$| and |NS$_{46}$| and others; and file parsed file 3 comprising data 330c is redundantly stored on both |NS$_{13}$| and |NS$_{92}$| and others.

The storage of file 1 and file 3 in |NS$_{13}$, file 2 and file 3 in |NS$_{92}$|, and file 1 and file 2 in |NS$_{46}$| automatically generates file storage access link keys 319a, 319b, and 319c respectively, all of which are stored redundantly on name server nodes |NS$_{21}$| and |NS$_{77}$| hosted on servers 334a and 334b, respectively, and others (not shown). If any |NS| storage node goes offline, the data is cloned onto another name server node. In one embodiment, each |NS| node issues and maintains a dynamic HyperContract listing backup servers, currently online. If a server goes offline, the HyperContract automatically clones the data to another server, which in turn issues a new backup HyperContract, perpetually ad infinitum.

Figure 23:
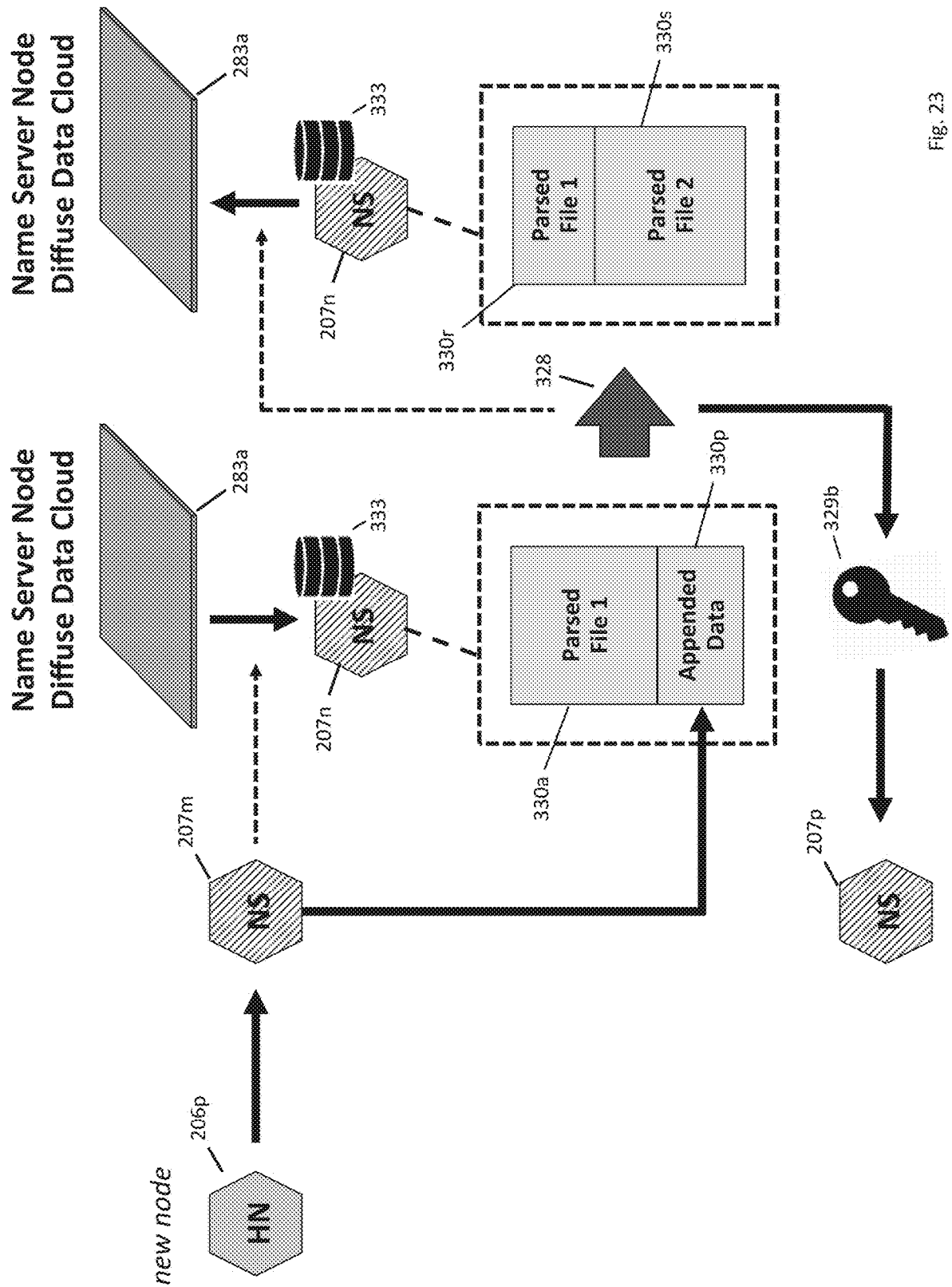
FIG. 23 is a flow chart for updating name server's diffuse-data cloud for HyperNode dynamics.

The process of updating the name server database stored by the name server diffuse cloud occurs every time a data storage resource comes online or disappears. As shown in FIG. 23, the registration process occurs every time there is a change in resources. For example, when a new HyperNode |HN| 206p joins the HyperSphere network, the info informs a name server node |NS| 207m to register the node. The initiation of the node registration can be done directly or in an alternative embodiment using an authority node as part of the 'hello' process. After receiving the dynamic IP address of the new node and assigning a new SDNP address and SDNP Zip code, the name server diffuse data cloud downloads a relevant portion of the database into |NS| 207n hosted on storage server 333 where parsed file 330a whereby new content 330p is appended onto the file. The file is then processed in step 328 for storage by |NS| 207n by reparsing the file into multiple pieces such as file 330r and 330s, then uploaded to name server node diffuse data cloud 383a. At the same time, a revised link key 329b is forwarded to name server |NS| 207p and used for name server operational requests.

Meanwhile, HyperNode 206p commences a regular network broadcast, i.e. a ping, to ensure connectivity with |NS| 207m or any other node in the network. If the ping is missed several times, the registration process is repeated, removing node |HN| 206p from the name server list of active nodes.

Decentralized Meshed Network Security Provisions

The security of data communication in the decentralized SDNP network involves numerous innovative methods. These methods, while similar to those disclosed in the above-referenced U.S. Pat. No. 9,998,434, are adapted for decentralized operation with no dedicated function network nodes, central authority or network operator, namely:

- Division of labor means no one HyperNode has access to all information needed to extract a meaningful payload, whereby |NS| nodes know information regarding HyperNode identity but have zero knowledge about any payload or the routing of any d'SDNP data packets; |A| nodes control packet routing but have zero knowledge as to the identity of any HyperNode users or the content of any payload; and |T| nodes carry content but have no knowledge as to the identity of any HyperNode users or the ultimate routing of any packet. HyperNodes only know the next hop destination, but have zero knowledge as the to the identity of any edge devices or callers.
- DMZ (air gapped) shared secrets means |T| nodes carrying data packets have zero knowledge as to how the concealment algorithms are chosen to encrypt or obfuscate payload content. Concealment algorithms and ciphers are zero day components installed in diffuse d'DMZ clouds preinstalled and existing prior to any communication session.

Metamorphic HyperNodes eliminate the use of dedicated function nodes, thereby preventing the opportunity to develop function specific attacks, because the role of a specific HyperNode constantly changes among |A|, |T| and |NS| functions.

A dynamic HyperSphere name server |NS|, a database not affiliated with the Internet's DNS name server, contains the HyperSphere's current list of every SDNP node registered on the network. The node list is stored in a |NS| diffuse cloud and is not available to task nodes transporting the data packets (thereby maintaining a separation of roles to prevent phishing).

Fragmented data transport involves parsing a file into small snippets (sub-packets), and transmitting the snippets in data packets over a meshed network whereby a hacker intercepting a single packet cannot extract useful content from the packet's payload.

Meshed routing dynamically changes data paths based on timely knowledge of network propagation delays—information stored and updated in a diffuse |A| data cloud not accessible except by the authority node responsible for a session's routing.

Dispatcher-based packet routing where an |A| node route data packets by informing each task node the information to execute only a single hop to the next destination in the network.

Anonymous data packets where each SDNP datagram shows only the IP source address of a single hop (i.e. the node sending the packet) and the IP address of the packet's next destination without ever revealing the original source or the final destination of the data packet, the name comprising the dynamic IP address of the SDNP node retrieved from the |NS| diffuse cloud. Data packet anonymity renders the collection of metadata meaningless in profiling a cyber target or discerning patterned behavior to develop attack stratagems.

Dynamic security credentials and algorithms change the concealment methods (including scrambling, encryption, junking, splitting and their anti-functions) using state-based shared secrets securely stored in a |T| diffuse cloud accessible to participating task nodes on a need-to-know basis.

Stateless node operation where each differentiated HyperNode reverts to its undifferentiated metamorphic state after completing its designated job, upon which it forgets all information regarding its last action (or the data related to performing such actions).

Figure 24:
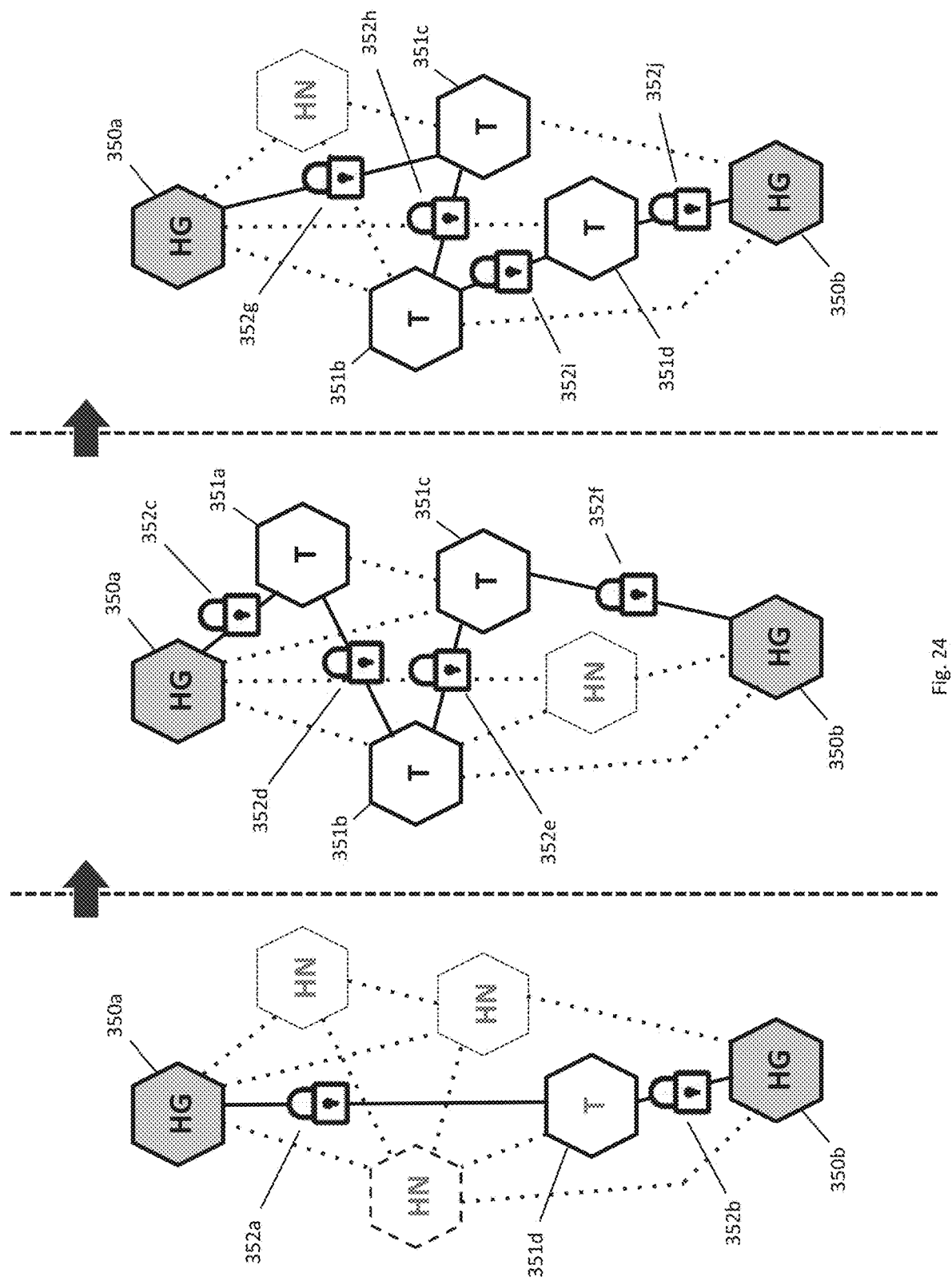
FIG. 24 is a flow chart of dynamic meshed data routing in a HyperSphere's decentralized cloud of task nodes.

Combining metamorphic HyperNodes with meshed dynamic routing executing authority node-issued command and control packets, packet routing within the HyperSphere occurs unpredictably without any central authority or network operator. Decentralized SDNP communication using autonomous meshed routing as disclosed herein enhances network security because no operator is involved in directing data traffic or managing the network. An example of decentralized SDNP routing of three successive packets sent from client |HG| 350a to |HG| 350b is illustrated in FIG. 24. In the left column, data traverses through secure connection 352a to task node |T| 351d, then over secure connection 352b to client |HG| 350b. The authority node decides packet routing based on propagation delay data downloaded from the authority node diffuse cloud, A second feature of decentralized SDNP communications is the use of dynamic security and concealment techniques. For example, the security credentials and concealment algorithms of secure connections 352d and 352e differ, including employing unique single-hop numeric seeds, cryptographic keys, and dynamic state conditions. As a result, should the virtually impossible task of breaking encryption and defeating dynamic security in 100 ms—the time it takes data to traverse secure connection 352d—be achieved, the entire process would have to be reprised again 100 ms later, this time as data is transported over secure connection 352e using entirely different security methods and keys.

Figure 25:
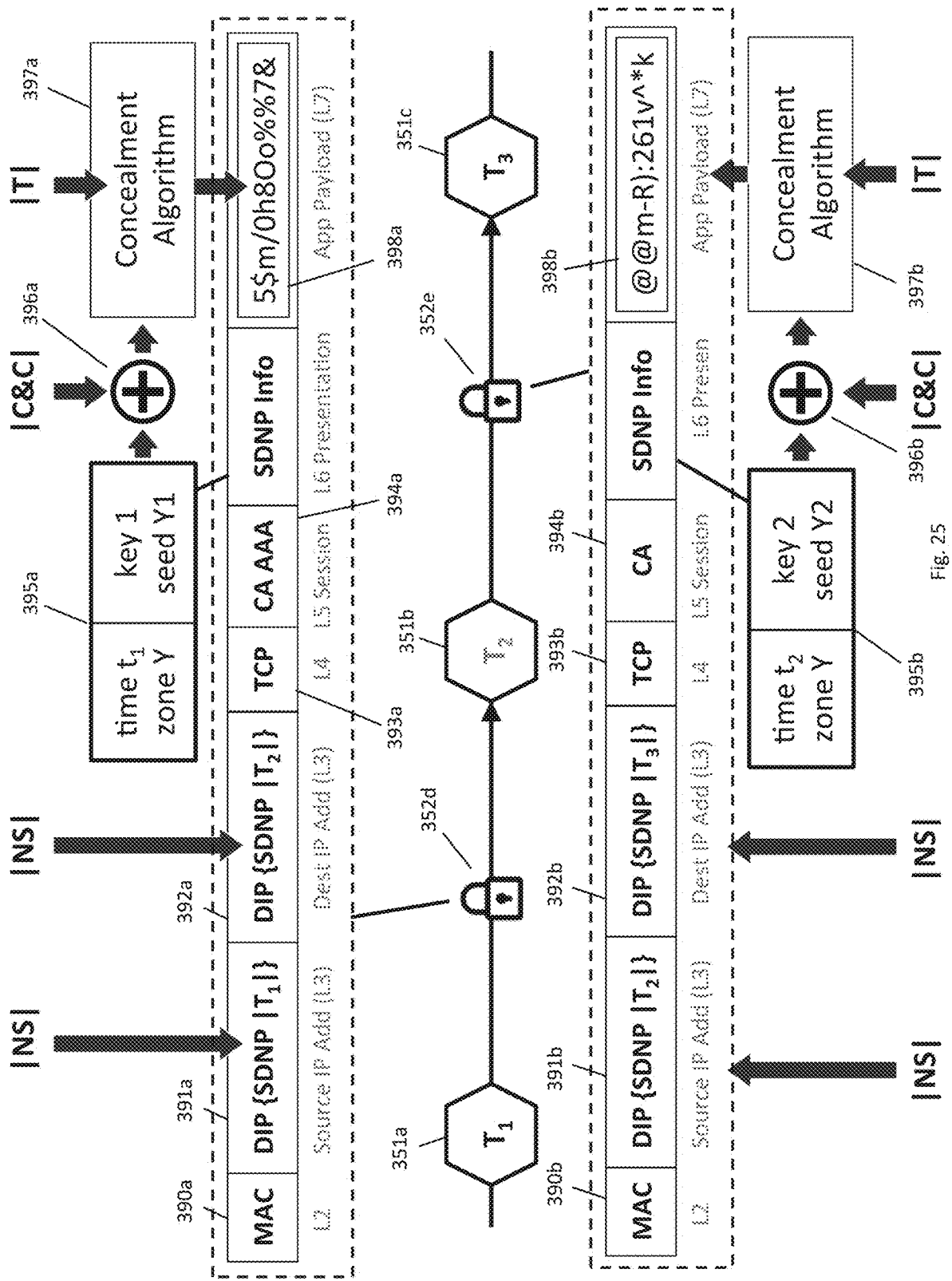
FIG. 25 illustrates packet transport of d'SDNP data utilizing hop-by-hop state-based dynamic concealment algorithms.

Dynamic security in decentralized SDNP communication is further elaborated in FIG. 25, where the security method 352d used in transporting a data packet from node $|T_1|$ to node $|T_2|$ comprises a data packet comprising a MAC Layer-2 addresses 390a consistent with the host device hardware; source and destination routing addresses 391a and 391b comprising the dynamic IP addresses corresponding to the SDNP addresses of HyperNode $|T_1|$ and $|T_2|$ supplied by name server diffuse cloud |NS|; transport Layer-4 criteria 393a (shown by example as TCP), and session Layer-5 data 394a used to validate a session confirming both parties identity through a CA digital certificate with AAA validation comprising a sequence of authentication, authorization, and administration. A successful session validation is needed to commence processing the remaining portions of the data packet. SDNP unique security credentials are carried with the datagram in the presentation field 395a and in the application data field 398a.

Presentation Layer-6 data field 395a, comprising a state variable like time $t_1$, zone Y security methods, plus a cryptographic key 1 and a numeric seed Y1 are then conjoined in process 396a with other seed or key data (delivered prior to data routing by command and control (C&C) packet from the authority node responsible for routing the session). This information is used in conjunction with security algorithms supplied by task node diffuse cloud |T| to execute concealment algorithms 397a to de-process (recover) incoming file data and convert it into newly concealed data 389a.

The entire process is repeated by task HyperNode $|T_2|$ 351b as data passes from the single-hop security method 352d to method 352e. Accordingly, MAC address 390a is updated to 390b with the device hosting node $|T_2|$ becoming the source MAC address and the device hosting node $|T_3|$ the destination address. The datagram source IP address is changed from the dynamic IP address of SDNP node $|T_1|$ 391a to that of dynamic IP address of SDNP node $|T_2|$ 398b, namely DIP {SDNP $|T_2|$}. Similarly, the datagram's destination IP address is changed from the dynamic IP address of SDNP node $|T_2|$ 391b to that of dynamic IP address of SDNP node $|T_3|$ or 391c, namely DIP {SDNP $|T_3|$}. The L4 transport data field 393b is updated with the proper dynamic port number, and the CA digital signature and credentials are maintained in L5 field 394b without the need for a new AAA validation process.

Layer-6 SDNP data 395b is then updated to new security credentials including time $t_2$, zone Y (unchanged), cryptographic key 2 (a new key), and updated numeric seed Y2. Concurrently C&C packets download a link to new concealment 397b algorithms stored as d'DMZ task cloud diffuse data |T|. The result is a change in concealed payload 398b, unrecognizable from its predecessor 398a one hundred milliseconds earlier.

In data fragmentation and transport as shown in FIG. 24, the data contained within a single packet represents only a fraction of the original media content. Without collecting all packets comprising the original file, data file assembly reconstruction cannot be performed, i.e. without the entire encrypted file, decryption and recovery of the plaintext source is not possible. And because of the aforementioned meshed dynamic routing, an attack on a single node cannot intercept all the packets needed to gather and recreate the original encrypted file. For example, in the center column the same illustration, data packets are transported through task nodes 351a, 351b, and 351c using secure connections 352c, 352d, 352e, and 352f, a totally different routing from the previous routing. In the rightmost column data is routed over secure connection 352g to task node 351c, then over connection 352h to task node 351b, connection 352i to task node 351d, and finally over secure connection 352j to client gateway 350b.

Figure 26:
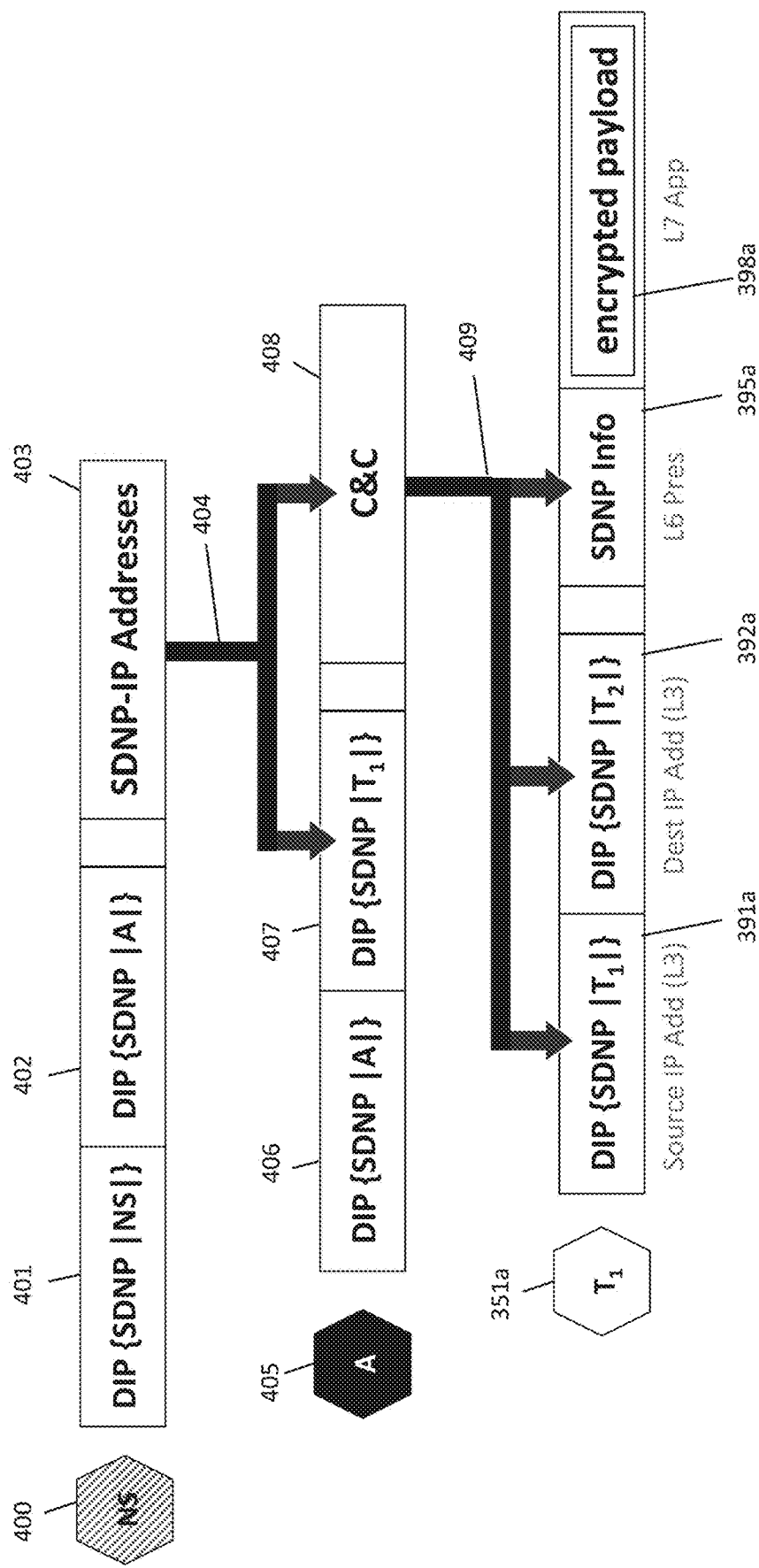
FIG. 26 shows d'SDNP datagrams illustrating the division of labor between |NS|, |A|, and |T| differentiated HyperNodes.

FIG. 26 illustrates the principle of division of labor in hypersecure communications in preventing the concentration of knowledge in any one device or storage medium. In packet routing, name server node |NS| 400 with dynamic IP address 401 sends a datagram to authority node |A| at IP destination address 402 carrying a payload 403 comprising a SDNP address to IP address translation table which in turn is loaded during step 404 into the destination IP address 407 and into the C&C (command and control instructions) in payload 408 of a datagram sent from |A| node 405 having a dynamic IP address 406. The C&C instruction file is forwarded to task node $|T_1|$ 351a describing the construction of a media packet comprising source IP address 391a of node destination IP address 392a of node $|T_2|$, SDNP info 395a comprising security credentials, and encrypted payload 398a to be transported to its next destination. In this manner |NS| node 400, |A| node 405, and $|T_1|$ node 351a share only the information they need to instruct the nodes what job must be executed. Separation of labor combined with limiting information exchange to content on a need-to-know basis confounds systematic attacks on a device or on the decentralized SDNP network.

Figure 27:
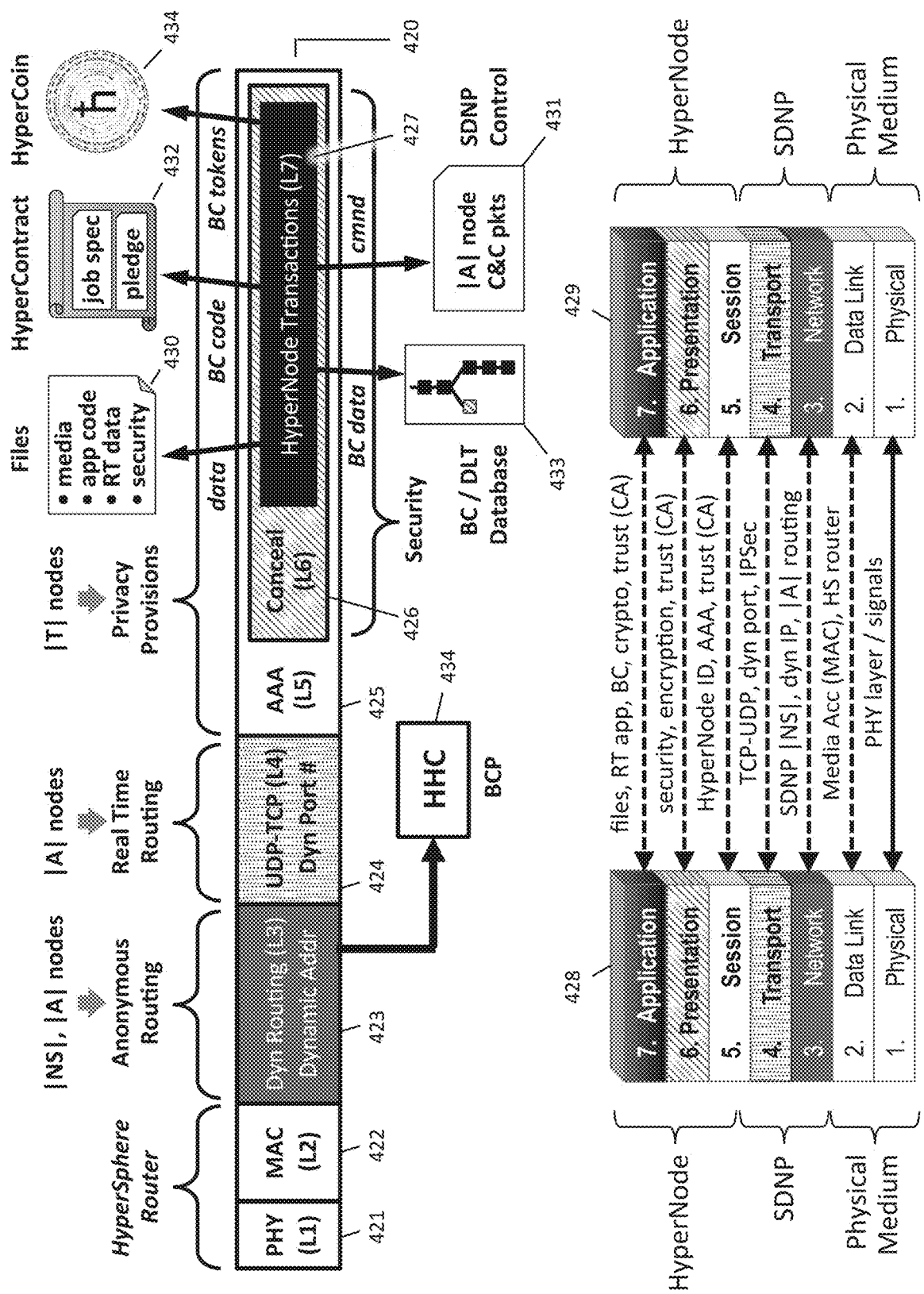
FIG. 27 is a hierarchical representation of a HyperSphere's 7-layer OSI communication stack and corresponding d'SDNP datagram.

One way to represent the SDNP communication protocol is using the same 7-layer OSI abstraction model used to describe the Internet's TCP/IP protocol. Accordingly, FIG. 27 depicts two devices communicating over separate SDNP stacks 428 and 429 using SDNP datagram 420 to execute decentralized SDNP routing comprising network Layer-3 data 423 and transport Layer-4 data 424. Atop SDNP hypersecure data transport, session Layer-5 data 425, presentation Layer 6 data 426, and application Layer-7 data 427 facilitate HyperNode operation supporting client applications, online application, and blockchain applications. As shown, HyperSphere communication is performed using Layer 3 through Layer 7 irrespective of PHY Layer-1 data 421 and MAC Layer-2 data 422 data (except when realizing a SDNP enabled HyperSphere router).

Routing, executed via network Layer-3 and transport Layer-4, is fully decentralized, so although HyperSphere routing is not open source per se, transport over a dynamic meshed network in autonomous and distributed, meaning no one controls it or is even capable of monitoring packet routing. Moreover, as a decentralized system, no network operator, government, or hacker can circumvent packet routing or usurp network operations. Aside from autonomous network utilities, HyperNode user functions available on Layers 5 though Layer 7 are open source, allowing users to develop and enforce their own proprietary authentication, security, and applications atop the HyperSphere as a platform.

As represented in network Layer-3 of the SDNP protocol stack, not only are decentralized SDNP-packet IP-addresses dynamic (changed frequently), HyperSphere routing does not involve the Internet's domain name servers (DNS). Instead the SDNP name server function linking dynamic IP addresses to a user's identity, phone numbers, physical devices, MAC addresses, etc. is realized in a fully decentralized manner via the stored on the d'SDNP name-server diffuse |NS| cloud, accessed through metamorphic HyperNodes and executed only through HyperSphere |A| authority nodes. HyperSphere IP datagrams specify only single-hop source and destination IP addresses but not disclose a packet's point of origination or its ultimate destination.

Obfuscating the SDNP packet's true origin and destination using anonymous data packets prevents tracing a call's origin, thereby protecting clients from profiling. Without meaningful packet routing addresses, there is no way for hackers to use sniffing or surveillance to determine which packets are related to one another. To further confound metadata surveillance and DOS attacks, SDNP protocol for Transport Layer-4 employs ad hoc dynamic port addresses having no particular assigned port number or defined service (such as email, FTP, etc.) by which an attacker can analyze packet content contextually. And rather than using SSL or TLS transport security (notoriously vulnerable to attack), d'SDNP transport security is preformed by tunneling protocols (such as IPSec), executed on a hop-by-hop basis in the cloud.

To maximize quality-of-service (QoS), the HyperSphere's transport protocol employs both TCP and UDP transmission methods depending on the nature of the payload. While the Transmission Control Protocol (TCP) is employed for high reliability payload delivery such as software code and content delivery, User Datagram Protocol (UDP) is employed for realtime (RT) communication such as voice, live video, and other realtime services. Moreover, RT datagrams will be routed by authority node |A| over the network's shortest propagation delay paths. TCP routing in reserved for 'high integrity' delivery focused on maximizing reliability with a higher degree of redundancy.

Being less time sensitive, TCP packets are likely routed over entirely different meshed routes than UDP packets. Using the forgoing methods, unauthorized reconstruction of disaggregated digital content, conversations, media, or transactional sessions is prevented. As described, d'SDNP network operation confounds single-point attacks by limiting the content carried by any single node in the network, both by fragmenting the data and by only routing single packets through the same task nodes.

A unique function of SDNP packet transport is the generation of "HyperNode hop codes," namely HHC 434. A HHC is a transitory blockchain created adjunctively during packet transport needed for blockchain processing (BCP) in blockchain apps, HyperContracts, blockchain-as-a-service (BaaS), and used in token and cryptocurrency transactions. Because they are generated as part of decentralized dynamic meshed data routing of data packets, HHC 434 contains randomized cryptographic hash values that repel counterfeiting and cloning.

To ensure privacy, the HyperSphere privatizes each session (and its contents therefrom) using Layer-5 data 425. Session data includes identity confirmation via AAA login dialogs, security credentials delivered by authority node issued |A| command and control (C&C) packets, and through digital CA certificate based trusted devices and transactions (described later).

Another attribute of d'SDNP network operation employs authority node issued |A| command and control (C&C) packets containing security credentials and algorithms combined with presentation Layer-6 data 426 to conceal the content of data packet payload 427 and to prevent unauthorized access. State-based security means that the security methods and credentials used to protect SDNP datagrams change with its state. A security 'state' is a condition existing at the moment of a data packet's creation, e.g. network time, location, security zone, etc. Packet concealment in the HyperSphere comprises modifying payloads using a variety of state-based security mechanisms executed as data packets traverse the spatiotemporal network, including . . .

Dynamic splitting and mixing,
Dynamic scrambling and unscrambling,
Dynamic encryption and decryption [398] [399]
Dynamic junk data (or packet) insertion and deletion
Time and zone dependent states Decentralized SDNP payload security employs the same dynamic concealment methodology using state-based security algorithms and credentials as the fixed-infrastructure SDNP protocol disclosed in the above-referenced U.S. Pat. No. 9,998,434, except that the HyperNodes are metamorphic and the DMZ server is realized over a diffuse cloud. As explained previously, state-based dynamic concealment is illustrated in FIG. 25 and FIG. 26 where security credentials, algorithms, and payload content depend on network time, changing on a hop-by-hop basis delivered in SDNP command and control packets 431. The dynamic states are further subdivided into zones, geographic regions (subnets) within the HyperSpheric cloud.

Using the foregoing methods means that no two packets traversing the HyperSphere have the same construction. So even if in the unlikely event two packets could be identified as part of the same conversation or session, the packets will not have the same state-based security credentials (keys, seeds, tags, zip) and won't employ the same fragmentation, scrambling, encryption, or junk data algorithms. In other words, identifying two related datagrams does not help improve a hacker's chance of reconstructing secure message content. Dynamic security, where the network state changes constantly with time, disclosed herein therefore comprises a DyDAG, a dynamic version of a DAG (directed acyclic graph). DyDAG operation and its technological realization is a fundamental component of HyperSphere routing, commerce, and blockchains (discussed later herein).

Payload 427 of SDNP datagram 420 may contain a variety of content types, including files 430 containing real time data (live video, audio), media content such as photos and videos, application code (software distribution), and user and application specific Layer-7 security credentials including cryptographic keys, CA certificates, etc. In |A| routing tasks, payload 427 may include SDNP command and control instructions such as C&C packet 431. Payload 427 may also securely deliver a number of blockchain related files including executable code (HyperContract 432), transactions on a DLT/BC database 433, and tokens or cryptocurrency such as HyperCoin 434, Bitcoin, and other digital assets.

Deploying HyperSpheric Nodes

Figure 28:
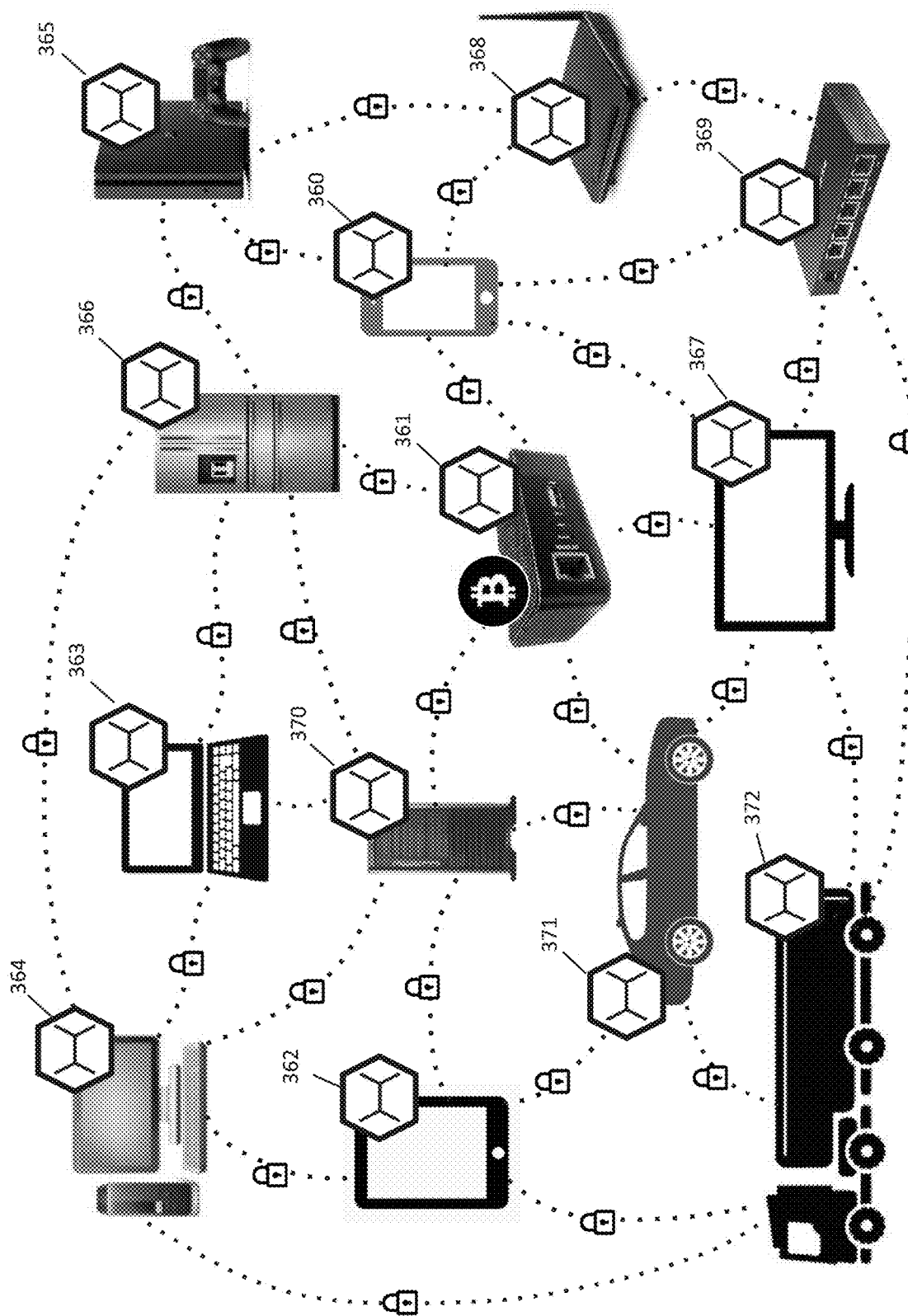
FIG. 28 is a graph of heterogeneous cloud hosting homogeneous HyperNodes.

As shown in FIG. 28, HyperNodes 380 can be installed onto any host device to convert it into a HyperSpheric node. Devices may include high-performance AC-powered systems including servers 370, desktop computers 384, and crypto mining machines 361. Other suitable devices, albeit having lower performance, include WiFi routers 368, Ethernet routers 369, gaming consoles 365, HDTVs 367, and IoT devices, e.g. smart refrigerators 366. Mobile devices such as tablets 361 and cell phones 360 have extensive computing capability but limited battery life. Vehicles such as cars 371 and commercial trucks 372 have the potential of forming dense communications grids, especially valuable when mobile networks fail.

The significance of realizing an interoperable hypersecure high-performance cloud based entirely on software with no need to acquire or install a single piece of hardware means that the total number of HyperNodes is capable of rapidly expanding to exceed every commercial network on earth, even AWS, GWS and Azure (which also host HyperNodes). But unlike large commercial clouds, the HyperSphere also is able to enlist the support of personal computers, smartphones, Internet routers, gaming consoles, Bitcoin miners, HDTVs, IoT devices (like refrigerators), cars and trucks.

Today the Internet today employs 200 million servers and supports 1 billion network connected PCs. Cell phone users comprises 66% of the world population, 5 billion people purchasing 9 billion subscriptions—one billion more subscriptions than there are people on earth, meaning many people have more than one cell phone. Moreover, IoT devices today comprise 27B units and are expected to exceed 60B units by 2024 (https://www.statista.com/statistics/471264/iot-number-of-connected-devices-worldwide/).

Figure 29:
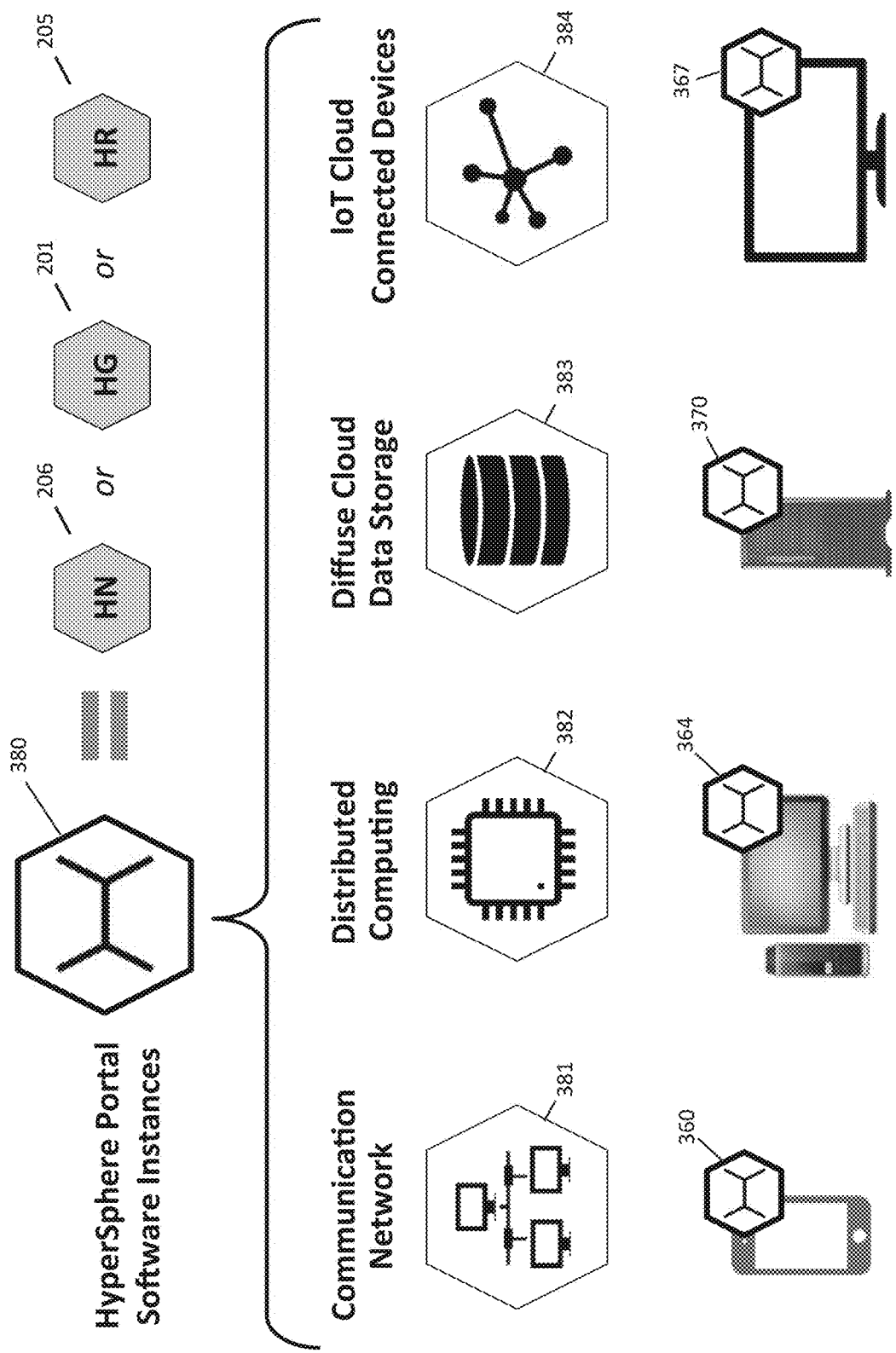
FIG. 29 illustrates the types of HyperSphere portals comprising software performing communication, computing, data storage, and cloud-connected devices.

As described previously, access to the HyperSphere may comprise a HyperNode |HN| 206 software-based autonomous network element, a HyperSphere gateway |HG| 201 embedded in a client's application, or a HyperSphere router |HR| 205 managing L1/L2 physical connectivity. As shown in FIG. 29, for convenience these HyperSpheric software instantiations may collectively be referred to as "HyperSphere portal software 380." And although a HyperSphere portal comprises generic software available for each major host OS, its functional performance varies based on the host device's hardware. In particular, the HyperSphere ports can be optimized for communication-networking 381, distributed computing 382, diffuse cloud data storage 383, and IoT cloud connectivity 384:

HyperSphere portal software 380 comprising communication network components 381 including client edge devices (such as mobile phone 360), network routers, and commercial server clouds (not shown) perform minimal computing but require high bandwidth connectivity across high speed networks preferably comprising optical fiber wireline and microwave radio links, gigabit Ethernet routers, high speed WiFi such as 802.11ac, and 4G or 5G mobile networks. One key requirement of fixed infrastructure hosting of HyperSphere portals is the need for steady reliable power, i.e. high uptime and perpetual availability.

HyperSphere portal software 380 also supports peer-to-peer (P2P) or vehicle-to-vehicle (V2V) communication. Peer communication is important when access to fixed wireline or mobile infrastructure is unavailable (e.g. when driving in the mountains) or when the network is offline (such as in a natural disaster). HyperSpheric peer communication necessarily operates differently than communication over omnipresent networks, soliciting or commandeering available resources such as cell phones and automobiles as available. In rural regions lacking any wireline infrastructure whatsoever, HyperSphere communication must rely on low carrier frequency mobile telephony, satellite networks, and in extreme cases drone hosted wireless connectivity or on COW (cell-on-wheels) networks. Performance and QoS aside, HyperSphere portal software 380 operates in a manner agnostic to the physical network that hosts them, with the only proviso being the HyperSphere portal software for |HN|, |HG| or |HR| must be compatible with the OS of its device host.

HyperSphere portal software 380 comprising distributed computing components 382 employs devices with substantial computing capability (generally measured in MFLOPs or millions of floating point operations per second) and sufficient capacities of scratch pad memory (volatile memory, i.e. RAM) to execute the calculations without undo amounts of memory swaps (read/write cycles). Hosts may include high-speed commercial servers and server farms, or an aggregation of large numbers of personal computers 364. Other high performance hosts include cryptocurrency mining computers and gaming computers. The most beneficial computing resources maintain constant power for high uptime and network availability. That said, the sheer number of smartphones in the world (9B), properly managed, represent a significant computing potential, provided each subtask does not require more time than the per-charge battery life of the device or overwhelm the volatile memory capacity of the device.

HyperSphere portal software 380 comprising diffuse cloud storage 383 employs either large capacity server farms (with correspondingly substantial memory capacity) or a large number of smaller capacity online-connected memory devices. Smaller capacity storage demands a greater degree of fragmentation and memory maintenance.

HyperSphere portal software 380 comprising IoT cloud connected devices 384 comprise lightweight devices having little demand for computation, storage, or communication bandwidth. Remote devices, e.g. security cameras however, require low power consumption. The HyperSphere portal software, however, does not require significant power to host and as such is naturally IoT compatible and eco-friendly.

Decentralized (d'SDNP) Hypersecure Communication

Figure 30:
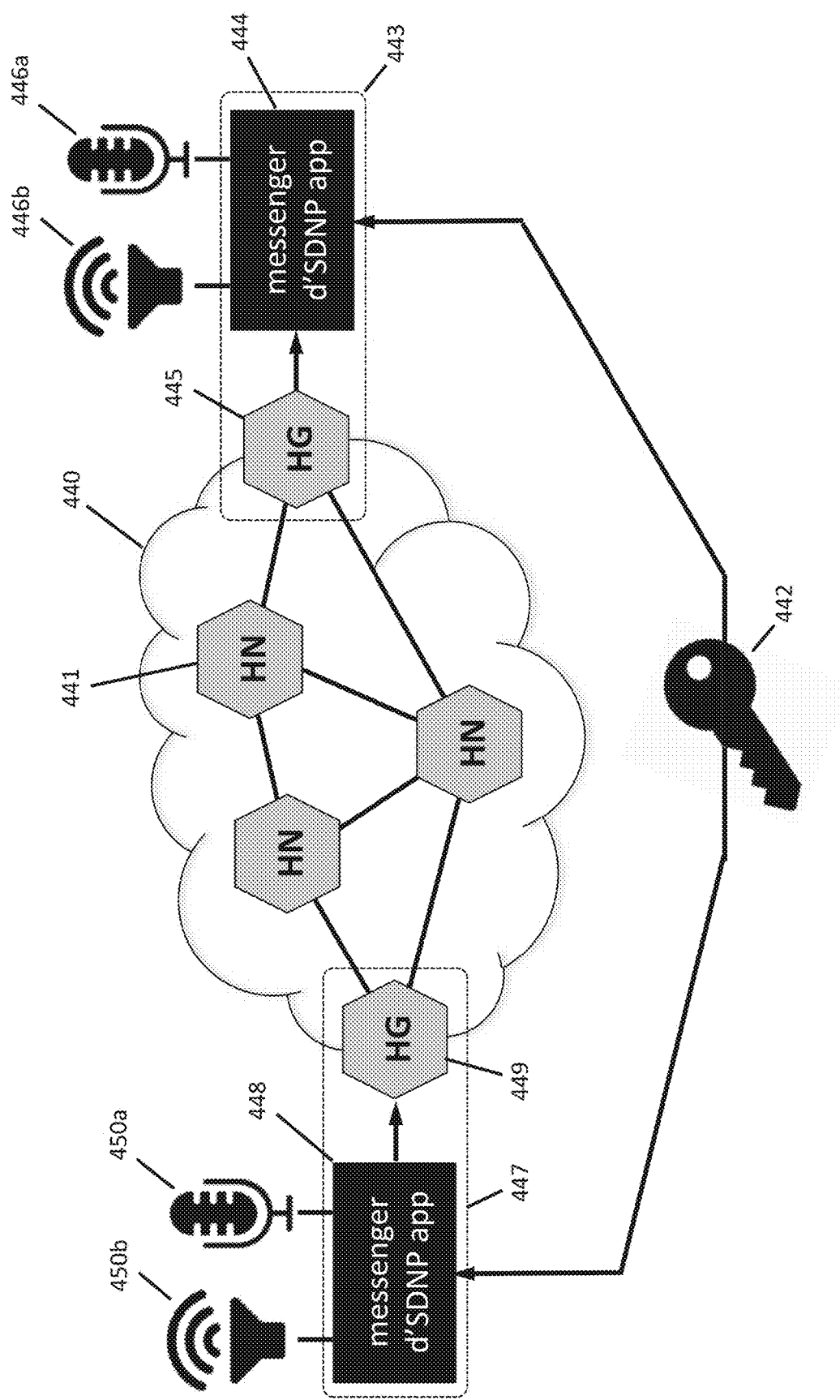
FIG. 30 shows an example of a HyperSphere communication application showing operation of personal messenger.

Examples of the decentralized d'SDNP hypersecure communication use cases include:
  HyperSphere d'SDNP messenger app
  HyperSphere V2V ad hoc peer networks
  HyperSphere multiband communication
  HyperSphere over 5G mobile network
  HyperSphere distributed computing
  HyperSphere diffuse data cloud storage
  HyperSphere cloud connected devices Each of the foregoing applications includes inventive matter required to execute the required tasks for the specific applications:

HyperSphere d'SDNP Messenger App:

One application of HyperSphere communication is to provide hypersecure, text, voice, and video in a personal messenger application. As shown in FIG. 30, d'SDNP enabled personal messenger 447 communicates with personal messenger 443 over the decentralized SDNP cloud 440. Personal messenger 447 comprises d'SDNP 448 messenger app hosted on a cell phone or tablet (not shown) interfacing with microphone 4501 and speaker 450b. The personal messenger includes embedded HyperSphere gateway software HG 449 providing access to the d'SDNP cloud 440. The gateway facilitates registration of the messenger and device on the HyperSphere name server diffuse cloud and manages the connection dialog to open a communication session with other d'SDNP communication apps.

In a call from messenger 447 to 443, sound from microphone 450a is digitized, fragmented, scrambled, encrypted (using shared key 442), and then split into multiple packets. During data transport within d'SDNP cloud 440, data packets are transported using dynamic meshed transport of fragmented data packets over HyperNodes 441, the datagram ultimately reaching HyperSphere gateway 445 embedded within messenger app 443. Once a series of related datagrams are received, recombined, decrypted and unscrambled, the digital sound packet is converted into analog signals, driving speaker 446b. In normal VoIP telephony, full-duplex conversation involves the concurrent delivery of messages from microphone 446a in personal messenger 443 to speaker 450b in messenger 447. Each sequential packet follows a unique trajectory through the d'SDNP cloud 440 under direction of |A| node performing acting as a dispatcher.

Messenger security involves two unrelated processes, one occurring outside cloud 440 involving the edge devices, the other functioning autonomously inside cloud 400. In one embodiment, shown in FIG. 31, edge security employs encryption using one or more cryptographic keys 442 transferred directly between the two messengers. As shown, audio waveform 451a is converted into an unencrypted file 451b (also known as plaintext) then encrypted in process 452 using key 442 resulting in ciphertext 451c. After transport through the d'SDNP cloud, edge encrypted file 451c is transmitted to application 443, decrypted in process 453 into unencrypted (plaintext) file 451b, and finally converted back into audio waveform 451.

Because edge encryption involves a cryptographic key 442 transferred directly without network 440's involvement (for example by transferring keys in person, or hidden in a innocuous data stream of voice, video, or music), then edge encryption facilitates privacy benefits to callers separate from network security. In any event, key 442 transfer should occur prior to initiating any communication session—days, weeks, or months before so that use of the encrypted channel with edge shared secrets is undetectable, like forming a VPN long before communicating.

Figure 31:
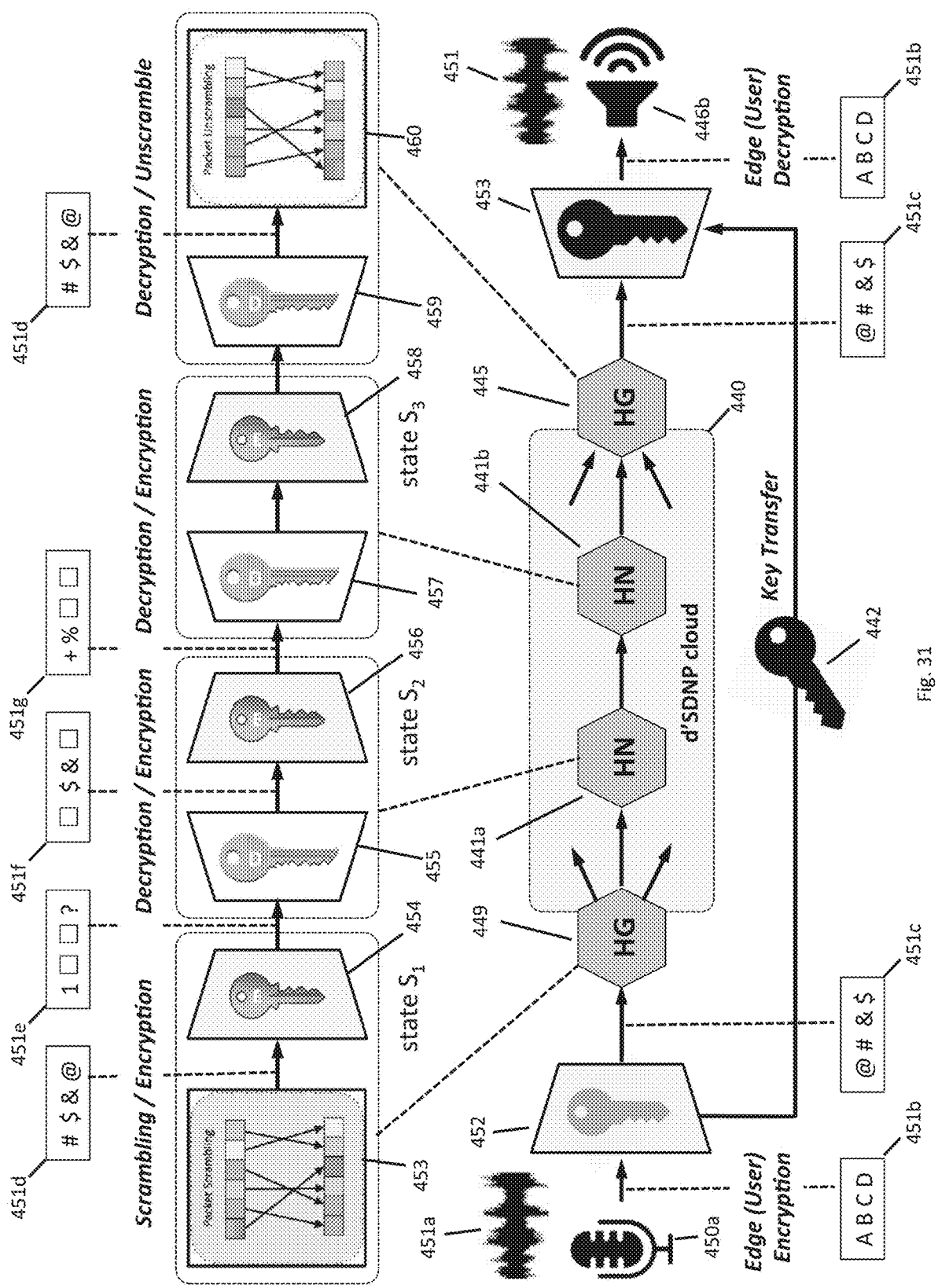
FIG. 31 shows an example of the dynamic concealment of a messenger payload during d'SDNP datagram transport.

Security within the decentralized SDNP cloud involves a separate process from edge security. Unlike edge security, dynamic cloud security does not involve any party's participation. It occurs autonomously without the involvement of any network operator. FIG. 31 illustrates the dynamically varying content of d'SDNP datagrams during network transport. Security provisions within d'SDNP cloud 440 occur on a hop-by-hop basis using dynamic security credentials and shared secrets, secret information exchanged prior to the commencement of any communication session. For example, data processed by HyperSphere gateway |HG| 449 involves scrambling operation 453 and encryption operation 454 made in accordance with state $S_1$. State $S_1$ may be based on the time the scrambling operation occurs, the time the task node accepts a job from a HyperContract, the security region of a device, or some combination of these and other time-varying parameters.

Scrambling of packet 451c by operation 453 results in data packet 451d. The packet is then encrypted and split into fragments, including the algorithmic insertion of junk data into the data payload or other packet data. In addition to being encrypted and contaminated with meaningless junk data, the packet is also mixed with the content of other communication sessions. The resulting data packet 451e lacks the full content of its ancestral lineage (packet 451d) because some of the fragmented pieces are diverted onto different paths through the meshed network. Unrelated data or junk data are represented in the figure by empty squares ☐ in the text.

HyperNode |HN| 441*a* decrypts packet 451*e* in decryption process 455 in accordance with state $S_1$, recovering the fragmented unencrypted remains of the data packet, which bears no resemblance whatsoever to the original data packet 451*b*. HyperNode |HN| 441*a* then encrypts the data packet's payload anew in accordance with state $S_2$. Knowing how to decrypt data packet 451*e*, therefore, offers no help in decrypting data packet 451*g*. The decryption process 457 (using state $S_2$) followed by encryption process 458 (using state $S_3$) is repeated in |HN| 441*b* and any other intermediary HyperNodes (not shown) until exit gateway node |HG| 445 de-junks and combines all related incoming packets from the meshed network, then merges the files algorithmically, and decrypts the resulting packet in accordance with the last state used in its concealment process (shown here to be state $S_3$), a process that recovers scrambled packet 451*d*. Since the restored packet 451*d* is still scrambled, a brute force attack to break the cipher and emulate decryption process 459 is wholly unproductive because there is no way for the hacker to know if they successfully decrypted the incoming file.

In the last step, packet 451*d* is unscrambled within HyperSphere gateway |HG| 445 embedded in messenger application 443, recovering data packet 451*c*, still encrypted by the edge encryption process. Only a holder of edge user key 442 can then decrypt the packet to extract the plaintext file 451*b*.

Figure 32A:
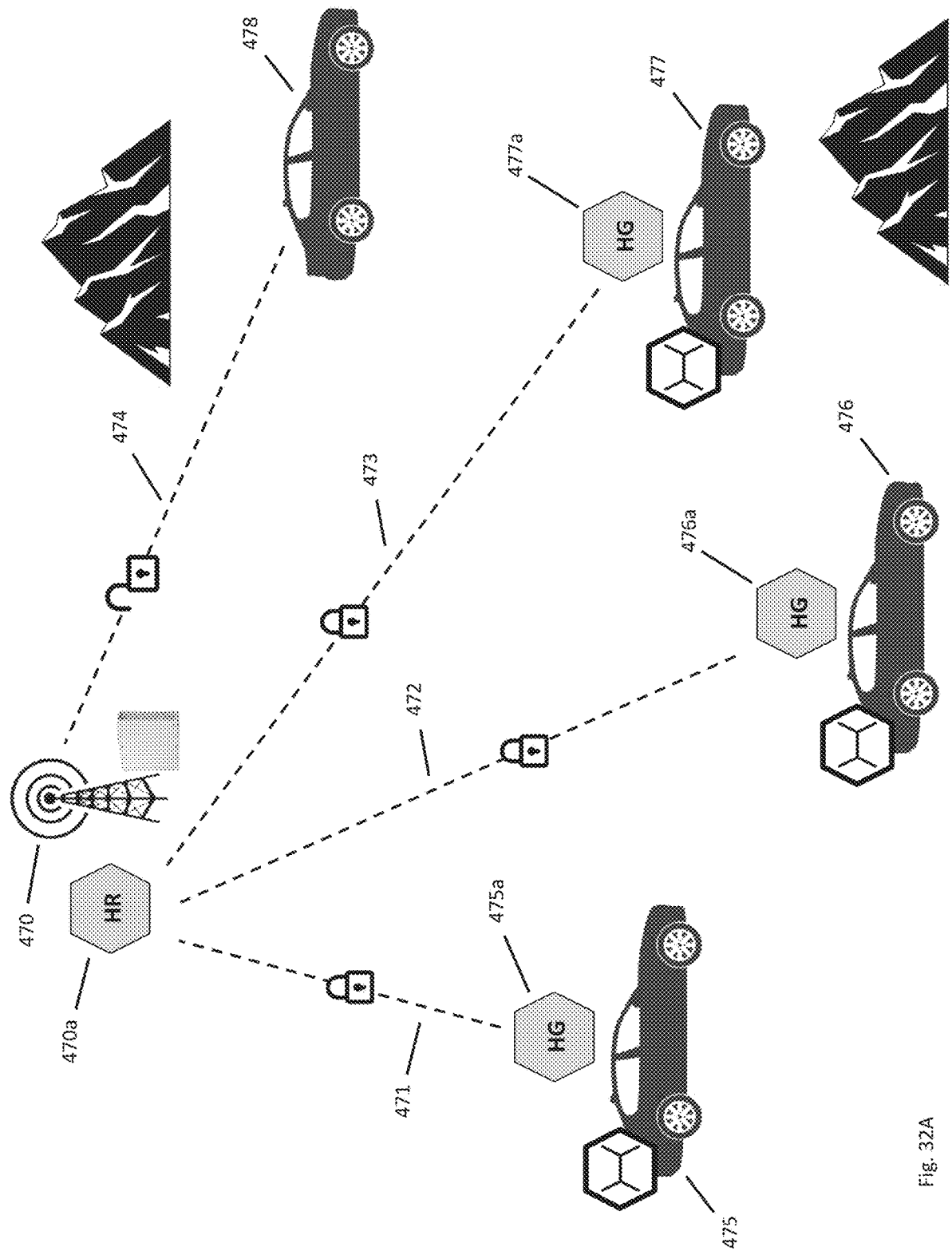
FIG. 32A is a graph of a vehicle-to-infrastructure (V2I) based network over a mobile (cellular) carrier network.

HyperSphere V2V ad hoc Peer Networks:

Another virtue of the decentralization of a meshed autonomous network is its ability to instantly form autonomous peer-to-peer (P2P) and vehicle-to-vehicle (V2V) networks whenever fixed infrastructure or mobile networks fail. As stated previously, the interface between an edge device and the d'SDNP cloud is a multi-function software portal referred to as a HyperSphere gateway. Unlike a symmetrically sandboxed HyperNode being isolated from its host, a |HG| node has access to application data from its host's device. For example, in FIG. 32A a group of automobiles 475, 476, 477 and 478 communicate with mobile network cell tower 470 over radio links 471, 472, 473, and 474, respectively.

Since cell tower 470 is enabled with HyperSphere router |HR| 470*a* connected to corresponding HyperSphere gateways |HG| 475*a*, 476*a*, and 477*a* hosted in cars 475, 476, and 477, respectively, radio links 471, 472, and 473 are hypersecure because they employ HyperSphere node-to-node packet routing (the same as any cloud hosted HyperNode operates). In this sense, the HyperSphere's cloud reaches all the way to the edge devices. In other words, for network Layer-3 there is no such thing as Last Mile communication in a d'SDNP network's implementation. Note that because car 478 does not host a HyperSphere gateway, radio link 474 is not secure.

As an academic point, it can be argued that HyperNode gateways behave as a peer-to-peer (P2P) network (or in the case of automobiles, as a vehicle-to-vehicle (V2V) network) even when the cellular network is available as a network backbone. This peer communication feature uniquely occurs on network Layer-3 because HyperSphere portals (nodes, routers, gateways) only trust one another. In this sense, every HyperSphere node operates as a dynamic autonomous VPN with its neighbors, except that the HyperSphere's node-to-node tunnels are created through the |A| node's dispatcher function. In other words, the d'SDNP cloud forms virtual tunnels on Layer-3 tunnel, not on application Layer-7 (the way conventional VPNs operate). Moreover, VPNs must be established prior to communication. Nodes in the d'SDNP cloud form hypersecure links with other nodes, autonomously and automatically.

Figure 32B:
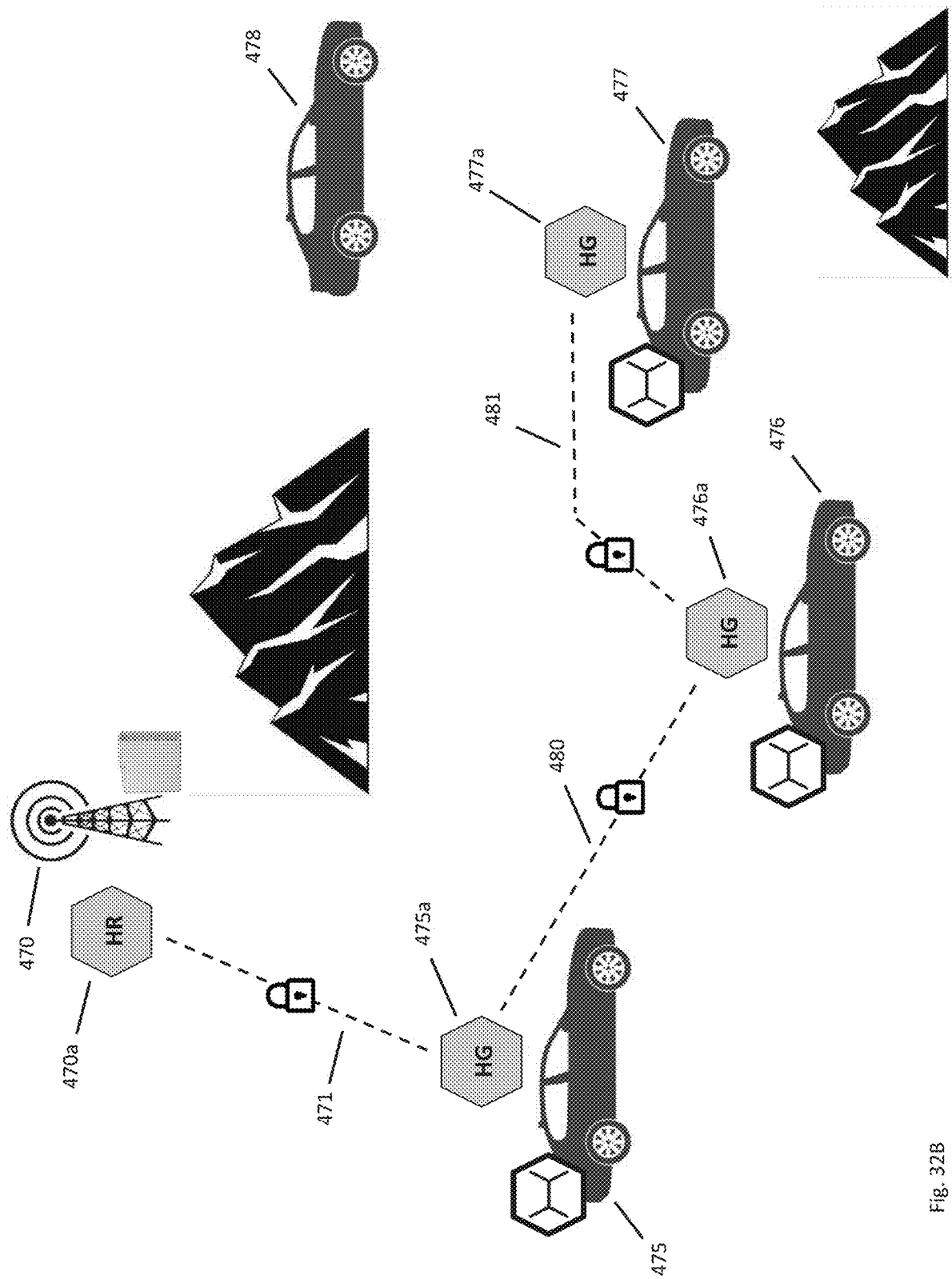
FIG. 32B is a graph of an autonomous ad hoc vehicle-to-vehicle (V2V) network maintaining indirect mobile network access.

FIG. 32B illustrates the instinctive adaptation of the d'SDNP cloud into a V2V network in the absence of network infrastructure. For example, if cars 476, 477 and 478 travel into the foothills of a mountain range, they may be cut off from cellular network connectivity. If, however, car 475 is still able to connect to the cell tower 470, then HyperSphere gateway |HG| nodes 475*a*, 476*a*, and 477*a* spontaneously convene a V2V peer network maintaining connectivity to the cell tower 470 and HyperSphere router 470*a* through the intervening vehicles' |HG| nodes. As a result, vehicle to infrastructure (V2I) link 471 and V2V links 480 and 481 are all hypersecure. Even if data from car |HG| 477 is transported to cell tower |HR| node 470*a*, intermediate vehicular HyperSphere gateways 475*a* and 476*a* cannot inspect the data being transmitted. Without a HyperSphere gateway node, vehicle 478 loses all connection once it is out of tower range.

Figure 32C:
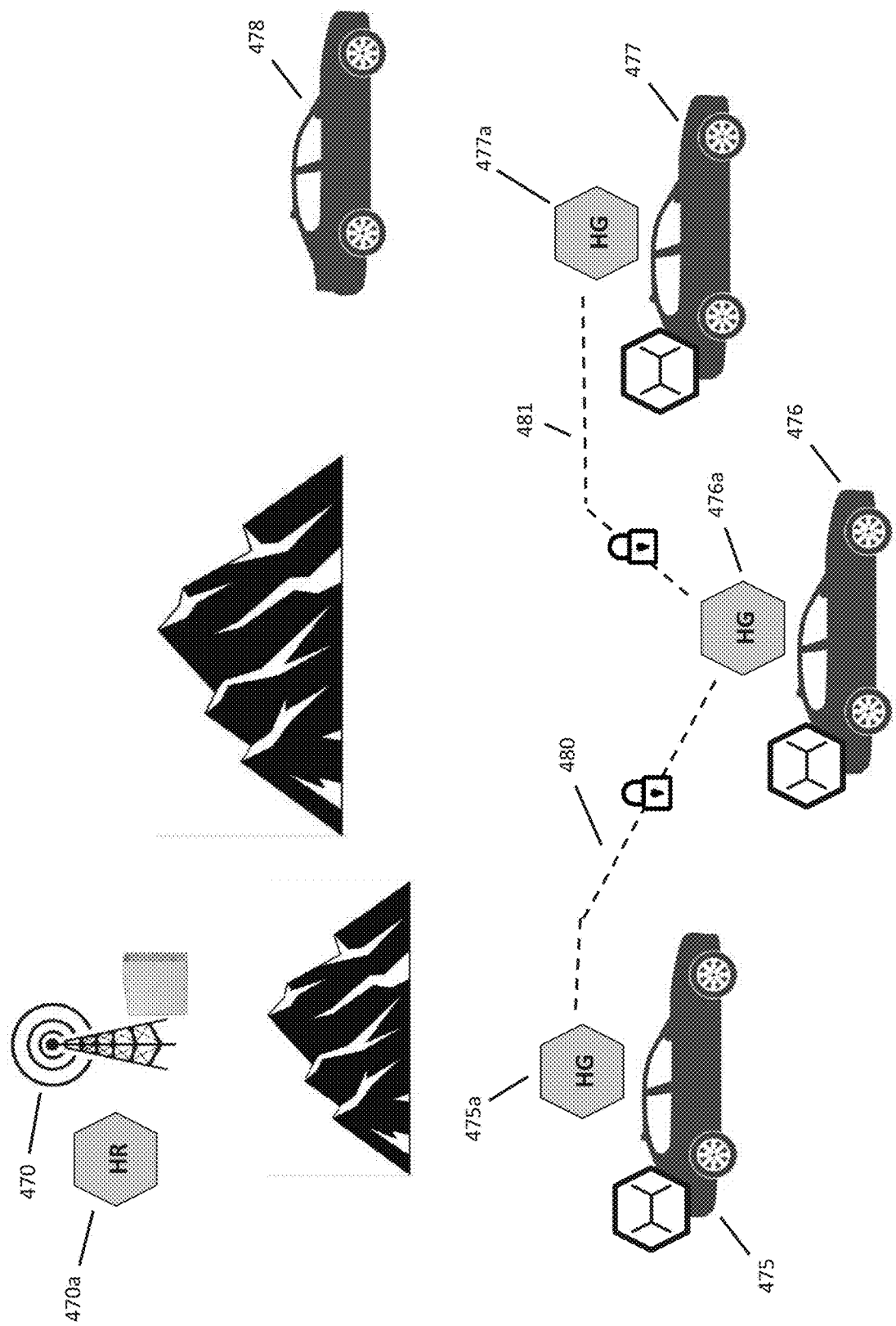
FIG. 32C is a graph of a fully autonomous ad hoc vehicle-to-vehicle (V2V) network (micro-cloud) isolated from mobile network access.

In FIG. 32C, cars 475, 476 and 477 all drive out of range of cell tower 470. In such case the HyperSphere gateways spontaneously transform into a fully self-sustaining V2V network to maintain connectivity across hypersecure channels 480 and 481. V2V communication is important, especially in inclement weather, to prevent against collusions and to warn other cars of impending hazards.

Figure 32D:
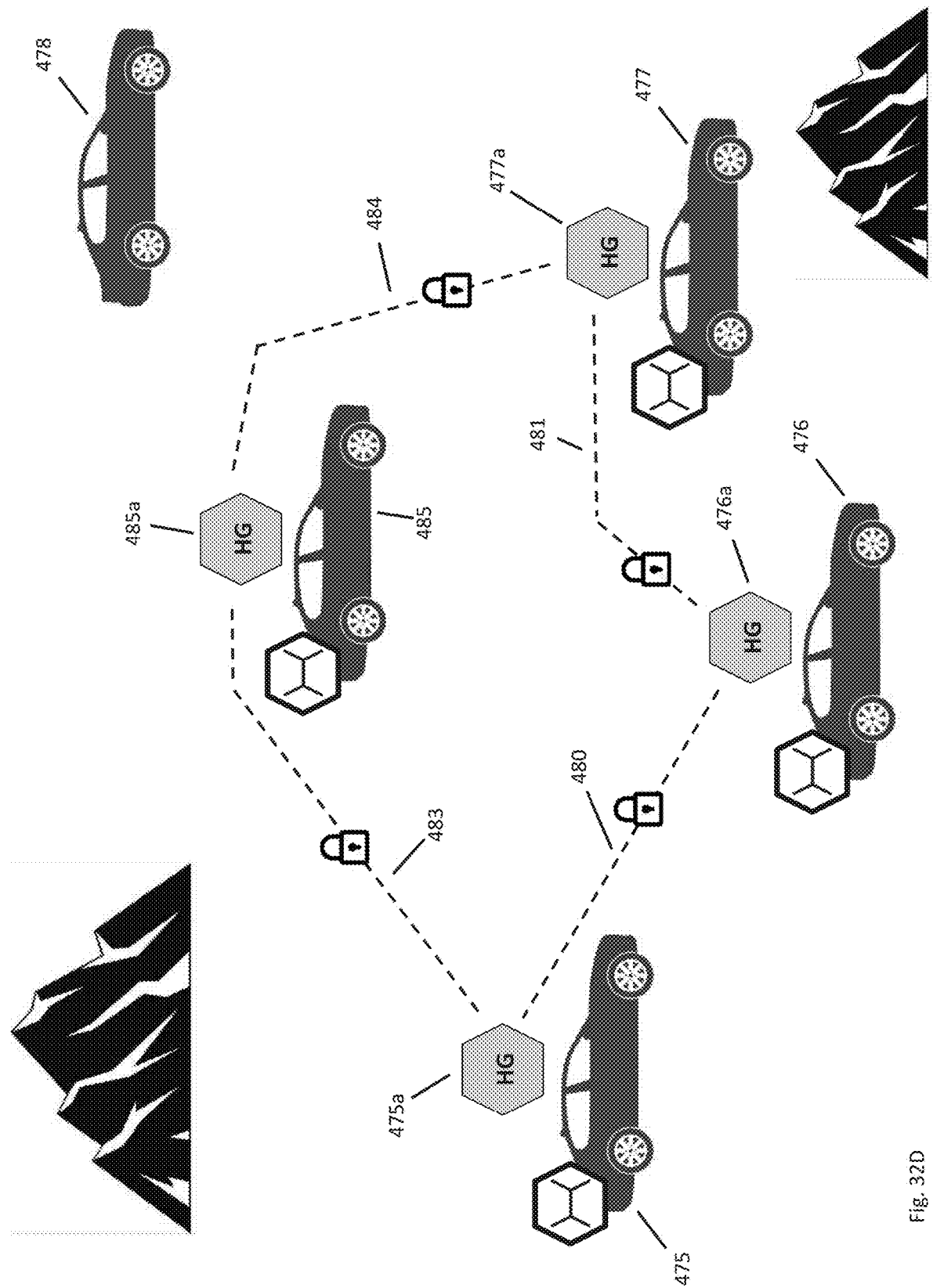
FIG. 32D is a graph of a fully autonomous ad hoc vehicle-to-vehicle (V2V) network isolated from mobile network access, dynamically reconfigured to access available HyperNodes.
Figure 32E:
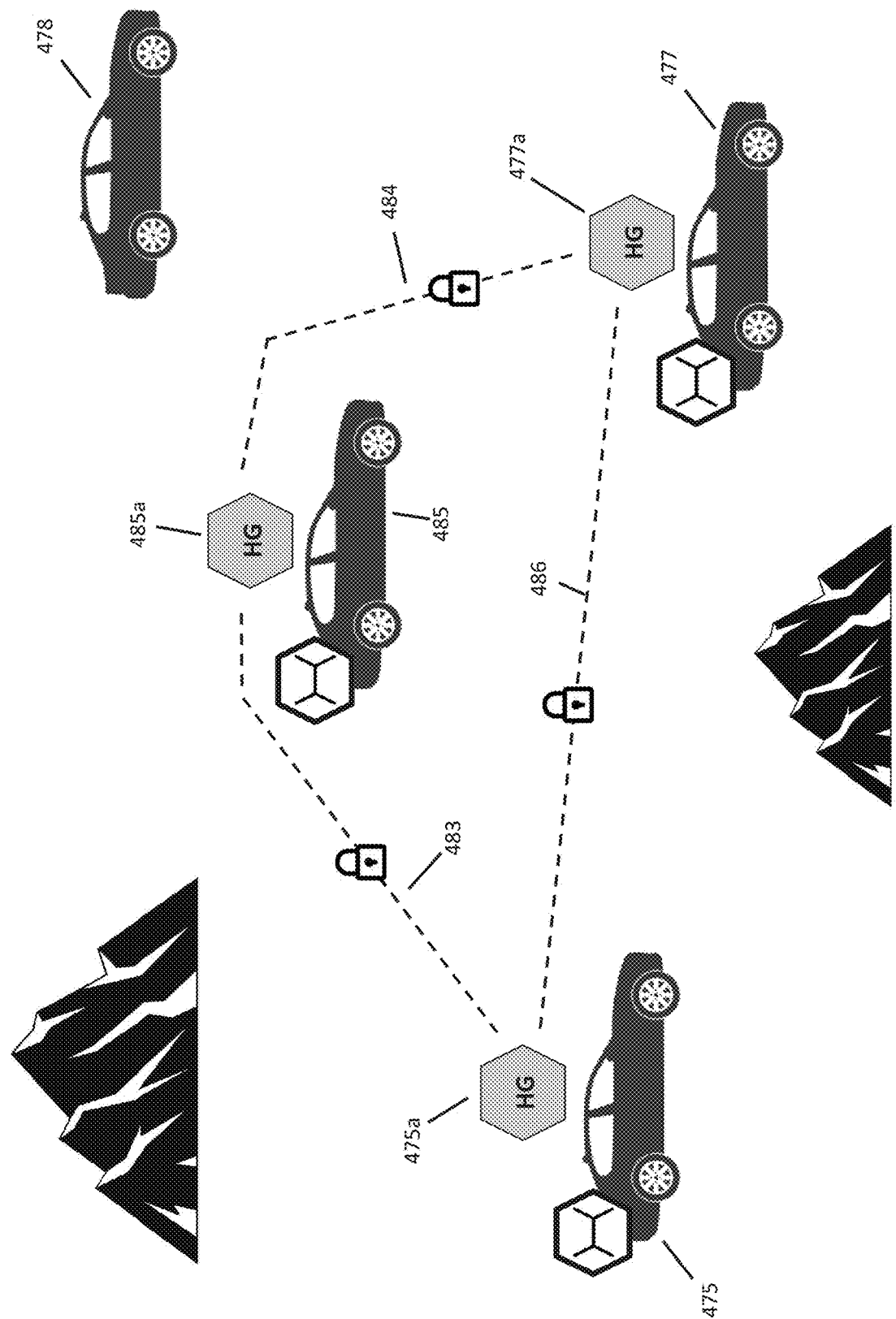
FIG. 32E is an updated graph of a fully autonomous ad hoc vehicle-to-vehicle (V2V) network isolated from mobile network access, dynamically reconfigured to access available HyperNodes.

The ad hoc V2V network is fully autonomous, adding and removing resources as they enter and leave the radio range between the cars. For example, in FIG. 32D, another vehicle 485 containing |HG| node 485*a* drives into the vicinity of the other cars. The HyperSphere gateway nodes 475*a* and 477*a* instantly and spontaneously add hypersecure links 483 and 484 to connect to |HG| 485*a*. In FIG. 32E, car 476 leaves the road and is dropped from the V2V peer network. To maintain the best possible QoS connectivity, |HG| node 475*a* automatically establishes hypersecure link 486 to |HG| node 477*a*.

HyperSphere Multiband Communication:

A key principle of d'SDNP cloud communication is fragmented data transport across multiple paths in a meshed network. Although these paths can represent different combinations of HyperNodes in a fixed infrastructure cloud of servers, in connections to edge devices additional redundancy and security can be achieved by sending the various packets across multiple PHY connections.

Figure 33A:
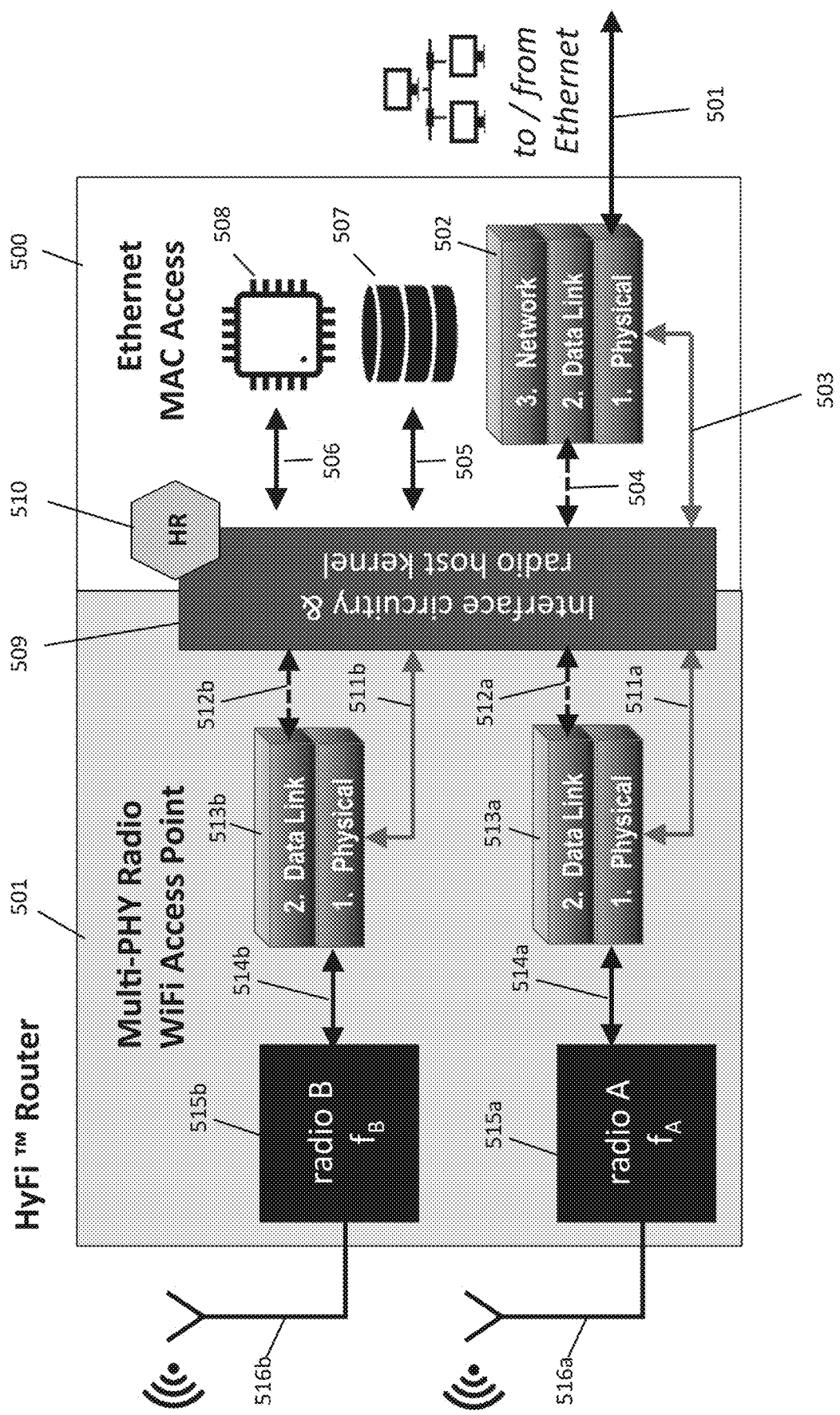
FIG. 33A is a schematic representation of a HyperSphere HyFi wireless router using multiple (802.11 compatible) OFDM modulated microwave carriers.

One such implementation, shown in FIG. 33A, comprises a wireless access point, forming a bridge between Ethernet MAC access 500 and a multiband WiFi radio 501. The access point combines three communication stacks 502, 513*a*, and 513*b*, facilitating routing among Ethernet 501 and microwave radios 515*a* and 515*b*. The host platform comprises interface circuitry & radio host kernel, (herein "kernel") 509 connected through driver interface 506 to host processor 508, through driver interface 505 to local data storage (nonvolatile memory), through driver interface 503 to the PHY Layer 1 of 802.3 (Ethernet) communication stack 502, through driver interface 511*a* to the PHY Layer 1 of 802.11 (WiFi) communication stack 513*a* for radio A, and through driver interface 511*b* to the PHY Layer 1 of 802.11 (WiFi) communication stack 513*b* for radio B.

Data packets carried by Ethernet connection 501 are interpreted by communication stacks 502 and passed via data link Layer-2 data 504 to kernel 509. In accordance with routing instructions received by d'SDNP authority node, HyperSphere router |HR| node 510 processes the incoming packet, parses it into separate payloads. The payloads are then assembled into packets having different IP and MAC addresses—one transferred over data-link layer connections 512a and 514a to radio 515a and broadcast over antenna 516a with a carrier frequency $f_A$.

The second payload is transferred over data link layer connections 512b and 514b to radio 515b and broadcast over antenna 516b over a carrier frequency $f_B$. While the above sequence describes an incoming Ethernet packet being split and sent across multiple radio carrier frequencies, in full duplex communication and telephony, the process is bidirectional. For example, multiple WiFi radio signals once received, are processed, mixed, then split, and sent as multiple packets over Ethernet 501 sharing a common MAC address but with separate IP addresses.

Figure 33B:
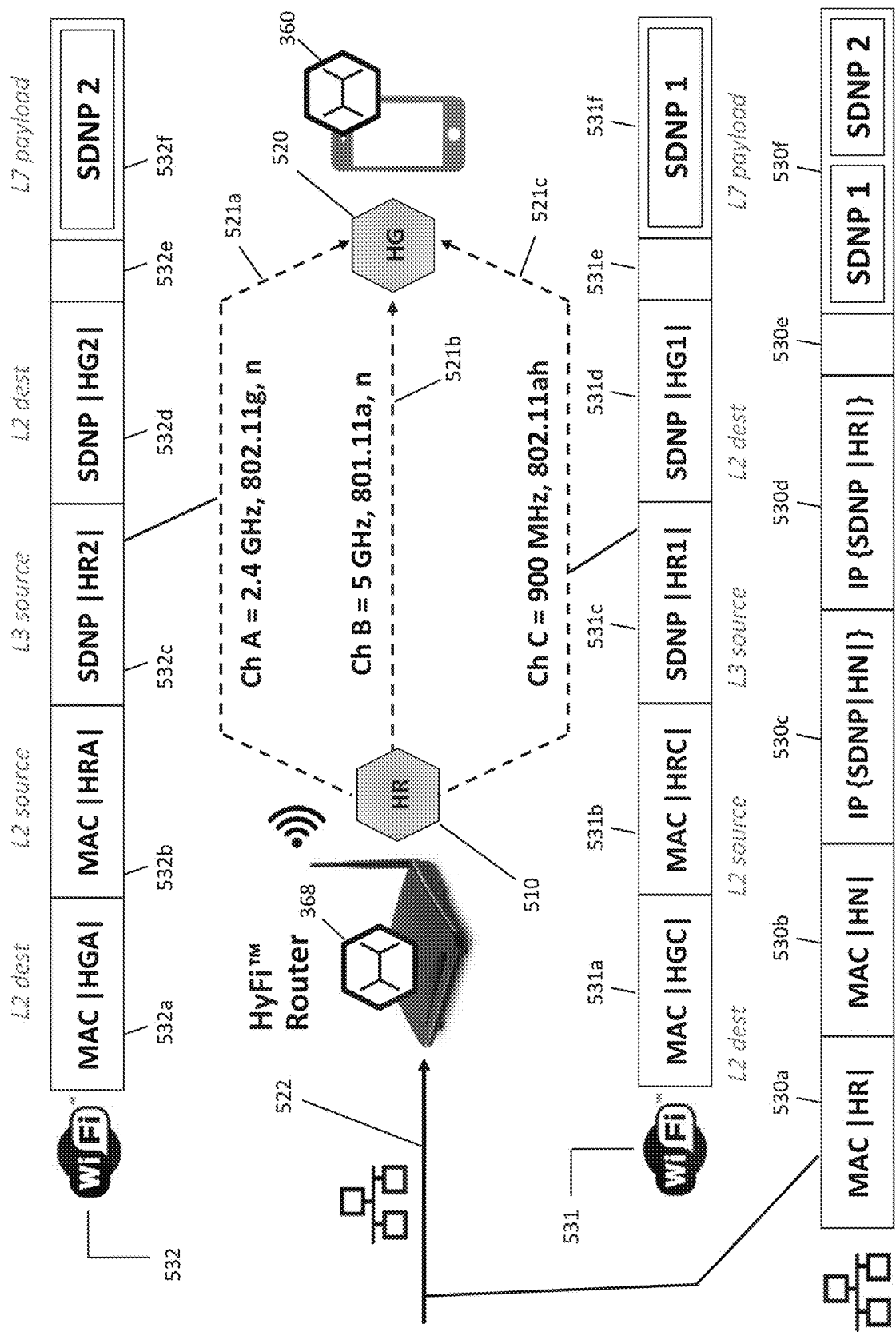
FIG. 33B shows an example of HyFi router d'SDNP multi-PHY communication using fragmented data transport over multiple microwave radio channels and multiple WiFi protocols.

The HyperSphere enabled WiFi router (herein referred to as a HyFi router) uniquely involves a process of mixing and splitting data packets and sending or receiving them over multiple carrier frequencies. This methodology is exemplified in FIG. 33B where data packets carried by Ethernet wireline 522 to HyFi router 368 are split and sent to cell phone 360 over a multi-PHY microwave radio links comprising, for example, a 2.4 GHz channel 521a, a 5 GHz channel 521b, and a 900 MHz channel 521c. Packet construction is managed using HyperSphere portal software comprising |HR| router 510 and |HG| gateway 520. In the following discussion of MAC addresses and IP addresses, for brevity's sake the abbreviation L2 shall mean data link Layer-2 and L3 shall mean network Layer-3. Although the example shows two radio links and one Ethernet connection, the number of wireless and wireline router channels may be increased with minimal impact to performance.

Ethernet packet 530 is routed from a server hosting HyperNode |HN| (not shown) at L2 source address 530b (with a value MAC |HN|) and a L3 source address 530c (with a value IP {SDNP |HN| }). Ethernet packet 530 is routed to HyperSphere HyFi router 368 hosting router node |HR| 510 at L2 destination address 530a (with a value MAC |HR|) and a L3 destination address 530d (with a value IP {SDNP |HR|}). Blank field 530e contains L4 to L6 data left blank for clarity's sake. The payload 530f of Ethernet packet 530 contains both SDNP1 and SDNP2 sub-packets. For clarification, the term SDNP |HN| is the SDNP address of HyperNode |HN| while the value IP {SDNP |HN|} is the dynamic IP address of the device hosting HyperNode |HN| and associated with address SDNP |HN|.

After payload processing and concealment, WiFi packet 531 is routed from HyperSphere HyFi router 368 hosting router node |HR| 510 at L2 source address 531b (with a value MAC |HRC| for channel C) and a L3 source address 531c (with a value IP {SDNP |HR1|} where HR1 is the 1st IP address). WiFi packet 531 is routed to smartphone 360 hosting gateway |HGC| 520 at L2 destination address 531a (with a value MAC |HGC|} for channel C) and a L3 destination address 530d (with a value IP {SDNP |HG1|}). Blank field 531e contains L4 to L6 data left blank for clarity's sake. The payload 531f of WiFi packet 531 contains only SDNP1 sub-packets.

After payload processing and concealment, WiFi packet 532 is routed from HyperSphere HyFi router 368 hosting router node |HR| 510 at L2 source address 532b (with a value MAC |HRA| for channel A) and a L3 source address 532c (with a value IP {SDNP |HR2|} where HR2 is a $2^{nd}$ IP address). WiFi packet 532 is routed to smartphone 360 hosting gateway |HGA|520 at L2 destination address 532a (with a value MAC |HGA|} for channel A) and a L3 destination address 532d (with a value IP {SDNP |HG2|}). Blank field 532e contains L4 to L6 data left blank for clarity's sake. The payload 532f of WiFi packet 531 contains only SDNP2 sub-packets.

Figure 34A:
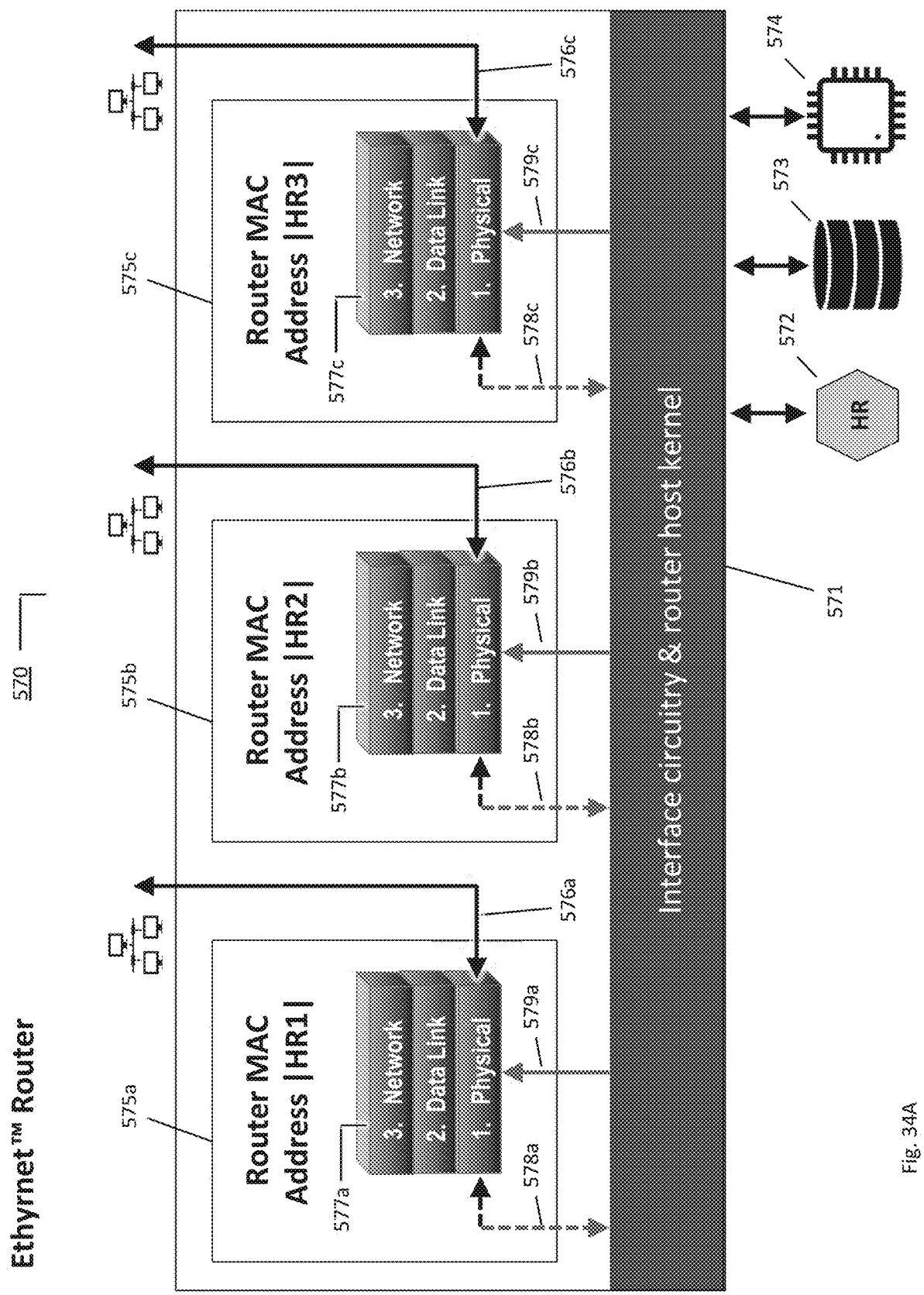
FIG. 34A is a schematic representation of a HyperSphere Ethyrnet wireline router capable of multiple channels of IEEE 802.3 compatible (multi-PHY) communications.

The methods of d'SDNP packet routing apply equally to wireline communication such as 802.3 (Gb Ethernet). FIG. 34A illustrates a HyperSphere enabled wireline router 570, forming a bridge among multiple Ethernet MAC addresses 575a, 575b, and 575c. The router-bridge combines three communication stacks 577a, 577b, and 577c facilitating routing among Ethernet connections 576a, 576b, and 576c. The host platform comprises interface circuitry & radio host kernel, (herein "kernel") 571 connected to host processor 574, to local data storage (nonvolatile memory) 573, to the PHY Layer 1 of 802.3 (Ethernet) communication stacks, namely 579a, 579b, and 579c.

Data packets carried by any of the Ethernet connections, e.g. 576b, are interpreted by the corresponding communication stack 577b and passed via L2 data link 578b to kernel 571. In accordance with routing instructions received by d'SDNP authority node, HyperSphere router |HR| node 572 processes the incoming packet, parses it into separate payloads. The payloads are then assembled into packets having different IP and optionally MAC addresses, e.g. transferred over unused Ethernet channels 576a and 576c.

The physical media may vary from copper twisted pair to the more common optical fiber at various wavelength of infrared light. The protocol itself may also vary in data rate from 100 Mb/s to 1,000 Mb/s (so called Gb Ethernet) and in cable length from 50 km down to a few meters. For example, multiple Ethernet protocols, once received, are processed, mixed, split, and sent as multiple packets over Ethernet connections 576a through 576c with separate IP addresses and distinct MAC addresses.

Figure 34B:
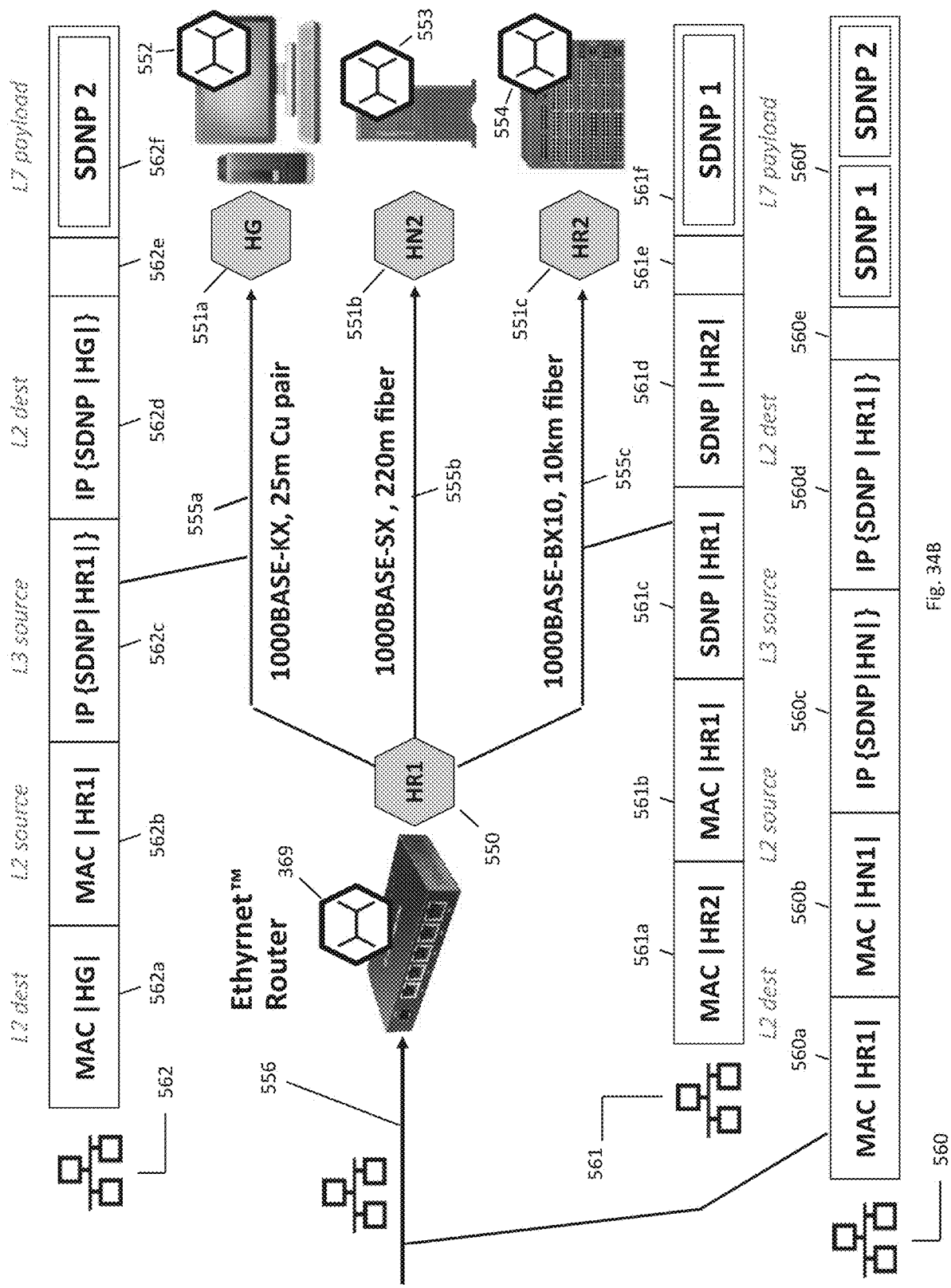
FIG. 34B is an example of Ethyrnet router multi-PHY communication using d'SDNP fragmented data transport over multiple 802.3 compatible Ethernet mediums and protocols.

The HyperSphere enabled Ethernet router (herein referred to as a Ethyrnet router) uniquely involves a process of mixing and splitting data packets and sending or receiving them over multiple Ethernet channels. This fragmented transport methodology is exemplified in FIG. 34B where data packets carried by Ethernet wireline 556 are received by Ethyrnet quad channel router 369, split, recombined into new payloads, and forwarded by router |HR1| via multiple hypersecure channels. The wireline channel may include channel 555a comprising 100BASE-KX (over copper), channel 555b comprising 1000BASE-SX limited to 220m optical fiber, and channel 555c 1000BASE-BX10 capable of supporting up to 10-km fiber communication.

The destination of any Ethyrnet packet depends on packet routing determined by the dispatcher function of the HyperSphere's |A| authority nodes. Examples include |HG| gateway 551a hosted by personal computer 552, |HN| HyperNode 551b hosted by server 553, or HyperSphere router |HR2| hosted on high bandwidth router 554. Packet construction is managed using HyperSphere portal software, comprising |HR| router 550, |HG| gateway 551a, |HN2| HyperNode 551b, or |HR2| router 551c. As in the prior WiFi example, for brevity's sake the abbreviation L2 shall mean data link Layer-2 and L3 shall mean network Layer-3. Although the example shows three Ethernet wireline connections, the number of router channels may be increased with virtually no adverse impact on device performance.

Referring again to FIG. 34B incoming Ethernet packet 560 is routed from a server hosting HyperNode |HN1| (not shown) at L2 source address 560b (with a value MAC |HN1|) and a L3 source address 560c (with a value IP {SDNP |HN1|}). Ethernet packet 560 is routed to HyperSphere Ethyrnet router 369 hosting router node |HR1| 550 at L2 destination address 560a (with a value MAC |HR1|) and a L3 destination address 560d (with a value IP {SDNP |HR1|}). Blank field 560e contains L4 to L6 data left blank for clarity's sake. The payload 560f of incoming Ethernet packet 560 contains both SDNP1 and SDNP2 sub-packets.

After payload processing and concealment, packet 561 is routed from Ethyrnet router 369 hosting router node |HR1| 550 at L2 source address 561b (with a value MAC |HR1|) and a L3 source address 531c (with a value IP {SDNP |HR1|} where HR1 is the 1st IP address). Ethyrnet packet 561 is routed to high bandwidth router 554 hosting router |HR2| 551c at L2 destination address 561a (with a value MAC |HR2|}) and a L3 destination address 561d (with a value IP {SDNP |HR2| }). Empty field 511e contains L4 to L6 data left blank for clarity's sake. The payload 561f of WiFi packet 561 contains only SDNP1 sub-packets.

After payload processing and concealment, packet 562 is routed from Ethyrnet router 369 hosting router node |HR1| 550 at L2 source address 562b (with a value MAC |HR1|) and a L3 source address 561c (with a value IP {SDNP |HR1|}) where HR1 is the 2nd IP address). Ethyrnet packet 562 is routed to desktop 552 hosting gateway |HG| 551a at L2 destination address 562a (with a value MAC |HG|) and a L3 destination address 562d (with a value IP {SDNP HR2|}). Empty field 562e contains L4 to L6 data left blank for clarity's sake. The payload 562f of WiFi packet 562 contains only SDNP2 sub-packets.

Another example of HyperSphere communication is in cable modems used to connect homes and businesses to high-speed wireline connections. Like the descriptions of HyFi and Ethyrnet routers described previously in this application, content distribution using DOCSIS-3 over cable and fiber is bidirectional capable of full duplex operation, using packet switched technology. Cable operators use a special protocol called DOCSIS-3 to manage content distribution and high-bandwidth communication traffic over hybrid networks of fiber and coaxial cable. An acronym for "Data Over Cable Service Interface Specification," is an international telecommunications standard designed to support a dynamic blend of Internet, audio, and video (media) content audio including unicast HDTV, subscription HDTV (including broadcast television content), pay-per-view HDTV, and web-streaming services. CableLabs released the 'DOCSIS-3.1 Full Duplex' (or D3.1-FD for short) specification in October 2017 supporting symmetrical speeds of 10 Gb/s.

Although cable TV represents a declining business, the advent of Internet video streaming services is creating new demand for the high bandwidth offered by cable systems. This trend is forcing new alliances between global Internet cloud-as-a-service (CaaS) providers and cable network operators in order to enhance Last Mile performance to homes and merchants, e.g. Google-Comcast is deploying an extensive cable network for global key client businesses such as Starbucks, who broadcast their own music channels to all their locations. Since significant Internet traffic comes from clients in coffee shop chain using unsecured public WiFi, the potential for cybercrime is enormous. As such, privacy and security protections over cable networks are important considerations in modern networking.

Figure 35A:
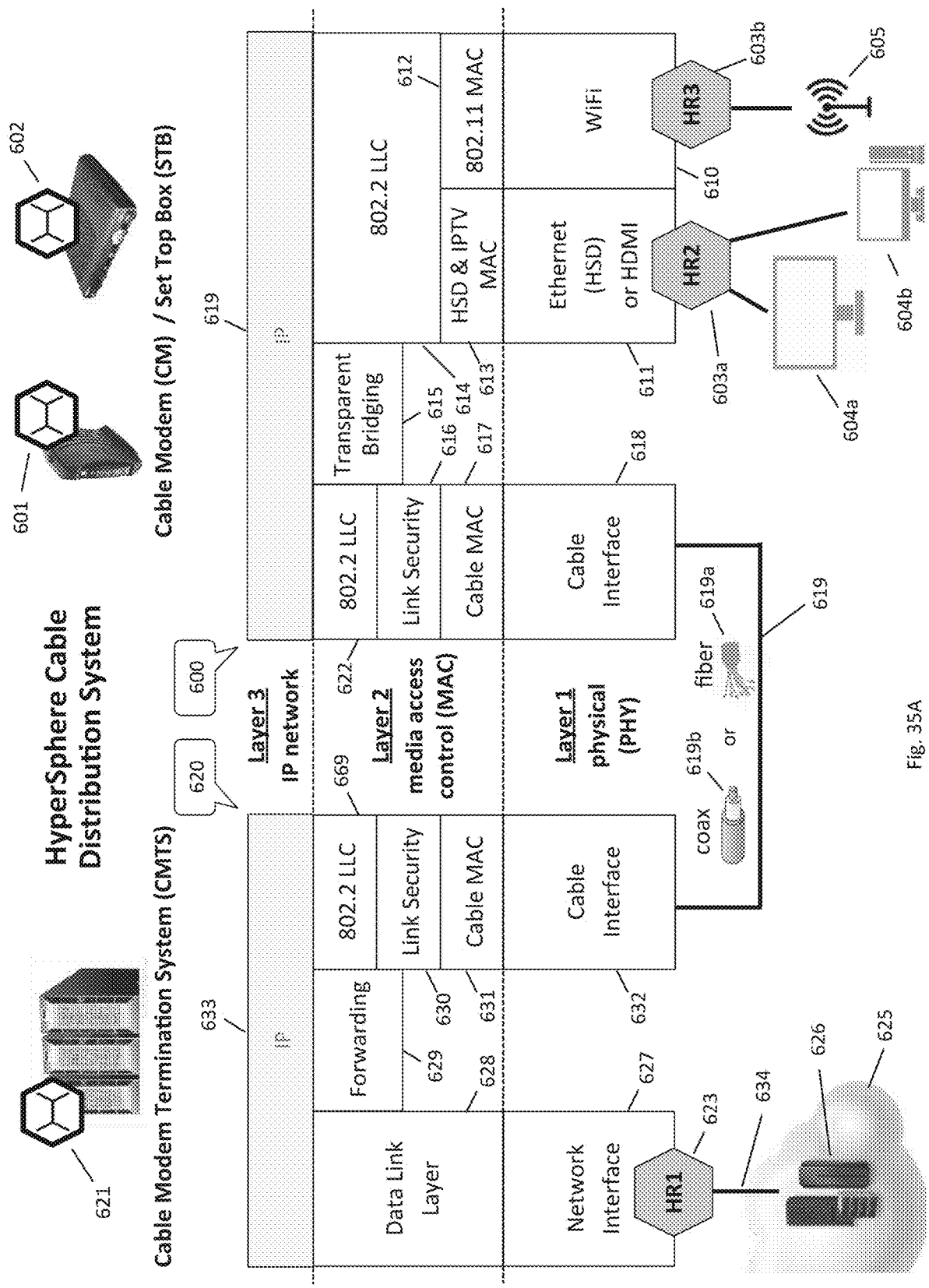
FIG. 35A is a schematic representation of a HyperSphere cable system comprising d'SDNP enabled communication stacks for cable modem termination system (head unit) and multiple cable modem (or STB) downstream devices.

By employing light instead of electrical or microwave signals to carry information on its PHY layer, optical fiber, in particular offers superior bandwidth compared to other forms of communication. The OSI communication stack for DOCSIS3 in a cable distribution system is illustrated in FIG. 35A illustrates Layer 1 PHY connectivity and the Layer 2 data link made in accordance with the specification. The DOCSIS specification remains agnostic as to the use of network Layer-3 data.

In order to provide content distribution and video streaming combined with full-duplex high-bandwidth communication, cable distribution services employ a multichannel up-stream device referred to as Cable Modem Termination System (CMTS) 621 combined with multiple client devices comprising cable modems (CM) 601 or set-top boxes (STB) 602 deployed in client's homes and businesses. Specifically, cable modem termination device CMTS 621 and its corresponding communication stack 620 contains a Layer-1 PHY network interface 627 connected to cloud severs 625 and Internet cloud 625 over wireline 623, or alternatively to various media and content sources including a video head-end, IPTV, or VoIP systems (not shown). The combination of network interface 625 and data link layer 628 comprise the device interface communication stack of CMTS 621.

On data link Layer 2, data is passed from the network interface communication stack to the cable network interface communication stack through forwarding function 629, specifically into link level control LLC 669. Link level control LLC 669 comprises a hardware-independent protocol defined in accordance with IEEE specification 802.2. The packet data is then modified by link security 630 to provide limited packet security, primarily to prevent unauthorized viewing of content such as pay-per-view unicast broadcasts. The data packets are then formatted in accordance with DOCSIS3 to include cable MAC 631 addresses for distribution to cable modems and set top boxes.

The Layer-1 PHY cable interface 632 then sends the data frames over cable distribution network 619 comprising either coaxial cable 619b or optical fiber 619a to the corresponding Layer-1 PHY cable interface 618 within communication stack 600 of cable modem CM 601 or set top box STB 602.

Upon receiving a data packet, cable MAC interface 617 then interprets the cable MAC addresses, passing its payload to link security 616 for decryption and ultimately to hardware independent link layer control LLC 622 for interpretation. The input data to the CM or STB cable network communication stack 600 is then passed through transparent bridging 613 to the CM or STB device portion of the interface communication stack, specifically to device independent link layer control LLC 614 made in accordance with the specification for IEEE 802.2. The packet is then passed to either HSD & IPTV MAC block 613 or to WiFi 802.11 MAC block 612 to update the packet's MAC addresses. In the case of WiFi communication, the data packet is then passed from 802.11 MAC block 612 to WiFi PHY Layer 1 radio interface 610 for transmission on WiFi radio 605. In the case of wireline connections, the data packet is then passed from HSD & IPTV MAC block 613 to Ethernet or HDMI interface block 611 for connecting to smart HDTV 604a or desktop 604b.

Figure 35B:
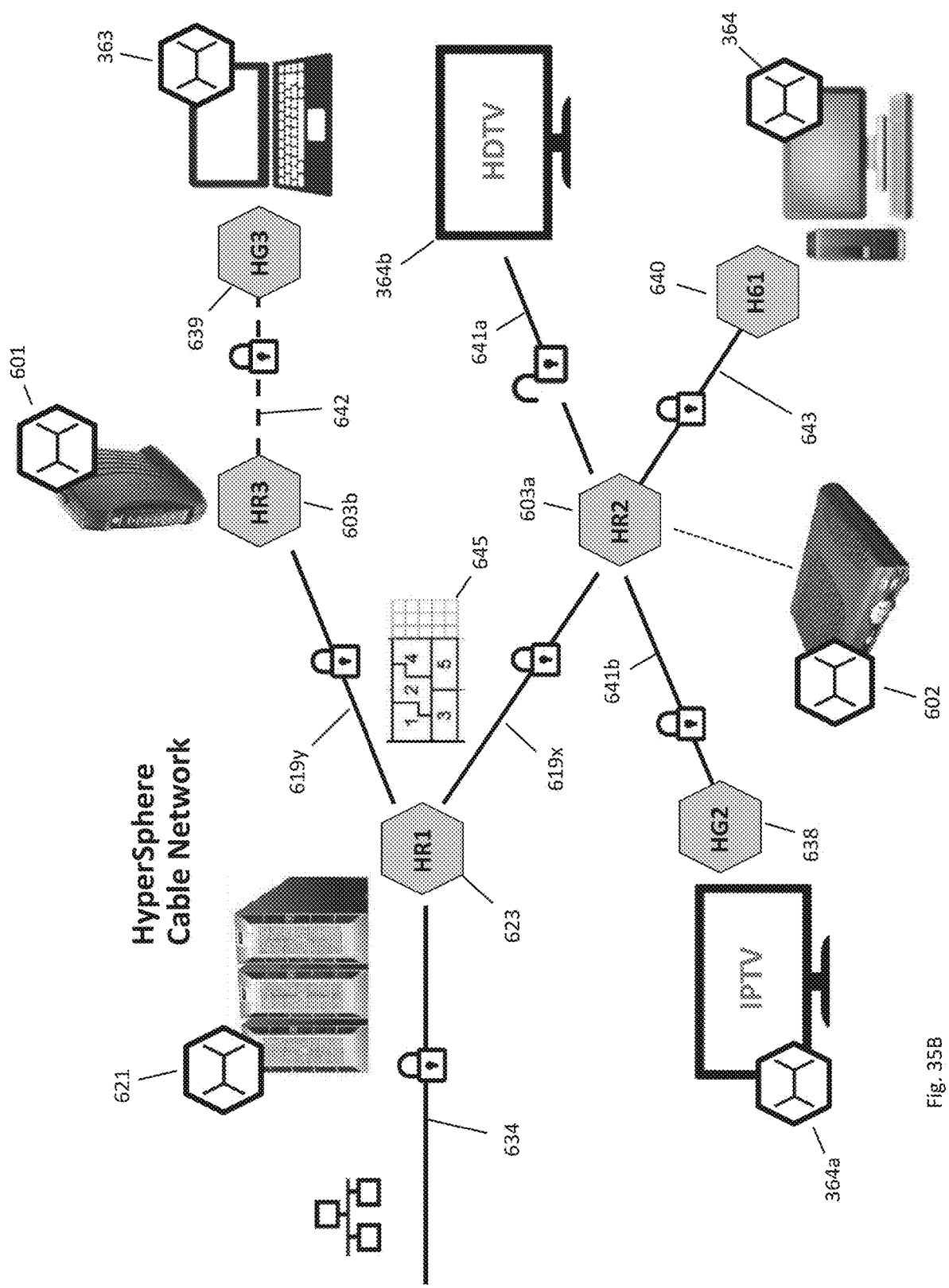
FIG. 35B is an example of d'SDNP fragmented data transport employing trellis coded multi-channel DOCSIS3 cable communication.

Because of external connections to network interface 627, to Ethernet 611, and to WiFi 610, cable networks suffer the same security vulnerabilities as any TCP/IP based network. As a result, the installation of HyperSphere router software facilitates hypersecure communication with no need to alter the DOCSIS3 protocol. Specifically, to secure the network port of CMTS 621, HyperSphere router software |HR1| 623 is installed in communication stack 620. Similarly, to ensure port security for Ethernet 611 and WiFi 610 HyperSphere router software |HR2| 603a and |HR3| are installed in either CM 601 or STB 602. The resulting HyperSphere enabled hypersecure cable network is shown in FIG. 35B, comprising HyperSphere router |HR1| 623 hosted by CMTS 621, router |HR2| 603a hosted by STB 602, and router |HR3| 603b hosted by CM 601.

Communicating with other HyperNodes in the d'SDNP cloud (not shown), HyperSphere router |HR1| 623 facilitates secure wireline communication over Ethernet 634 to the HyperSphere. WiFi communication link 642 between cable modem 601 and notebook 363 is secured by HyperSphere router |HR3| 603b and HyperSphere gateway |HG3| 639, software installed into their corresponding host devices as shown. Similarly installed HyperSphere portal software secures other last link connections including Ethernet link 642 between router |HR2| 603a hosted on set top box 602 and HyperSphere gateway |HG2| 640 hosted on notebook 363; as well as Ethernet link 641b between |HR2| and gateway |HG2| 638 hosted on IPTV 364a. Note that HDMI connection 641a to HDTV 364b is not secure because the client device lacks HyperSphere portal software.

Another unique embodiment of this invention relates to hypersecure communication between CMTS 621 and client device CM 601 over fiber link 619y and to STB 602 over fiber connection 619x, involving a cable-specific data modulation scheme referred to as trellis encoding 645. By adapting d'SDNP routing to employ "trellis encoding" 645, different IP and MAC addresses can be carried within the cable distribution sharing a common PHY layer (optical fiber). Similar to OFDM used in WiFi or OFDMA used in 4G/LTE and 5G communications, DOCSIS3 communication employs multiple orthogonal, i.e. non-overlapping frequencies, either in the microwave or optical spectrum of electromagnetic radiation in which in encodes and transmits its information. Rather than assigning content specifically dedicated to each channel, in trellis encoding, video and high-speed data across are dynamically allocated across all available frequency channels based on demand.

Figure 35C:
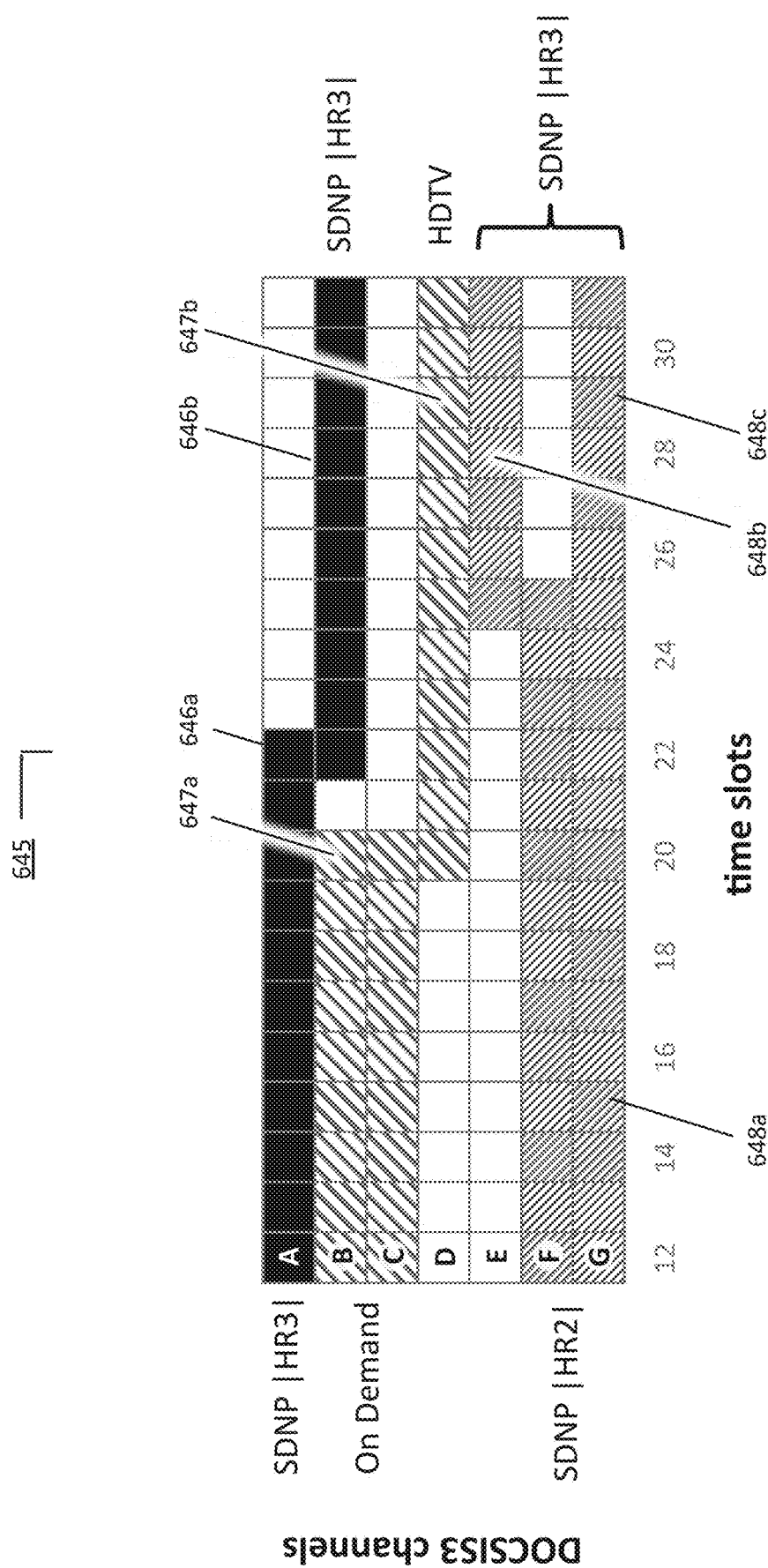
FIG. 35C is an example of the trellis coding of multiple d'SDNP channels and HDTV content during DOCSIS3 compatible cable modem operation.

As represented in FIG. 35C, trellis-encoding 645 involves breaking fiber bandwidth into modulation carrier channels (shown as A through G) and into sequential fixed interval time slots. For example, on-demand video carried on channels B and C 647a is reallocated to a single channel D 647b at time slot 20. The dynamic feature of trellis encoding can be adapted to carry d'SDNP datagrams with separate IP addresses and packet specific security provisions. For example, SDNP |HR3| data carried on channel-A 646a changes to channel-B 646b in time slot 22. Concurrently, using entirely different security credentials and algorithms, SDP |HR2| data 648a is carried split across channels F and G using fragmented data transport. At time slot 25, the carriers are reassigned to channels E and G containing fragmented data 648b and 648c. So in a manner similar to transmitting d'SDNP packets across multiple WiFi carrier frequencies or Ethernet cables, DOCSIS3 accommodates d'SDNP transport for hypersecure communications.

Figure 36A:
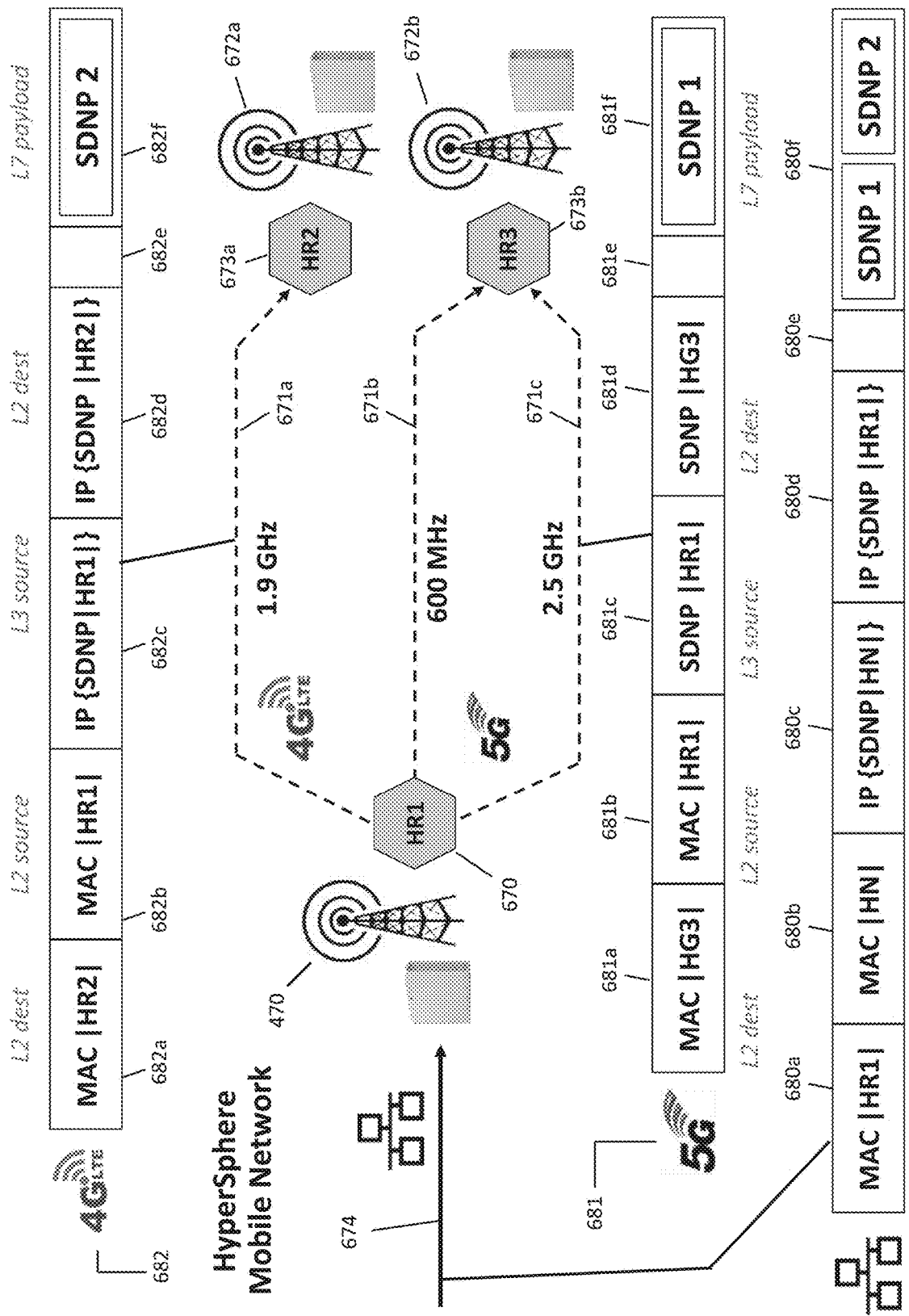
FIG. 36A is a schematic representation of HyperSphere enabled mobile network communication using d'SDNP transport of fragmented data packets over multiple carrier frequencies and cellular protocols (4G and 5G shown by example).

The HyperSphere process of mixing and splitting data packets and sending or receiving them over multiple channels applies to mobile telephony and wireless networks. This fragmented transport methodology is exemplified in FIG. 36A where data packets carried by Ethernet wireline 674 are received by mobile network cell tower 470, then processed by HyperSphere router |HR1| 670 for broadcast over radio carriers 671a at 1.9 GHz, 671b at 600 MHz, and 671c at 2.5 GHz. Carrier 671a connects to HyperSphere router |HR2| hosted by cell phone tower 672a. Carriers 671b and 671c are both routed to HyperSphere router |H32| hosted by cell phone tower 673b.

Although cellular routing employs modulation schemes (2G, 3G/LTE, HSDPA, HSDPA, 5G) and carrier frequencies defined by the PHY Layer-1 and link Layer-2 data and the mobile carrier's network, the ultimate destination of any mobile network packet depends on packet routing determined by the dispatcher function of the HyperSphere's |A| authority nodes. Referring again to FIG. 36A incoming Ethernet packet 680 is routed from a server hosting Hyper-Node |HN| (not shown) at L2 source address 680b (with a value MAC |HR1) and a L3 source address 680c (with a value IP {SDNP |HNR}). Ethernet packet 680 is routed to HyperSphere cell tower 470 hosting router node |HR1| 670 at L2 destination address 680a (with a value MAC |HR1|) and a L3 destination address 680d (with a value IP {SDNP |HR1|}). Blank field 680e contains L4 to L6 data left blank for clarity's sake. The payload 680f of incoming Ethernet packet 680 contains both SDNP1 and SDNP2 sub-packets.

After payload processing and concealment, packet 681 is routed from cell phone tower 470 hosting router node |HR1| 670 at L2 source address 681b (with a value MAC |HR1|) and a L3 source address 681c (with a value IP {SDNP |HR1|} where HR1 is the $1^{st}$ IP address). Mobile 5G packet 681 is routed over radio link 671c to cell tower 672b hosting router |HR3| 673b at L2 destination address 681a (with a value MAC |HR3|}) and a L3 destination address 681d (with a value IP {SDNP |HR3|}). Empty field 681e contains L4 to L6 data left blank for clarity's sake. The payload 681f of WiFi packet 681 contains only SDNP1 sub-packets.

In a similar manner, after payload processing and concealment, 4G radio packet 682 is routed from cell phone tower 470 hosting router node |HR1| 670 at L2 source address 682b (with a value MAC |HR1|) and a L3 source address 682c (with a value IP {SDNP |HR1|}) where HR1 is the $2^{nd}$ IP address). Mobile 4G packet 862 is routed to cell tower 672a hosting router node |HR2| 673aa at L2 destination address 682a (with a value MAC |HR2|}) and a L3 destination address 682d (with a value IP {SDNP |HR2| }). Empty field 682e contains L4 to L6 data left blank for clarity's sake. The payload 682f of mobile 4G-packet 682 contains only SDNP2 sub-packets.

Figure 36B:
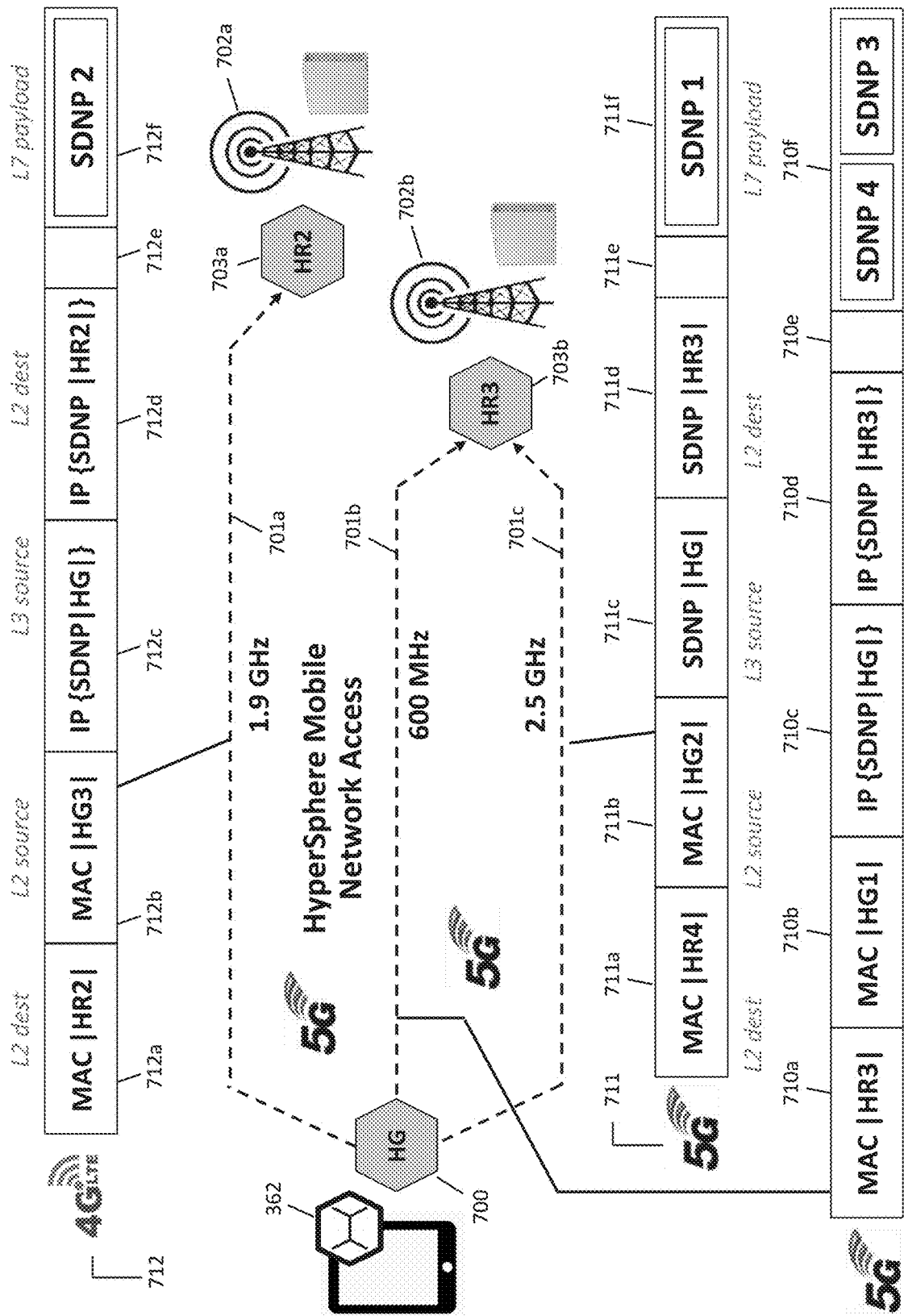
FIG. 36B is a schematic representation of edge device (mobile phone or tablet) access to HyperSphere enabled mobile network, illustrating d'SDNP transport of fragmented data packets over multiple carrier frequencies and cellular protocols (4G and 5G shown by example).

Although fragmented data transport over multi-PHY mobile networks is beneficial for tower-to-tower (T2T) communication and transcontinental routing, the same method can also be adapted to upcoming 5G equipped phones and tablets. This fragmented transport methodology is exemplified in FIG. 36B, wherein data packets carried by tablet 362 and HyperSphere gateway 700 are broadcasted over radio carrier channels 701a at 1.9 GHz, 701b at 600 MHz, and 701c at 2.5 GHz. Carrier 671a connects to HyperSphere router |HR2| hosted by cell phone tower 702a. Carriers 701b and 702c are both routed to HyperSphere router |HR3| hosted by cell phone tower 702b.

As shown, transport of mobile 5G data packets 710, 711, and 712 from cell phone 362 and HyperSphere gateway |HG| 700 occur across three different carriers 701a, 701b, and 701c.

Carrier 701b transporting 5G packet 710 comprises LS source address 710b having a value MAC |HG1| where HG1 represents the 600 MHz band of cell phone 700. The L2 destination 710a of the packet is MAC |HR3| an address assigned by HyperSphere router 703b. Network routing of data packet 710 from L3 source address 710c to L3 destination address 710d occurs using dynamic IP addresses of the source as IP {SDNP [HG|} and destination IP {SDNP [HR3|}.

Carrier 701a transporting 5G packet 712 comprises LS source address 712b having a value MAC |HG3| where HG3 represents the 1.9 GHz band of cell phone 700. The L2 destination 712a of the packet is MAC |HR2| an address assigned by HyperSphere router 703a. Network routing of data packet 712 from L3 source address 712c to L3 destination address 712d occurs using dynamic IP addresses of the source as IP {SDNP [HG|} and destination IP {SDNP [HR2|}.

Carrier 701c transporting 5G packet 711 comprises LS source address 711b having a value MAC |HG2| where HG2 represents the 2.5 GHz band of cell phone 700. The L2 destination 711a of the packet is MAC |HR4| an address assigned by HyperSphere router 703b. Network routing of data packet 711a from L3 source address 711c to L3 destination address 711d occurs using SDNP addresses, not dynamic addresses) of the source as SDNP [HG| and destination SDNP [HR3|. In this manner routing does not necessarily depend on dynamic IP addresses.

Figure 37A:
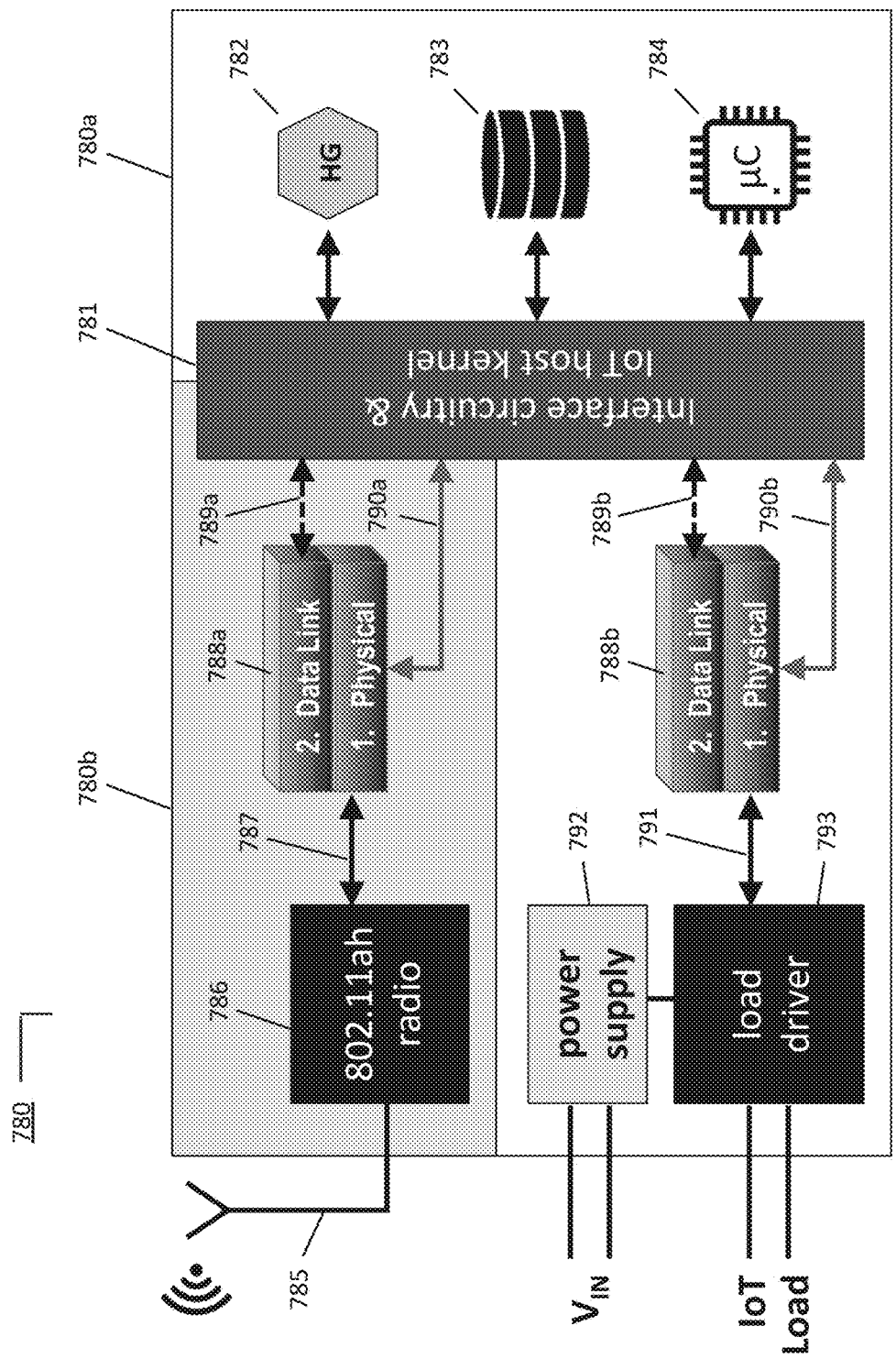
FIG. 37A is a schematic representation of HyperSphere enabled IoT device over 801.11 protocol compatible microwave communication.

HyperSphere Cloud Connected Devices:

Decentralized SDNP routing can also be implemented to secure IoT devices. As shown in FIG. 37A, IoT cloud-connected device 780 comprises WiFi radio 780c and host device 780a including IoT host kernel 781, microcontroller 784, local nonvolatile memory 783, power supply 792, load driver 793, 802.11ah compatible radio 786 and two communication stacks 788a and 788b. In operation signals received by antenna 785 are demodulated and converted to digital data 787 and passed to IoT kernel 781 via connection 790a. Data link information 789a is then processed by HyperNode gateway 782 and the control instructions 789a passed to the data link layer of communication stack 788b, which interprets the information converting PHY digital data 790b into control signals 791 to drive the load via load driver 793 powered by power supply 792.

Figure 37B:
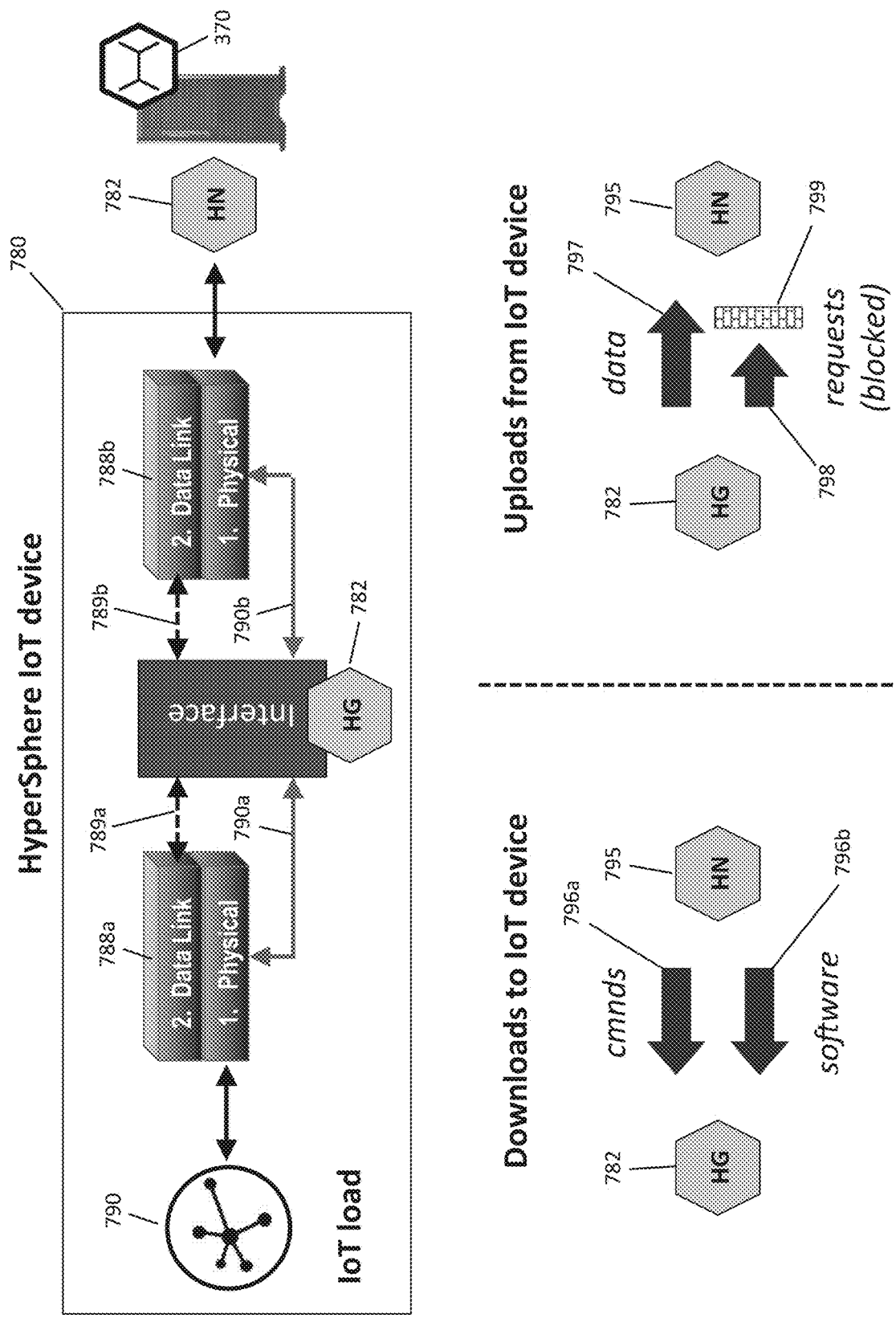
FIG. 37B is a schematic representation of a HyperSphere IoT device illustrating d'SDNP network to IoT datagram download and upload content.

As depicted in FIG. 37B, HyperSphere gateway 782 prevents unauthorized control of IoT device 780, control of the IoT load 790, or usurpation of the network through infiltration of "dumb," low level IoT devices. Using the HyperSphere as a control platform, HyperNodes |HN| 795 can send commands 795a and software downloads into HyperSphere gateway |HG| 782 enabled IoT devices, but uploads from the |HG| node 782 to the local network are limited to data 797. Commands and information requests 799 represent unauthorized access and are blocked by sandbox protections 799.

Figure 37C:
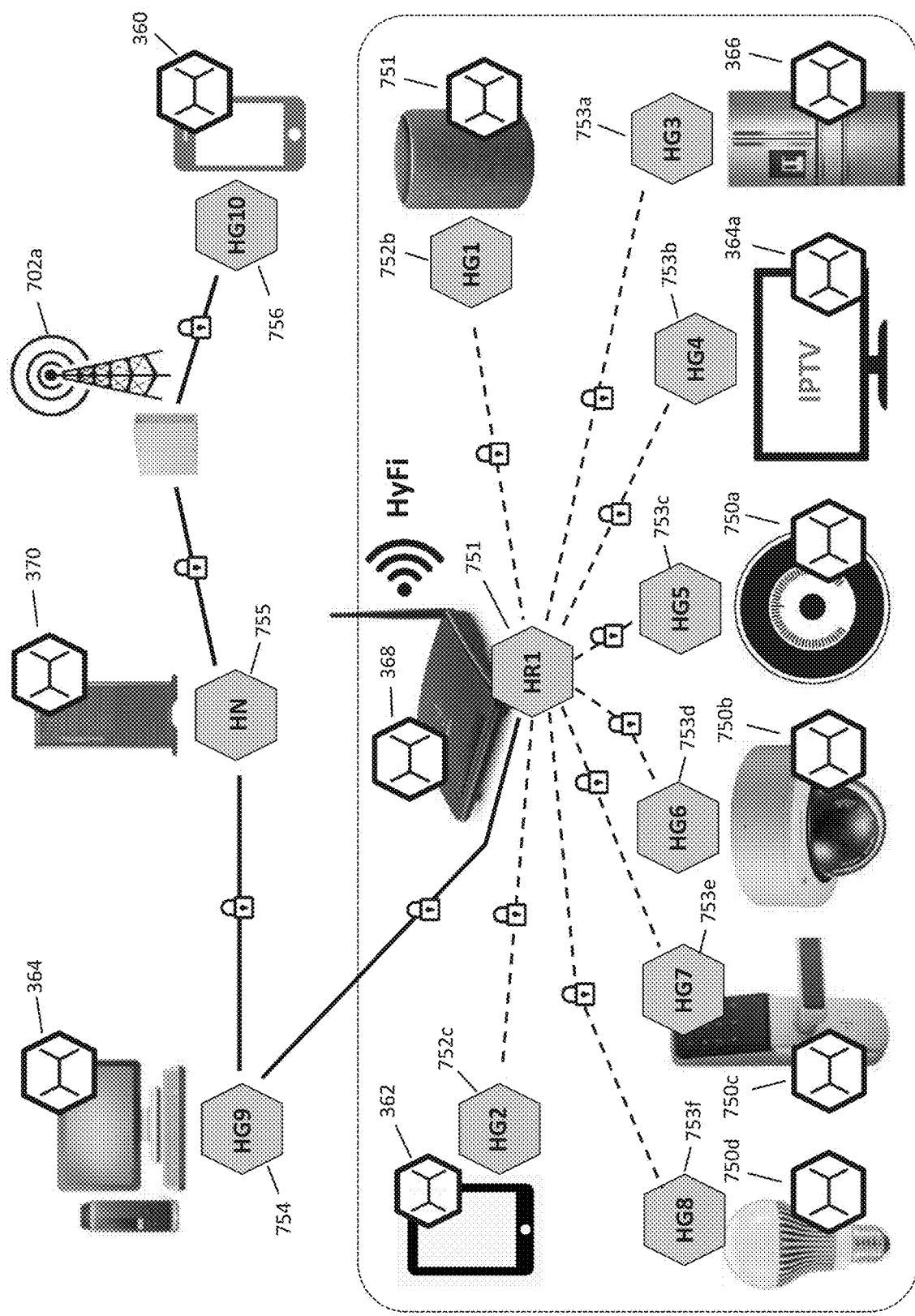
FIG. 37C is a schematic representation of HyperSphere HyFi network control of IoT device cloud.

An example of a HyperSphere protected IoT network is illustrated in FIG. 37C, where wireless router 368 is HyFi enabled by HyperSphere router software |HR1| 751, protecting the entire network from unauthorized intrusion. IoT devices including smart refrigerator 366, IPTV 364a, thermostat or HVAC controller 750a, security camera 750b, IoT door locks 750c and controllable lighting 750d are protected by IoT embedded HyperSphere gateways HG3 753a through HG8 753f, respectively and controlled by application software installed in tablet 362 or personal assistant 751 including protective HyperSphere gateways HG2 752c and HG1 752a. Secure control of the IoT devices outside of the trusted HyFi zone can be accomplished using wireline connected desktop 364 hosting HyperSphere gateway |HG9| 754, or controlled via cell pone 360 through HyperSphere gateway 756 facilitating a hypersecure network through cell tower 702a to server 370 hosted HyperNode |HN| 755 comprising one of many decentralized nodes in the HyperSphere.

Figure 38A:
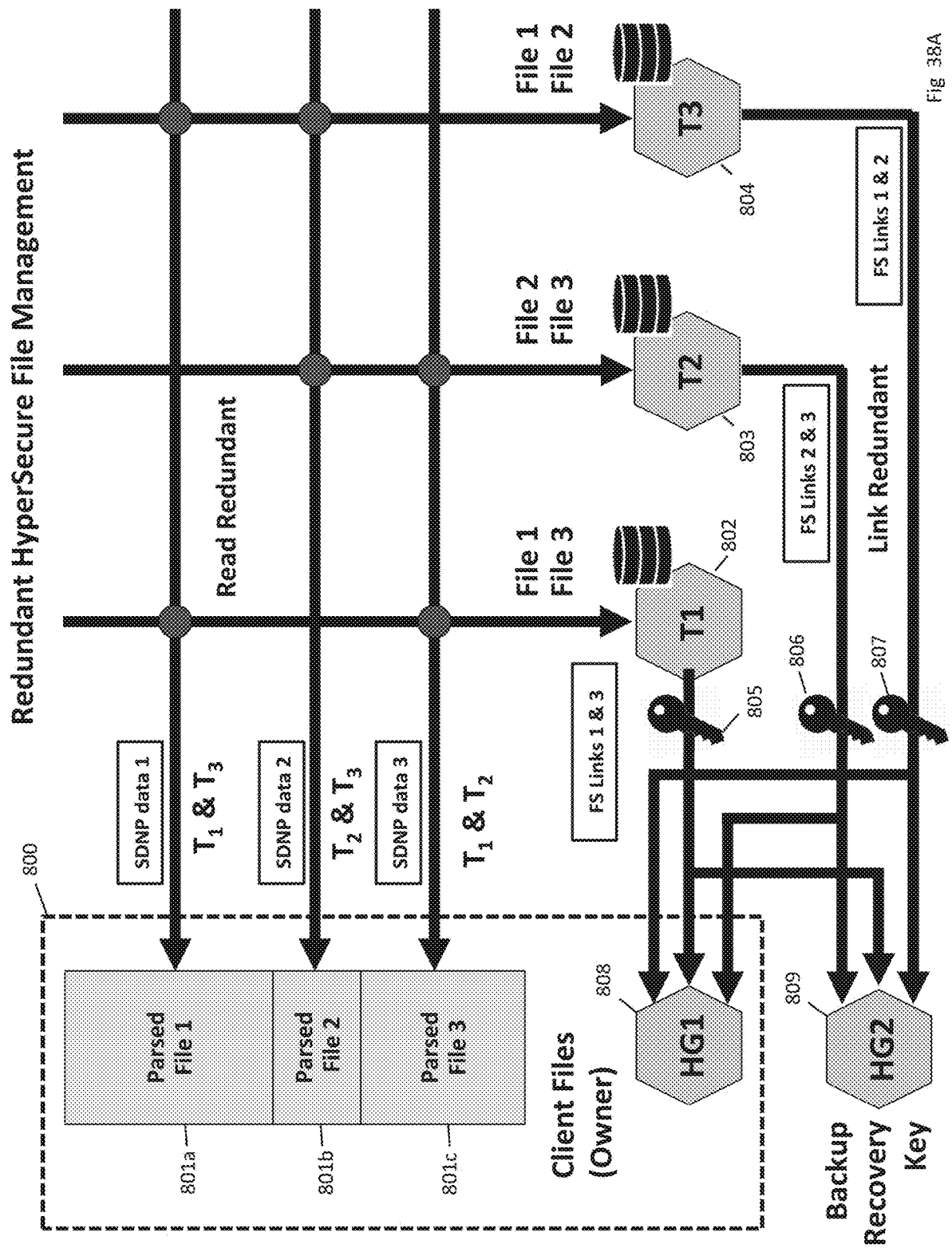
FIG. 38A is a schematic representation of a hypersecure cloud for disaggregated data storage of client-owned files with redundant storage elements and recovery mechanisms.

HyperSphere Diffuse Data Cloud Storage:

FIG. 38 illustrates the redundant file storage of user data. For example a parsed file of client files 801a, 801b, 801c is written into a number of storage servers 802, 803, and 803 respectively comprising task nodes |T1|, |T2|, and |T3| collectively performing diffuse cloud storage for client data 800. As shown, parsed file 1 comprising data 801a is redundantly stored on both |T1| and |T3| and others (not shown); parsed file 2 comprising data 801b is redundantly stored on both |T2| and |T3| and others; and parsed file 3 comprising data 801c is redundantly stored on both |T1| and |T3| and others.

The storage of file 1 and file 3 in |T1₃|, file 2 and file 3 in |T2|, and file 1 and file 2 in |T3| automatically generate file storage access link keys 805, 806, and 807 respectively, all of which are stored redundantly on client HyperSphere gateway devices |HG1| and |HG2₇| hosted on servers 808 and 809, respectively, and others (not shown). If any |T| storage node goes offline, the data is cloned onto another name server node. In one embodiment, each |T| node issues and maintains a dynamic HyperContract listing backup servers, currently online. If a server goes offline, the HyperContract automatically clones the data to another server, which in turn issues a new backup HyperContract, perpetually ad infinitum.

Figure 38B:
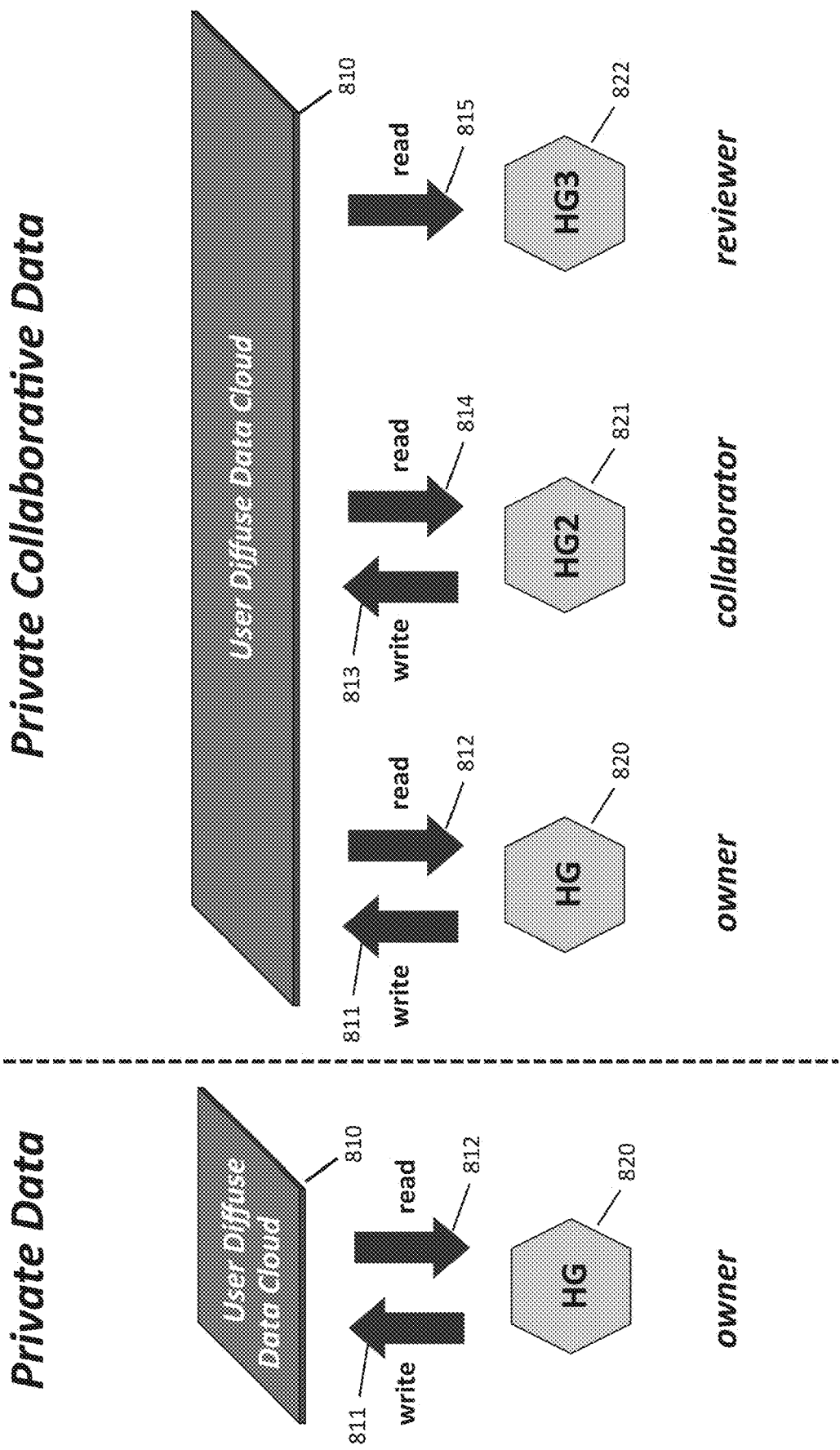
FIG. 38B is a schematic representation of the access control of user-owned diffuse-data cloud including both private data and collaborative files.

As shown in FIG. 38B, disaggregated data stored for a user in the HyperSphere can be retained for private use, for example where the data owner uses HyperSphere gateway |HG| 820 to facilitate write 811 and read access 812 to user diffuse data cloud 810, or alternative to share write 813 and read 814 access to the cloud with collaborator gateway device |HG2| 821 or just offer read 823 access to reviewers via gateway device |HG3| 822.

Figure 39A:
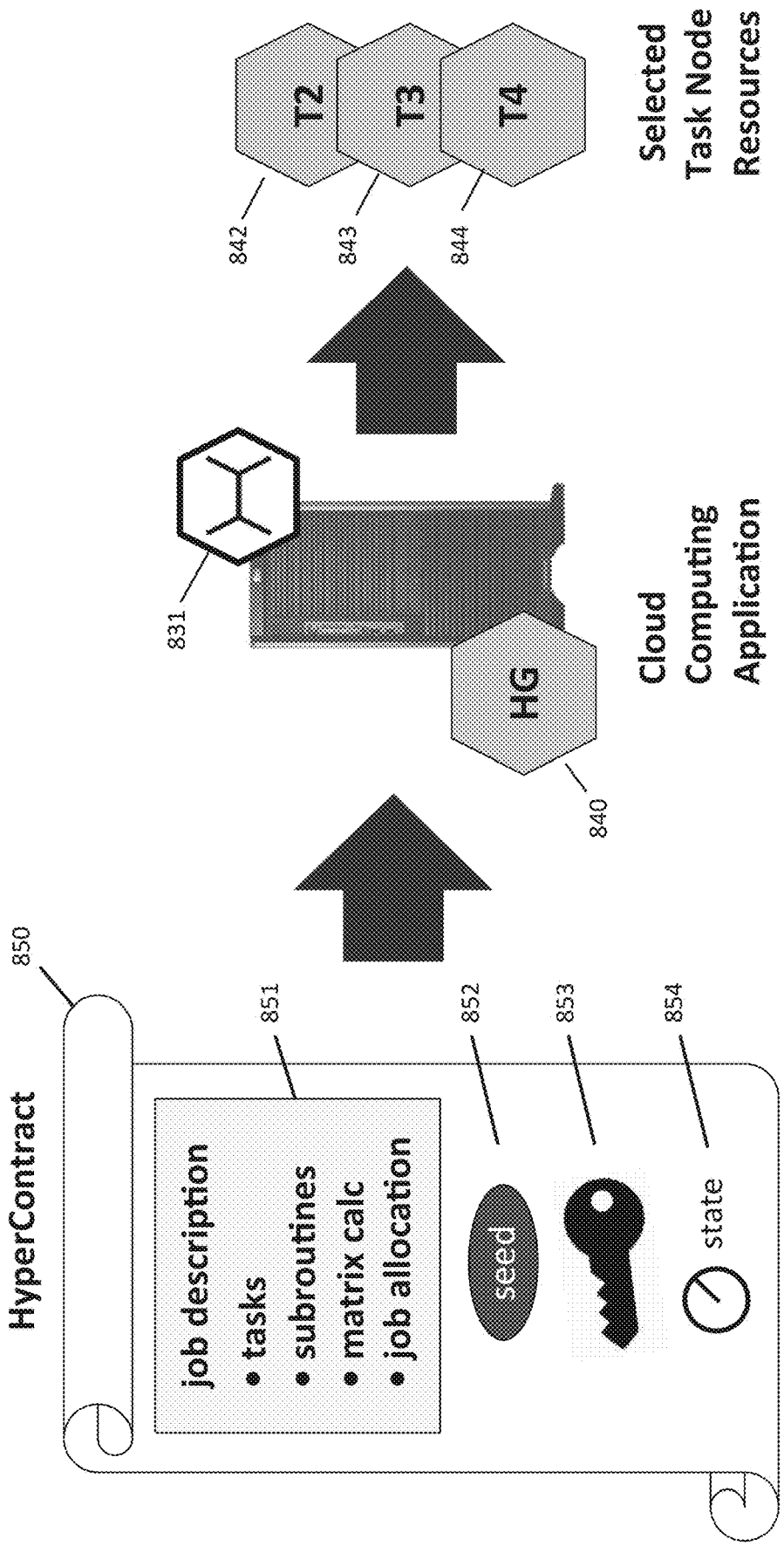
FIG. 39A is a flow chart showing a HyperContract job specification of a HyperSphere cloud computing application.

HyperSphere Distributed Computing:

The HyperSphere's hypersecure communication cloud is also well suited for cloud computing facilitating secure and rapid data transfers across the d'SDNP cloud. As shown in FIG. 39A, a cloud computing application hosted on server 831 comprising a HyperSphere portal via gateway |HG| 840 is instructed by HyperContract 850, a computing job comprising a series of tasks defined by job description 851 (including tasks, subroutines, matrix calculations, and job allocation) along with security related information including numeric seed 852, cryptographic key 853, and state 854. The gateway node |HG| 840 then allocates the job to a number of selected task nodes 842, 843, 844 and others.

Figure 39B:
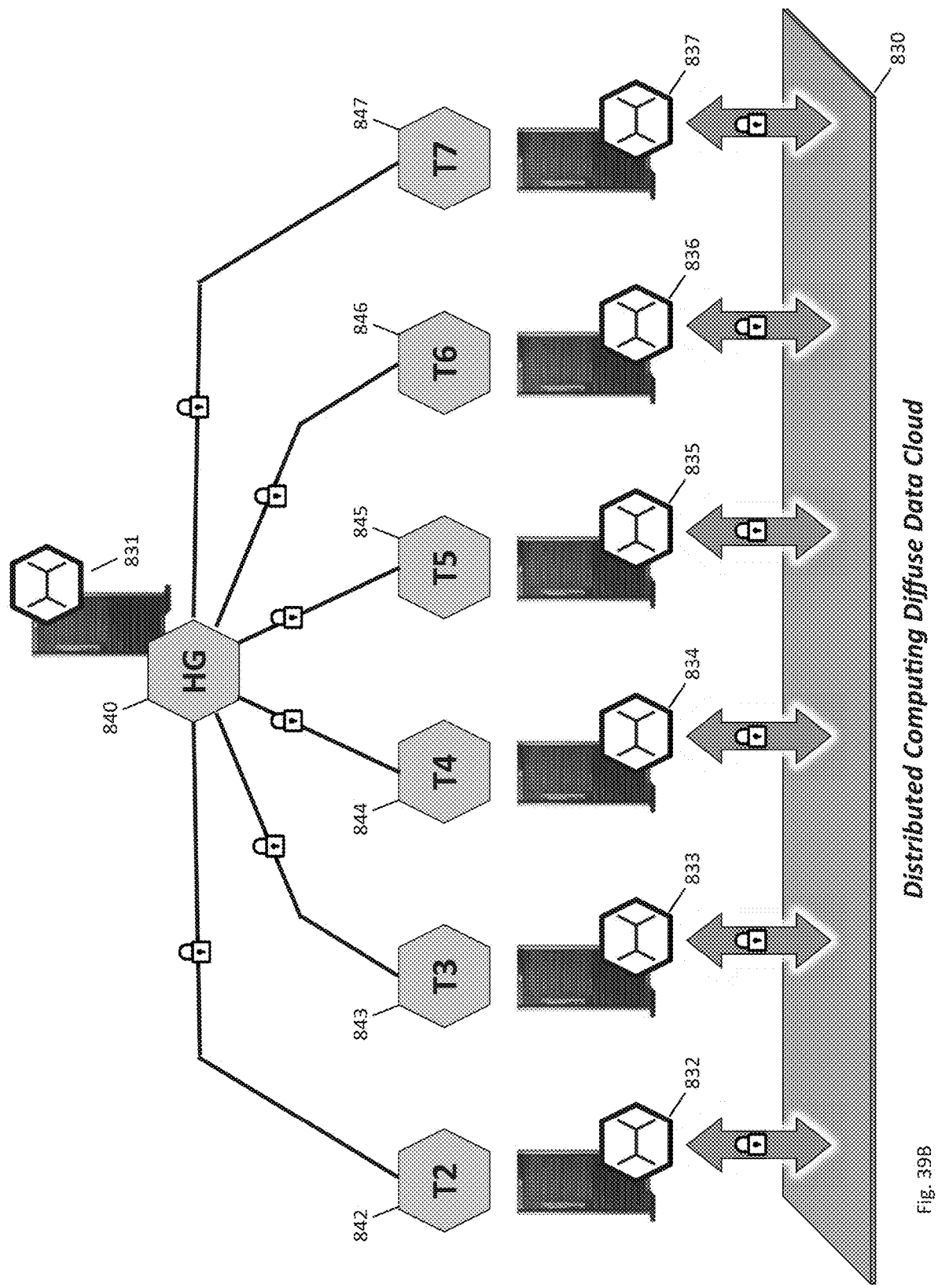
FIG. 39B is a flow chart showing the hypersecure job execution of a HyperSphere cloud computing application.

As shown in FIG. 39B, HyperSphere gateway node |HG| 840 then establishes a secure session link and communication channel with servers 832 through 837 whose installed HyperNodes morph into task nodes |T2| 842 through |T7| 847. The job instruction and security credentials also enable the task nodes to access distributed computing diffuse data cloud 850 in order to upload and download files during job execution.

Summary of HyperSphere Decentralized Communication Public-Private Network:

The HyperSphere's unique connectivity facilitates the above electronic business processes using a single common-communications platform supporting interoperability and decentralized applications not possible over the Internet. Unlike public-network hosted communication and transactions executed over-the-top of TCP/IP, the HyperSphere operates independently from, yet co-existing with, the Internet, using a global dynamic real-time meshed network. The d'SDNP network is dynamic, able to automatically expand or contract to match regional resources with changing demand while ensuring that the routing of data packets occurs over the shortest propagation delay paths. In this way HyperSphere network communication maintains superior real-time performance and quality-of-service (QoS) for voice communication and live video. HyperSphere communication employs "hypersecure" protocols, using dynamic network communication methods far beyond simple encryption techniques, sending the data packets on different and changing routes and using anonymous data packets comprising ever-changing encryption and security methods to prevent access or monitoring.

The HyperSphere applies these techniques equally to voice, video, text and video communication, to distributed computing tasks, and to HyperSphere financial transactions, thereby preventing any "meaningful" surveillance of network traffic while obfuscating the identity of its users, camouflaging the ultimate source and destination of data packets, and categorically thwarting man-in-the-middle (MiM) attacks. The HyperSphere's network co-exists in parallel with the Internet, sharing some physical-layer connections with cellular networks and the Internet but otherwise operating as a completely independent and parallel system, i.e. metaphorically as "Internet 2.0".

Physical realization of the HyperSphere network comprises a heterogeneous cloud of HyperSphere node portals—connections to the HyperSphere comprising HyperNodes, HyperSphere routers and HyperSphere gateways. These nodes comprise application software downloaded onto any computing or communication device, applicable for any size device ranging from global server networks to home PCs, or smartphone to IoT light bulbs. The number of nodes in the HyperSphere naturally grows in proportion to user adoption, requiring no investment in infrastructure to deploy, and no capital expense to expand coverage, improve capability, or enhance performance. So, although the HyperSphere's network is public in the sense that any individual or company may join it by downloading and activating a HyperNode, it routes and secures all data transport as a private network. In this manner, a large group of users can exchange private communication as a fully distributed private network even though the private cloud is coexisting within the public HyperSphere. In that sense the HyperSphere could paradoxically referred to as a "public-private" network.

As an alternative description, a private HyperSpheric cloud operating within the public HyperSphere operates like an ad hoc virtual private network (VPN), but with no need to establish the VPN prior to making a call or sending a file. The publicly hosted private cloud could be described as a self-launching VPN or alternatively as an autonomous VPN. The same self-launching mechanism can be used to create an ad hoc peer-to-peer network. In such cases, any HyperNode being cut off from the cloud automatically looks for nearby devices hosting HyperNodes to connect to even if no cellular or WiFi network exists in the vicinity. Each device in turn searches for other HyperNode host devices until the cloud connection can be re-established.

Collectively then, HyperNodes form the HyperSphere's network, not the physical devices that host them. There is no limitation how many HyperNodes may co-exist on a single server or on a common piece of hardware. For example, although the HyperSphere may directly launch its own HyperNode on a specific AWS server, nothing prevents a regular client of AWS services from installing and launching its own HyperNodes over the AWS cloud or even on the same server (so long as the client pays AWS for its own data traffic). Since HyperNodes hosted by a commercial cloud and clients using the same cloud have their own separate digital signatures and owners, the HyperSphere considers the HyperNodes as independent resource suppliers, and even as competitors.

For example, an AWS Cloud-as-a Service (CaaS) client may be using AWS cloud services to compete for HyperContract business with AWS cloud services. Since the HyperSphere considers each HyperNode as uniquely identified by the digital certificate used to authenticate it, its CA-certificate, the two HyperNodes will appear as competing independent vendors. In cryptoeconomics, like in regular commerce, increased competition naturally drives down costs and improves capital efficiency.

Stateless Meshed Routing:

HyperNodes route data packets through the HyperSphere across a meshed network using anonymous data packets with no centralized control whatsoever. As a dispatcher based communication system and protocol, the jobs of HyperNodes involve one of three interrelated yet independently executed functions:

Identifying devices and HyperNodes chosen to carry data or to execute tasks, referred to as the name server nodes or |NS| nodes.

Determining data packet routing and providing instructions to HyperNodes executing the tasks as well as confirming when a task has been completed, referred to authority nodes or |A| nodes.

Carrying data or executing tasks, referred to as task nodes or |T| nodes (called media nodes in the above-referenced U.S. Pat. No. 9,998,434, titled "Secure Dynamic Communication Network And Protocol" (SDNP), sometimes referred to herein as the "SDNP patent").

As described in the SDNP patent, tri-channel communication over dedicated function SDNP nodes utilizes a name server or device hosting a SDNP name server node, a signaling server or device hosting a SDNP signaling server node, a media server or device hosting a SDNP media server node, and a DMZ server or device, also known as an air-gapped computer', hosting offline functions of a DMZ server. Together these electronic assets, or 'resources' deliver hypersecure communication, multi-level security, and superior performance unparalleled by any network today. In the SDNP patent four key functions—the name server function, the signal server function, the media server function, and the DMZ server supporting shared secrets are hosted on specific computers. Because no one computer has all the information involved in call routing, content, or device addresses, packet transport is secure.

Although the network administrator cannot intercept the dynamic real-time operation of any SDNP node, the fact that computers function as specific types of SDNP nodes, and the fact that a network administrator is responsible for the deployment and allocation of the executable code, mean the SDNP network deployment is not fully decentralized (even though the network's meshed routing operations are decentralized). Using d'SDNP, the HyperSphere's implementation of the network and the SDNP protocol is, in contrast, fully decentralized, meaning no network administrator knows what functions are being hosted by a specific server at any given time.

To achieve this fully decentralized capability, the HyperSphere replaces the dedicated-function SDNP nodes with the newly disclosed metamorphic HyperNode. A metamorphic HyperNode represents software that can perform any one of the aforementioned SDNP functions—name server, signal server, and media (task) server functions, BUT can only perform one of these functions at a time in a given conversation. For example, a metamorphic HyperNode can perform the task node services in one conversation, act as an authority node (signal server) in another call, and function as the name server |NS| in another transactions, but it cannot perform two or more of the task, name server, or authority node functions in the same call or session. In logic, this feature can be considered as an "exclusive OR" function symbolized by $\oplus$. Mathematically the metamorphic HyperNode function |HN| means a functional state comprising "one or another but not more than one", or as |MHN|= (|NS|⊕|A|⊕|T|). The term 'metamorph' refers to an ability to change, i.e. morph, into something else.

In this sense when a call or a transaction is initiated, the metamorphic HyperNode is chosen to serve as one of the three functions, either a |NS|, |A| or |T| HyperNode. Once it is selected to perform one of the three functions, it is automatically excluded from being able to perform the other two functions in the same job. In one embodiment, the job selection of a metamorphic HyperNode is made during HyperContract negotiation in a decentralized AI-based environ referred to as the HyperSphere Marketplace, at which time a HyperNode's selection to serve as name server, authority node, or task node is decided. In the selections process, more HyperNodes are selected than are actually required. These extra "backup" HyperNodes are held in reserve in case a selected HyperNode goes offline or is otherwise unable to fulfill its assigned role.

Once selected for a given role, the HyperNode then acquires the information it needs to perform its assigned task by accessing data stored in the disaggregated data storage of the HyperSphere. The disaggregated data storage layer operates like a DMZ server in the sense that the data it contains cannot be recalled or read directly from the Internet. Only a HyperNode can extract data from the disaggregated data storage layer. During the designed metamorphosis of the HyperNode into a specific type of HyperNode, the Hyper-Contract provides the HyperNode the codes it needs to extract the relevant information from the disaggregated data storage layer. For example, a |NS| HyperNode accesses the necessary node list to do routing. A |T| HyperNode extracts the required state-based concealment algorithms, and an |A| HyperNodes accesses propagation delays. Metaphorically, the process of HyperNode metamorphosis is similar to biological differentiation of human stem cells, cells that can change into nearly all types of specialized cell types. Cytological differentiation of stem cells is based on the environment used as a template to initiate differentiation. Similarly, a metamorphic HyperNode differentiates based on the template it receives from a HyperContract and the information it accesses from the disaggregated data storage layer. Other HyperNodes are used not to execute tasks, but to confirm transactions by functioning as blockchain observers in a jury of peers.

Another key feature of a metamorphic HyperNodes is "stateless" operation. Immediately after completing a task, the HyperNode forgets all the information or instructions it received, experiencing instantaneous amnesia and automatically reverting back to undifferentiated metamorphic Hyper-Node.

No Master Encryption Keys:

Because the HyperSphere comprises a meshed network with decentralized control, execution of concealment mechanisms occurs locally with master encryption keys. As such, each |T| HyperNode receives decryption and encryption keys on a need-to-know basis relating only to the next expected incoming data packet and the next outgoing data packet. In other words, encryption and concealment occurs on a hop-by-hop basis with no master decryption key available to decipher network traffic or its contents. Operating in the manner of a dynamic directed acyclic graph (DyDAG), described later in this application, packet routing involves ever-changing routes and security credentials, meaning no HyperNode state is ever repeated. Even in the unlikely event that a single data packet were to travel through the same node twice, the node's state and security credentials will have changed. This feature means that any attempt to divert network packets to a common server, will result in unreadable content.

No person, group, or corporation owns or controls the HyperSphere, its network, or its operations. Instead, the HyperSphere functions as a non-profit decentralized organization aggregating resources of its corporate, private, and research constituents. Comprising an autonomous network of participating members with virtually no fixed operating costs, merchants and service providers contract and pay resource providers on an as needed basis, with the Hyper-Sphere Foundation having no material interest in any Hyper-Spheric Transactions.

In this manner, the HyperSphere's network is made of its resource providers—a heterogeneous community of devices earning income for their owners mutually interested in protecting privacy for themselves and the HyperSphere's user base. Not to be confused with decentralized applications, as a fully distributed network, packet routing and network security are executed dynamically without central authority. Instead functions are shared among nodes dynamically dividing the tasks of traffic management, packet concealment algorithms and methods, and in the issuance of security credentials and cryptographic keys. In fact, because network encryption and packet concealment is state based, no master keys exist whatsoever. Instead dynamic security is 'state based' occurring dynamically hop-by-hop as data packets traverse the HyperSpheric cloud.

C. HyperSphere Identity & Privacy Provisions

Privacy Protection

Although data packets traverse the network anonymously, HyperNodes represent registered users, whose individual or corporate identity is validated and authenticated whenever a HyperNode joins the network. By facilitating financial transaction traceability, professional identity registration of HyperNode users dissuades criminals in the illegal use of the HyperSphere to engage in crime, money laundering, trafficking, racketeering, or terrorism. Adopting a policy that "identity inspires responsibility", the HyperSphere avoids the Internet's problems of anonymity, overcoming the metaphorical "payphone" problem by ensuring that a user's identity can be traced to their financial transactions even if the content of their communications remains private. Although user registration identifies each HyperNode, stateless network operation still ensures personal and business privacy, where even the network operator is unable to monitor network traffic and packet content.

Identity in the HyperSphere is confirmed using a digital certificate trust chain comprising a digitally verified, i.e. "signed" digital CA-certificate. Such system generated, 'network native' CA-certificates are unique to the HyperSphere. The CA-certificates are used in innumerable ways in the HyperSphere, such as to confirm and authenticate devices, HyperNodes, cryptocurrency wallets, software installation, and perpetual blockchain transactions (chronicling asset debits and credits).

Network Native Certificate Authority

The HyperSphere acts as its own network-native certificate authority in generating identity-trust-chains for its users and their devices. During account setup, the HyperSphere first establishes a parental "identity" certificate as either a verified 'true identity' owner, or alternatively using a pseudonym. For the purpose of banking, asset management, legal and business transactions, a user's true identity must be established through a know-your-client anti-money-laundering (KYC/AML) identity confirmation procedure.

Figure 40:
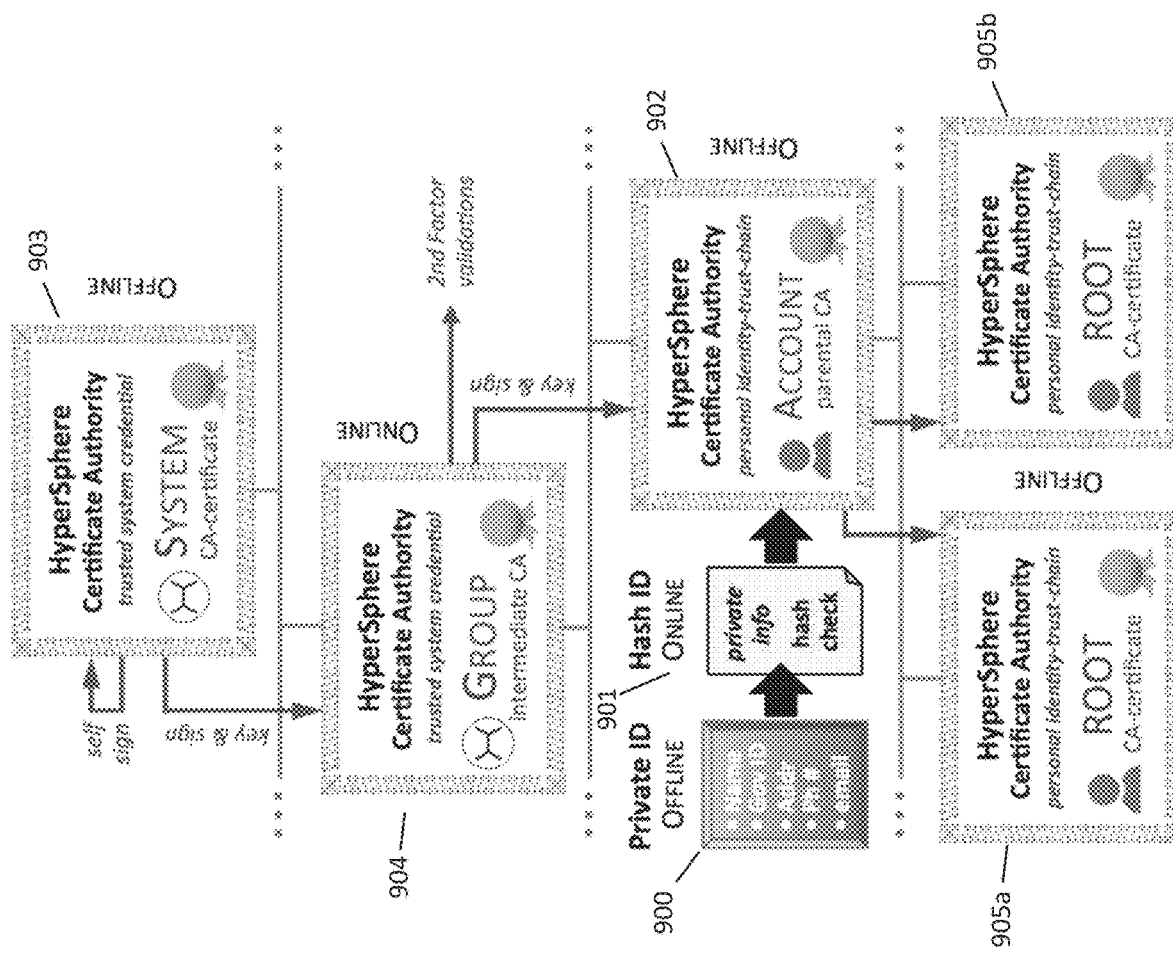
FIG. 40 illustrates the identity trust chain of HyperSphere network native CA certificates, including system and private account parent and root certificates.

The account opening process, shown in FIG. 40, establishes an irrevocable link between a person's identity and their personal identity-trust-chain of CA-certificates. In one embodiment of this invention, personal identity documents 900 are translated into private information using a cryptographic hash to produce a hash ID 901, which is used to generate a parental HyperSphere certificate authority, specifically 'account' CA 902, stored offline for security reasons. Instead of employing an unknown 3rd party certificate authority to issue the account CA 902, the HyperSphere provides system specific digital cryptographic verification through a system CA certificate 903. The system certificate 903 is stored offline in the HyperSphere's diffuse cloud storage, meaning that the system certificate 903 is read-accessible, but not at risk for being corrupted or revised.

The system signed CA certificate 903 is then used to sign a group certificate 904 which may include 2nd factor authentications. HyperSphere generated group CA certificate 904 cannot be duplicated outside of the HyperSphere. By combining its digital signature with hash ID 901, the parental account CA certificate 902 is issued. The parental account CA certificate 902 cannot be counterfeited from outside the HyperSphere. Any party trying to perpetrate or distribute a counterfeit account CA certificate from within the HyperSphere will be detected and their actions traceable to their identity, their accounts, and their assets. This fraud prevention feature is unique to HyperSphere generated trust chains.

Figure 41:
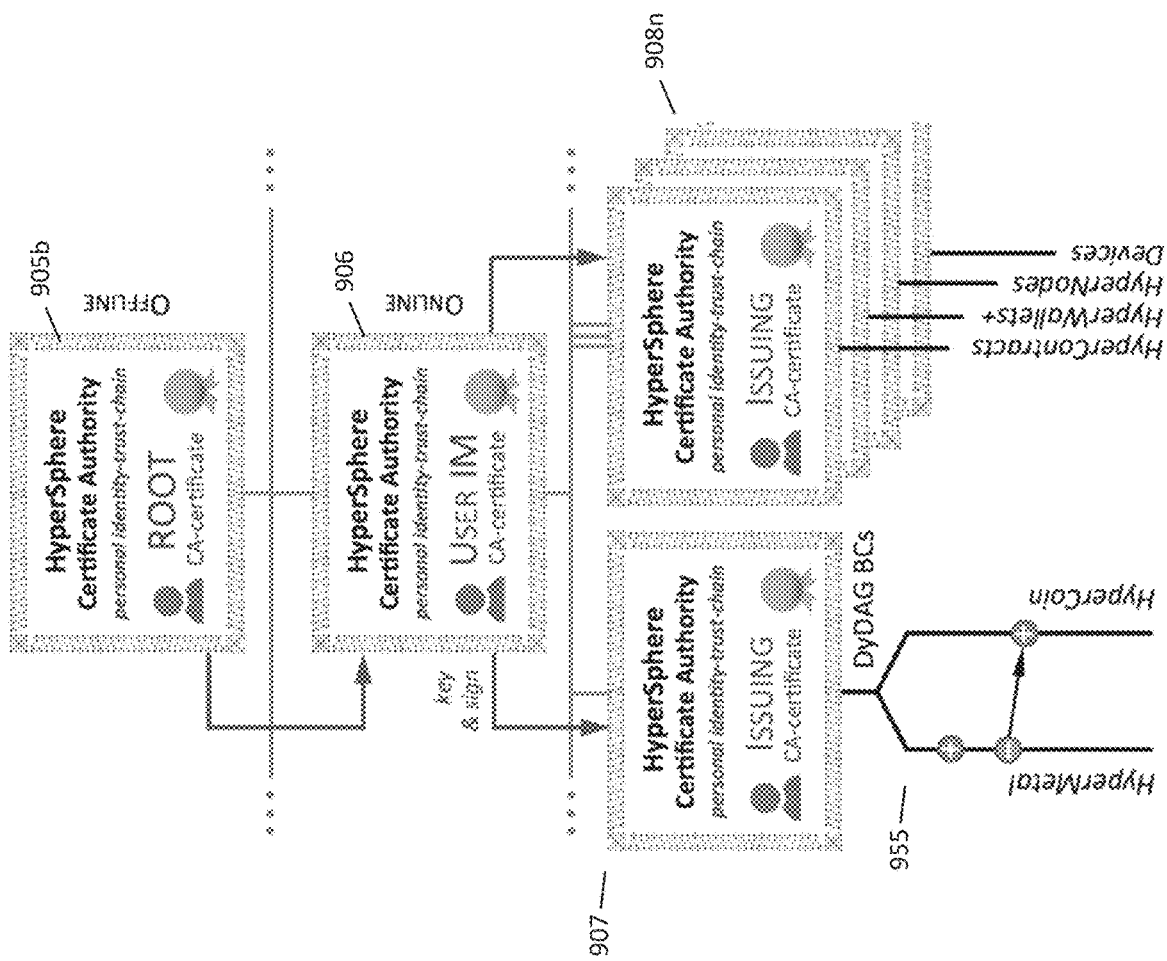
FIG. 41 illustrates the identity trust chain of HyperSphere network native CA certificates comprising root, intermediate and issuing (leaf) certificates signing blockchains, devices, and wallets.

Thereafter, account certificate 902 is used to generate root certificates 905a and 905b. As shown in FIG. 41, offline root certificate 905b is then used to sign an online CA-certificate 906, which in turn is used to generate 'leaf' or 'issuing' certificates 907 (used to sign HyperSphere blockchain records of assets), and multiple CA's, collectively designated as 908n, which are used to verify and sign wallets, contracts, devices and installed software (such as HyperNodes).

Figure 42:
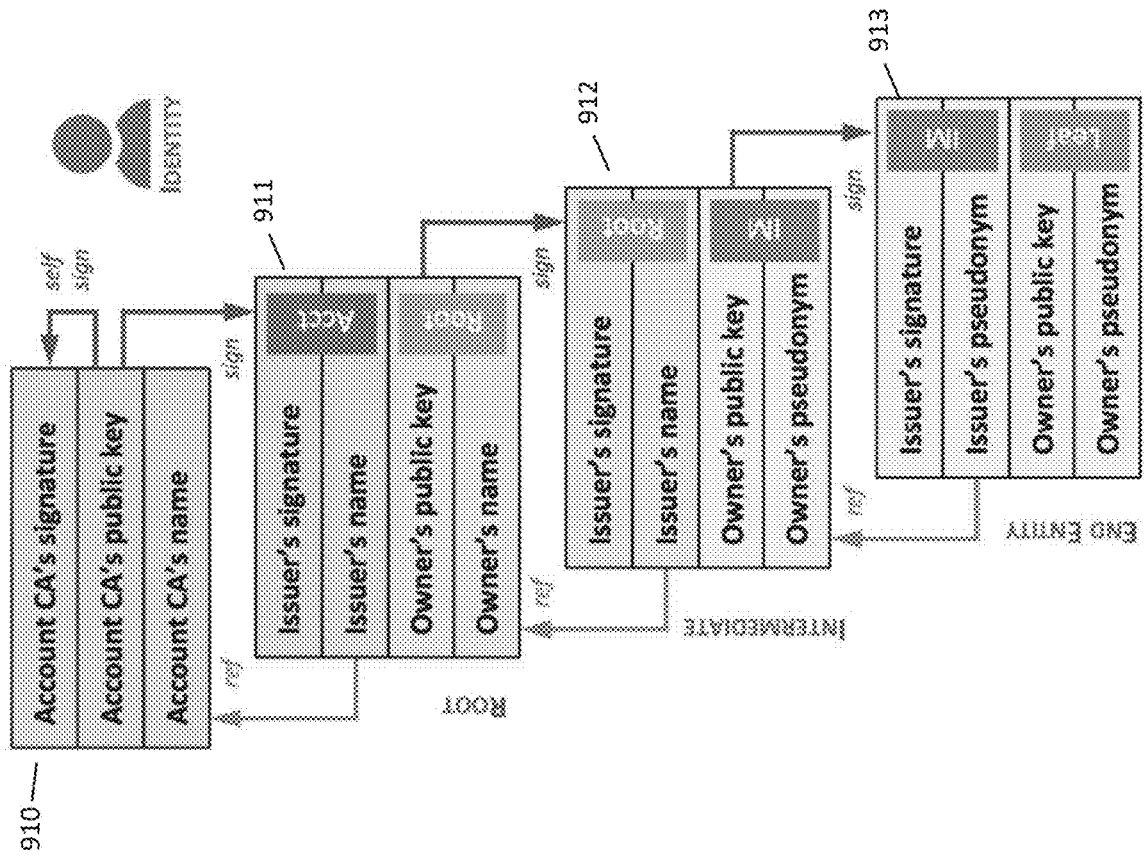
FIG. 42 illustrates the HyperSphere private signing trust-chain.
Figure 43:
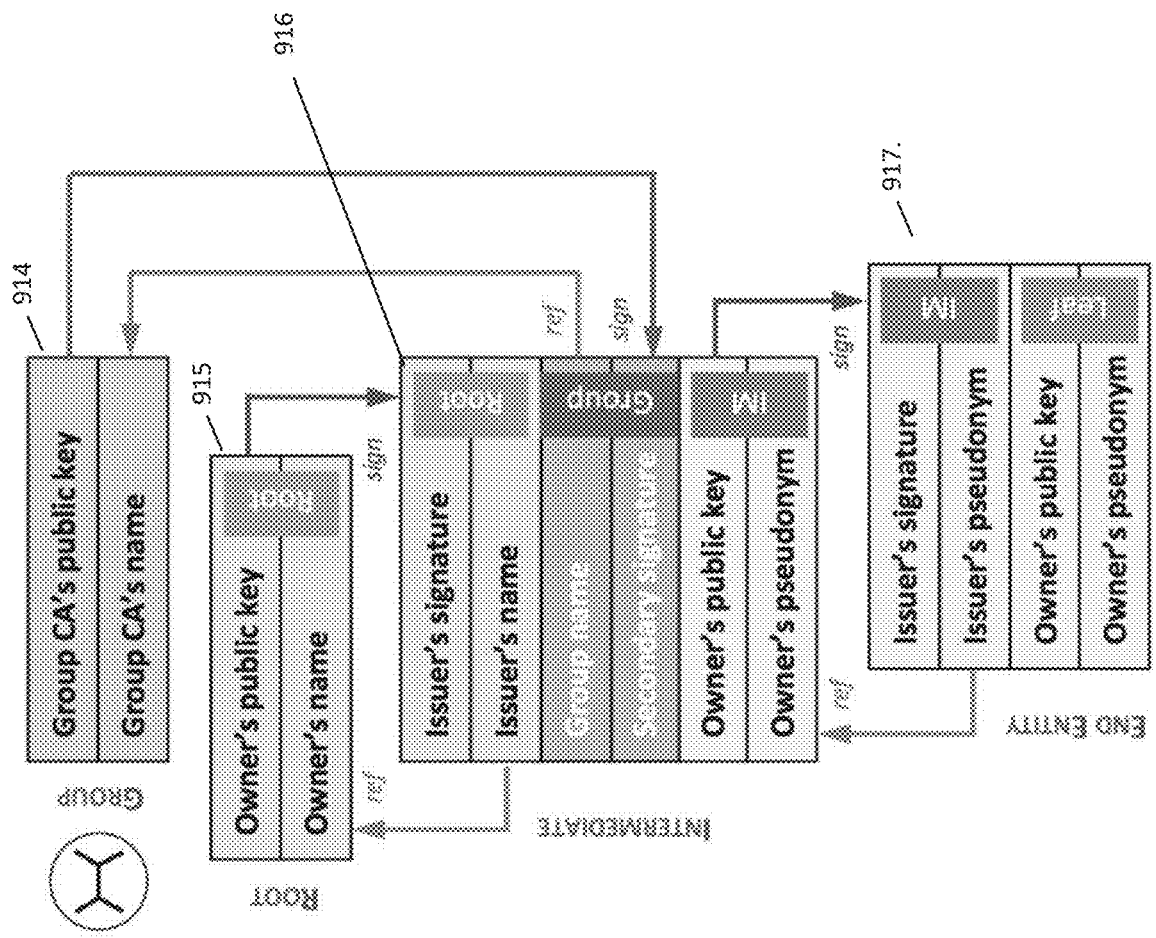
FIG. 43 illustrates the HyperSphere dual signature trust-chain.

Regardless of whether an account is created using verifiable true identity or pseudonymously, the account and its trust chain digitally signs (and therefore is connected to) all hardware on which the HyperNodes reside. In true identity accounts, the topmost personal CA-certificate, the 'parent' CA-certificate 902 is linked to identity documents, e.g. passport, drivers license, social security number, etc. as evidenced by image scans, biometrics, signatures, etc. The process of forming a trust chain by using a trusted verified certificate to sign antecedent certificates is illustrated in FIG. 42 and FIG. 43. When executed by a bank, qualified merchant, or by a trusted third-party agency during account setup, the independent confirmation procedure confirms and corroborates the legal identity of the person or corporation using multiple sources of ID validation, creating the account CA certificate 910. Once trusted identity is established, the account owner is able to obtain a HyperSphere-issued 'root' certificate 911.

The approved root certificate enables its owner to make intermediate certificates 912 and leaf (end entity) certificates 913, useful for signing specific transactions or authenticating specific devices. In this manner, a person or their devices can engage in commerce without revealing their personal identity or risking identity theft. As shown in FIG. 42, the account holder's identity certificate 910—their parental CA-certificate, is used to generate a personal root certificate 911. The identity certificate 910 then signs the account holder's root certificate 911, which in turn is used to sign and authorize one or more intermediate certificates 912 (IM CA-certificates) and ultimately leaf (end entity) certificates 913. Both the identity certificate 910 and its root CA-certificate 911, once used to sign subordinate certificates, can be placed in cold storage (i.e. offline or in a diffuse cloud) as a backup in case its antecedent CA-certificates become corrupted. A CA-certificate confirms ownership of a public key by the named subject of the certificate. In the signing process, each certificate passes its public key to a subordinate, i.e. a would-be issuer, which in turn encrypts confidential info using the public key and returns it to the signing authority. Using its private key, the signing authority is able to decrypt the file, proving it alone is the owner of the public key.

The signing authority then signs the issuer's identity information with an encrypted version of its private key and passes it back to the issuer. The certificate issuer can in turn digitally sign subordinate certificates, creating a chain-of-trust tracing back to the root and parent CA-certificates. In the HyperSphere, while the controlling certificates involve the identity of the account holder's identity, the intermediate (IM) and leaf certificates may use pseudonymous identities to further protect user privacy. In addition to protecting personal privacy, CA-certificates also prevent fraud. All derivative CA-certificates sharing a common lineage from a parental certificate are useful only to the parent certificate owner's accounts and devices. Even if an account's login information is stolen, a thief will not be able to match the pedigree of the account holder's personal CA-certificate to their devices and accounts. In the case where the account owner and its signer cooperatively commit fraud, criminal investigation will invariably discover and expose the conspiratorial relationships through the irrevocable identity-trust-chain.

An alternative embodiment of the invention (shown in FIG. 43) uses a combination of the group CA certificate 914 and the owner's public key 915 to generate a verified intermediate certificate 916, which is then used to generate end entity certificates 917.

In this way, HyperSphere identity protects account security, transactional integrity, and personal privacy while thwarting criminality. In the HyperSphere, users are able to access identity-trust-chains to execute AAA verified transactions without added cost or delays. The term AAA refers to a process of 'Authentication, Authorization, and Administration' where (i) the certificate is first checked for a valid signature, (ii) the corresponding transaction process is approved for the confirmed user, and finally (iii) all relevant records are updated including, as applicable, appending new blocks onto a blockchain.

Together, the unique combination of network-generated CA-certificates, identity-validation, and digital signing using hypersecure public-key-infrastructure (PKI) cryptography, establishes the HyperSphere as the pioneer of enterprise-grade CA-certificates deployed natively over a public cloud. In contrast, enterprise-level CA-certification over the Internet is both vulnerable and expensive, with costs of hundreds of dollars per certificate not uncommon. And because the Internet is unable to confirm the true origin of a CA-certificate, undetected Internet fraud is rampant with malware infections at epidemic levels. With its pioneering deployment as a hypersecure 'privacy' network, the HyperSphere protects personal identity and privacy by combining identity-trust-chains and verified CA-certificate lineage with digitally signed authentication of devices, HyperNodes, accounts, blockchains, transactions, and wallets. The privacy network's protection provisions operate in a myriad of ways, including:

Pseudonymous identity of user HyperNodes based on a disaggregated HyperSphere name-server function, dynamically assigned to cryptographic identities via ad hoc dynamic IP addresses and dynamic port numbers, to prevent account mapping.

Personal network-generated CA-certificates for trusted dynamic signing of transactions for devices, HyperNodes, and HyperWallets, thwarting imposter attacks, certificate fraud, and cryptocurrency theft, Session based certificate exchange using a personal CA-certificate to secure session dialog and prevent eavesdropping.

End-to-end encryption with identity-based private key exchange capability combined with decentralized session-based certificates to ensure personal privacy independent of HyperSphere cloud operations.

Stateless HyperNodes not containing a record of calls, files, communiqués, or cryptocurrency transactions on the device or HyperNodes (cloud portals) to prevent forensic attacks and content reconstruction.

A distributed network with fully decentralized control, where all transactions and data routing use private keys with no master key or system authority, preventing usurpation of the network electronically or through offline attacks of sysops or other personnel.

Individually owned multi-tree blockchains with limited access for cryptocurrency transactions and record keeping comprising dynamic directed acyclic graphs (DyDAGs) eliminating the risk of privacy leakage through observer backtracing a master blockchain.

Transaction validation of replicant blockchain observer segments (RBOS), through a decentralized cloaked (unidentifiable) jury-of-peers with limited blockchain provenance access to prevent backtracing, fraud, blockchain attacks while insuring blockchain transactional integrity.

Root recovery capability using a newly disclosed device, the sequential quantum key or (SQK) facilitating account restoration without exposing the identity-trust-chain to a malefactor's usurpation by online cyberattack.

To prevent illicit attempts to generate fraudulent certificates outside the HyperSphere, the network also facilitates system level certificate authority linking each user account to a group using digital signature credentials impossible to imitate, as they are network-native, generated and signed through system operations. As depicted in FIG. 43, for added privacy protections, intermediate CA-certificates can utilize multi-factor authentication using dual signatures, one from the owner's root certificate 915, and a second certificate from the system generated group certificate 914. In addition to preventing fraud, the second authentication facilitates added protection against conspiratorial malfeasance in business transactions. In any event, the HyperSphere is not a good platform for criminals to practice their trade. Account information remains indefinitely discoverable by law enforcement vis-à-vis authorized jurisdictions under court order or by subpoena.

Likewise, while pseudonymous accounts are useful for engaging in legal confidential business, because of identity based ownership, in the HyperSphere they do not offer a conduit by which to subvert law or evade its agents. In the HyperSphere all transfers from pseudonymous accounts to true identity accounts needed for banking are recorded on the blockchains.

Another element of the HyperSphere is its novel use of topological trust networks. Although the foregoing methods rely on strong cryptographic defense using network-generated CA-certificates and identity-trust-chains not subject to fraud and theft, no system is immune to every attack. As such, the HyperSphere's architecture employs topological trust networks, or 'trust layering', to limit the potential damage of a successful intrusion into a person's accounts or devices—a security feature operating much the same way that fire doors prevent the rapid spread of fire to limit damage.

Figure 44:
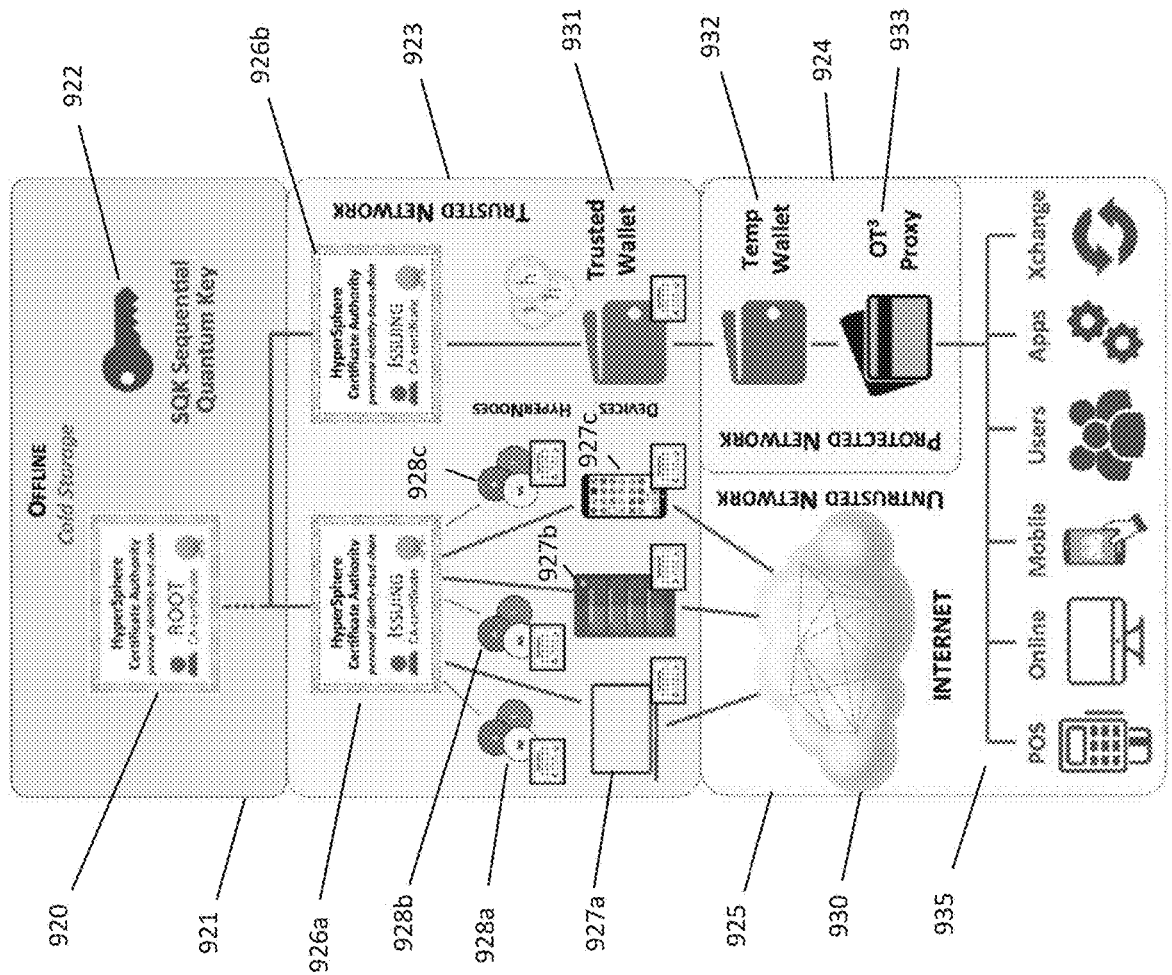
FIG. 44 illustrates HyperSphere trust zones.

FIG. 44 illustrates a hierarchical structure of the HyperSphere's topological trust network or trust zone. The most secure portion, the security core, contains an account holder's identity based 'root certificate' 920. After it is used to generate 'intermediate' CA-certificates (not shown), the root certificate 920 is stored offline in 'cold storage' 921, such as a bank vault to prevent account usurpation. As a downside to its superior identity-based privacy protection, damaged or lost root CA-certificates may become permanently unrecoverable. To protect root CA-certificate privacy while ensuring their recoverability, the HyperSphere employs a new cryptographic key, the sequential quantum key 922 or (SQK), introduced herein for the first time.

SQK employs methods adapted from quantum physics, namely the quantum observer effect, the process whereby observing a system changes its state. This effect includes quantum entanglement, the pairing of states where anything affecting one particle's state also impacts its entangled pair too. Although an SQK may eventually be realized using quantum electron devices, in the HyperSphere its quantum behavior can be emulated using multidimensional software realized across the HyperSphere's stratified virtual-network layers. For example, in one embodiment an SQK key's implementation comprises a number of key segments (cells), each of which contains an ASCII alphanumeric character. The SQK key, comprising an encrypted version of a certificate access passcode includes both user selected and system-generated components. SQK decryption requires knowing an owner's passphrase and executing a read-write sequence in a precise order, i.e. reading, selecting and entering data into each segment in the proper order. Only when all the segments are viewed and modified in the proper read-write sequence will access to the root certificate recovery process be unlocked. Committing a single sequence misstep or entry error will result in a cascade of dead ends and meaningless challenge-response dialogs without revealing the entry has already failed.

In this manner the misdirection consumes a hacker's CPU cycles wasting time, energy, and money. Without the proper read-write sequence, even knowing the passphrase is useless because the QSK is multidimensional, appearing at the HyperSphere user level as a cryptographic password having a different length than the passphrase. The missing pieces of the passphrase exist on at least three different virtual-network layers, appearing only if the proper sequence is entered. As such, the length of the SQK segment field length is variable, its appearance changing as entries are made or viewed. This variable key length feature makes it impossible for a cyber-attacker to guess the length of a passphrase they are looking for. For example, if the entry field has a constant length of 16 segments and each segment may constitute one of 37 alphanumeric characters (26 letters, 10 ten numbers, 1 null entry), the odds against a successful single-dimension brute-force incursion skyrocket well beyond $10^{25}$-to-one per virtual-network dimension used. If the passcode entry segment-length varies, however, the odds against discovering a successful passphrase using brute force attacks increase exponentially.

Returning to FIG. 44, beyond offline cold storage 921 (also known as air gap or DMZ security), the HyperSphere partitions its topological trust networks into three zones, namely a trusted network 923, a protected network 924, and an untrusted network 925. In trusted network 923, the HyperSphere's network-native leaf CA-certificates 926a and 926b are used to sign all network-connected devices (such as notebook 927a, server 927b, and smartphone 927c) and all installed HyperNodes 928a through 928c. Even though the same devices may interact with untrusted networks such as company networks, university clouds, cyber café subnets, or the Internet 930, the HyperSphere's symmetric sandboxing of HyperNodes prevents incursion or surveillance of the HyperContract execution. A separate leaf certificate 926b is also used to sign an account owner's trusted HyperWallet 931, holding cryptocurrency and other digital assets. HyperWallet 931 does not, however, interact directly with the unprotected network of online and POS transactions, mobile and other applications, users or independent digital currency exchanges. Instead, all transactions are processed through protected network 924 comprising a temporary wallet 932 separate from the user's personal trusted HyperWallet 931. The temporary wallet 932 in turn executes transactions 935 with the one-time transaction token ($OT^3$) proxy 933, preventing any access of vendors or users to a HyperSphere account holder's HyperWallet 931 or their blockchains. As a result, the HyperSphere's built-in topological trust network protects both parties in a transaction 935 (including point-of-sale (POS), online, mobile, apps exchanges, and users) from fraud and theft by third parties and also by one party against another.

D. HyperSphere Blockchain Processing

Directed Acyclic Graphs (DAGs)

Aside from the Internet's fundamental security flaws, cryptocurrency transactions over the Web are made vulnerable by reliance on a single communal blockchain accessible by everyone and anyone. In contrast, the HyperSphere eliminates the use of a common public blockchain altogether, instead adapting multiple connected blockchains having personal identity-based ownership. To ensure transactional integrity through peer consensus, blockchain interconnectivity is facilitated using a multi-tree data structure best described as a "directed acyclic graph" or DAG, also known as a "digraph".

Figure 45:
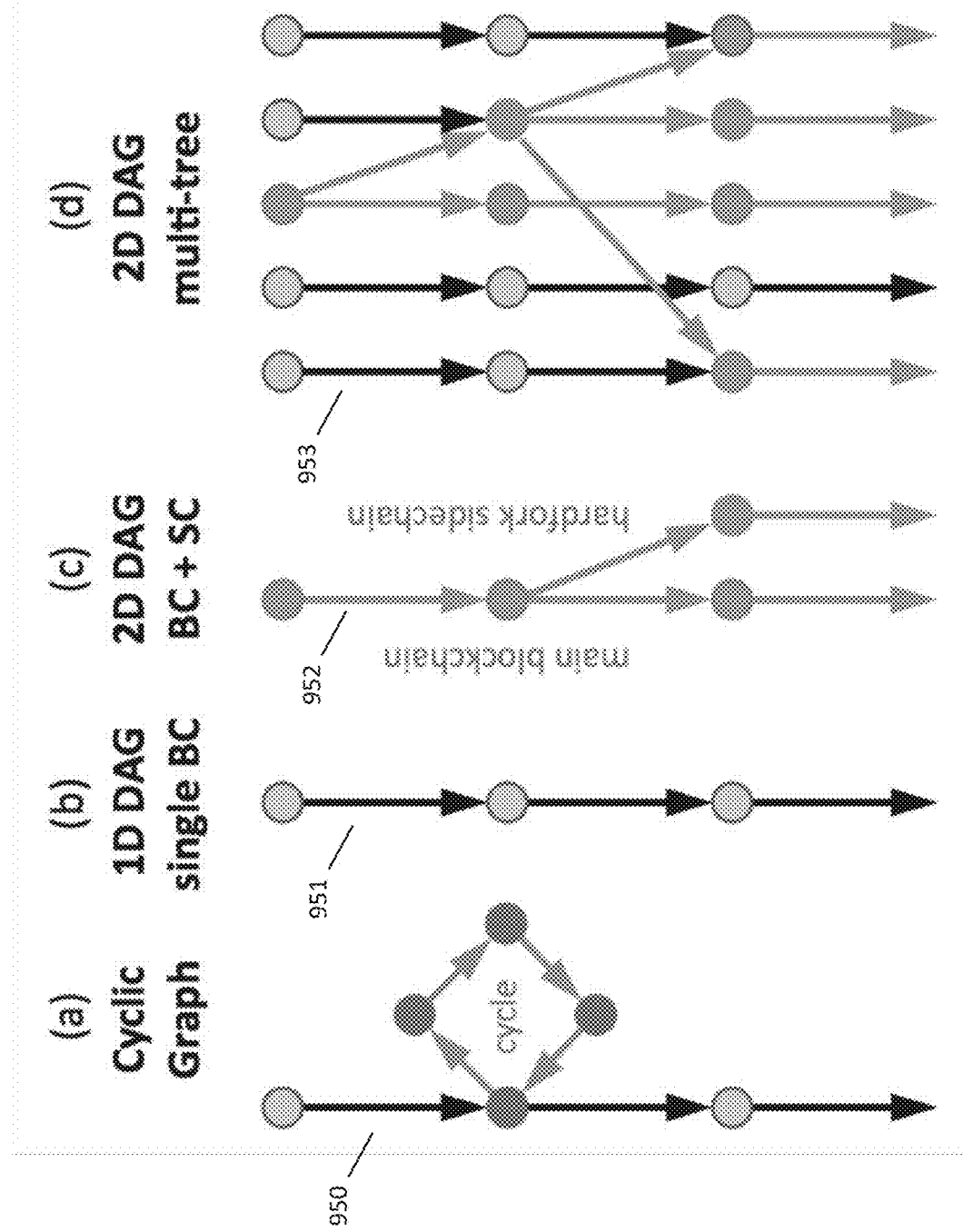
FIG. 45 depicts a comparison of cyclic and multi-dimensional directed graphs.

The HyperSphere employs a novel variant of this DAG data structure not only in its cryptocurrency generation, payments, and transfers, but also in its network operations, fragmented data transport, disaggregated data storage, and identity-trust-chains. To better understand how the DAG applies to HyperSpheric operations, we should first consider graph theory—the mathematical theory of the properties and applications of graphs. While in mathematics the term graph has several interpretations, in the broadest sense a graph is a collection of vertices and edges that join pairs of vertices. Applicable to a diverse range of disciplines including physics, biology, chemistry, electronics, computer science, communications, commerce, and more, graphs provide topological insight into connectivity, relationship, hierarchy, and processes. One class of topologies, 'directed' graphs, is particularly well suited in describing processes, flows, and algorithms containing sequence information. Shown in various forms in FIG. 45, directed graphs comprise graphs with vertices connected by edges employing vectors (arrows) signifying directionality.

As shown, a graph 950 containing at least one graph cycle (a path of edges and vertices wherein a vertex is reachable from itself, i.e. a loop) is referred to a "cyclic graph". In theoretical physics, an example of a cyclic process is a Carnot engine, a reversible isothermal gas expansion process (used to model the upper limit on the efficiency of thermodynamic engines converting heat into work). In each Carnot cycle temperature and entropy repeat the same loop, returning the system to its original state unchanged from the last cycle. In e-commerce, cyclic processes are problematic because they provide a means to change the past with no record of the change, affording the opportunity to commit undetected fraud and theft. For this reason, in accounting erroneous ledger entries cannot be changed, but instead must be amended as a new entry comprising a debit-credit pair recorded the date of the change.

Like traditional accounting ledgers, blockchains and DAGs comprise sequential records containing no 'cycles', meaning transactions proceed unidirectionally, never returning to the same vertex. Other examples of DAGs include ancestral family trees, epidemiological graphs of infectious disease spread from a single origin or index case, and computer malware diffusion, where each generation's antecedents are followed by their own progeny, and so on.

While it has been suggested on the Web that a blockchain and a DAG are distinct concepts—that a DAG is a new construct intrinsically superior to blockchains, a more accurate description is that a blockchain is a one-dimensional DAG 951 comprising a single tree. In other words, a blockchain is the degenerate form of a DAG, a chain evolving in one dimension. DAGs can also exist in two dimensions: a blockchain with a single sidechain 952 is the trivial case of a 2D DAG comprising a single common tree. In graph vernacular, a tree comprises vertices connected to a common ancestor. It follows that a 2D multi-tree DAG is simply a DAG containing multiple independent trees 953 containing both common and distinct vertices.

Conceptually, the advantage of multi-tree DAGs over a single-chain (1D DAG) blockchain is 'parallelism'—the ability to divide content and spread transactions across multiple 'interconnected' blockchains. Compared to conventional blockchains, parallel processing offers the potential for improved transactional efficiency, shorter chain lengths, lower storage demands, and faster transaction processing. Converting a single communal blockchain into multiple interconnected blockchains, albeit a step in the right direction, does not alone fix today's cryptocurrency issues of blockchain technology.

Cryptocurrency's excessive reliance on nonce-hash puzzle solving remains fundamentally energy and time inefficient, irrespective of transactional processing efficiency improvements offered by DAGs. Furthermore, all cryptocurrency transactions over the Internet remain vulnerable to security and trust attacks including blockchain consensus exploits, privacy invasions, fraud, and cryptocurrency theft. Alone, converting cryptocurrency to DAGs cannot (and will not) prevent crypto-wallet theft and blockchain attacks. Only a holistic approach to security, privacy, and crypto-economic transactional integrity can possibly hope to overcome the Internet's ongoing epidemic of cyber-theft and fraud.

As described previously, the HyperSphere is based on state-based communication made in accordance with SDNP technology, methods, and apparatus. In graph theory, this means that each time a HyperNode performs a task or executes a transaction the vertex's state at that moment is distinct in space and time. As such, the HyperSphere uniquely comprises a spatiotemporal network. Accordingly, all transactions in the HyperSphere are dynamic and state-dependent, constantly changing in accordance with time and location. In order to adapt the features of multi-tree DAGs to operate on a SDNP based dynamic spatiotemporal network, the HyperSphere employs a new graph topology, the dynamic directed acyclic graph or DyDAG, introduced here for the first time. In a DyDAG topology, vertices are defined by two characteristics—identity (vertex name or number), and state, symbolically as vertex $v_x$ and state $s_y$. A state is the condition defining the rules by which the vertex operates and interacts with other vertices. In the HyperSphere, a vertex's state includes time, its resident security zone, and other location information. As such, revisiting the same vertex does not constitute a cyclic loop so long that the state is different.

Figure 46:
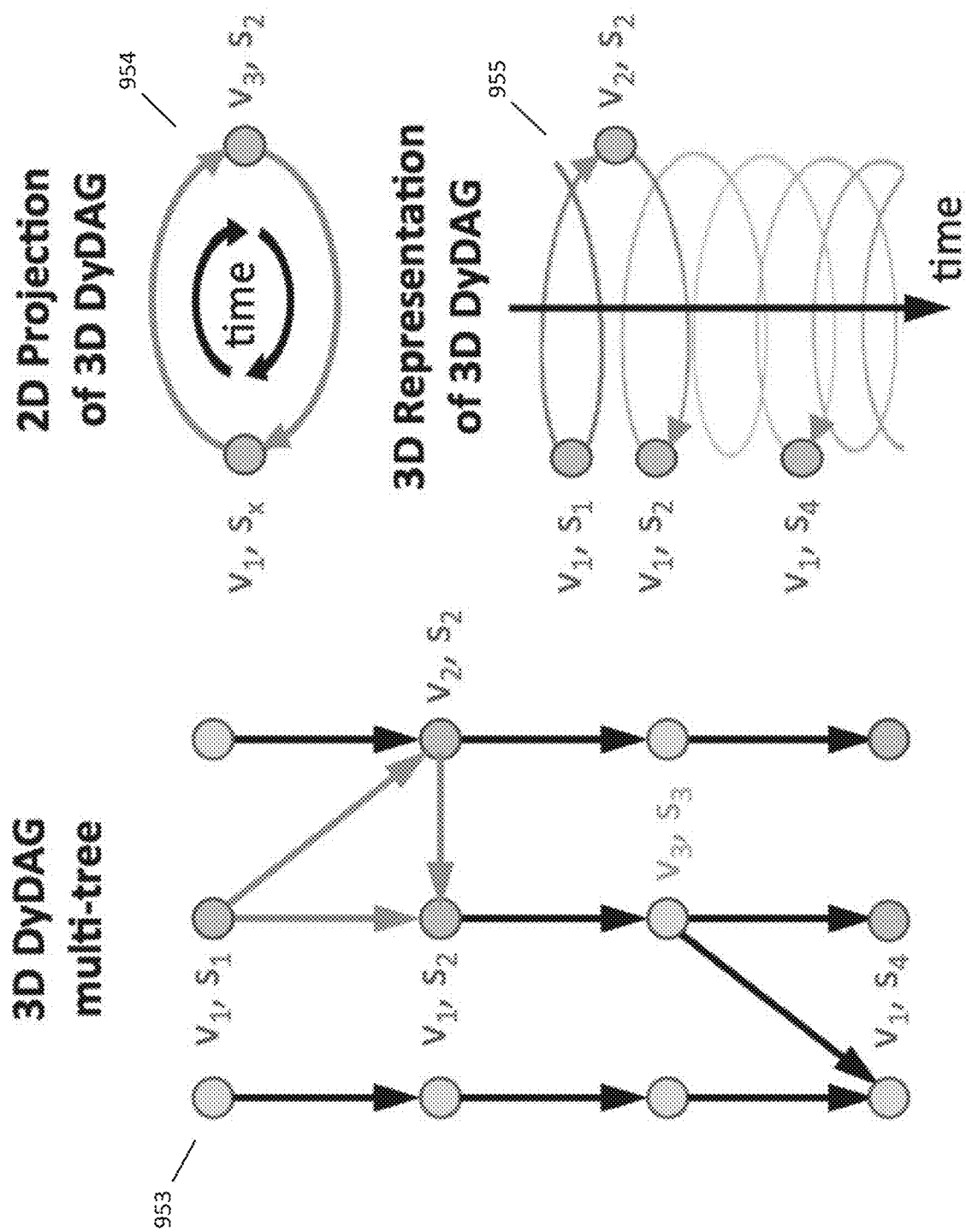
FIG. 46 shows 2D and 3D representations of dynamic acyclic graphs (DyDAGs).

For example, in the Carnot cycle each repeated loop is cyclic because whenever the system returns to a vertex, the state of the vertex is exactly the same as the prior cycle. In this sense, the HyperSphere intentionally changes states constantly and in unexpected ways, confusing and confounding any cyber-hacker trying to discern a pattern. As graphically represented in FIG. 46, a DyDAG sequence 953 comprising a transaction from $(v_1, s_1)$ to $(v_2, s_2)$ to $(v_1, s_2)$ does not constitute a cyclic graph so long that the states $s_1 \neq s_2$. Although in a two-dimensional planar projection 954 of a three-dimensional DyDAG the graph appears cyclic, in 3D the graph illustrated as a helix or spiral 955 clearly shows the state-space is not cyclic or closed loop. In essence, the network autonomously exhibits a sequence of irrevocable changes with such rapidity it defies analysis. By including a state variable, a 2D multi-tree DAG becomes a 3D DyDAG blockchain of superior performance, integrity, and security. The HyperSphere applies this DyDAG principle is a number of ways in the HyperSphere including:

- Hypersecure SDNP communication using state-based security credentials and algorithms.
- Data transport over a distributed network of active and redundant HyperNodes, minimizing propagation delays while improving network resiliency (described below).
- Personal CA-certificate based identity-trust-chains used to chronicle the inclusion or revocation of HyperSphere connected devices and HyperNodes, thereby controlling access and privileges.
- Personal CA-certificate based identity-trust-chains used to sign and manage perpetual DyDAG blockchain transactions, RBOS observers, and $OT^3$ proxy payment processors.
- Personal CA-certificate based identity-trust-chains used to sign and manage perpetual DyDAG data in Hyper-Wallets.
- Transitory DyDAG blockchains (tBCs) used in Hyper-Contract job execution of contract pledges, task execution, juror consensus, and HyperCoin generation through minting or by melting and recycling (re-minting).

With regard to the use of a DyDAGs in network operation, the SDNP cloud intrinsically forms a dynamic DAG comprising four tiers of HyperNode resource providers. Nodes are added to the network based on the number of prospective minters wishing to earn cryptocurrency and by automatic node instantiation in the event of local network congestion or DoS attacks. In each instance, the more HyperNodes joining the network the more redundancy the cloud exhibits and the more efficient the network becomes in finding and using the shortest propagation delay paths for data routing. In graph theory vernacular, SDNP network operation represents spatiotemporal destination-oriented directed dynamic directed acyclic graphs for meshed and multipath routing. Another benefit scaling with nodal density is resiliency, the ability of the network to maintain an acceptable level of QoS (quality of service) while surviving misconfigurations, faults, power failures, natural disasters, and attacks. The resilience of a network scales non-linearly with the number of participating nodes. While theoretically the total number of combinational connections scales with the number of nodes n by the relation $n \cdot (n-1)/2$, approaching $n^2$ for a large number of nodes, many of the connections are excluded as cyclic. Although in a DyDAG reusing a node is not truly cyclic (because the states differ), in real time networks only short hop-counts are valuable in delivering low propagation delays and are also beneficial in achieving low routing power, especially important in mobile Last Mile connections. A representative model of a DAG describes the number of combinations "a" by a recurrence equation comprising k outflows (exiting edges) over 'n' nodes.

$$a_n = \sum_{k=1}^{n} (-1)^{k-1} \binom{n}{k} 2^{(n-k)} a_{n-k}$$

In the binomial expression shown, the number of available paths rises proportionally with the population of participating nodes in the network. Although the expression is more realistic than the idealized permutation population $n(n-1)/2$, it does not embody certain features of dynamic DAGs. For example, cyclic loops excluded in a DAG may not be cyclic in a DyDAG because of state changes. Conversely, in nodes executing transactions at extremely high transaction rates, some nodes may (at least for brief intervals) behave as elements of a static DAG, whereby a number of possible loops (outflows) should be excluded from the tree population as cyclic. And although while mathematically speaking distant remote nodes comprise valid DyDAG trees, in real time networks they must be excluded for their unacceptably long propagation delays (meaning they are so far away from the callers their participation in the network does not help transport at all). In other words, in a spatiotemporal DyDAG graph, the trees must be excluded.

Multi-Tree DyDAG Blockchains

To ensure the security, integrity, and speed of cryptocurrency generation and blockchain transactions, a blockchain must be limited in size and length, and therefore involve limited membership to avoid uncontrolled growth and prevent intrusion from unknown users. Existing blockchain technology used by Bitcoin, Ethereum, etc. employs a single public 'communal' blockchain with global permissionless participation.

Communal permissionless blockchains are also subject to privacy leakage, theft, content contamination, and illegality. The resulting public blockchain is too cumbersome, slow, and vulnerable to attack to meet the HyperSphere's design goals and operational objectives. To circumvent long blockchain weaknesses and vulnerabilities, the HyperSphere employs a completely new blockchain structure and control system for blockchain processing, cryptocurrency transactions, and traffic management—the dynamic directed acyclic graph, or 'DyDAG', developed and introduced here for the first time. Adapted for dynamic real-time processes from static graph theory, DyDAG mathematics, graph theory, and control algorithms are employed extensively throughout HyperSpheric operations including governance of dynamic meshed data routing, HyperContract execution, rapid blockchain transactions, HyperSphere cryptocurrency generation, and e-commerce.

Contrasted against conventional single-chain ledgers, DyDAG blockchains 955 shown previously in FIG. 41 are personalized and multi-tree, thereby limiting blockchain length, reducing storage demands, and accelerating transaction resolution rates. Beyond these obvious performance benefits, DyDAG blockchains are robust, ensuring tamper-proof consensus for transaction validation.

Unlike the global communal permissionless single-chain blockchain in conventional cryptocurrency, the various trees in the HyperSphere's DyDAG blockchains are 'individual' (not communal), with each blockchain having personal or enterprise ownership through an identity-trust-chain. DyDAG blockchains include both transitory (temporary) blockchains (tBCs), i.e. limited-life, ledgers used for contract execution, and perpetual (i.e. permanent) blockchains (BCs) used to immutably record financial transactions and enshrine legal records. Like unitary blockchain implementations, all transactions on DyDAG blockchains are time stamped, immutably chronicling a record of sequential transactions not subject to backdating and revision. Unlike communal unitary public blockchains, however, since each DyDAG blockchain tree is personalized and owned by a different individual or corporate entity, a mechanism is required to interlink transacting blockchains and entities.

Figure 49:
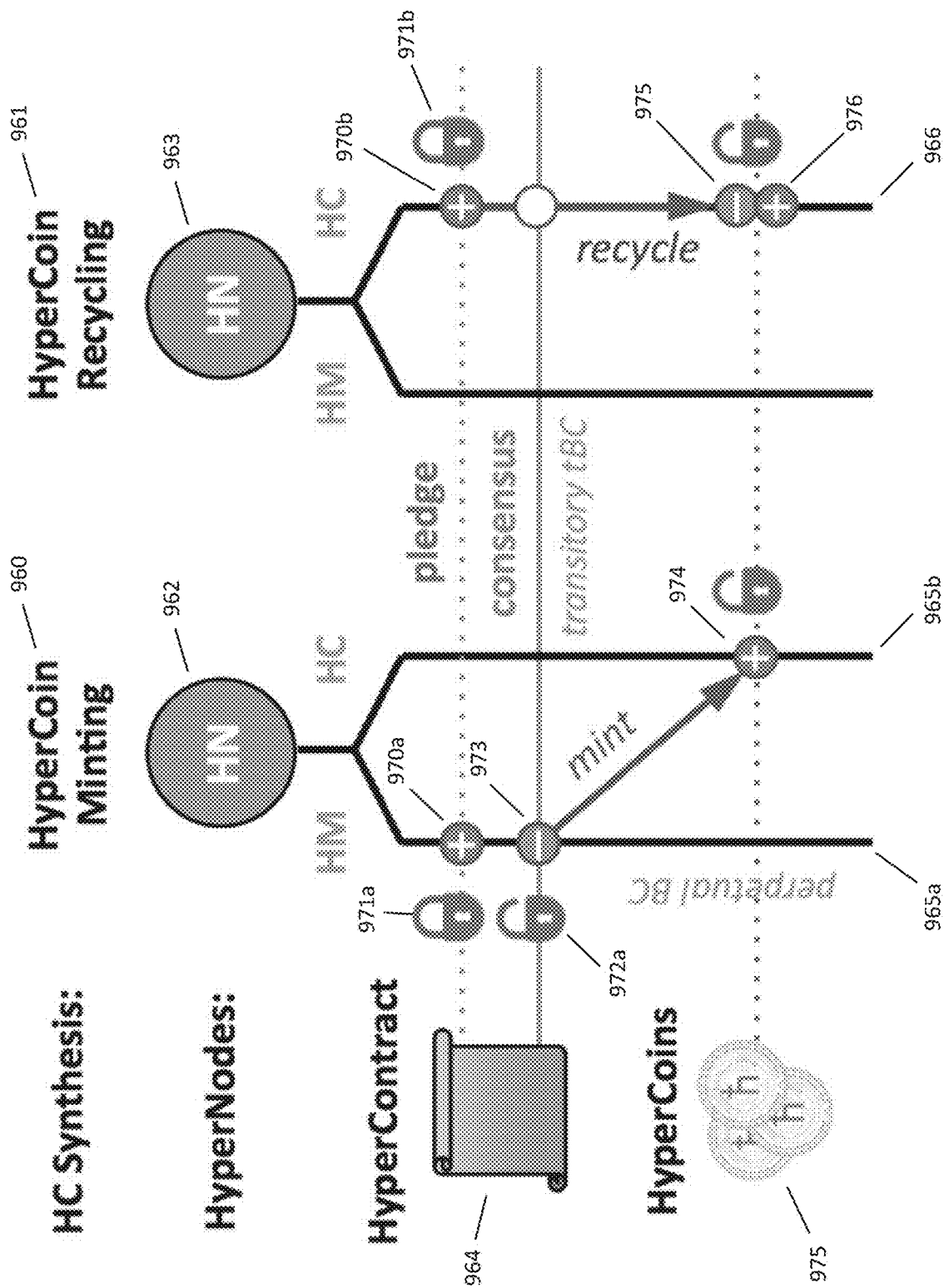
FIG. 49 illustrates the synthesis of HyperCoins through minting and recycling.

As depicted in FIG. 49, this link is realized by adapting the dual-column credit-debit ledger concept of general accounting for blockchains, where every credit 974 corresponds to a debit 973 on another blockchain. In the HyperSphere, all blockchain-to-blockchain asset transfers are executed through HyperContracts 964. specifying the participants including buyers, sellers, jurors, and alternate jurors. At contract completion all credit-debit transactions are recorded and time stamped as debits on the payor's DyDAG blockchain and as credits on the payee's private blockchain. In the case of public blockchains, the modified DyDAGs are then published on the HyperSphere using pseudonyms to protect the owner's true identity from hackers and thieves. Although these pseudonyms do not reveal an owner's true individual or corporate identity, in criminal investigations or in cases of civil litigation, a pseudonymous blockchain owner is traceable to their true identity. The HyperSphere is also capable of supporting private blockchains. Unless a buyer waives built-in protective provisions, tokens recorded on private blockchains are not directly transferable to the HyperSphere's cryptocurrency. Instead such tokens should be exchanged through a bank or independent digital currency exchange into fiat currency subsequently used to purchase either HyperMetal or HyperCoins.

E. HyperSphere Cryptoeconomic Platform

The HyperSphere operates as a fully distributed network and ecosphere for decentralized e-commerce. Transactions between HyperSphere merchants and resource providers occur on a peer-to-peer basis with no central authority, after which compensation, i.e. rewards, transfer directly between the parties. Published block chain ledgers of completed transactions are verifiable by a jury of peers within the HyperSphere. Customers of HyperSphere merchants vary with the services a merchant offers. Broadly, HyperSphere merchant services include HyperSecure cloud communication, cloud computing, disaggregated cloud data storage, network connected devices, and a myriad of cloud-based e-services.

As a Cloud-as-a-Service (CaaS) provider, the HyperSphere facilitates a hypersecure platform for supporting a wide range or commercial and scientific efforts. Unlike commercial CaaS providers, however, the HyperSphere operates as a platform at arms length from the transactions it hosts, and (aside from small routing fees) is not a party to any services, transactions, or businesses using the HyperSphere. In short, the HyperSphere does not compete with its users or its resource providers. As such, the HyperSphere is more accurately described as a Platform-as-a-Service provider.

HyperSphere Platform-as-a-Service

As a non-profit independent Platform-as-a-Service, the HyperSphere is able to support a diverse range of economic, commercial, scientific, and philanthropic endeavors without conflict. Limited only by merchant offerings and participant imagination, the HyperSphere is therefore able to serve virtually every sector of business and study, including banking and finance, manufacturing, marketing, merchandizing and selling, distribution, health care and medicine, energy and ecology, transportation and shipping, safety and security, education, research, development, science, and information storage, to name but a few examples. The HyperSphere offers a unique approach e-commerce supporting a diverse range of the hottest high-tech business topics today, including:

Cloud computing & real-time communication
Big data
Artificial intelligence (AI)
Security and privacy
Decentralized digital currencies
Energy efficiency Services enabled by the HyperSphere platform for the foregoing efforts are described in greater detail here below:

Cloud Computing and Real-Time Communication:

The promise of cloud computing and cloud-based communication is plagued by its reliance of the Internet for connectivity. From its very inception, the Internet was created for reliable redundant delivery of files, but never as a real time network. As such, cloud-based communication today including Line, KakaoTalk, WhatsApp and others are often unreliable, dropping calls and suffering delays and "network instability," a euphemism for an unacceptably long propagation delay of data traversing a packet switched network. This same instability makes distributed computing extremely problematic because network delays of hundreds of milliseconds can be a billion times slower than computer calculations, meaning a server spends all its time waiting to reestablish network connectivity and transfer updated data files. The HyperSphere addresses these issues by employing a patented real time dynamic network and protocol where expediency is realized using small data packets delivered over the lowest propagation delay pathways through the network.

Big Data:

The analysis or storage of large data sets means that a single drive or memory farm may contain an extraordinary amount of personal and private data in one place. A successful attack or unauthorized incursion on these massive records exposes the public to fraudulent transactions, identity theft, blackmail, extortion, or even personal attack. The number of successful hacks on government, credit card, credit bureau, insurance, and merchant databases in recent years has exposed hundreds of millions of people to personal and financial attacks from stolen data. This problem will only worsen with today's migration to big data file structures and more online and personal cloud storage, e.g. with iCloud, Amazon Drive, Google Drive, iDrive, Box.com, and Dropbox. The HyperSphere combats storage-drive attacks using disaggregated data storage—redundantly distributing file contents across hundreds of devices. This approach makes it impossible for hackers to locate and gather all the components of a file or to re-assemble the pieces to restore the original content.

Artificial Intelligence:

Artificial intelligence is a rapidly evolving but still underutilized discipline in computer science today. Without amassing significant compute power, progress in this field is expected to proceed slowly. Artificial intelligence plays two roles in the HyperSphere. Firstly, as an enabling technology, AI is employed in the HyperSphere marketplace to autonomously negotiate job contracts between HyperSphere merchants and HyperSphere resource providers. In this manner, AI eliminates the central authority concern in the HyperSphere, performing scheduling (like a dispatcher) but not acting as a party to any transaction or its validation. Secondly, with its distributed computing resources and open source architecture, we expect the HyperSphere to make an attractive cloud platform for research in AI technology.

Security and Privacy:

The world's platform for international business and e-commerce, the Internet, is intrinsically insecure. A limitless list of cyber-attacks have been recorded since the advent of Internet based communication and e-commerce, including denial-of-service attacks, worms, viruses, spyware, packet redirection, faux cell towers, keystroke loggers, packet sniffers, zero-day attacks, port sniffers, and other malware. Moreover, because data packets identify information about a packet's origin and destination, metadata analysis can be used for user profiling based attacks. The HyperSphere, in contrast, uses anonymous fragmented data transport with dynamic routing. With packet content, security credentials, and routing dynamic changing every fraction of a second, tracking network transport and capturing related packets in the HyperSphere, decrypting them and extracting their payload, then reassembling their original content is virtually impossible to successfully execute (even once). To hack an entire communication requires constantly monitoring every node in the HyperSphere and performing the aforementioned hacking sequence at a pace faster than new packets change. As such, the HyperSphere's dynamic security methods render the network impervious to man-in-the middle attacks. So, unlike purely encryption-based Internet communication, HyperSphere communication is HyperSecure lacking any central control or system encryption key.

Decentralized Digital Currencies:

Existing cryptocurrencies face rapid value fluctuations from speculation, affecting a coin holder's buying power. Bitcoin price fluctuations of 27% have occurred in a single day of trading. Further cryptocurrency concerns include the rising expense and longer times required for coin mining (the so-called "Tragedy of Commons"), hidden Ponzi schemes and elaborate pyramid scams, unreliable exchanges, hacking of Internet based communication used for coin transactions, suspicious exits of ICO founders, insider trading, securities fraud, identity theft, money laundering, drug trafficking, and other substantive concerns regarding security, ethics, digital currency integrity and value. As such, cryptocurrencies today are dubious financial instruments having little or no role in the daily life of consumers, businesses, banking, or international commerce. The HyperSphere employs tokens generated autonomously and conjunctively as part of data transport through the network. Since tokens are generated based of Proof-of-Use, whenever a Resource Provider completes a task or job, the process of minting is not subject to Ponzi schemes, 51% attacks, or the Tragedy of Commons.

Energy Efficiency:

The mining of present-day cryptocurrencies involves the wasteful expenditure of vast quantities of energy (now over 0.15% of the world's entire annual electrical consumption) to perform computational tasks having little or no beneficial purpose aside from generating new crypto-coins. The HyperSphere employs tokens generated autonomously and conjunctively as part of data transport through the network, i.e. doing useful work. This method of token generation consumes twelve-orders-of-magnitude less energy than Proof-of-Work based mining used in Bitcoin generation.

HyperSphere Design Architecture

The design objective of the HyperSphere is to facilitate an open source platform for e-commerce, supporting a global community of users while both protecting user privacy and ensuring transactional integrity. To that end, the HyperSphere's design methodology is based on five fundamental precepts comprising the attributes of:

Identity
Security
Privacy
Integrity
Responsibility

As a computer network and communication cloud adhering to these core principles, the HyperSphere's design offers vastly superior operational command and control compared to other networks and clouds. The Internet, by its very nature, relinquishes control to unknown devices connected to it. Internet-connected devices determine packet routing, the security methods employed (or ignored) in data transport, and even who can access or surveil a packet's contents or metadata. As such, any bad actor can through a variety of means subject other users to theft, privacy invasion, and other malefactions without consequence, all protected by anonymity of the cloud.

Metaphorically speaking, in this regard the Internet operates as a 'payphone', meaning anyone can communicate anonymously without revealing personal identity information to the network or to other users. Worse yet, with no ability to confirm identity or confidently establish trust, imposters can with relative ease use the Internet to usurp another user's identity without detection. In many cases, Internet attacks can be launched from IoT devices—the least secure components in a network. In this way, a refrigerator, smart TV, thermostat, or dimmable 'smart' light bulb can compromise the integrity and security of an entire network and its users, becoming the attack vector of choice for discerning cybercriminals. The HyperSphere, by contrast, explicitly controls network access by identifying and authorizing every user and attached component. Through software-based network portals called HyperNodes, the HyperSphere manages process and call initiation, controls the handling of different data types (voice, text, video, software, etc.), directs data packet routing, selects security concealment algorithms and security credentials, and validates processes.

It also carefully scrutinizes embedded cryptocurrency transactions, manages network operation to ensure high quality-of-service (QoS), and carefully verifies connected device and user identities. In the HyperSphere, security and privacy are addressed through separate mechanisms. Rather than augment Internet communication, HyperSpheric security is achieved by utilizing its own dedicated communication protocol—the Secure Dynamic Communication Network And Protocol or SDNP. As such, the HyperSphere is not subject to traditional Internet security vulnerabilities and deficiencies.

Previously deployed over private networks for municipalities and emergency services in Germany, the UAE, and by various shipping port authorities, multipath radio communication operating at the physical layer uses proven field-tested technology with over fifteen years experience in professional communication and private networks. Its use by the US Army during the Iraq War confirmed the method's capability of delivering military-grade security over private radiophonic networks compliant with FIPS140-2 standards. SDNP, however, operates at the network layer, not exclusively at the physical layer. The HyperSphere's design objectives as described herein represent a public network open source deployment of that same technology combined with enterprise-grade certificate authority and embedded network-native cryptocurrency. The following is brief overview of these objectives and how the HyperSphere addresses the issues:

HyperSphere Identity:

In contrast to the Internet, in the HyperSphere no user is anonymous—every user, personal or corporate, holds a corresponding unique HyperSphere identity, privately protected from other users' inspection. This personal or corporate HyperSphere identity permanently interlinks a user's devices, HyperNode cloud portals, accounts, and wallets to an identity-trust-chain comprising HyperSphere network-generated CA-certificates. The Internet depends on third-party certificate authorities subject to theft and fraud. In contrast, the HyperSphere generates its own network-native CA-certificates. As shown previously in FIG. 40, all identity-trust-chains exclusively employ CA-certificates signed by the HyperSphere's master certificate 903, rejecting all self-signed or third party certificates as untrusted. By interlinking a user's CA-certificates to a corresponding identity-trust-chain, stolen or fraudulent certificates will not match other instances of the user's CA-certificates, and the fraud will be detected, rejecting all transactions involving the fraudulent certificate.

HyperSphere Security:

While the HyperSphere's enterprise-grade certificate authority for identity verification is important, alone it is inadequate to prevent network incursions. In order to protect data, maintain transactional integrity, and prevent cryptocurrency theft or fraud, the HyperSphere employs military-grade 'hypersecure' data transport and multi-tiered security features made in accordance with the patented Secure Dynamic Communication Network And Protocol (SDNP). Although encryption is employed in packet transport operations, the SDNP process does not depend exclusively on encryption to achieve its superior security protection. Instead, hypersecure communication combines the principles of fragmented transport of anonymous data packets together with dynamic routing and concealment. In accordance with its protocol, SDNP data transport in the HyperSphere is secured by (i) limiting the quantity of data traveling through any single node in the network, (ii) obfuscating the packet's true origin and destination, (iii) concealing the content of data packets, and (iv) limiting the time in which to break the security provisions and launch an attack before everything changes (e.g. new security credentials, algorithms, packet routing, content, and more).

The last described security method of limiting 'time', more accurately described as dynamic routing and concealment, is especially frustrating and costly to cybercriminals because it constrains the useful duration of any successful hack to a mere fraction of a second, after which the attackers must start all over again. Changes in routing and concealment methods change perpetually, meaning even in the unlikely event a cyberattack breaks into a packet, they will be unable to ascertain where the next successive packet is or how it is being routed. In the HyperSphere's meshed network, it is unlikely that two successive packets will ever traverse the same nodes. And since SDNP data packets carry fragmented data, even if an attacker is able to break a packet's cipher (requiring the perfect execution of a century worth of brute force decryption in one tenth of second), without the other corresponding pieces a decrypted packet's fragmented contents are incomplete, meaningless, and utterly useless, discouraging further attacks on the HyperSphere's cloud and network traffic.

HyperSphere Privacy:

Privacy is the right to control what information you share and with whom you share it. A secure network does not automatically guarantee privacy—ensuring privacy is more stringent and demanding than simply facilitating security. As such, the HyperSphere does not rely solely on its SDNP secure network capability to guarantee private communiqués and files remain so. Instead, a privacy network must, in addition to preventing hacking and surveillance, control access to personal content and private information on a need-to-know basis utilizing 'verifiable identity' to limit access.

Authorization by verifiable identity is especially critical in preventing imposters from capitalizing on anonymity to obfuscate their true identities, misrepresent their purposes, or secretly engage in malicious attacks against a person or enterprise. In order to function as a privacy network, the HyperSphere utilizes the principle of confirming user and device identities during the connection process, i.e. using network-native CA-certificates to establish trust of persons or devices before granting user access to privileged information. Beyond hypersecurity, the HyperSphere's privacy provisions protect personal identity and private information through a sophisticated combination of identity-trust-chains and verified CA-certificate lineage not possible over the Internet. Shown previously, these safeguards include digitally signed authentication of devices, HyperNodes, accounts, blockchains (BCs), HyperContract transactions, and wallets, employing issuing (leaf) certificates distinct from its intermediate IM parents. Beyond a strong cryptographic defense, the foregoing methods uniquely employ HyperSpheric network-native CA-certificates and identity-trust-chains not subject to counterfeiting. One downside to identity-based privacy protection is that, without some means of backup, damaged or lost root CA-certificates may become permanently unrecoverable—a problem which the HyperSphere addresses with an innovative solution, the Quantum Sequential Key or QSK, described later in this application.

HyperSphere Transactional Integrity:

As a privacy network for hypersecure global e-commerce, transactional integrity depends on secure network operation, user authentication, identity-trust-chains, assured HyperContract execution, and verifiable cryptocurrency transactions. Ensuring transaction integrity in the HyperSphere involves several important mechanisms including (i) preventing the creation of fraudulent (fake) cryptocurrency, (ii) preventing blockchain attacks intended to perpetrate double spending and theft, (iii) avoiding destabilization of cryptocurrency value impacting the HyperSphere's utility and cryptoeconomics, and (iv) ensuring expedient transactional processing and resolution.

HyperSphere Responsibility:

The final consideration of the HyperSphere is its principled dedication to personal privacy, fiscal, ethical, and ecological responsibility. As a fully decentralized network using fragmented data transport with no network cryptographic master keys, HyperSphere operation naturally protects its users' confidentiality and personal privacy. Because of its dynamic meshed transport, privacy attacks using packet sniffing, surveillance, and metadata monitoring are completely unproductive.

In the HyperSphere, a user, not the network, owns their private data. Unless a user grants rights to a service provider to access or distribute it, merchants have no capability to obtain, know, share (or steal), a HyperSphere client's personal information. Moreover, by using pseudonymous leaf CA-certificates, clients can engage in e-commerce without revealing any personal data whatsoever or risking identity theft. Combining identity-based CA-certificates with advanced multifactor and biometric authentication, a user's accounts, blockchain, wallet, and personal data are not subject to inspection, data collection, attack, or usurpation.

Although the HyperSphere protects personal privacy in the lawful use of the network, the HyperSphere's inventors and proponents condemn all acts of criminality, financial and business fraud, privacy attacks, theft, and terrorism. As an ethical communication network, the HyperSphere supports law enforcement in accordance with legal jurisdictions of the session's terminus HyperNodes, i.e. wherever a transaction between parties originates or terminates. Because of fragmented data transport across a meshed network and stateless node operation, no useful content or metadata is available except on the terminus nodes.

Environmentally, the HyperSphere represents the world's first and most eco-friendly method of cryptocurrency generation. Unlike PoW cryptocurrencies wasting vast amounts of energy, consuming precious resources, and exhibiting large carbon footprints only to solve useless puzzles and games, the HyperSphere's cryptocurrency is highly energy efficient, using data transport through its network as a symbiotic mechanism to generate new cryptocurrency. As such, the HyperSphere's Proof-of-Performance conjunctive synthesis and lightweight blockchains consume one-trillionth ($10^{-12}$) the energy of Proof-of-Work cryptocurrencies such as Bitcoin, Ethereum, and their sidechain derivatives.

In comparison with existing and hypothetical token and cryptocurrency generation schemes, the HyperSphere's adjunctive method of minting HyperCoins represents the world's first ecologically friendly and environmentally sustainable cryptocurrency. As a final point, the potential of the HyperSphere is not limited to commercial and personal profit-minded projects, but extends to all socioeconomic groups. For example, the HyperSphere can be adapted to support research, to facilitate funding of a new generation of entrepreneurs, and to facilitate a variety of charitable and philanthropic projects, including its potential role in will and trust execution and estate planning.

Architectural Summary:

In summary "The HyperSphere" disclosed herein comprises a new dual digital token based decentralized global electronic marketplace for e-commerce that overcomes issues of digital currency integrity and instability, network security, real time performance, and energy inefficiency. Running over a global hypersecure private network—a cloud separate and distinct from the Internet yet co-existing on the same hardware, the HyperSphere delivers eco-friendly cloud-based computing, data storage, real-time communication, secure network-connected devices, and e-services to any user within the HyperSphere.

HyperSphere Beneficial Features

As described in its provisional patent, the HyperSphere is an open-source hybrid-cloud platform amalgamating the global functionality of the Internet with the best features of premier professional communication, private networks, VPNs (virtual private networks), dynamic real-time networks, global telephony, military-grade cybersecurity, enterprise-grade certificate authority, trusted transactions, intrinsic privacy protections, and private blockchains. The HyperSphere is wholly unique in its novel method of real-time data routing, traffic management, cryptocurrency generation, and blockchain transactional execution. During operation, tasks are performed autonomously and conjunctively, unassisted by network operators. Routing occurs dynamically based on network conditions without relying on pre-defined (static) routing tables. Instead, the HyperSphere represents a fully decentralized system employing dynamic meshed routing designed to minimize network propagation delay to securely and rapidly execute transactions.

Combining beneficial features of high-reliability fixed and backbone networks, dark-fiber and backhaul, wireless, and ad-hoc peer-to-peer communication, with an AI-based de-centralized marketplace, the HyperSphere dynamically analyzes and ascertains the best match between network performance and a client's performance and cost objectives. Because the network's nodal density increases with its number of users, 'the more people who use the HyperSphere—the better it performs', quite the contrary of fixed network clouds.

Figure 47:
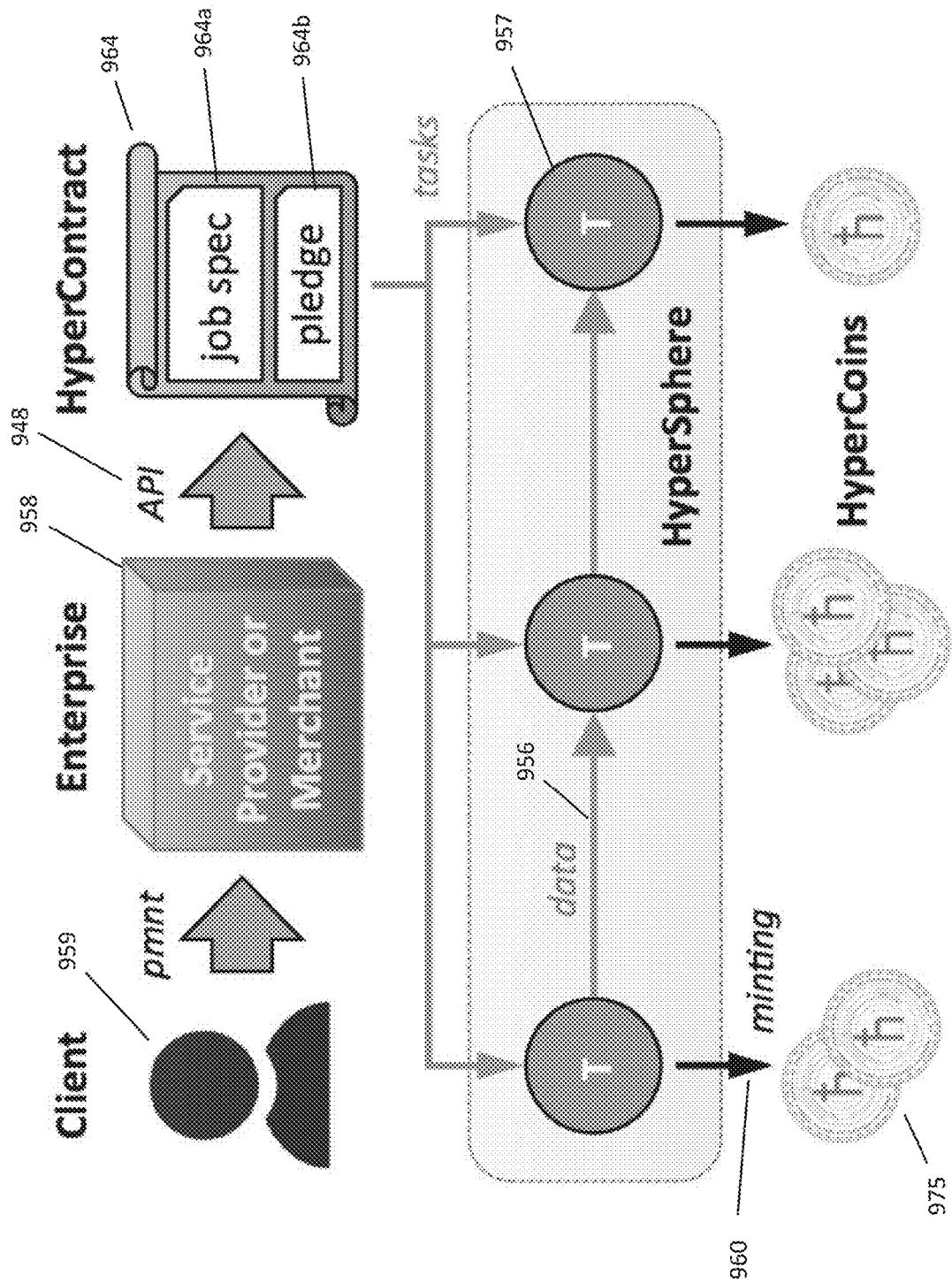
FIG. 47 illustrates HyperContract task-based cryptocurrency remuneration of task HyperNodes.

The HyperSphere is especially unique in its generation and use of its network-native (embedded) cryptocurrency. In the Internet, conventional cryptocurrency is "mined" using costly and energy-wasting Proof-of-Work puzzle solving such as nonce-hash or prime number challenges with uncertain payment and ever-diminishing fiscal returns to its miners. In stark contrast, cryptocurrency generation in the HyperSphere is "minted", created conjunctively as data packets traverse the cloud 956, as shown in FIG. 47. Unlike the uncertain return of PoW miners, in minting HyperSphere resource providers (e.g. HyperNodes operating as task nodes |T| 957) receive guaranteed compensation for supporting completed transactions, paid in accordance with pre-negotiated HyperContracts 964 specified by service providers or merchants 958 providing services for their clients 959). Because the coin generation occurs conjunctively with network operation, virtually no additional energy is spent on minting cryptocurrency beyond the energy spent completing useful work needed for communicating or computing tasks. Other than being energy efficient and ecologically responsible, dynamically generating network-native blockchains by data transport in the cloud prevents counterfeiting. Producing cryptocurrency using dynamic blockchain synthesis comprises a process of inter-nodal data transport that cannot be imitated outside of the HyperSphere. And because the cryptocurrency is network native, it can be transferred and retained in HyperWallets and reused in the HyperSphere without exposing blockchains to the Internet's hacking, theft, fraud, and online transaction risks.

HyperSphere access is entirely software-based, with no need for specialized hardware. User interfaces for smartphones, notebooks, desktop PCs, gaming platforms, smart TVs, IoT etc. include support for major operating systems including Windows, MacOS, Linux, Unix, iOS, and Android. Businesses, corporations, research institutes, and universities can facilitate HyperSphere access to their private servers and networks via personal devices, i.e., enabling convenient and cost-effective Bring-Your-Own-Devices (BYOD) connectivity, while supporting corporate IT department security provisions and control. A cluster of devices can also operate as a private network within the HyperSphere, i.e. as a publically hosted private-network. HyperSphere users may engage in transactions in several ways including in the roles of:

Resource providers—By downloading HyperNode portal software into one or more devices, individuals, companies, and institutions provide resources (e.g., HyperNodes operating as task nodes |T| 957) to the HyperSphere and earn HyperCoin cryptocurrency as compensation.

Merchants & service providers—By creating a HyperSphere API-generated application or user interface, merchants and service providers 958 can offer communication, computing, storage, cloud-connected devices, or e-services and products to their clients (even if their customers are not HyperSphere clients).

Users—As clients of merchants and service providers 958, users 959 can utilize the resources of the HyperSphere, paying in fiat currency or using earned or commercially acquired HyperCoin cryptocurrency.

Hierarchically, rather than employing software running on the Internet as over-the-top (OTT) applications, the HyperSphere co-exists with the Internet, sharing resources, physical networks, last mile carriers, and data links. In this sense the HyperSphere essentially operates "on-the-side" (OTS) of the Internet, representing partially overlapping peer networks. Furthermore, the HyperSphere is agnostic to last mile connectivity between the cloud and a user's device, seamlessly compatible with any medium including WiFi, Ethernet, DOCSIS-3, wireless (3G/LTE, 4G, 5G), etc. Aside from its superior security and its embedded native cryptocurrency, as a 'privacy-network' the HyperSphere uniquely employs network-specific pseudonymous identities to protect personal account information.

Using digitally signed CA-certificates to privately execute transactions, open HyperContracts, deliver network resources, or trade cryptocurrency, HyperSphere users are thus able to engage in e-commerce without exposing their true identity to potential attacks. As a further precautionary feature, consensus verification of blockchain transactions employs a unique innovation—a replicant blockchain observer segment (RBOS) e.g., RBOS 1063 shown in FIG. 57, a limited length blockchain mirror used to validate transactions while preventing blockchain backtracing and privacy leakage. Another inventive element, a one-time-transaction token $OT^3$) e.g., $OT^3$ proxy 1041 shown in FIG. 56, employs a single-use temporary transactional payment mechanism to prevent a payee's third-party transaction processor from gleaning private information from a payor's blockchain. In e-commerce, the HyperSphere offers numerous benefits over the Internet including:

The ability to anonymously, securely, and privately transport real-time audio and video content—functionality needed by service providers offering communication and secure messenger services.

The ability to anonymously, securely, and privately transport high-integrity data files including email; databases; private media content; and software: functionality needed by providers of secure email, database services, customer contact management, and online collaboration platforms.

The ability to anonymously, securely, and privately dispatch; manage; and collate the execution of distributed cloud computing supporting researchers and online cloud computing providers.

The ability to anonymously, securely, and privately transport, store and recall data in disaggregated form, functionality needed for big data analysis and by purveyors of online and cloud storage services.

The ability to anonymously, securely, and privately transport command-and-control (C&C) instructions for cloud-connected devices while preventing security and privacy attacks on cloud connected devices: functionality and privacy features important to IoT device users and service providers.

The ability to securely and pseudonymously execute financial transactions, payments or money wires using cryptocurrency intermediaries comprising network-native dynamic blockchains.

The ability to anonymously, securely, and privately execute a wide variety of e-services for merchants.

The ability to facilitate the use of pseudonymous data to facilitate personalized AI-based recommendations without revealing a user's true identity or enabling the unauthorized access or sale of personal or private information. In the HyperSphere, a user owns their personal data, not the merchant or the network.

The ability to form a merchant-operated hypersecure private overlay network securely deployed within the public HyperSphere cloud, i.e. using fully sandboxed processing to protect corporate and personal privacy and data integrity.

The ability to dynamically tunnel past a Last Mile subnet to circumvent denial of service attacks or to access the Internet without exposing a user's identity to unsecured networks or clouds.

The ability to securely accept, transfer, and hold various forms of cryptocurrency (including HyperCoins, Bitcoins, and Ether) in private HyperWallets using personal CA-certificate identity-based ownership validation and network-based anti-theft provisions.

The ability to provide Blockchain-as-a-Service (BaaS) to HyperSphere merchants and startups.

The ability to support cryptocurrency and token offerings as a platform for a variety of blockchain based companies, services, and startups.

The foregoing features as articulated describe but a few of the HyperSphere's innumerable beneficial hallmarks.

HyperSphere Business Services

As disclosed, the HyperSphere is an open-source electronic communication and e-commerce environment where participants actively contribute by creating demand and by supplying resources needed to transact and fulfill that demand. In a manner similar to the role of the non-profit Linux Foundation in providing an open-source platform for secure computing, the HyperSphere is designed to facilitate a fully-distributed decentralized open-source privacy platform for hypersecure networking, communication, cloud computing, and e-commerce. Metaphorically, the HyperSphere is designed to be the Linux of communication and e-commerce.

Cloud-based hypersecure communication,

Distributed computing,

Disaggregated cloud data storage and data backup,

Secure network-connected (IoT) devices, and

A myriad of online e-services, online and electronic transactions.

HyperSpheric Cloud Communication:

In HyperSpheric cloud communications, merchants may use the network's unique security to offer HyperSecure telephony, conference calling, text messaging, live video, and hypersecure email to individuals, businesses, and corporations, including individual targeted vulnerabilities (such as corporate and executive officers, board members). Merchants may also use the HyperSphere to deliver FIPS-140 compliant professional communication services for governments and its officials, police and emergency services, port authorities, national defense, and homeland security. Corporations may employ the HyperSphere for executing private business networks within a large corporation or in the transportation and shipping industry.

HyperSpheric Cloud Computing:

In HyperSpheric cloud computing, merchants may use to the HyperSphere to deliver locally sourced online business computing for small corporations and public accountants, or to provide cloud-computing services to hospitals and clinics for analysis of medical images. In big data projects, the HyperSphere's distributed computing capability can supply unlimited computing resources to a corporation, government agency, or research institute at a price and performance to match a client's budget. Big data projects include epidemiological studies, DNA analysis and human genome studies, climate and weather modeling, macroeconomics, tectonic and volcanic activity prediction, identifying NEOs (near earth objects), high-energy physics and subatomic particle research, and philanthropic projects such as SETI (the search for extraterrestrial intelligence).

HyperSpheric Cloud Storage:

In HyperSpheric disaggregated data cloud storage merchants can offer low cost, distributed, and massive data storage to individual, corporate, government, and civic clients including hypersecure fragmented storage of personal pictures and videos, corporate archiving of financial data, insurance medical records and medical images, tax and accounting records, corporate IT backup services, as well as archival storage of the contents of libraries, film archives, and rare books. Disaggregated data storage has the advantage that successfully raiding a storage device or facility will yield no useful information whatsoever because the corresponding digital content of the data are spread across the network and saved elsewhere. Moreover, no information as to how data fragmentation occurred is included with the stored media file.

HyperSpheric Network Connected Devices:

In HyperSpheric network connected devices merchants can employ the HyperSphere to provide secure connections to devices used in home, commercial, transportation, government and infrastructure applications. It is well known that Internet connected devices (referred to as the Internet of Things or IoT) are subject to hacking and a variety of identity attacks. By employing a HyperSphere enabled WiFi hub, HyperSphere of Things (HSoT) connected devices prevent outsider intrusion or commandeering of control. Personal HSoT connected devices can include security cameras and home security systems, control IoT devices and personal assistants, appliances, thermostats, entertainment devices and home entertainment networks, voice activated devices, radio-controlled speakers and more.

Applications of HSoT connected devices in the workplace include shared drives, printers, conference display screens, HVAC systems, lighting and blinds control, alarm systems, security systems, building maintenance, and more. In factory automation and in power generation, network connected devices may include surveillance cameras, sensors, monitors, locks, failsafe systems, backup systems, gas and air monitors, biosensors, emergency lighting, emergency systems, and more. Infrastructure applications include cameras, traffic flow sensors, traffic lights, freeway metering and commuter lane lights, mass transit security sensors, radio controller parking meters, smart payphones, etc. Connected and autonomous vehicles represent another broad class of network connected device and applications where security and privacy are strictly important. Vehicular and smart highway applications include vehicle-to-vehicle (V2V), vehicle-to-infrastructure (V2X), and, more broadly, vehicle-to-everything (V2E) communications.

HyperSpheric e-Services:

In HyperSpheric e-services, merchants can monetize the intrinsic security of the HyperSphere to deliver secure services to risk adverse industries such as banking, transportation, communication, energy, security, treasury, medical, emergency response, and defense uses. Applications include credit card readers, remote ATMs, mobile banking and payments, dispatcher-based professional communication services, and industry specific customized services including HIPA-compliant medical devices and files, FIPS-140 compliant services for military and government applications, or online DRM-compliant video distribution as a replacement for cable and satellite TV subscriber services. In the foregoing applications, the HyperSphere enables a merchant to offer secure transactions to its client base that would be difficult or impossible to guarantee using Internet based communication and commerce.

Other HyperSphere Features:

Other uniquely inventive features of the HyperSphere include its green methods for cryptocurrency generation, its coexistence with the Internet as a public private network, its novel method for decentralized data packet routing, its ability to facilitate privacy protection of a user's identity and asset ownership, and a novel dual cryptocurrency based cryptoeconomic system. As compared to the Internet, the HyperSphere is uniquely capable in e-commerce, a hypersecure platform with the following characteristics:

- Eco-friendly autonomous conjunctive cryptocurrency and digital tokens
- Public-private fully distributed real time network
- Decentralized data packet routing over a stateless meshed network
- Distributed DyDAG network with no master encryption keys
- Privacy protected identity and ownership
- Embedded cryptocurrency for bank-less transactions (HyperSphere cryptoeconomics)

HyperSphere Market

E-commerce in the HyperSphere comprises a number of elements, including the HyperSphere marketplace; resource providers (HyperNodes); HyperSphere merchants (service providers); HyperContracts; and a sharing economy; as described in the following sections:

HyperSphere Marketplace:

As an e-commerce platform, the HyperSphere enables merchants to engage in real-time cybersecure network communication and cloud computing with no capital investment in hardware, infrastructure, R&D, or cyber-security developments. Rather than depending on privately owned or contractually obligated leases of servers, VPNs, or dedicated dark-fiber channel capacity, HyperSphere merchants and service providers use HyperContracts to solicit and contract independent resource providers (HyperNode owners) to facilitate network communication and execute their transactions. Using artificial intelligence and machine learning, the decentralized HyperSphere Marketplace then solicits and procures the necessary HyperSphere resource providers to complete each contract.

Figure 48:
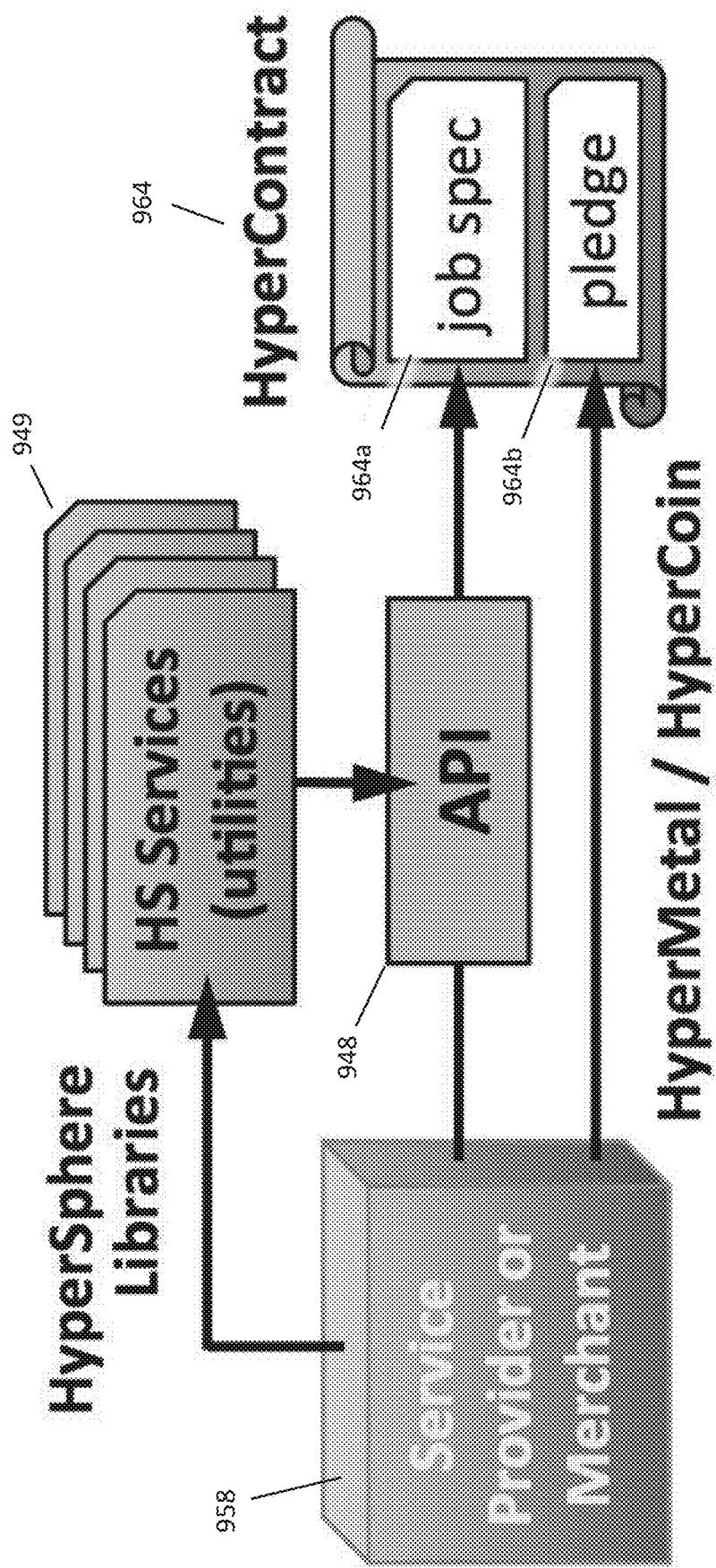
FIG. 48 illustrates a HyperSphere merchant API generated HyperContract and pledge.

HyperContracts 964 can be 'hard coded' by HyperSphere contract savvy software engineers or, as shown in FIG. 48, generated automatically or quasi-automatically through API interfaces 948 and templates, including the use of 'HyperSphere services 949,' utilities created and digitally signed by the HyperSphere as system validated transactional process code. These HyperSphere service utilities render certain commonly executed processes such as HyperCoin sales, asset transfers, point-of-sale transactions, installing Hyper-Nodes onto devices, creating HyperNode clusters, signing HyperWallets, etc., easy to use without the need to write executable code from scratch.

To match HyperSphere merchants' and service providers' requirements to resource providers willing to meet the terms and deliverables specified in a HyperContract, the Hyper-Sphere utilizes the HyperSphere Marketplace, a decentralized electronic marketplace. In operation, the HyperSphere Marketplace solicits resources and negotiates terms mutually acceptable to all parties. HyperNodes participating in the contract resolution process are by definition not party to a HyperContract. After negotiation is completed, the broker nodes are appended to the HyperContract for their role in brokering an actionable agreement. HyperMetal compensation is only paid upon successful execution of the Hyper-Contract.

Resource Providers (HyperNodes):

HyperSphere resource providers deliver communication, computing and storage capability to merchants in accordance with performance requirements stipulated in Hyper-Contracts—electronic contracts offered by merchants describing tasks, deliverables, and compensation. A Hyper-Sphere resource provider is any network-connected communication device hosting operation of a HyperNode—a software-based portal for accessing the HyperSphere. HyperNodes may be downloaded from a trusted app store or from the HyperSphere's website. For identity validation, HyperNode owners use digital signatures to ensure ownership by a specific parental CA-certificate and identity-trust-chain.

In operation, active HyperNodes participating in completed transactions immediately earn HyperCoin cryptocurrency in accordance with their contributions. Contribution value and compensation depend not only on market demand, but also on the intrinsic capability, speed, reliability, etc., of the HyperNode's host device. HyperNodes are not limited to operation on a single hardware host but may comprise clusters of devices forming a shared account linked to a specific perpetual blockchain and parental CA-certificate. Specifically, in the HyperSphere, resource providers are subdivided into four tiers of HyperNode owners based on their performance, speed, capacity, and the uptime capability of their hosts, namely:

- $1^{st}$ Tier: High-speed, high-capacity global server networks with high availability, such as Azure, AWS, GWS, IBM Cloud Services, etc.
- $2^{nd}$ Tier: High-speed, local server clouds including ISPs, cable networks, bitcoin miner farms, etc.
- $3^{rd}$ Tier: Medium-speed, AC-powered computers and CPUs including PCs, gaming consoles, smart TVs, routers, etc., and
- $4^{th}$ Tier: Mobile and IoT devices including notebooks, tablets, smartphones, games, appliances, etc.

Merchant access to and pricing of a specific tier of resource provider is determined by the cost and performance requirements stipulated in a merchant's HyperContract and by the market dynamics of supply and demand. During execution of a HyperContract, pledged payments (made in HyperMetal or HyperCoin) are recorded on the account owner's corresponding blockchain. Upon completion of a HyperContract and confirmation by a jury-of-peers, the HyperNode mints HyperCoins in accordance with the pledge specified in the HyperContract.

HyperSphere Merchants (Service Providers):

Referring to FIG. 47, A HyperSphere merchant 958 is an independent company that uses the HyperSphere to deliver products and services to its client 959. The merchant 958 pays only the HyperNodes 957 that are involved in carrying its data 956 or executing its prescribed tasks. HyperSphere resource providers, operating HyperNodes 957, perform tasks and execute contracts for the HyperSphere merchant 958.

The merchant 958, in turn, provides services for its client 959, including such services as business-to-business (B2B) and business-to-consumer (B2C) support. Since the Hyper-Sphere is a platform and not a company, client 959 is unable to use or to access the HyperSphere except through the HyperSphere merchant 958. Commercial merchants are able to compete more effectively using the HyperSphere than the Internet because they can access greater resources with higher performance at a lower cost.

The service provided by HyperSphere merchant 958 may include:
- Financial services
- Asset management
- Entertainment
- Manufacturing
- Healthcare By creating a HyperSphere API-generated application or user interface, merchants and service providers can offer communication, computing, storage, cloud-connected devices, or e-services and products to their clients (even if their clients are not HyperSphere clients).

HyperContracts:

Transactions in the HyperSphere occur using digitally specified procedures called HyperContracts issued by HyperSphere merchants and service providers to solicit and contractually stipulate deliverables from HyperNode resource providers. Every HyperContract comprises a job specification 964a and a HyperMetal or HyperCoin reward pledge 964b, describing the compensation reserved, i.e. pledged, for payment to resource providers participating in the contract's successful execution (including jurors and backup nodes). To provide both transparency and to confound blockchain attacks, the jury-of-peers used for consensus-based validation includes both public and cloaked members, observers unknown by the parties transacting business until after the consensus option has been rendered. To solicit job resources and encourage participation, a HyperSphere merchant or service provider attaches a reward pledge to the HyperContract along with the job specification.

The pledge, once attached, is temporarily sequestered, i.e. removed, from the merchant's blockchain and essentially held in digital escrow pending contract completion or failure, thereby ensuring payment with the proviso that the contract is executed. The merchant next delivers the proposal to the HyperSphere Marketplace, a decentralized market using AI-based algorithms executed by HyperNodes. The bidding process is iterative using various silent auction methods, continuing until all the required resources including participants, jurors, and backups are committed. The accepted contract is then executed as specified. Remuneration is likewise paid in accordance with contractual obligations.

Sharing Economy:

The HyperSphere itself serves as the electronic framework and ecosphere in which communications and transactions occur. Comprising a heterogeneous decentralized network, the HyperSphere cloud co-exists with the Internet using the same servers, microwave towers, satellites, fiber networks, dark fiber channels, and routers as public and for-profit private clouds. Similarly, the HyperSphere's "last mile", is routed over local ISP's Ethernet and fiber lines, over cable networks, and over 2G, 3G/LTE, 4G, and 5G networks with no requirement to deploy new or dedicated infrastructure. The last link to a user's device employs whatever connectivity is available, be it Ethernet, WiFi, mobile telephony, or an ad hoc peer-to-peer (P2P) or vehicle-to-vehicle (V2V) network in which the user participates. In the HyperSphere, network operations comprise fully decentralized operations with no central authority, no master encryption keys, and no governing security credentials. In essence, users are unaware of how the HyperSphere achieves its communication and transactional security and privacy.

Users, whether merchants (service providers) or resource providers, connect to the HyperSphere using 'bring-your-own-device' (BYOD) hardware simply by installing a software- or firmware-based network-portal called a HyperNode. HyperNodes not only enable a device to access the HyperSphere and to reach other HyperNode owners, but also serve as a communication node in the network. Each new HyperNode connecting to the HyperSphere expands the size, density, capacity, and performance of the HyperSphere. In this sense, the HyperSphere is the "the people's network," a network made up of its users, merchants, and resource providers.

Unlike large cloud operators, AWS, GCP, Azure, Facebook, and global telephony carriers AT&T, NTT, Verizon, T-Mobile, the HyperSphere is not a party to or beneficiary of the business transactions it hosts. Instead, merchants fund the resources by paying only for the HyperNodes involved in carrying their data or executing their prescribed tasks. Aside from a small transaction fee for processing certain types of transactions, the HyperSphere does not receive compensation or set the price of services executed on its platform. The cost of services in the HyperSphere is instead determined by a negotiation between the HyperNode owners, i.e. the resource providers, and the merchant or service-provider seeking network, storage, or computing resources.

In one embodiment, these tasks are assigned and distributed to available (online) and willing HyperNodes through an artificial intelligence (AI) based marketplace matching merchant's demands to various resource provider's capacity and capabilities. In another embodiment, the tasks to be performed are specified and the participating HyperNodes agreeing to perform such services are assigned in a digital contract called a HyperContract. In a third embodiment, HyperContracts are electronically negotiated in an AI-based HyperSphere Marketplace. HyperNodes serving HyperContracts may comprise one of four tiers of HyperSphere Resource Providers classified by their performance, reliability, capacity, and availability, comprising:

Tier-1 Resource Providers: Tier-1 Resource Providers comprise highly reliable, high capacity, high bandwidth cloud communication, cloud computing, and cloud storage suppliers. Tier-1 providers offer premium performance at the highest HyperMetal payment prices, taking HyperSphere marketplace job contracts, i.e. HyperContracts, with a guaranteed service contract payment of HyperMetal and with no HyperMetal performance bonus. Tier-1 resources include AWS, Azure, GCP, etc. Tier-1 resources operate on a business model of "guaranteed performance, guaranteed payment" converting HyperMetal to HyperCoins upon job completion, and most likely exchanging HyperCoins immediately for fiat currency. Statistically, Tier-1 resource providers are expected to service performance demanding applications including premium HyperSphere merchants offering commercial pay-for-service businesses, and real-time applications sensitive to latency and propagation delay such as voice and live video.

Tier-2 Resource Providers: Tier-2 Resource Providers comprise high capacity and high bandwidth computing platforms and Internet providers lacking global omnipresence or guaranteed availability. Tier-2 resources offer high-throughput cloud connectivity, high speed cloud-connected computing, and high-capacity storage at competitive, commercially aggressive rates compared to Tier-1 Resource Providers. Examples include local ISPs, cable operators, university server farms, and re-purposed high capacity Bitcoin miners. HyperContracts for Tier-2 Resource Providers negotiated in the HyperSphere marketplace comprise a combination of fixed and bonus HyperMetal compensation. HyperMetal bonus compensation varies, depending on market competition and a provider's performance. Upon receiving payment in HyperMetal for fulfilling a HyperContract, the received HyperMetal is automatically converted to HyperCoins, the HyperSphere's fungible cryptocurrency. Although Tier-2 HyperNodes can hold HyperCoins for speculative investment, Tier-2 HyperNodes are more likely to immediately reuse HyperCoins for contracting services or to cash them out to avoid fluctuations in HyperCoin cryptocurrency prices. Alternatively, Tier-2 resource providers may elect to convert HyperCoins into HyperMetal through a tandem currency-exchange process comprising the steps of (i) exchanging HyperCoins to fiat currency at the current market rate, and subsequently (ii) purchasing HyperMetal at the current quant (bit rate) cost. HyperCoins cannot be used to purchase HyperMetal directly without becoming subject to onerous government regulations regarding 'options contracts.'

Tier-3 Resource Providers: Tier-3 Resource Providers comprise opportunistic providers comprising wireline connected or high uptime devices such as personal computers, small servers, private online storage farms, and HyperNode enabled routers (i.e. HyperSpots). Tier-3 resources are used for HyperSphere Merchants less sensitive to communication latency such as online shopping sites, regional services, online backup and storage of photos, files, media contents, etc. Tier-3 resources may also be used philanthropically to support students, researchers, startups, and entrepreneurs lacking access to computing resources. HyperContracts for Tier-3 Resource Providers negotiated in the HyperSphere marketplace a mix of contract and bonus HyperMetal compensation with a greater possibility for guaranteed HyperMetal compensation during periods of high demand. Tier-3 Resource Providers often may comprise individuals or small companies wishing to supplement their income or lower their operating costs. Upon receiving payment in HyperMetal for fulfilling a HyperContract, the received HyperMetal is automatically converted to HyperCoins, the HyperSphere's fungible cryptocurrency. Although Tier-3 HyperNodes can exchange HyperCoins to fiat currency at any time, they are less likely to "cash out" upon payment than Tier-1 or Tier-2 providers, and are more likely to hold them for investment purposes, risking a capital loss for the upside potential of the cryptocurrency.

Tier-4 Resource Providers: Tier-4 Resource Providers comprise mobile devices such as cell phones, tablets, notebook computers, and automobiles that offer only limited-duration connectivity to the HyperSphere cloud. Such devices are primarily used for increasing the HyperSphere's communication mesh density, especially in peer-to-peer networks and in rural or dense urban areas where access to cell towers may be limited or obstructed. HyperContracts for Tier-4 Resource Providers negotiated in the HyperSphere marketplace primary comprise bonus HyperMetal compensation automatically converted into HyperCoins, the value of which varies in accordance with periods and localities of high demand. Although Tier-4 HyperNodes can exchange HyperCoins to fiat currency at any time, they are less likely to "cash out" upon payment than other tiers of providers, and are more likely to hold them for investment purposes, risking a capital loss for the upside potential of the cryptocurrency.

HyperSphere Resource Providers can leverage their cell phones, notebooks, personal computers, and company computers to make income from devices that would otherwise sit idle at least two-thirds of every day. Resource Providers include everyday ordinary people wishing to augment their paychecks or cut their phone and utility bills, Small companies can improve their profitability and improve cash flow as well as access global customers otherwise not available to them. Gamers can share their resources when they are not playing in exchange for access to a global network of computing power and challengers to enhance their gaming experiences when they are active. Bitcoin miners can find an alternative use for their hardware investments as the profit potential of the Bitcoin market continuously declines. Universities can share their research computers with other institutes to balance workloads, reduce costs, and improve peak performance. Large companies can improve their loading through access to HyperSphere clientele.

HyperSphere merchants are independent companies using the HyperSphere to deliver products and service to their clients. In one embodiment, the HyperSphere Marketplace comprises an AI (artificial intelligence) based transactional ecosphere matching merchant demand against cloud-connected suppliers, i.e. where HyperSphere resource providers perform tasks and execute contracts for HyperSphere merchants. The merchants in turn, provide services for their clients including business-to-business (B2B) and business-to-consumer (B2C) support. Since the HyperSphere is a platform and not a company, consumers are unable to use or to access the HyperSphere except through a HyperSphere merchant. Commercial merchants are able to compete more effectively using the HyperSphere than the Internet because they can access greater resources with higher performance at a lower cost.

Any individual or corporation wishing to participate in HyperSpheric e-commerce can actively engage in the HyperSphere as a merchant, a resource provider, or both, with no investment or infrastructure expense. As a HyperSphere merchant, businesses can immediately access the potentially limitless resources of the HyperSphere, engaging in international businesses and global marketing at competitive costs. As a HyperSphere resource provider, a computer network operator, disenfranchised Bitcoin miner, regional ISP provider, cable network operator, personal computer, or even smartphone owner, can earn profit by contributing communication and computing assets to the HyperSphere on a full-time or part-time basis. Customers of HyperSphere merchants vary with the services a merchant offers.

HyperSphere Digital Currencies

Digital tokens used by the HyperSphere involve two types of cryptocurrency—HyperMetal transactional tokens, and HyperCoin utility tokens. The purpose of HyperMetal and HyperCoins is to facilitate a means by which merchants and resource providers can transact e-commerce in the HyperSphere. The stability and scalability benefits of a dual token economy are described below.

HyperCoin Cryptocurrency:

HyperCoins, the HyperSphere's tradable cryptocurrency and utility token, is a fully fungible medium of commerce with capability of:

Being traded, i.e. bought or sold, in banks or independent digital currency exchanges, Being minted from HyperMetal by resource providers (HyperNodes) as earned compensation for completing tasks and fulfilling HyperContracts, or Being used to engage and pay resource providers (HyperNodes) for completing tasks and fulfilling HyperContracts, the cryptocurrency being recycled into new HyperCoins (having new digital cryptographic identities).

HyperCoins bought or sold in banks independent digital currency exchanges and optionally used in the HyperSphere, are intrinsically volatile and subject to supply and demand market dynamics. Conversely, HyperMetal, purchased from the HyperSphere directly, is intended exclusively for contracting services in the HyperSphere, and cannot be sold, bartered, or hypothecated. Risk adverse merchants should employ HyperMetal to contract resource providers. Risk adverse resource providers minting HyperCoins as compensation, should immediately use the cryptocurrency to purchase services from other HyperSphere merchants or immediately exchange their HyperCoins for fiat currency in a digital currency exchange.

Holding on to a HyperCoin involves economic risks. Aside from their utility in the HyperSphere, the value of HyperCoins as an investment vehicle is unknown, as it depends on market dynamics . . . The conversion rate between international currency, aka "fiat" currency, and HyperCoins is subject speculation and currency fluctuations. Should a purchaser hold HyperCoins for an extended duration, there is no guarantee the HyperCoins' price will appreciate or that the HyperCoins holder will be able to sell their HyperCoins for a price higher than they purchased them. In one embodiment of this invention, in order to sell HyperCoins, a purchaser or token holder must be an active participant in the HyperSphere, requiring downloading a HyperNode onto one or more of their computing or communication devices and actively connecting to the HyperSphere for a prescribed duration. Absent an actively connected HyperNode, the associated HyperCoins will be disabled for eligibility for sale or exchange until the criteria are met. In other embodiments, a transaction fee is levied, but where there is no requirement for a user to own an active HyperNode.

HyperMetal Token:

The non-tradable internal cryptocurrency of the HyperSphere, HyperMetal utility tokens, serve a single purpose—to create and execute HyperContract transactions and to pledge reward payments for successful task and micro-task completion. HyperMetal may be purchased with a fiat currency from the HyperSphere or through authorized digital currency exchanges (DCEs). HyperMetal may not be sold or bartered. The purchase price of HyperMetal (in fiat currency) is set by the network's bit cost. The bit-cost is the normalized weighted average cost for $1^{st}$ Tier resource providers, unrelated to the trading price of HyperCoins.

Because HyperMetal can only be used to pledge compensation for HyperContracts and is not tradable, the purchase price of HyperMetal is relatively stable and not subject to speculation-driven price volatility.

Detached from trader-induced price volatility, merchants and resource providers can accumulate and hold HyperMetal to fund a company's HyperSpheric operations without risk of speculators driving up costs, destabilizing their business and supply chain. And because the HyperMetal's purchase price is set by $1^{st}$ Tier supplier bit rates, purchasing HyperMetal is commercially equivalent to guaranteeing access to the highest performance networks. Discounted by the buying power of the HyperSphere's growing economy, merchants can access resources at prices they would otherwise be unable to procure on their own.

Since HyperMetal is purely transactional and used exclusively within the HyperSphere, it is not subject to speculation or currency fluctuations thereof. HyperMetal can only be converted back into HyperCoins by engaging in e-commerce in the HyperSphere, i.e. where a HyperSphere Merchant uses HyperMetal to hire a service from a HyperSphere Merchant. The purchase price of HyperMetal is determined not by the trading price of HyperCoins, but by the actual bit-rate cost of Tier 1 resource providers also referred to herein as "quants", a measure of computing and communication bit-rate cost.

Thus the exchange rate from fiat currency to the HyperCoins may vary, as will the exchange rate of HyperCoins needed to purchase HyperMetal, but the net exchange rate between international fiat currency and HyperCoins will vary only in the real bit-rate cost or a quant of cloud services. If the value of HyperCoins appreciates, fewer utility tokens will be needed to purchase a fixed quantity of HyperMetal transactional tokens. Conversely, if the trading price of HyperCoins drops, more utility tokens will be needed to procure the same quantity of transaction tokens. Regardless of the market price of HyperCoins, the equivalent purchase price of HyperMetal in international currency remains relatively constant, essentially varying proportionally with the global cost of electrical power.

Dual Token Economy:

The HyperSphere economy as disclosed concurrently operates on two forms of digital tokens or virtual currency—HyperMetal used within the HyperSphere marketplace used by HyperSphere merchants to procure resources and schedule tasks, and "HyperCoins", used to compensate and reward HyperSphere resource providers for completing jobs in a timely manner and for engaging to the HyperSphere economic environment. Only by completing tasks can HyperSphere resource providers convert, i.e. "mint", HyperMetal into HyperCoins. In the HyperSphere, minting, the process of completing tasks and converting HyperMetal into HyperCoins, is analogous to mining in other cryptocurrencies except that it involves two digital currencies, one created, the other destroyed. Unlike mining of Bitcoins, minting of HyperCoins is based on a resource provider completing a task, job, or contract for a merchant. Minting is not based on gambling or gaming.

The commercial value of one of the HyperSphere's unique innovations—the concept of a dual virtual currency system, is that the HyperCoins can float to any value without affecting the real cost of engaging in e-commerce within the HyperSphere. Risk adverse merchants can eliminate current concerns by concurrently purchasing HyperCoins and simultaneously converting them to HyperMetal, thereby completely eliminating the risk of HyperCoin currency fluctuations from their purchases. Merchants wishing to gamble on HyperCoin appreciation may hold the HyperCoin before redeeming it for HyperMetal, in the hope that their HyperMetal purchasing power will improve if the HyperCoin trading price increases (it may not). In this manner, the HyperSphere can satisfy speculative and conservative business owners and merchants.

Digital Currency Generation

As shown in FIG. 49, HyperCoins can be generated in two ways, either through minting 960, the process of converting HyperMetal into HyperCoins, or by recycling 961 (melting) HyperCoins to make new HyperCoins. In this process, the payment pledge of HyperContract 964 is ratably apportioned among participating HyperNodes then used to synthesize new HyperCoins. If payment is pledged as HyperMetal 970*a*, HyperContract 964 transfers and locks 971*a* the pledge onto the HyperNode 962 owner's HyperMetal blockchain 965*a*. After contract execution and consensus, the pledge is unlocked 972*a* and recorded as a debit 973 on the HyperNode 962 owner's personal HyperMetal blockchain 965*a*, and entered as a corresponding unlocked credit 974 onto the HyperNode 962 owner's HyperCoin blockchain 965*b*.

In the case of HyperCoin recycling 961, the pledge 970*b* is entered onto the HyperCoin blockchain 966 of HyperNode 963 and held until HyperContract 964 completion. Thereafter, the HyperCoin is melted 975, i.e. reissued with a new cryptographic code, recycling the old coin into a new one 975. In either minting 960 or recycling 961, participating HyperNodes 962 or 963 automatically generate new HyperCoins 975 at the time of contract completion. Once generated, the HyperCoins can be sold, transferred, or moved into wallets.

Conjunctive BC Generation:

One unique feature of the HyperSphere is its ability to support e-commerce, online shopping, business transactions, and money wires without the need of banks or credit cards. Instead, the HyperSphere utilizes its own network-embedded virtual currency, i.e. digital tokens, to eliminate the cost, complexity, delays, and inefficiencies of transacting e-commerce using international currencies, money wires, and conventional credit-card based payment mechanisms. The generation of these digital tokens occurs autonomously and conjunctively as data packets move through the HyperSphere's unique dynamic network. In one embodiment, unique cryptographic codes are distributed to participating HyperNodes as data moves through the network.

During network operation, a cryptographic code comprising a transient or temporary blockchain is modified with each data hop in the cloud. This verification code used to substantiate a HyperNode's participation in carrying network traffic or performing a task is referred to as a HyperNode hop code or HHC. Because token generation accompanies the network performing real work, no energy is wasted on meaningless mining operations. Instead digital tokens are "minted" as a reward for resource providers completing tasks, jobs, and contracts. This novel Proof-of-Performance (PoP) mechanism requires less than one-trillionth of the energy consumed by mining Bitcoins, representing the world's first eco-friendly digital token generation. Once issued, the sale or transfer of tokens is chronicled in published blockchain ledgers, easily verifiable by a jury of peers. To initiate new HyperContracts, digital tokens or a portion thereof, are recycled, i.e. used to pay for a new transaction, job, or contract, during which the previous token is melted, and its blockchain retired.

HyperNode hop code (HHC) token generation is not exclusively limited to HyperCoin and HyperMetal generation and transactional processing. The same methods can also be used to generate counterfeit-proof digital tokens for merchants using the HyperSphere. This feature—creating, distributing, and verifying digital tokens as a service for merchants using HyperNode Hop Codes, or tokens-as-a-service (TaaS) is unique to the HyperSphere. Because the generation method involves the synthesis of either a transient blockchain (tBC) or a perpetual blockchain (BC), the feature of TaaS can be considered as a special version of a blockchain-as-a-service (BaaS). HyperSpheric TaaS custom-generated tokens can be used for a variety of purposes, including reward tokens for customer allegiance; discount coupons for purchases; reward mileage and perks for frequent travelers; gaming rewards for game performance; preferred tickets, backstage passes, and meet-and-greet VIP perks for artist fan club members, shopper rewards for completing information requests or credit card applications, and more.

HyperCoin Minting:

To prevent the fraudulent generation and falsified validation of cryptocurrency, the HyperSphere does not employ mining to generate new coins. Instead of trusting an unknown miner and a potentially corruptible jury-of-peers to validate Proof-of-Work solutions of numerical and cryptographic puzzles, the HyperSphere synthesizes cryptocurrency through a reliable internal process executed by its network of HyperNodes. This generation method is not observable to outside observers or subject to packet sniffing, and is unrelated to PoW nonce-hash puzzle solving. In its unique implementation, cryptocurrency generation occurs conjunctively as an intrinsic part of network operation during data transport in execution of HyperContracts without requiring additional energy or effort.

In operation, the HyperSphere utilizes multi-tree DyDAG blockchains to generate cryptocurrency and to record ownership. The DyDAGs may comprise 'perpetual' or 'transitory' blockchains, depending on their purpose and application. Perpetual blockchains (BC) establish ownership by linking extant cryptocurrency to personal CA-certificates using an identity-trust-chain lineage derived from a corresponding parental certificate.

Transitory blockchains or 'tBC' are, in contrast, temporary distributed ledgers used to execute HyperContracts, synthesize cryptocurrency, and ratably apportion compensation to participating resource providers. Unlike the permanence of a perpetual blockchain, once the task of a transitory blockchain is completed its blockchain is destroyed. In this manner, perpetual blockchains do not get burdened carrying unnecessary and irrelevant blocks of minutiae. All cryptocurrency synthesis in the HyperSphere starts with a HyperContract, a business agreement between resource providers and their clients—service providers and merchants. Each HyperContract comprises a job specification and a reward pledge describing the compensation reserved for resource providers participating in the contract's successful execution. HyperContract pledges can be made in two different cryptocurrencies, either HyperMetal or HyperCoins.

Figure 50:
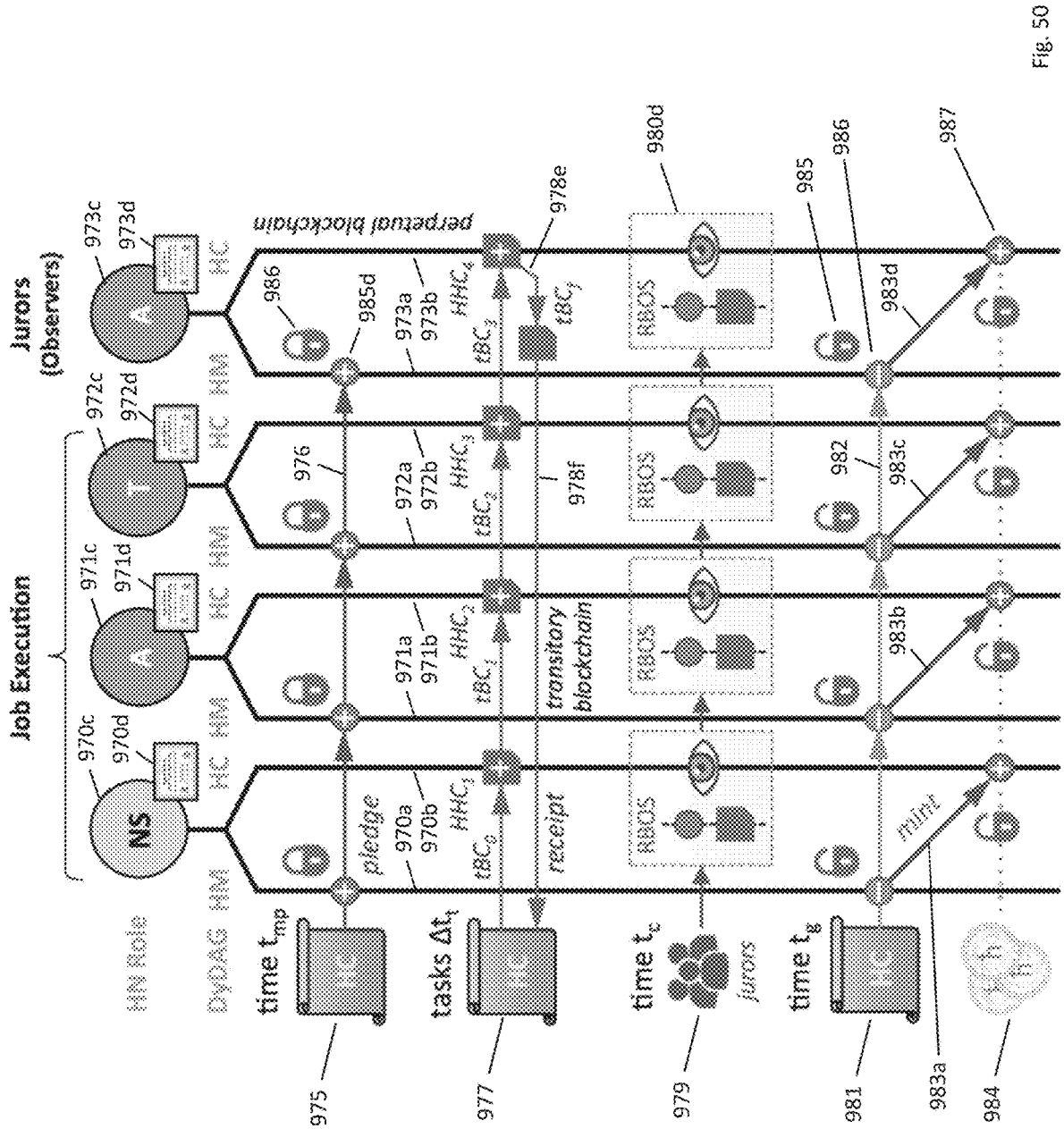
FIG. 50 is a flow chart of HyperCoin minting and juror validation through HyperContract execution of transient and irrevocable blockchains.

The process of minting, converting a HyperMetal pledge into HyperCoins is shown in FIG. 50. As shown, the vertical lines represent perpetual blockchains 970a and 970b; 971a and 971b; 972a and 972b; and 973a and 973b held by HyperNode owners 970c through 973c and signed by the owner's corresponding CA-certificate 970d though 973d based identity-trust-chain. The roles of participating HyperNodes 970c through 973c are represented by their metamorphic function performed respectively, as either name server |NS|, authority |A|, or task |T| nodes for job execution, or authority |A| nodes participating as observers in jury-of-peer consensus. Each participating node has two DyDAG perpetual blockchains—one set for HyperMetal transactions 970a, 971a, 972a, and 973a, the other for HyperCoin transactions 970b, 971b, 972b, and 973b.

In the DyDAG matrix shown, new blocks are appended onto these perpetual blockchains, in sequence ordered from top to bottom and time stamped accordingly. In the same illustration, horizontal arrows represent transitory blockchains tBC 976, 978e, 978f, 982, and 983a through 983d. Transitory blockchain are impermanent—executed sequentially, they modify perpetual blockchains and are subsequently discarded. As depicted, the minting process of HyperCoin generation occurs sequentially from top to bottom with tasks executed left to right. As listed in the order shown in the HyperContract, these processes involve the following milestones:

HyperContract pledging 975 at time $t_{mp}$
HyperContract task execution 977 over the duration $\Delta t_t$
HyperContract consensus 979 at time $t_c$
HyperCoin minting 981 at time $t_g$ In HyperContract pledging 975 at time $t_{mp}$, the decentralized HyperSphere Marketplace successively concludes contract negotiation, at which time the merchant sponsor distributes the HyperMetal pledges (e.g., 985d) to the committed contract participants, recording the pledge onto their HyperMetal blockchains 970a, 971a, 972a, and 973a as a pending transaction without actually transferring the HyperMetal. In this manner, the pledge acts as a blockchain version of an escrow by locking 986 the currency to prevent double spending. HyperContract execution 977 occurs over a period of time, i.e. during the interval $\Delta t_t$ when the HyperNodes execute a series of tasks (or subtasks) in accordance with the HyperContract's job specification. During data transit and micro-task execution, each HyperNode is delivered a cryptographic receipt, a transitory blockchain, e.g., 978e, containing a series of hashed blocks containing HyperNode hop codes or HHCs of the HyperNodes before it.

Figure 51:
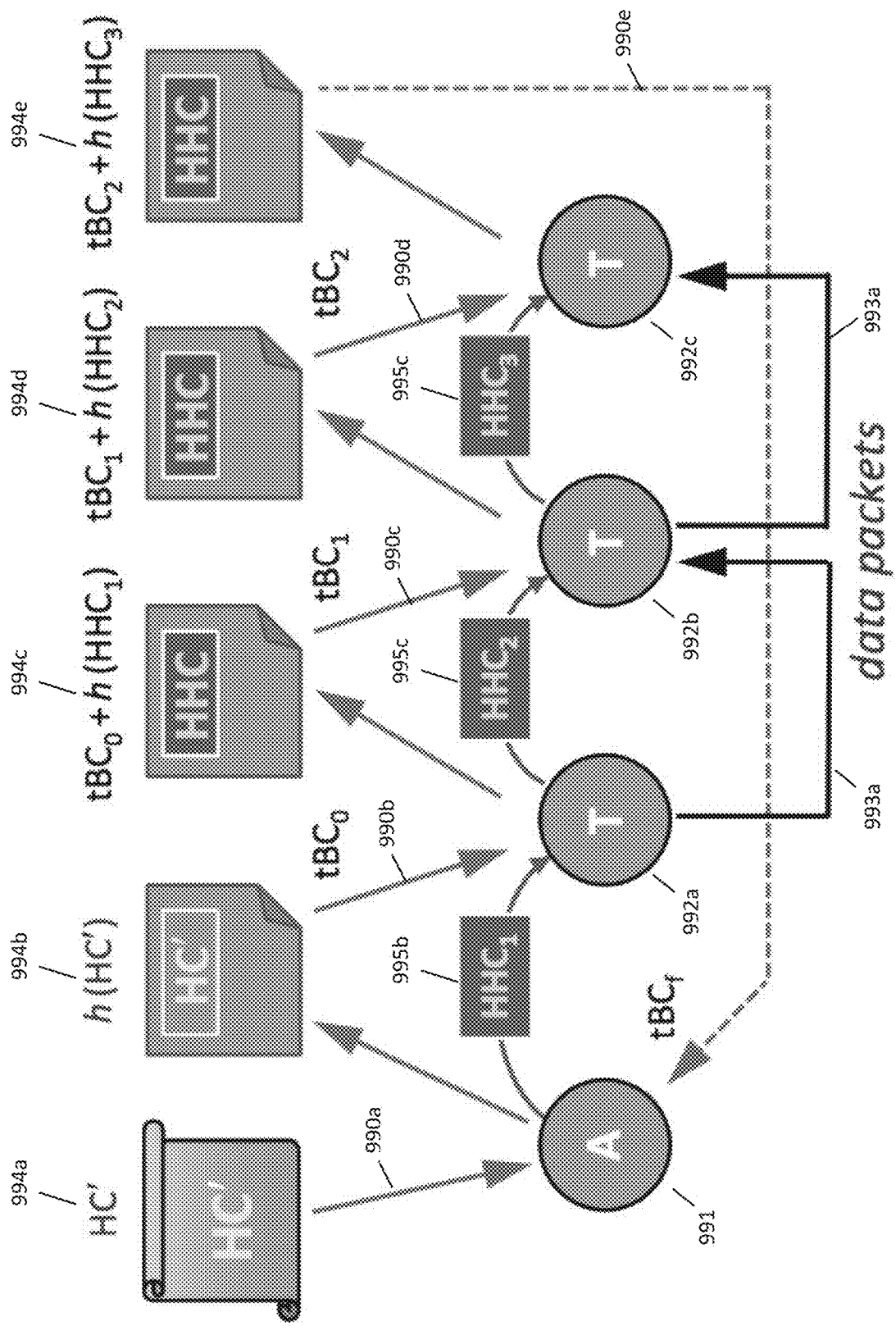
FIG. 51 illustrates conjunctive HyperNode hop code (HHC) generation during data packet transport.

As shown in FIG. 51, starting with HyperContract 994a, HyperNodes 991, 992a, 992b and 992c autonomously generate cryptographic codes 994b through 994e as part of a data packet's SDNP based routing instructions. Upon completion of their work, each HyperNode adds its own cryptographic block to the transitory blockchain. The HyperNode then forwards the new longer blockchain onward to the next node, which in turn repeats the process. In this manner, each HyperNode has irrefutable evidence of its participation. For example, task node |T| 992b receives transitory blockchain $tBC_1$ containing cryptographic code 994c, as shown having a value $\{tBC_0+h(HHC_1)\}$, and exclusively receives the HyperNode hop code $HHC_2$ 995c corresponding to the transport of data packet 983a, and then after processing forwards a revised transitory blockchain $tBC_2$ 994d having a value $\{tBC_1+h(HHC_2)\}$ onto the next HyperNode 992c. In this manner, a string of self-consistent blocks is generated excluding the possibility of imposters because they do not have access to the incoming transient blockchain or the HyperNode hope code HHC of the last data transport. Expressed algebraically in terms of SDNP network generated HyperNode hop codes $HHC_x$ 995b, 995c, 995d and cryptographic hash function h(x) then:

$$tBC_j = h(HHC_j) + tBC_{j-1}$$

In this process, the HyperContract itself forms the initial block of a transitory blockchain used in HyperContract execution, or tBC$_0$=h (HC') 994a. As data packets pass through HyperNodes 991, 992a, 992b, 992c in succession, a copy of the transient blockchain tBC$_j$ 994b, 994c, 994d, 994e is deposited, i.e. written onto the HyperNode's HC blockchain with the transient blockchain growing in length as the job is executed. Upon reaching the terminus node, the final full-length transitory blockchain tBC$_f$ 994e is returned to the HyperContract initiator to confirm task completion. The full-length tBC$_f$ blockchain is concurrently forwarded to the jury-of peers specified in the HyperContract for checking.

Returning to FIG. 50, at time t$_c$, consensus by a jury-of-peers confirms contract execution 979 using a RBOS (replicant blockchain observer segment), e.g., 980d, to facilitate inspection without the possibility of backtracing. Upon confirmation of HyperContract completion, peer review, and consensus, every participating HyperNode owner is awarded compensation according to their contribution using a copy of the transitory blockchain tBC$_0$, tBC$_1$, and tBC$_2$ establishing, i.e. 'proving' their performance. Once confirmed, the transitory blockchain is automatically converted, i.e. minted, into a specified number of HyperCoins 984 and recorded on the HyperNode owners' perpetual HyperCoin blockchains 970b, 971b, 972b and 973b. Cryptocurrency synthesis where participating nodes prove their contribution in performing real tasks is referred to as Proof-of-Performance or PoP.

Upon proving a HyperNode's performance 981 at time t$_g$ the HyperMetal is unlocked (using an unrestricted code) 985 and a new code is generated containing a hash of the HyperMetal pledge and the transitory blockchains tBC 983a, 983b, 983c and 983d, proving a valid peer-reviewed origination. Graphically, the minting process is depicted as an unlocking 985 and a debit 986 from the HyperMetal perpetual blockchain BC 970a, 971a, 972a, and 973a and a corresponding credit 987 onto the HyperCoin perpetual blockchains BC 970b, 971b, 972b and 973b of the same blockchain owners. HyperCoins, once minted, may be converted to international fiat currency or used in the HyperSphere to solicit resources, a process equivalent to recycling.

Figure 52:
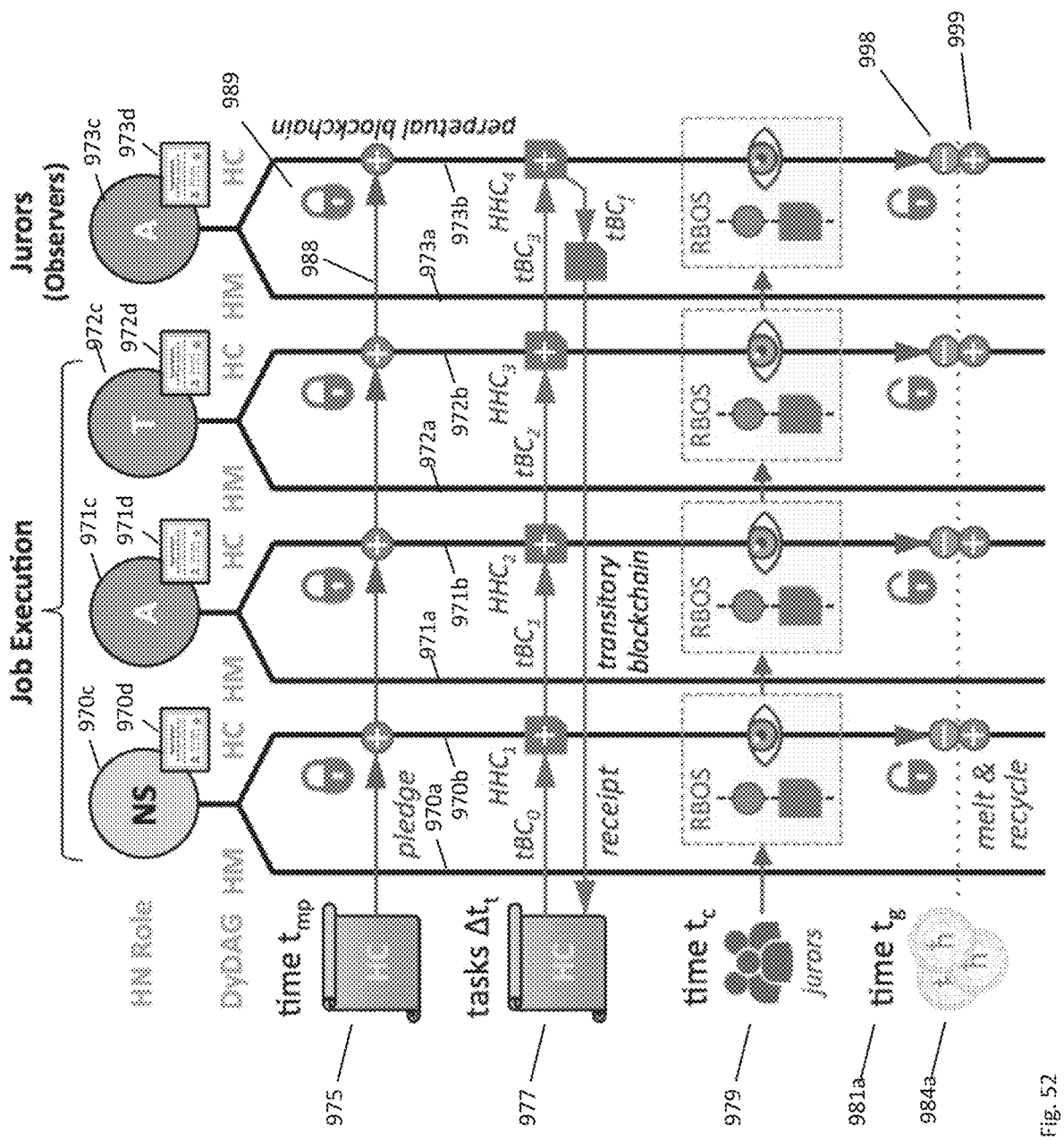
FIG. 52 is a flow chart of HyperCoin recycling and juror validation through HyperContract execution of transient and irrevocable blockchains.

In HyperCoin recycling, shown in FIG. 52, a HyperContract pledge is made in HyperContract 975 in HyperCoins (not in HyperMetal). The pledge, transferred by transient blockchain 988, is recorded on the HyperNode's perpetual HC blockchains 970b, 971b, 972b and 973b as a pending transaction (without actually transferring the HyperCoin). Locking 989 the HyperCoin into a digital escrow at the time of contract negotiation is especially important to prevent double spending, especially since the HyperCoin is fungible and tradable as a liquid asset. Task execution 977 and juror consensus 979 for recycling HyperContract execution occurs in the same manner as a minting HyperContract, except at the time of contract completion t$_g$ 981a when new HyperCoins 984a are generated.

In the recycling process, the cryptographic identities of the original pledged HyperCoins are destroyed (in HyperSphere taxonomy "melted") and then re-minted as new HyperCoins with new digital identities (depicted as a debit 998 and concurrent credit 999 on the HC perpetual blockchains 970b, 971b, 972b, and 973b). Like newly minted cryptocurrency, recycled HyperCoins employ a digital identity based on a cryptographic hash value h(x) derived from HyperNode hop codes HHC$_j$ and the original HyperContract HC. The HyperSphere's recycling process is entropic (lossy), not conservative, as the quantity of generated HyperCoins re-minted by HyperNodes is less than the number of HyperCoins pledged in the HyperContract, #HC$_{new}$<#HC$_{pledge}$, naturally reducing the number of HyperCoins in circulation by reuse attrition.

Network Native Blockchain Processing (BCP)

Figure 53:
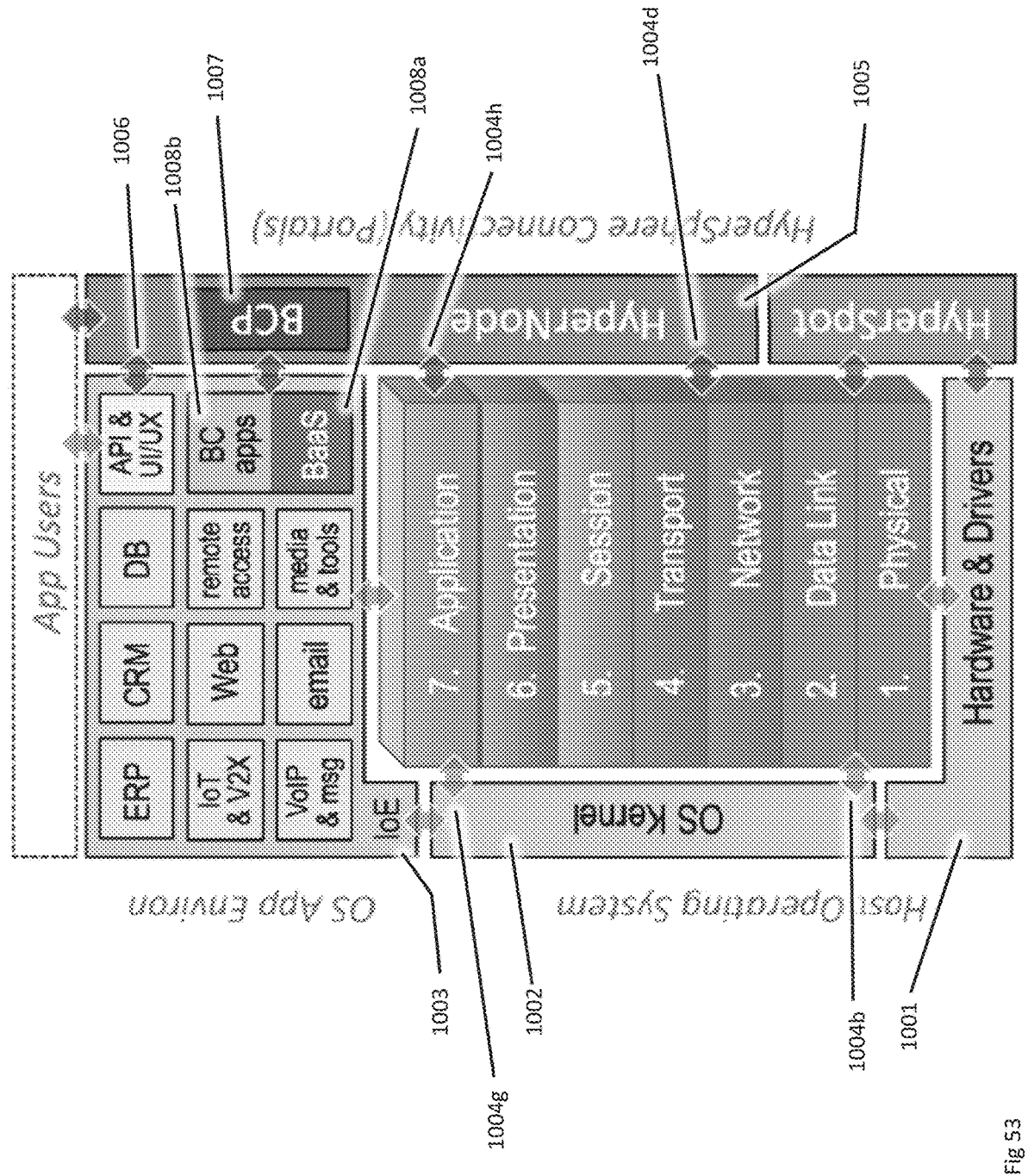
FIG. 53 is a block diagram depicting SDNP stack and device host with Layer-3 blockchain generation and processing.

Unlike in cryptocurrency mining, which only pays miners lucky enough to solve an arduous puzzle before others can, in Proof-of-Performance all HyperNodes participating in a successful HyperContract execution receive a contractually guaranteed return as minters. And because it occurs conjunctively with SDNP network operation, minting and recycling HyperCoins essentially consumes no more electrical energy than performing communication or e-commerce itself. In essence, HyperSpheric cryptocurrency synthesis wastes virtually no energy at all. To fully appreciate cryptocurrency generation and transactional processing in the HyperSphere and how these processes differ from Bitcoin, Ethereum, and conventional blockchain applications, it is insightful to consider a device's system architecture. As shown in FIG. 53, a computer or communication device supports software applications using an 'operating system' (OS) such as Windows, MacOS, Linux, Android or iOS. The operating system is hosted on a platform comprising hardware and drivers 1001, typically including multiple CPUs, memory, and device connections. An operating 'kernel' 1002 provides resource scheduling and task management for the OS acting an interface, i.e. a liaison between the hardware and an applications environment (referred to here as an application environ 1003 to avoid ambiguity). Recalling the terminology of FIG. 1, the applications environ can also be referred to as the OS virtual machine or VM. The application environ hosts a variety of software including APIs, UI/UX, database, business, email, VoIP-messengers, remote access gateways, IoT, Web apps, and more. Most apps today are network enabled, facilitating Internet-of-Everything (IoE) connectivity.

As depicted, the operating kernel 1002 interacts directly with both the application environ 1003 and the underlying hardware platform 1001. The kernel 1002 also interacts with the communication protocol stack, especially via Application Layer-7, as shown by double arrow 1004g, and layer 1.5 (the interfacial quasi-layer existing between PHY Layer-1 and Data Link Layer-2), as shown by double arrow 1004b. In operation, signals received by PHY Layer-1 are passed up to Layer-2 and concurrently transferred to the OS kernel for job scheduling. In turn, the kernel schedules tasks through its interaction with Application Layer-7 to support software running atop the device OS (in the application habitat). In this mechanistic explanation, it is insightful to distinguish the primary communication role of Application Layer-7 (in the SDNP or TCP/IP protocol stack) from the functions of computer application programs (running within the OS's application environ). Specifically, Application Layer-7 data packets provide high-level network connectivity to specific applications but are incapable of operating independently from the OS-hosted applications. In that sense the application environ 1003 sits atop the OSI protocol stack immediately above Application Layer-7. In the parlance of layers of abstraction, as shown by double arrow 1004g Application Layer-7 supports software running in the application environ above it and the software relies on Layer-7 supplied information for support. To function, the software and the data packet payloads must match in type, syntax, version, etc. For example, without database software installed on a device SQL instructions received on Layer-7 will go unrecognized and unanswered.

Data packets carrying Hypertext Transfer Protocol (HTTP) content for distributed, collaborative, and hypermedia information over the Web are completely useless without a browser application able to interpret HTML or XML. Similarly, in a conventional cryptocurrency blockchain, transactions received as Layer-7 payloads cannot modify or append new blocks onto an existing blockchain without corresponding application support. All conventional blockchain and cryptocurrency transactions occur entirely within the app environ of the host OS, not part of the protocol stack. As a network portal to the HyperSphere, HyperNodes 1005 span the SDNP protocol stack and OS app environs, communicating directly with the Network and Transport Layers-3 and -4 (double arrow 1004*d*), with SDNP Application Layer-7 (double arrow 1004*h*), and with its API and UI/UX in the OS apps environ 1003 (double arrow 1006).

In blockchain processing, the HyperSphere is wholly unique, generating HHC cryptographic HyperNode hop codes as part of Network Layer-3 and using this information in a blockchain processor or 'BCP' 1007, a decentralized network-connected software engine used in blockchain generation and transactional processes. The BCP 1007 then supports blockchain apps including BaaS (Blockchain as a Service) 1008*a* and various blockchain apps 1008*b*. Although BCP 1007, BaaS 1008*a*, and BC apps 1008*b* are used to facilitate HyperMetal and HyperCoin transactions, the processing engines can also be employed as a service to HyperSphere users creating custom cryptocurrencies or tokenization of service provider businesses.

The HyperSphere's multi-layer cryptocurrency generation is entirely unique and easily distinguished by conventional blockchains processed entirely as an application running in the OS app-environ above Layer-7 in the OSI protocol stack. For this (and innumerable other reasons), it is more accurate to refer to such conventional blockchain processors as "apps" rather than "protocols" or "networks." The HyperSphere's BCP 1007, in contrast, can truly be considered a protocol because it exists as part of the SDNP protocol stack, i.e. operating as a network-native operation both in minting new cryptocurrencies and conducting e-commerce transactions. Semantics aside, because BCP 1007 operation is HyperSphere network-native, blockchain processing is rapid—limited only by the speed of peer consensus rates for transactional validation.

Despite its rapid process capabilities, the HyperSphere's cryptocurrencies are difficult to counterfeit because they employ the previously described cryptographic hop codes unique to SDNP network operation not observable from the OSI Session, Presentation, or Application Layers 5, 6 and 7. These codes include a combination of HyperContract information (including the hash of the pledge and a timestamp) and their own unique sequence of HyperNode hop codes. Moreover, because of its purely internal coin generation and a cloaked (undisclosed) jury-of-peers, cryptocurrency counterfeiters are unable to match or predict network-generated blockchain content.

Blockchain Defragmentation:

Aside from its network-native blockchain processing and short-length DyDAG blockchains, another method to improve transactional speed involves the unique use of blockchain defragmentation. In a manner similar to defragging a hard disk drive (HDD), in the process of blockchain defragmentation available cryptocurrency is moved to the end of the blockchain at some regular schedule, e.g. at the end of every transaction or every day. By re-locating liquid currency near the bottom of the DyDAG blockchain, subsequent transactional verification requires only very short RBOS segments for confirmation, speeding validation and preventing backtracing altogether.

Figure 54:
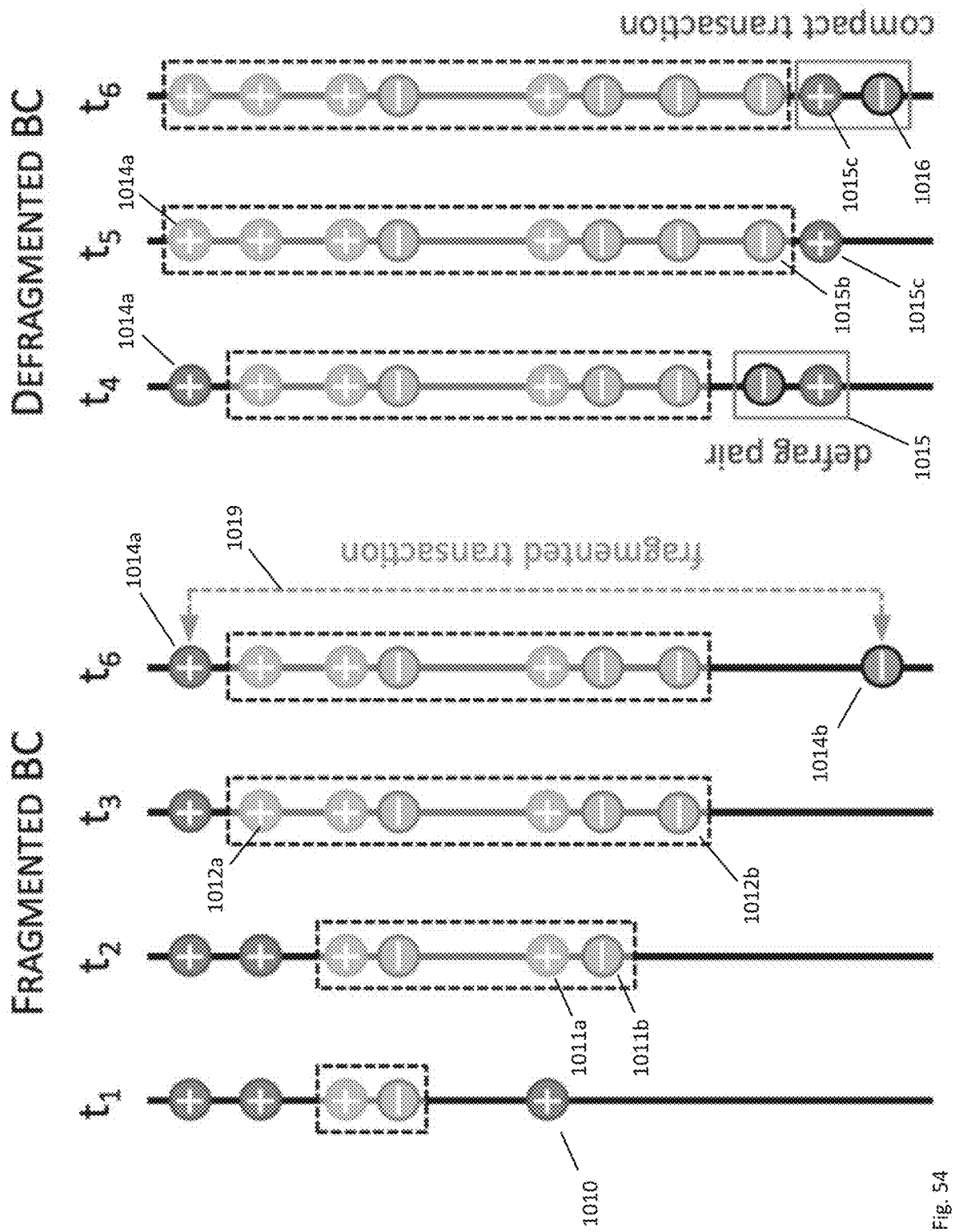
FIG. 54 illustrates a HyperSphere process sequence for executing blockchain defragmentation.

As depicted in FIG. 54, during fragmented blockchain processing new blockchains are appended only to the end of the chain regardless of whether they constitute a credit or a debit of assets. Blockchain assets are processed using a last-in first out or LIFO process, where the last acquired coins are used first to minimize transaction time. As shown, at time $t_2$ currency added at time $t_1$ (credit 1010) is consumed (shown as credit debit pair 1011*a* and 1011*b*). At time $t_3$ an even earlier deposit (credit 1012*a*) must be found and confirmed to facilitate a current debit 1012*b*. At time $t_6$, the asset needed to fund a current liability (debit 1014*b*) could involve identifying a deposit from far in the past (credit 1014*a*), i.e. comprising a fragmented transaction 1019 resulting in a long RBOS and slow transaction resolution.

The solution to this conundrum is to clean up the blockchain "as you go," meaning to remove defragmented assets at a convenient time when other transactions are not occurring and speed is not critical. The defragmentation process, shown in the sequence from times $t_4$ to $t_6$, involves identifying stranded assets and relocating these assets to the end of the blockchain. Since added blocks are permanent, there is no means by which to change an earlier entry. Instead, the BC defrag process involves adding "zero" to the blockchain, by recording a debit-credit pair 1015 as shown at time $t_4$. During validation, the new debit 1015*b* will cancel the earlier isolated deposit (credit 1014*a*), resulting a new asset (credit 1015*c*) located at the end of the chain as shown at time $t_5$. Then, when a payment (debit 1016) is made at time $t_6$, the asset (credit 1015*c*) is already located at the end of the blockchain and a compact rapid transaction can occur. Another element of blockchain management is the use of auxiliary blockchains.

Figure 55:
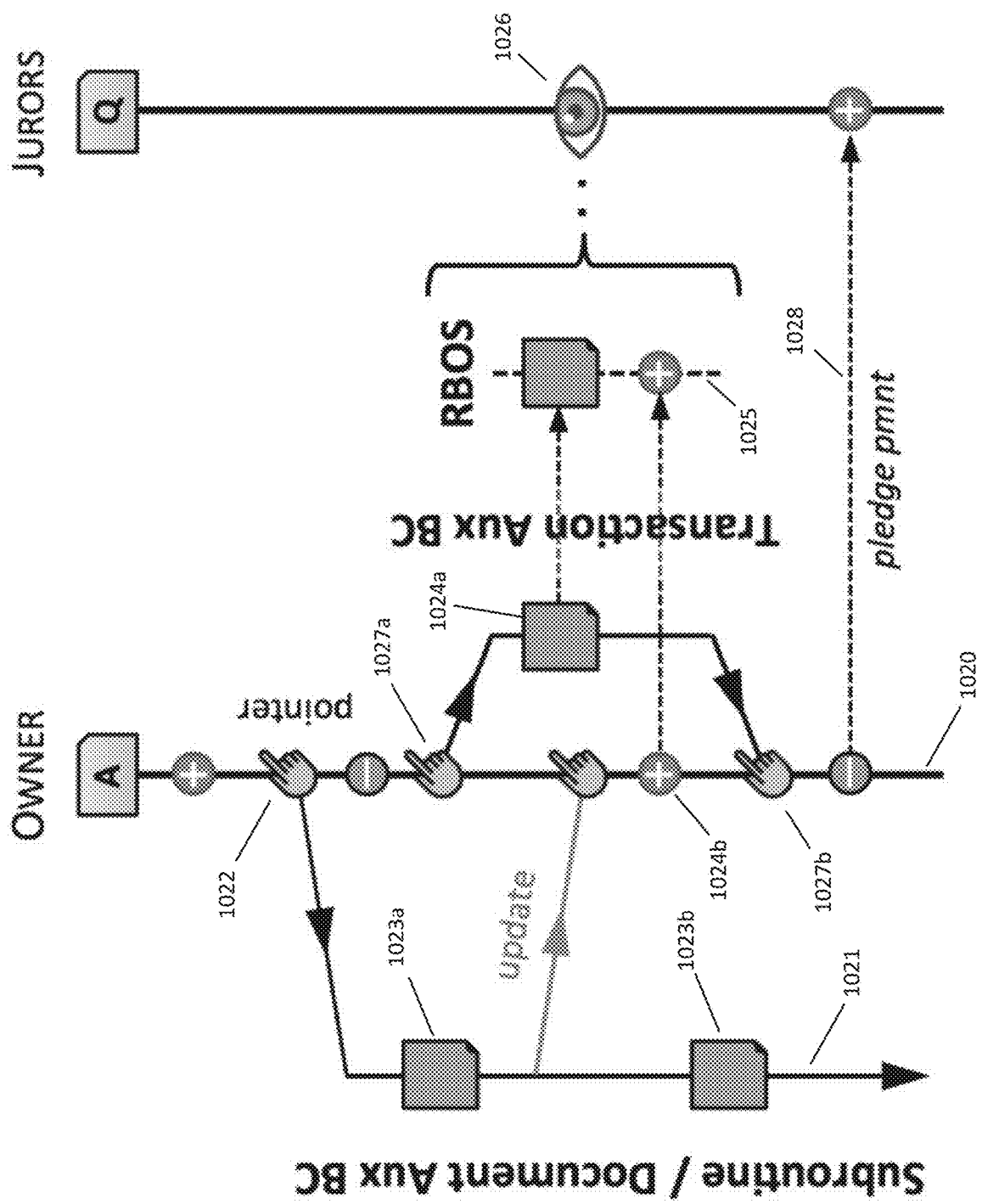
FIG. 55 illustrates a HyperSphere blockchain process for the creation and validation of auxiliary sidechains.

Auxiliary Blockchain Processing:

While in communal blockchain technology arbitrary files are appended onto the main blockchain, with the HyperSphere's use of DyDAG blockchains, as shown in FIG. 55, content can be implemented as an auxiliary sidechain 1021 without disturbing the integrity of the main blockchain 1020.

Without the ability to write arbitrary blocks onto the main blockchain, users are prevented from contaminating transactional blockchains with objectionable or illegal content. Instead, the main blockchain 1020 records only a pointer 1022 linking it to an auxiliary sidechain 1021, supporting entries 1023*a*, 1023*b* other than cryptocurrency transactions useful for documentation purposes. If the documentation supports a transaction 1024*a*, 1024*b*, such content can be included in an RBOS 1025 for a validation check by independent jurors 1026, and compensation 1028 can be made to the jurors therefor.

Once the sidechain is complete, it terminates and records a second entry on the main blockchain, establishing a firm chronology of events by pointers 1027*a* and 1027*b* without recording the actual non-transactional content 1024*a*. Because the second entry (pointer 1027*b*) occurs at a different dynamic state than the first (pointer 1027*a*), the DyDAG sidechain does not form a cyclic loop. The same auxiliary sidechain mechanism can be used for documentation unrelated to cryptographic transactions, and can even be used to invoke subroutine calls of executable code via BC apps. These processes may optionally record updates as to a subroutine's process status on the main blockchain while continuing processes in parallel to the spatiotemporal state of the blockchain, thereby enabling the prospect of executing a Turing complete process.

Secure Wallet:

HyperSphere accounts refer to the device assets, devices, and HyperWallets owned by a particular parental CA-certificate. In particular, HyperSphere accounts of a specific owner include their devices, their registered HyperNodes or HyperNode cluster, their HyperMetal perpetual blockchain, their HyperCoin perpetual blockchain, and their HyperWallets. Any number of intermediary CA-certificates may be used to digitally sign and verify ownership of these elements. All HyperNode income earned by a HyperSphere account owner will reside on their personal HyperCoin blockchain unless transferred into one of several HyperWallets. Additionally, HyperWallets may hold cryptocurrency other than HyperCoins including private company tokens using the HyperSphere as a Blockchain-as-a-Service (BaaS). Aside from minting HyperCoins, all asset transfers in and out of a HyperSphere account occur through $OT^3$ proxy mediator.

Purchases And $OT^3$ Proxies:

As described previously, all asset transfers in and out of a HyperSphere account are executed using a special transitory blockchain referred to as a one-time-transaction token or $OT^3$ proxy. The proxy exists only during a transaction after which the mediator and its records are irrevocably dissolved. In particular, to prevent theft or backtracing during sale of HyperCoins or when using HyperCoins as payment for online or point-of-sale purchases, no direct blockchain access to the owner's blockchain is allowed. Instead, a two-step transfer process is employed, wherein the blockchains are first moved onto a One-Time Transaction Token mediator or $OT^3$ proxy, and then in a second step the cryptocurrency is transferred from the proxy to the merchant or buyer in exchange for goods or currency (crypto or fiat). During all $OT^3$ proxy mediated transactions, the first step requires the payor, the HyperCoin holder, to request moving a specified number of HyperCoins from their account or HyperWallet to the $OT^3$ proxy. The term "proxy" is used to describe the fact that the assets held in an $OT^3$ during transaction verification are actually allocated and locked (like an escrow) on the payor's blockchain, but are not yet transferred into the $OT^3$, i.e. the $OT^3$ acts as a proxy agent for the real cryptocurrency asset.

Figure 56:
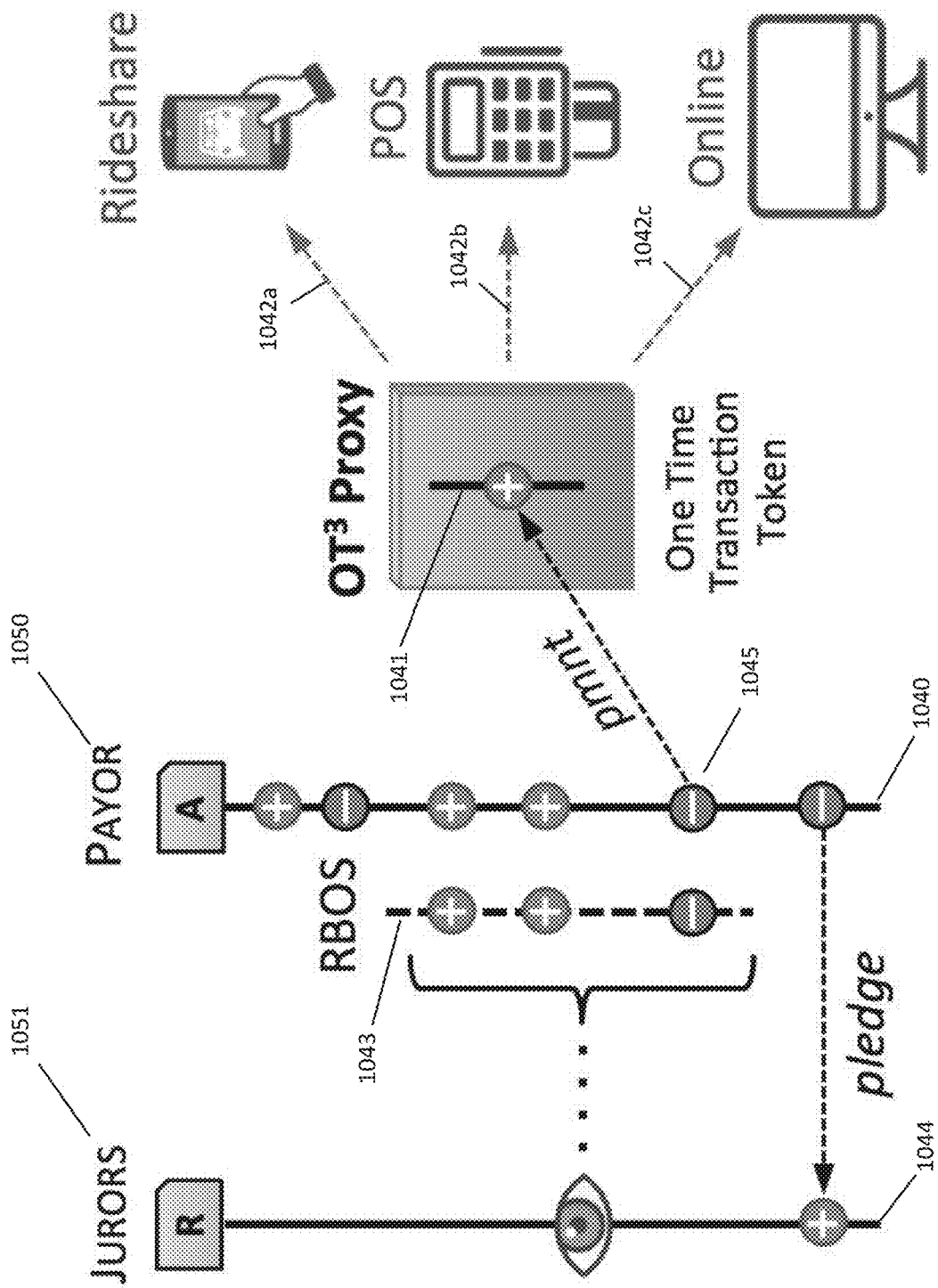
FIG. 56 is a schematic representation of HyperSphere payment processing using one-time transaction tokens ($OT^3$) facilitating preauthorized payment proxies.

The process, shown in FIG. 56, commences by the requestor opening an $OT^3$ transfer HyperContract. The HyperContract then identifies a jury-of-peers (e.g. jurors 1051 with a blockchain 1044) and creates a replicant blockchain observer segment (RBOS) 1043 from the owner's HyperCoin blockchain (or HyperWallet) 1040 of sufficient length to verify that the payor holds adequate assets to execute the requested transaction. Once verified, the requested HyperCoins are debited 1045 from the owner's (the payor's) perpetual HyperCoin blockchain 1040 and credited onto the transitory $OT^3$ blockchain 1041. Because the payor 1050 cannot see and does not know the cloaked jurors 1051 who are checking the RBOS blockchain, they are unable to execute a 51%, cyberbot, or Sybil attack to engage in double spending. Similarly, the payor 1050 cannot subvert or corrupt the 1040 RBOS data or blockchain.

The next step is to confirm the sincerity of the payee, either the merchant selling good and services, or the HyperCoin purchaser. This task can be accomplished in person for POS transactions, through an escrow agent (for real property) or by time-locking the $OT^3$ proxy's release till the transaction settles, e.g. until the validity of a Bitcoin payment can be confirmed. After the transactional integrity is confirmed the $OT^3$ proxy 1041 transfers the HyperCoin digital code to the merchant or buyer (e.g. paid to a rideshare agent (arrow 1042a), paid to a POS terminal for an in-person purchase (arrow 1042b), or transacted online (arrow 1042c)), and the proxy is closed. In this manner through the $OT^3$ proxy neither party directly interacts and is unable to commit fraud or backtracing. The proxy mediator also speeds transactional resolution because the slower blockchain verification and transfer process can precede the actual e-commerce transaction. Lastly, the $OT^3$ proxy limits the total assets at risk for transactional fraud because the HyperSphere account holder never exposes their personal HyperCoin blockchain or HyperWallet.

Figure 57:
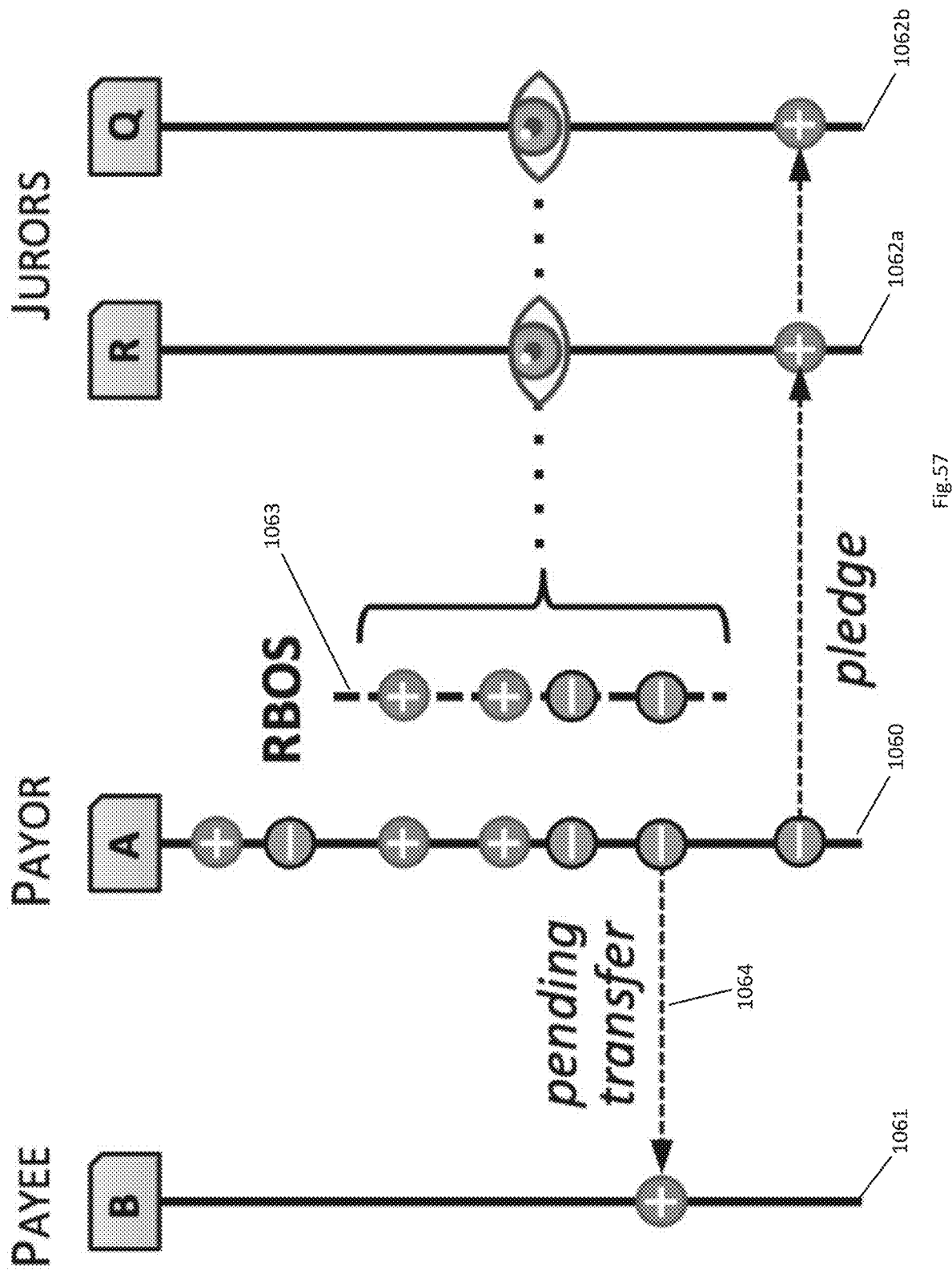
FIG. 57 is a schematic representation of HyperSphere rapid transaction validation and privacy protection using replicant blockchain observer segments (RBOS).

Replicant Blockchain Observer Segments (RBOS):

To manage transactional integrity while preventing personal identity theft or leakage from an account owner's blockchain, the HyperSphere uses a unique and inventive method referred to as a replicant blockchain observer segment (RBOS), introduced here for the first time. As shown in FIG. 57, comprising a limited length copy of a host's blockchain 1060, the RBOS 1063 is sufficiently long to authorize a transaction 1064 to a payee's blockchain 1061 but too short to enable backtracing of prior history or inadvertently result in privacy leakage.

FIG. 57 shows the use of the RBOS 1063 the consensus of jurors 1062a and 1062b in a HyperSpheric transaction. Any given transaction can employ more than one RBOS to support any size jury-of-peers. After the transaction's completion, RBOS 1063 is destroyed and the hashed blockchain recorded, protecting privacy while ensuring transaction integrity and traceability while preventing double spending.

Cloaked Jurors:

Another unique feature of the HyperSphere is its ability to establish ad hoc tunneling communication, i.e. dynamic single-hop VPNs, between a HyperNode source portal and a remote portal. The purpose of these private tunnels is to divert traffic away from subnets suffering QoS degradation from congestion and to avert cyberattacks on the network or on blockchain transactions such as DoS or Sybil or other surround attacks. The method can also be used to ensure hypersecure communication over uncontrolled Last Mile links.

Figure 58:
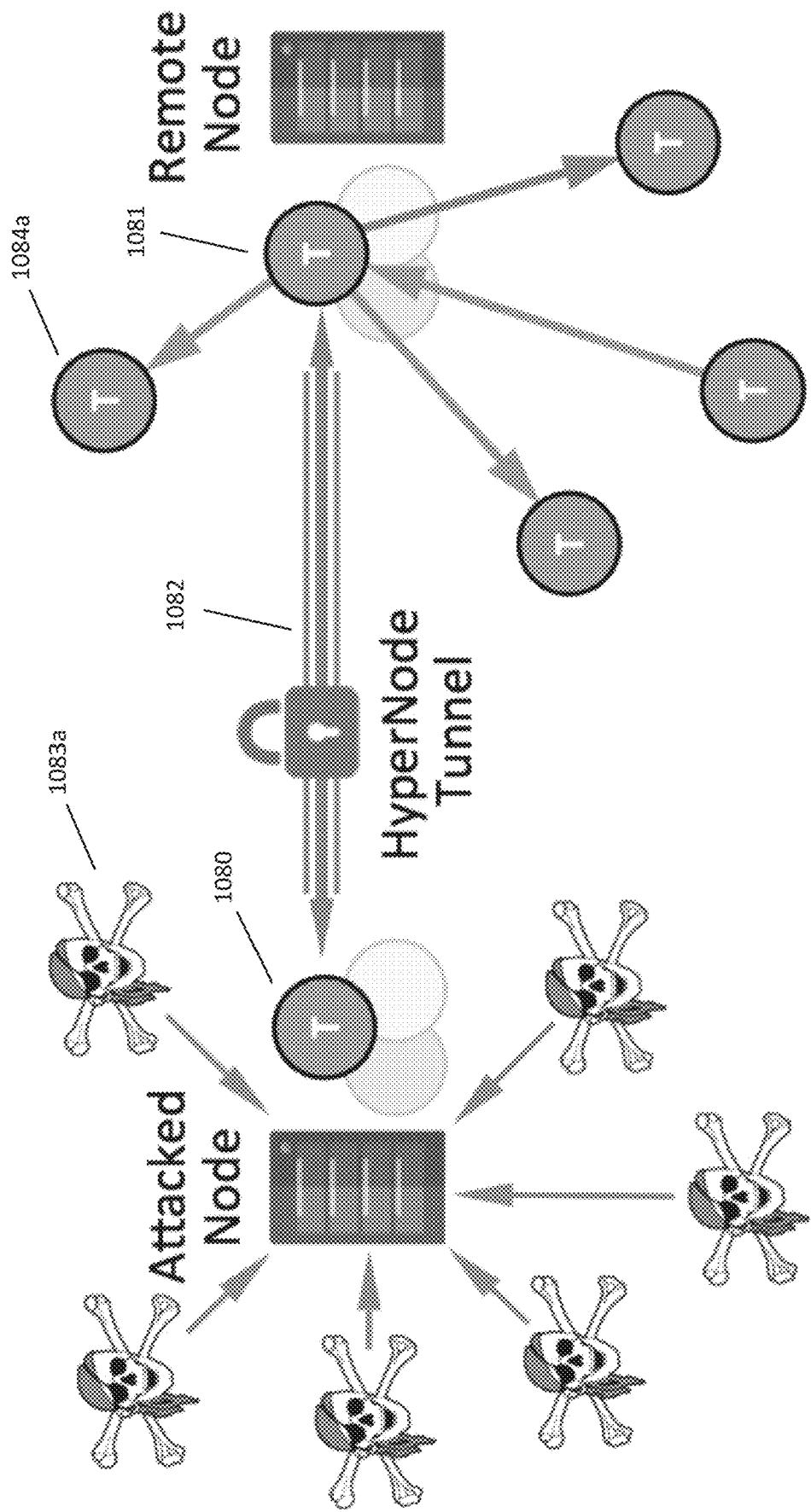
FIG. 58 is a schematic representation of the use of HyperNode tunnels to prevent consensus surround attacks of jurors.

As shown in FIG. 58, once a HyperNode inter-portal tunnel 1082 is established data can flow using direct routing to the remote portal 1081 unprocessed by intermediate nodes, much like an express train passes through local train stops without stopping (or even slowing down). Application of HyperNode tunnel communication is especially valuable in repelling cyber-assaults. For example, in the event of a rapid rise in localized network congestion where a denial-of-service-attack is suspected, the node under attack can temporarily suspend incoming packet support (or optionally open a queue buffer), establish a tunnel 1082 beyond the reach of attacked device or subnet, then reestablish all ongoing sessions redirecting traffic with other nodes 1084a to and from the remote portal 1081. While this response methodology will not prevent DoS from delaying the establishment of new incoming calls and sessions, it allows the surrounded node to establish open new links to safety on a priority basis, even when the source node 1080 is surrounded by cyberbots 1083a.

Because cyberbots 1083 lack the dynamic security credential to interpret the SDNP protocol, they cannot trace the location of a remote HyperNode portal 1081. HyperNode tunneling is especially valuable in protecting cryptocurrency transactions to avoid blockchain attacks such as Sybil, 51%, and DoS methods. By specifying cloaked jurors in a HyperContract, the transacting parties are unaware of which HyperNodes are performing asset and transaction consensus validation. Moreover, by connecting to cloaked jurors through the HyperNode tunnel 1082, their inter-portal communication is privileged and not subject to metadata surveillance and hacking by other network nodes. HyperNode tunneling is automatically executed by any HyperNode seeking exceptional transactional security or upon detecting a DoS assault. Once an attack is detected, tunnel traffic is assigned priority over all local traffic. Ongoing sessions are reinitiated through the remote node without any knowledge of the cyberbot attackers The HyperSphere also supports tunneling executed on an end-to-end basis. Unlike inter-portal tunneling, in end-to-end tunneling the communicating parties exchange cryptographic keys prior to and unrelated to the opening of a session or placing a call. Ideally, the keys can be exchanged between two devices in person without ever employing an intervening network. The application of end-to-end encryption facilitates personal privacy in the HyperSphere independently from the SDNP's security protocols.

Multidimensional properties of the HyperSphere include the following:
- Using quantum computing for brute force code breaking of a data packet is rendered meaningless by the incomplete data contained within the packet, lacking of metadata useful in identifying related datagrams in a sea of network traffic.
- Using quantum computing for brute force code breaking of a data packet does not help in decrypting other data packets since security credentials and concealment algorithms are dynamic, changing faster than they can be broken.
- The HyperSphere's metamorphic HyperNode's are stateless, meaning they forget what they have done immediately after they execute any task, leaving no record to inspect.
- Data transport occurs over a meshed network, secured on a hop-by-hop basis using dynamic concealment methods, meaning there are no master keys able to inspect data traffic, content, or even metadata.
- Since routing is dynamic, traveling through the network at near the speed of light, a hacker's intervention (also traveling at the same speed) can never catch the packet it is chasing. By the time the hacker's packet arrives at a HyperNode, the state of the DyDAG meshed routing has changed, metaphorically it is like reading yesterday's weather report.
- The application of DyDAG transitory blockchains (tBC) in HyperContract execution are stateless—destroyed after each task is completed, so supercomputing cannot be used to break a record that has already been destroyed.
- DyDAG perpetual blockchains (BC) are privacy protected by a multi-tree identity-trust-chain using pseudonymous identities, meaning that no means exists to link the pseudonymous owner to their true identity CA-certificate.

In general, the HyperSphere employs time and state-based dynamic changes in its network operations, packet transport, and security credentials to greatly reduce the probability of a successful intrusion into the SDNP spatiotemporal meshed network or against HyperSpheric transactional processing. This does not mean that any given datagram might not be code-broken, but that the damage of the attack is limited because of the packet's limited content, short lifespan, and lack of contextual metadata.

Sequential Quantum Key:

To recover lost root CA-certificate and restore corrupted account identities, the HyperSphere includes, as a last resort, a unique cryptographic device introduced herein as a sequential quantum key or SQK. The SQK, properly decoded, gives its owner the ability to open and restore their root CA-certificate to reclaim rightful ownership of corrupted accounts. Built on the principle of the quantum observer effect, which states that by very act of watching, an observer affects the observed reality, in a sequential quantum key, not only must the contents of the key be faithfully reproduced, the sequence in which each cell is viewed and entered must be executed in a precise way (metaphorically as a multidimensional Rubik's cube). If the sequence is executed incorrectly, the proper combination will never appear. The observer effect makes brute force attacks more difficult while allowing users to separate passphrase archiving and sequencing in unrelated media content.

Cryptoeconomics

While there is no generally accepted definition, in the context of this application we use the term 'cryptoeconomics' in its simplest interpretation to mean e-commerce involving the use of cryptocurrency. In that context, cryptocurrency based trading and e-commerce includes cryptographic currency generation, decentralized financial transactions, juror consensus-based transaction validation, smart contract execution, and crypto-incentives. Over the last decade, the advent of cryptocurrency, blockchain technology, and smart contracts has had a profound and beneficial impact on business, especially involving fund raising, venture capital, banking, capital decentralization, and challenging corporate hegemony for information control. Despite these accomplishments, the application and commercial acceptance of cryptocurrency and blockchain technology by major business sectors, especially risk adverse ones, has not progressed as anticipated. A number of issues plague todays crypto based economic models, as describe below.

1) The Problems with Crypto-Economy 1.0

All present day cryptocurrency based commerce, i.e. cryptoeconomics 1.0, relies on certain fundamental commonalities and associated deficiencies and vulnerabilities, namely:
- All transactions occur over the Internet and are subject to inherent security vulnerabilities (e.g. man-in-the-middle attacks, trust attacks, viral infections).
- There is no certain way to determine if CA-certificate based identification is stolen or fraudulent or to prevent malware infections (delivered via corrupted certificates).
- Nearly one hundred fifty attacks on blockchains are known, with many involving theft, fraud and double spending.
- The vast majority of cyber and cryptocurrency crimes go unpunished, especially those involving multinational hacks, in part because legal authorities are ill equipped to deal with cyber-crime, and also because of questions of jurisdiction.
- Conspiratorial and cyberbot peer voting control enables a variety of exploits, 51% attacks, and Ponzi schemes to be perpetrated on unsuspecting coin holders and traders.
- Corrupted smart-contracts can be used to commit fraud or Ponzi schemes without repercussion.
- Conventional cryptocurrency generation is by its very design fundamentally energy inefficient and ecologically harmful.

The last bullet point highlights the ecological challenges with crypto-economy 1.0. In essence, Proof-of-Work, the basis for Bitcoin mining was originally created not for cryptocurrency but to thwart denial-of-service attacks by forcing attackers to waste energy and spend money to launch an attack. Unfortunately, the same mechanism is now used to generate every PoW cryptocurrency (and to no surprise) wasting vast amounts of energy. Despite its publication buzz, alternatives such as Proof-of-Stake consensus based cryptocurrencies are not seeing widespread adoption. Aside from the foregoing concerns, cryptoeconomically several major fundamental flaws plague crypto-economy 1.0, including:

- Proof-of-Work generation of cryptocurrency relies on an artificially created coin shortage (limited production with diminishing rewards) with countdowns fueling price volatility and inviting exploits.
- Hard forks off of a blockchain intended to 'subvert' blockchain integrity with fraudulent blocks creates intense legal controversy between valid transactions competing on the main chain and side forks.
- Cryptocurrency today does not really do anything—aside from cryptocurrency mining and trading, using hash-nonce puzzle solving is unrelated to e-commerce or in delivering any real product.
- Long overweight blockchain cryptocurrencies suffer slow (and ever worsening) transaction rates incompatible with today's need for rapid e-commerce.
- Repeated use of direct blockchain payments exposes the blockchain or wallet to backtracing and theft.
- Present day smart contracts require unanimous consensus, thereby limiting the transaction rate serially by the slowest participant.
- Volatility in PoW cryptocurrencies, especially Bitcoin and Ether, prevent those businesses not interested in trading, from holding cryptocurrencies, forcing them to buy cryptocurrency only at the time of a trade.
- Successful blockchain attacks occur with tremendous regularity. Because skilled perpetrators gain control over entire blocks of the blockchain, coin owners irrevocably lose access to their own cryptocurrency to an unknown assailant with no legal recourse or means by which to recover their losses or seek justice or even to identity the perpetrator.

The last two bullet points highlight the risk of the current state of cryptoeconomics, specifically that merchants and businesses cannot procure and hold cryptocurrency because (i) it is too volatile in price, and (ii) it is too likely to get stolen if held for extended periods of time. This forces cryptocurrency users to simultaneously buy and use their digital assets only in spot trades or concurrent buy-sell transactions—hardly desirable features for the alleged currency of the future. Another issue is one of currency stability. A relentless appreciation in the average price of cryptocurrency coupled with trading-based volatility are particularly disconcerting for businesses considering cryptocurrency as medium for commerce because they destabilize an enterprise's operating costs. One oft-cited apologue (intended to inspire Bitcoin investors)—the anecdote of the 'fifty million dollar pizza' recounts the allegedly true story of a 2010 purchase of two pizzas for 10,000 Bitcoins, a purchase by November 2017 standards equal to $50,000,000 per pizza. As a post scriptum, six months later Bitcoin lost 25% of its value. Although such volatility may inspire speculators seeking quick riches, for businesses and enterprises the prospects of a wildly unstable currency is horrific, invariably limiting its utility and preventing any real commercial adoption.

2) Dual Cryptocurrency e-Commerce

To avoid the pitfalls of "Crypto-economy 1.0", the HyperSphere's cryptoeconomic system employs a uniquely implemented dual cryptocurrency system with personal blockchain ownership, i.e. blockchains not shared with other users. To ensure transactional integrity and to establish trust among peers, the HyperSphere's blockchain is inextricably linked to other blockchains in a dynamic (DyDAG) multi-tree structure. Cryptoeconomics in the HyperSphere is simple—no mining or hash-nonce puzzle solving is required. Service providers and merchants issue HyperContracts to obtain communication, computing, and storage capability using either fiat currency or using HyperCoins.

Figure 59:
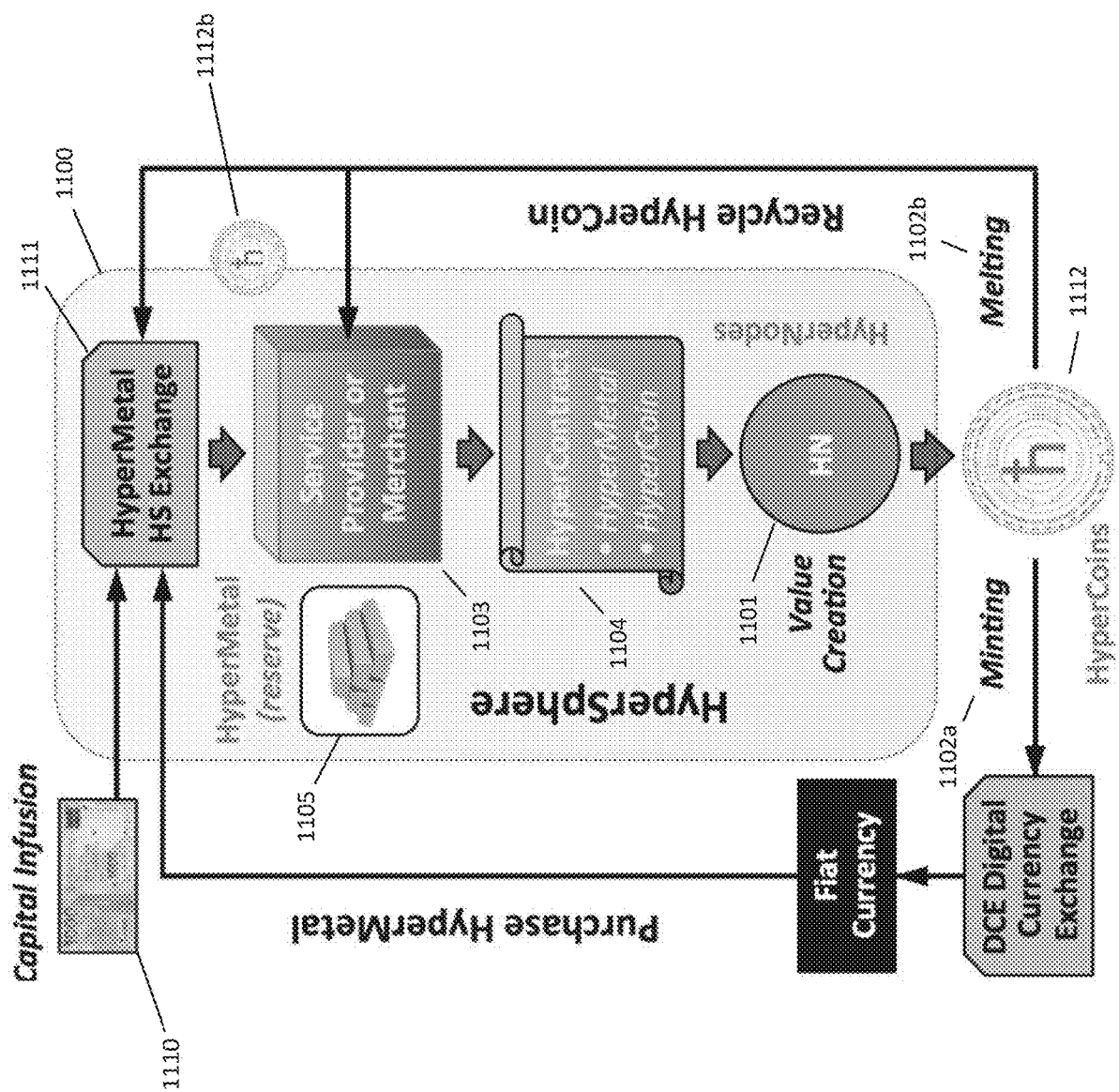
FIG. 59 illustrates the cryptoeconomics of HyperSphere e-commerce including the minting and recycling of HyperCoins through HyperContract execution via HyperMetal and HyperCoin pledges.

As shown in FIG. 59, in the HyperSphere 1100 resource providers (HyperNode owners) earn HyperCoins for supplying resources to merchants, either by minting 1102$a$ or melting (recycling) 1102$b$. In HyperContracts 1104 for HyperCoin 'minting' 1102$a$, merchants 1103 contractually pledge payment in HyperMetal 1105 using HyperMetal 1105 purchased with fiat currency 1110 (via a HyperSphere exchange 1111). Upon successful contract completion resource providers (HyperNodes 1101) automatically mint the released HyperMetal pledge into HyperCoins 1112, ratably apportioned in accordance with each HyperNode's relative contribution. Alternatively, in HyperContracts 1104 for HyperCoin 'recycling', merchants contractually pledge payment in HyperCoins (using HyperCoins 1112$b$ earned or purchased previously). Upon successful contract completion resource providers melt and recycle original HyperCoins 1112$b$ into new HyperCoins 1112, ratably apportioned in accordance with each HyperNode's relative contribution.

The newly generated HyperCoins contain new digital cryptographic identities in order to maintain small files and rapid transactions. Through recycling, HyperCoin holders and consumers have the ability to immediately use earned or purchased HyperCoin cryptocurrency 1112$b$ to directly pay merchants without requiring digital currency exchanges, thereby avoiding expensive exchange fees. In contrast, using minting HyperContracts, merchants can hold or use HyperMetal 1105 to conduct their business without risking the market volatility of HyperCoin trading and speculation.

3) HyperSphere Cryptoeconomics:

With its unique method of cryptocurrency generation, its dual-cryptocurrency system, and its utility in facilitating substantive e-commerce, the HyperSphere overcomes the fundamental limitations of Crypto-economy 1.0, namely:

- The HyperSphere delivers meaningful e-commerce including cloud-based communication, computing, storage, device-to-cloud connectivity, and e-services over a user-community owned cloud operating in a fully decentralized manner
- HyperSpheric cryptocurrency comprises embedded network-native digital tokens used for engaging in meaningful e-commerce in the HyperSphere without the complications of fiat-currency based transactions
- HyperSpheric cryptocurrency generation does not involve mining—solving useless puzzles to create digitally assets of artificial scarcity
- HyperCoins are automatically earned by any person, company, or entity hosting HyperNodes on their devices (or cluster of devices), with remuneration paid at the successful completion of any HyperContracts in which a HyperNode participates
- HyperNodes are BYOD friendly, allowing business and personal accounts to co-exist on a common platform with no comingling of files or data and requiring no capital investment (aside from personally owned devices)

Figure 60:
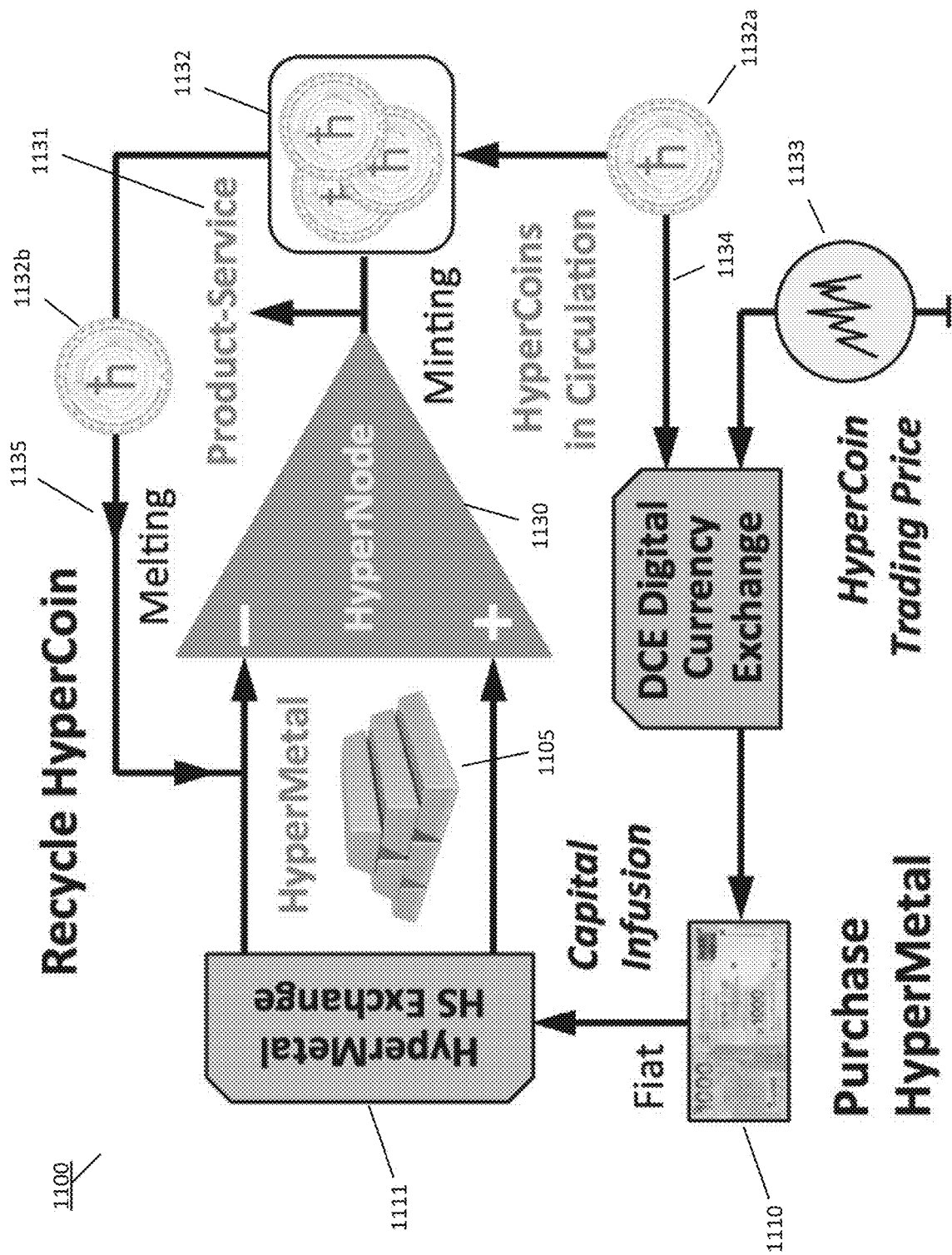
FIG. 60 is a flow chart showing an economic amplification representation of a value-added transaction, including positive and negative economic feedback mechanisms.

Unlike Bitcoin miners, HyperCoin minters are not required to consume massive amounts of energy to generate cryptocurrency or to risk capital investment on mining equipment with no certain reward or ROI Merchants and service providers are able to buy, store and gradually use HyperMetal to fund their HyperSpheric operations with minimal risk of volatility—thereby circumventing HyperCoin price volatility's impact on network use Risk tolerant traders, investors, and speculators are free to buy and sell HyperCoins without restriction, potentially benefiting from HyperCoin price fluctuations and volatility An economic model for the HyperSphere, albeit in simplified form, is represented schematically in FIG. 60, mechanistically illustrating economic growth drivers through both capital infusion and through HyperCoin recycling. As shown, the HyperSphere 1100 generates economic value through the operation of its HyperNodes—resource providers performing tasks to complete HyperContracts. Economic growth drivers of HyperSpheric operations are manifest in two ways: (i) as an increase in enterprise value $\Delta EV$ of merchants and service providers realized through the creation of products or the delivery of services, and (ii) in minting of new HyperCoins (HC) paid to HyperNode owners. This means service providers and resource providers (the community of HyperSphere users) are the economic beneficiaries of HyperSpheric e-commerce, not telecom or social media corporations, and not the HyperSphere platform. Economic gain of the HyperSphere occurs using two processes—minting and recycling (melting).

In minting, new capital infusion into the HyperSphere in the form of fiat currency 1110 is converted into HyperMetal 1105 and then "amplified" by a HyperNode 1130 to create added value comprising enterprise value $\Delta EV$ (a product or service 1131) and HyperCoin value $V_{HC}$ 1132, algebraically as $(\Delta EV+V_{HC})$. At the time of minting, HyperCoins have an immediate HyperCoin value $V_{HC}$ based on the number of coins received HC and the free market's HyperCoin exchange rate HXR, i.e. whereby $V_{HC}=(HC \cdot HXR)$. If the coins 1132a are concurrently sold (arrow 1134) as they are earned by HyperNode 1130, then volatility in the HyperCoin trading price HXR, i.e. its exchange rate into specific country's fiat currency, is not a factor in the fiat profit earned by the HyperNode's owner.

Illustrated schematically, value creation through minting depends only on the quantity of HyperMetal (HM) 1105 pledged to HyperNode 1130 (shown as the input to a difference amplifier); and by the amplifying value-gain $A_v$ of the HyperNode minting new HyperCoins (a reward value specified in each negotiated HyperContract). Since the HyperMetal purchase price in HyperSphere exchange 1111 is based on the (relatively stable) bit cost of the network, then the volatility in the HyperCoin trading price has no effect on earned HyperCoins (a behavior represented graphically as common-mode noise not amplified by the difference amplifier). To summarize, in minting, HyperMetal 1105 is converted into enterprise value of a product and service plus a varying number of HyperCoins 1132 (the system's gain) based on supply-demand market dynamics.

The second economic input to the HyperNode 1130 amplifier, 'recycling HyperCoins', does not result in production of new HyperCoins, but instead melts and recycles old HyperCoins 1132b into new coins of lesser quantity. Shown as a negative input to the amplifier representing HyperNode 1130, recycling (arrow 1135) decreases the number of HyperCoins in circulation, enabling merchants to engage in commerce without infusing new capital into the HyperSphere. During recycling, the initial quantity of HyperCoins (HC) is reduced to a smaller quantity ($\beta$ HC) where $\beta$ ranges from 0% to 100% describing the fraction of HyperCoins retained, i.e. paid to resource providers and remaining in circulation.

The corresponding value change of HyperCoins in circulation resulting from recycling is then given by $\Delta V_{HC}=(HC \cdot HXR)(1-\beta)$, a portion of which is delivered as products or services to merchants and service providers. The change in enterprise value, while proportional to the change in HyperCoin value $\Delta EV \propto \Delta V_{HC}$, does not obey a fixed ratio, but varies with market conditions. In summary, recycling does not grow the HyperSphere's economy but facilitates e-commerce in recessionary periods. Melting (recycling) also serves as negative economic feedback, cryptoeconomically-improving stability by steadily taking a fraction of HyperCoins out of circulation.

By combining the stabilizing impact of HyperCoin melting with the ability to generate new currency in response to economic growth enables the HyperSphere to support dynamic e-commerce in a stable closed-loop system while remaining insensitive to fluctuations in the HyperCoin's trading price. In times of economic expansion, new capital infusions, represented by HyperMetal purchases 1110, by merchants seeking resources increase the HyperSphere's money supply of both HyperMetal 1105 and HyperCoins 1132 to support growing market demand. In periods of economic recession when new capital infusions dwindle, the HyperSphere economy can naturally contract in response, consuming unused HyperMetal 1105 and ultimately recycling HyperCoins 1132b, reducing the coins in circulation and helping to stabilize the currency against market sell-offs. In this manner, the HyperSphere cryptoeconomically operates more like to a country than a business enterprise.

Community:

Far beyond regulatory and legislative initiatives intended to prohibit monopolistic control of information and discourage the unfair sequester of network bandwidth, the HyperSphere economically represents the quintessential embodiment of 'net neutrality'. In operation, the HyperSphere's decentralized cloud network is owned and enabled by companies and everyday citizens hosting its HyperNodes, making the HyperSphere truly the people's network. In this regard the HyperSphere is wholly unique and incomparable to present day cryptoeconomics.

Individuals, companies, and research institutions owning multiple servers, computers, and mobile devices, can download HyperNode portal software onto each of the component devices and then link them as a 'cluster' into one account owned by a single identity-trust-chain. The advantage of clustering devices is twofold: first, all HyperCoin cryptocurrency proceeds earned by the cluster can be assigned to a single blockchain and used for the group's greater good. Secondly, communication and tasks executed in clustered devices behave as a single connected device without any need for remuneration paid to the HyperSphere for establishing the secure interconnectivity. In this manner, a company can create and operate a virtual private corporate network within the public HyperSphere network, functioning privately but with the ability to solicit resources or earn cryptocurrency when the opportunity arises. Another opportunity for device-clustering is in gaming communities. Commanding significant graphics and computing bandwidth and processing capacity, the global gaming community can also benefit from device-clustering, creating ad hoc societies for specific games with their own public-private networks running over the HyperSphere. In such cases the HyperSphere can also be used as a tokenization platform for gamers, separate and distinct from HyperCoin and HyperMetal cryptocurrency.

The HyperSphere also supports collaboration. For example, two universities, each operating its own HyperNode clusters, can engage one another's assistance and cooperative support through a HyperContract. As such, HyperContracts defining the circumstances of cooperation specify when a university can borrow computing capacity from another, and the compensation to be paid. With the HyperSphere, idle capacity on server farms, Bitcoin mining farms, and supercomputers need not be wasted, but instead may contribute to solving complex computationally intensive challenges facing the planet and its inhabitants. Finally, the HyperSphere is able to support charitable or non-profit organizations, e.g. providing a mechanism for soliciting and collecting support cryptoeconomically. Contributions can be spent on paying for services or be used to fund HyperNode hosting platforms able to generate more cryptocurrency assets than the original contributions, i.e. to 'amplify' charitable contributions for greater benefit.

The invention claimed is:

1. A method of secure communication and transactional processing in a decentralized communication and computer network, the network comprising a plurality of software-based communication network nodes hosted on network-connected devices capable of transferring and processing packets of digital data, the method comprising;
    transporting the packets across the network in a form wherein at least a portion of a digital packet is secured against unauthorized access through one or more concealment methods, the concealment methods comprising data scrambling, encryption, splitting, mixing, junk data insertions; and
    dynamically changing routes of the packets through the network of communication nodes;
    wherein:
    one or more nodes send packets that include a Hyper-Contract, the HyperContract comprising a job description, the job description comprising a digital file containing data, software, and executable code along with security credentials including numeric seeds and cryptographic keys; and
    the HyperContract determines, affects, or controls the operation of the node receiving the HyperContract so as to enable the node receiving the HyperContract to perform tasks or functions specified in the job description of the HyperContract.

2. The method of claim 1 where each HyperContract specifies which network nodes will participate in delivering the functionality and resources needed to fulfill the job specified in the HyperContract.

3. The method of claim 2 wherein the HyperContract specifies tasks the node will perform in the execution of the HyperContract, including functioning as a name server, authority node, or task node.

4. The method of claim 2 wherein the HyperContract specifies one or more network nodes as backup nodes in case the primary nodes specified in the HyperContract go offline or are unable to fulfill their specified role and designated tasks.

5. The method of claim 1 wherein the job specification stipulates that the node shall perform communication over the network between or among two or more users or callers.

6. The method of claim 1 wherein the job specification stipulates devices or vehicles with wireless connectivity capability of forming an ad hoc peer-to-peer network of communication nodes not dependent on a network carrier or fixed communication network.

7. The method of claim 1 wherein the job specification stipulates that the network nodes shall perform distributed cloud computing to execute software, algorithms, or executable code contained in the job description.

8. The method of claim 1 wherein the job specification stipulates that the network nodes shall manage command and data flow among IoT devices or other edge devices.

9. The method of claim 1 wherein the job specification stipulates that the network nodes shall store and retain data or files functioning as redundant non-volatile storage.

10. The method of claim 9 comprising:
    fragmenting the data or files before the data or files are stored in the network nodes;
    storing the data or files in a disaggregated form spread across nodes in the network;
    returning a cryptographic recovery key needed to recover the fragmented data or files to the node generating, sending, or holding the HyperContract with the job description stored data; and
    causing the node generating, sending, or holding the HyperContract to use the cryptographic recovery key to collect and defragment the fragmented data or files so as to restore the fragmented data or files to their original form.

11. The method of claim 10 comprising:
    scrambling or encrypting the data or files before fragmenting the data or files; and
    causing the node generating, sending, or holding the HyperContract to use the cryptographic recovery key unscramble or decrypt the data or files after fragmenting the data or files so as to restore the data or files to their original form.

12. The method of claim 1 wherein the network nodes are metamorphic, and wherein the HyperContract designates:
    which network nodes will differentiate into name server nodes until the tasks specified in the job description of the HyperContract are completed;
    which network nodes will differentiate into authority nodes until the tasks specified in the job description of the HyperContract are completed; and
    which network nodes will differentiate into task nodes until the tasks specified in the job description of the HyperContract are fulfilled;
and wherein, after the tasks specified in the job description of the HyperContract are fulfilled, the name server, authority node, and task nodes designated in the HyperContract revert back into undifferentiated network nodes.

13. The method of claim 12 wherein each HyperContract comprises security credentials, including one or more of numeric seeds and cryptographic keys, the numeric seeds and cryptographic keys enabling selected network nodes to access information stored as fragmented data in a diffuse cloud storage, and wherein:
    on a need-to-know basis, name server nodes have access to data related to name server related data stored only on the name server diffuse cloud;
    on a need-to-know basis, authority nodes have access to data related to authority node related data stored only on the authority node diffuse cloud; and
    on a need-to-know basis, task nodes have access to data related to task node related data stored only on the task node diffuse cloud.

14. A method of secure communication and transactional processing in a decentralized communication and computer network, the network comprising a plurality of software-based communication network nodes hosted on heterogenous network-connected devices capable of transferring and processing packets of digital data, the method comprising:

authenticating every node instance installed on a device using a signed digital CA certificate authenticating its veracity and authenticity, wherein the CA certificate is network native and includes a HyperSphere specific identity and signature known only to the network and not available to third parties or interlopers; and providing a HyperContract, the HyperContract being authored by a merchant or service provider seeking access to network resources and specifying a job to be performed by the decentralized network.

15. The method of claim 14 wherein the CA certificate is authenticated and digitally signed by the HyperSphere network and by the merchant or service provider who authored the HyperContract.

16. The method of claim 14 where the HyperContract is authenticated and digitally signed by the HyperSphere network and by the merchant or service provider who authored the HyperContract.

17. A method of secure communication and transactional processing in a decentralized communication and computer network, the network comprising a plurality of software-based communication network nodes hosted on network-connected devices capable of transferring and processing packets of digital data; the method comprising:

providing a HyperContract, the HyperContract specifying a job description and containing a pledge of compensation for network nodes completing respective tasks assigned to the network nodes in the HyperContract; and executing the HyperContract, the execution of the HyperContract involving the transport of data packets through the network, the transport of the data packets generating a unique cryptographic hop code for each node-to-node hop of a data packet.

18. The method of claim 17 comprising causing a node to confirm its participation in executing a HyperContract by redeeming its cryptographic hop code as proof of its execution of the HyperContract, the node receiving a portion of the amount pledged in the HyperContract in return for transporting a data packet.

19. The method of claim 18 wherein the node receives a portion of the amount pledged in the HyperContract in a tradable cryptocurrency, the method further comprising permanently recording the redemption of the cryptographic hop code by the node on a perpetual DyDAG or blockchain.

20. The method of claim 18 wherein the node receives a portion of the amount pledged in the HyperContract in a non-tradable cryptocurrency, the method further comprising:

permanently recording the redemption of the cryptographic hop code by the node as a non-tradable cryptocurrency on a perpetual DyDAG or blockchain;

converting or minting the non-tradable cryptocurrency into a tradable cryptocurrency; and permanently recording the conversion of the non-tradable cryptocurrency into a tradable cryptocurrency on a perpetual DyDAG or blockchain.

21. The method of claim 1 wherein the HyperContract changes as the HyperContract passes through a node.

\* \* \* \* \*